Jan. 31, 1967 DAVID KWOK KANG LEE ETAL 3,301,963

REGISTER-SENDER ARRANGEMENT FOR A COMMUNICATION
SWITCHING SYSTEM COMMON CONTROL ARRANGEMENT

Filed Sept. 11, 1963 78 Sheets-Sheet 1

INVENTORS.
David Kwok Kang Lee
Howard L. Wirsing

BY C. A. Gullbrandsen

ATTY.

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 3

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 4

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 18

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 24

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 25

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 27

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 34

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 45

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 48

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 51

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 53

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 54

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 57

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 60

| POSITION → | A (1 2 3 4) | J (1 2 3 4) | B (1 2 3 4) | C (1 2 3 4) | D (1 2 3 4) | E (1 2 3 4) | F (1 2 3 4) | G (1 2 3 4) | H (1 2 3 4) | I (1 2 3 4) |
|---|---|---|---|---|---|---|---|---|---|---|
| ROW 1 | COUNTER (A) | "LX" (1-2); "CX" (3-4) | "MX" (1-2); RT (3); PP (4) | TL (1-3); LT (4) | "VX" (1-2); FM (3); PR (4) | KE (1); RQ (2); KM (3); DR (4) | TR (1); TS (2); TJ (3); FD (4) | "RX" (1-2); CB (3); RA (4) | IN | AD (1-3); CT (4) |
| ROW 2 | COUNTER (B) | TA | "MX" (1-2); DS (3); "SX" (B4 to C4) | "SX" | "QX" (1-3); HG (4) | AR | AS | MD | ES (1-3); TB (4) | SK |
| ROW 3 | ACCUMU-LATOR | TN | GR | MF DIGIT ENTRY | D13 S23 | D12 S22 | D11 S21 | D10 S19 | D9 S18 | D8 S17 |
| ROW 4 | ACCUMU-LATOR | UN | DE (1-3); EP (4) | MF DIGIT ENTRY D7 S15 | D6 S14 | D5 S13 | D4 S12 | D3 S11 | D2 S10 | D1 S9 |
| ROW 5 | COUNTER (C) | $K_X$ ¦ $K_X$ | $Y_X$ ¦ $Y_X$ | ¦ MF DIGIT ENTRY S29 NO | $P_O$ ¦ $N_O$ S28 | $U_O$ ¦ $N_O$ S28 | $T_O$ ¦ $N_O$ S27 | $H_O$ ¦ $N_O$ S27 | $D_O$ ¦ $A_O$ S26 | $C_O$ ¦ $A_O$ S26 |
| ROW 6 | COUNTER (D) | $Q_T$ S7 | $P_I$ S6 | $U_T$ S6 | $T_T$ S5 | $H_T$ S5 | $D_T$ S2 | $C_T$ S2 | $B_T$ S1 | $A_T$ S1 |

FIG. 64

SENDER ASSIGNOR SEQUENCE STATES

REGISTER & DISCONNECT SEQUENCE STATES

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 71

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 72

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 75

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 77

Jan. 31, 1967 DAVID KWOK KANG LEE ETAL 3,301,963

REGISTER-SENDER ARRANGEMENT FOR A COMMUNICATION SWITCHING SYSTEM COMMON CONTROL ARRANGEMENT

Filed Sept. 11, 1963 78 Sheets-Sheet 78

United States Patent Office 3,301,963
Patented Jan. 31, 1967

3,301,963

REGISTER-SENDER ARRANGEMENT FOR A COMMUNICATION SWITCHING SYSTEM COMMON CONTROL ARRANGEMENT

David Kwok Kang Lee and Howard L. Wirsing, Chicago, Ill., assignors to Automatic Electric Laboratories, Inc., Northlake, Ill., a corporation of Delaware
Filed Sept. 11, 1963, Ser. No. 308,112
16 Claims. (Cl. 179—18)

This invention relates to a register-sender arrangement for a communication switching system common control arrangement.

Many electronic automatic telephone switching systems have been developed in order to realize advantages such as fast operation, small size, and easy maintenance as compared to electromechanical systems. These electronic systems can be divided into two categories, those in which the voice path switching is accomplished by means of a common highway with time division multiplex sampling of the voice signals, and those using crosspoint switching devices connected in matrix form in one or more stages. The crosspoint type systems include small exchange types having approximately 100 lines in which control circuits such as registers and sequence switches are individual to connecting units such as links. In the larger crosspoint type systems the control circuits are time-shared by the connecting units. Furthermore, in order to permit non-decimal selections translations are usually provided in these systems. Translation permits conversion of called number information from the form in which it is received, for example as decimal dial pulses, to non-decimal forms for switch control and other purposes.

The object of this invention is to provide a universal register that will accommodate local, incoming, and tandem traffic in order to eliminate the necessity for separate registers for incoming trunks and for local lines.

These and other objects of this invention are attained in one specific illustrative embodiment wherein the common control equipment includes a pool of registers, with each originating call using a register only until the connection to a called line or outgoing trunk is established; and with the pool of registers comprising electronic apparatus shared on a time division multiplex basis. A pool of registers is preferably divided into a plurality of register groups, each including a ferrite core coordinate array, used with the electronic apparatus in a recirculating arrangement. Senders are also included for transmitting switching instruction in response to information stored in the registers. A translator is provided for seizure by the register equipment for providing the translation between the equipment location numbers and the corresponding line directory numbers and for passing the translated information to the register.

A pending United States patent application by K. E. Prescher et al., for a Register-Sender Arrangement for a Communication Switching System Common Control Arrangement, Serial No. 268,385, filed March 27, 1963, covers a time division multiplex register arrangement in which a large amount of storage is obtained for each register by providing several rows per register in the memory, and by dividing the time slot of each register into several sub time slots. Dividing the storage requirements of a register into several rows allows a more efficient use of the memory drive and sense circuitry, and the other electronic apparatus of a register group.

A feature of this invention relates to the provision of a universal register that accommodates local, incoming and tandem traffic by providing multi-frequency and touch-calling receivers in the unit connecting the registers with the markers and by employing other logic circuits in the register to perform the necessary operations.

Another feature of the invention relates to the detection of a reverting call so that a calling party need not dial a special reverting-call code. A parity circuit is used in the register to compare the called line number with the calling line equipment number to detect when a reverting call is in progress. After the called party's directory number is transmitted to the translator, the called party's equipment location number is returned from the translator to the register and is compared with the calling line equipment number returned from the markers.

Another feature of the invention relates to logic circuits in the register to process alternate route information returned from the markers via the sender to the register. This information is stored in the recirculating memory so that the register can change the outpulsing pattern if required to do so by a marker. Thereby, the markers' choice of alternate routes is not restricted by the mode of outpulsing required. Also, a resend feature is also provided to improve the grade of service by allowing a second attempt to complete a call via a different connection; wherein the resend signal returned from the marker to the register via the sender is stored in the register to inform the sender that the switching instructions must be repeated to the markers.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–87 wherein:

FIG. 1 is a block diagram of a telephone switching exchange;

FIGS. 1A through 8 when arranged as shown in FIG. 79 comprise a more detailed block diagram of the exchange;

FIGS. 9–11 when arranged as shown in FIG. 80 comprise a call-thru diagram;

FIGS. 12–14 comprise a schematic representation of a local register junctor;

Figure 35:
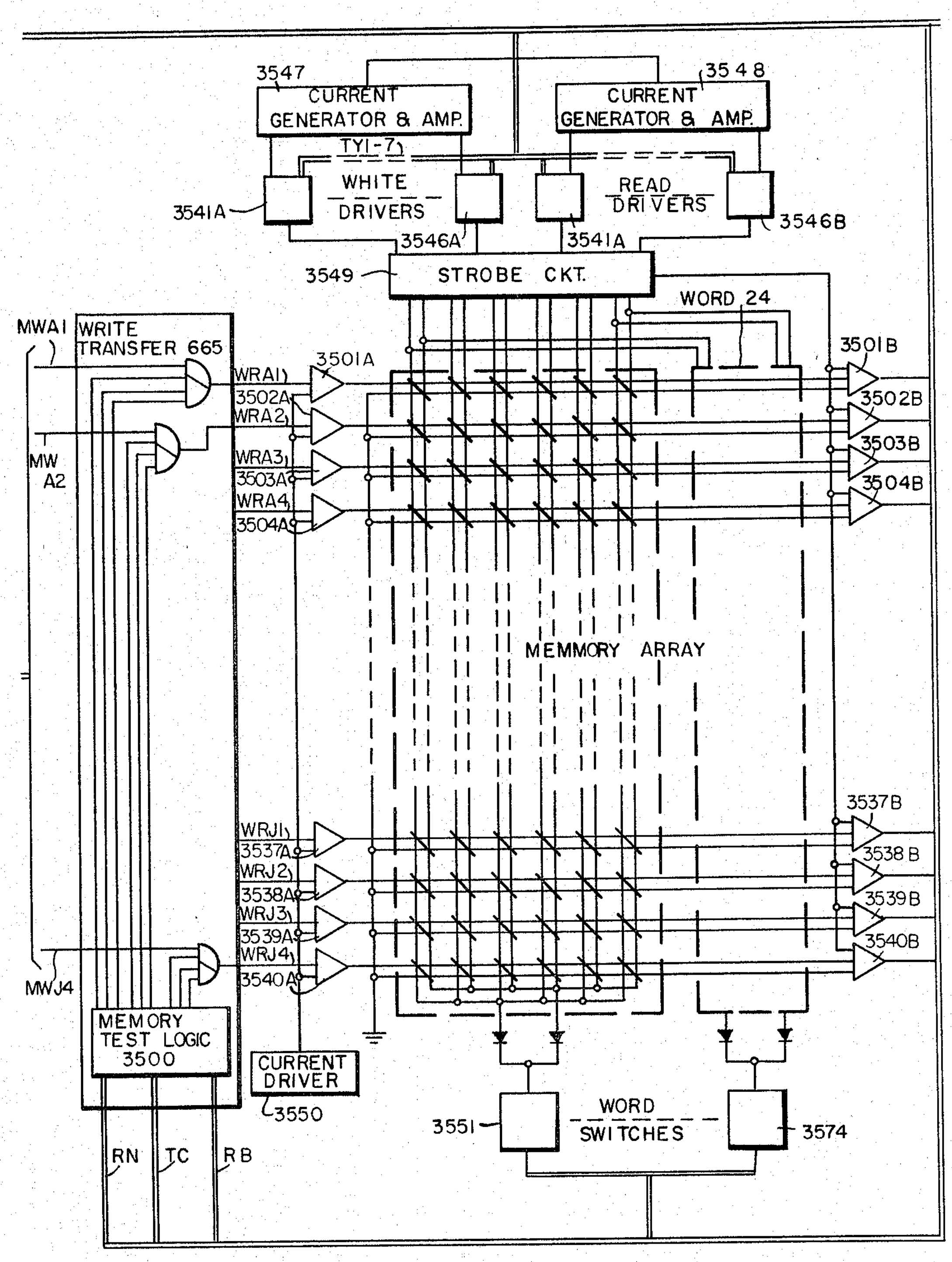
Figure 36:
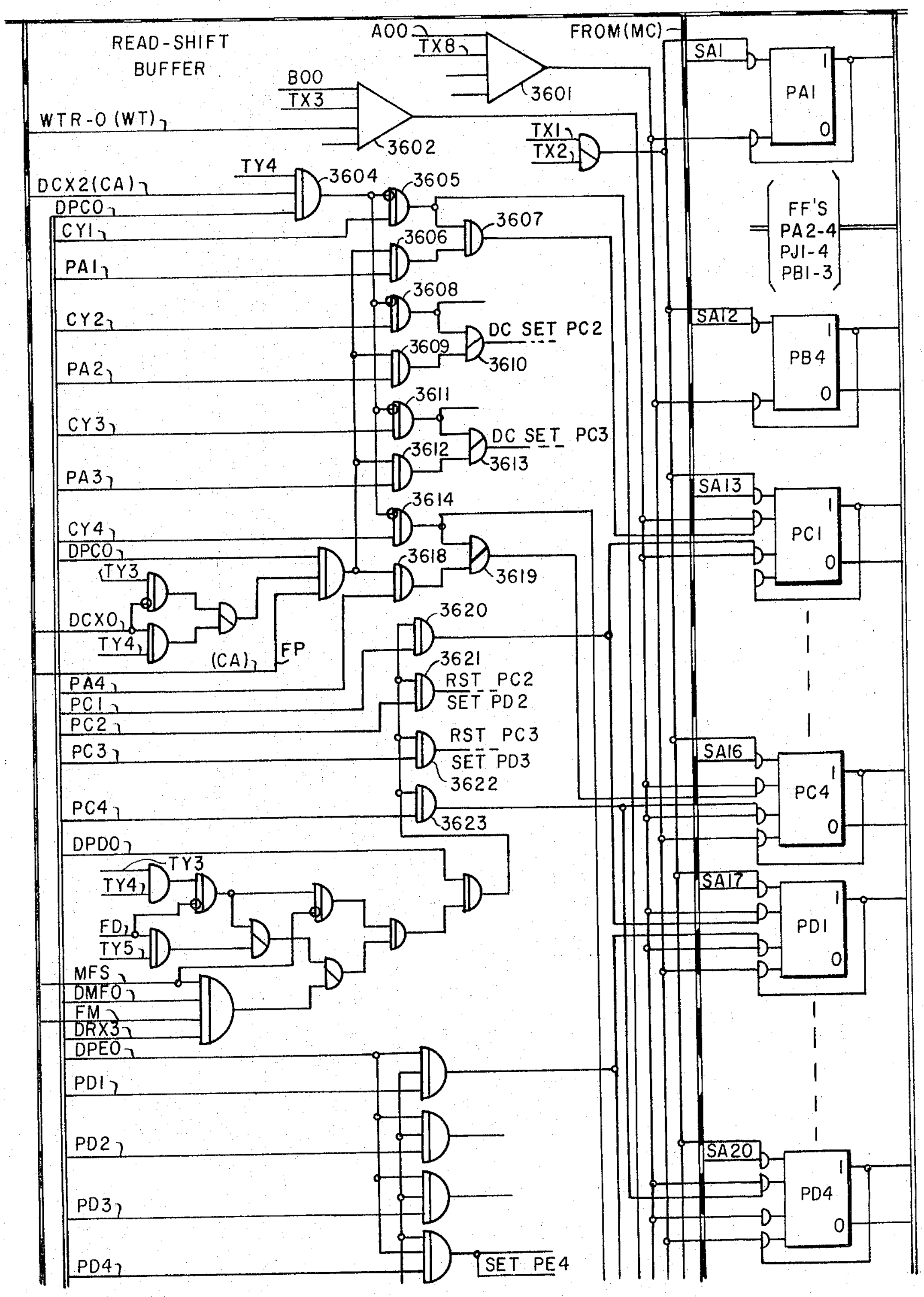
Figure 37:
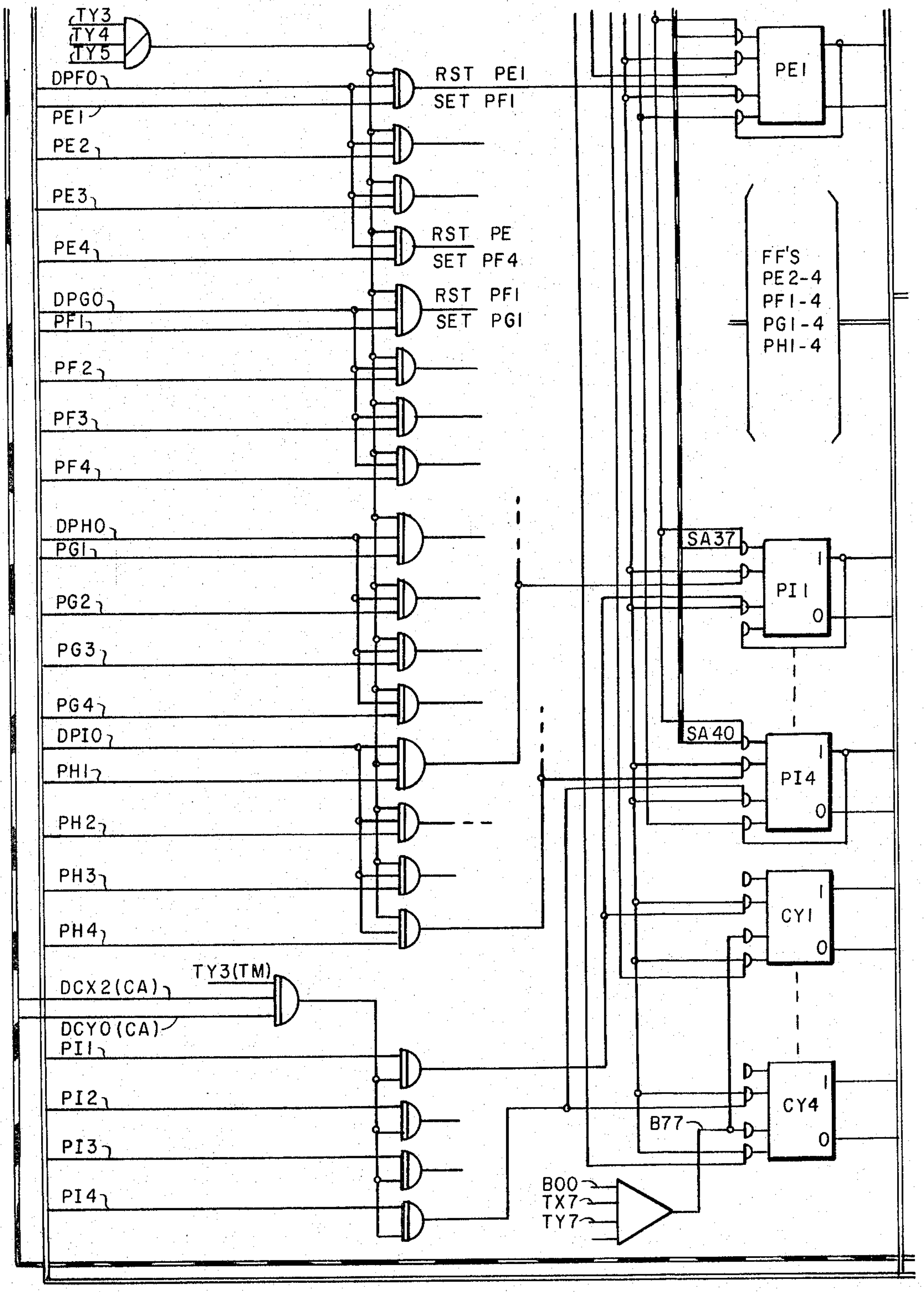
Figure 54:
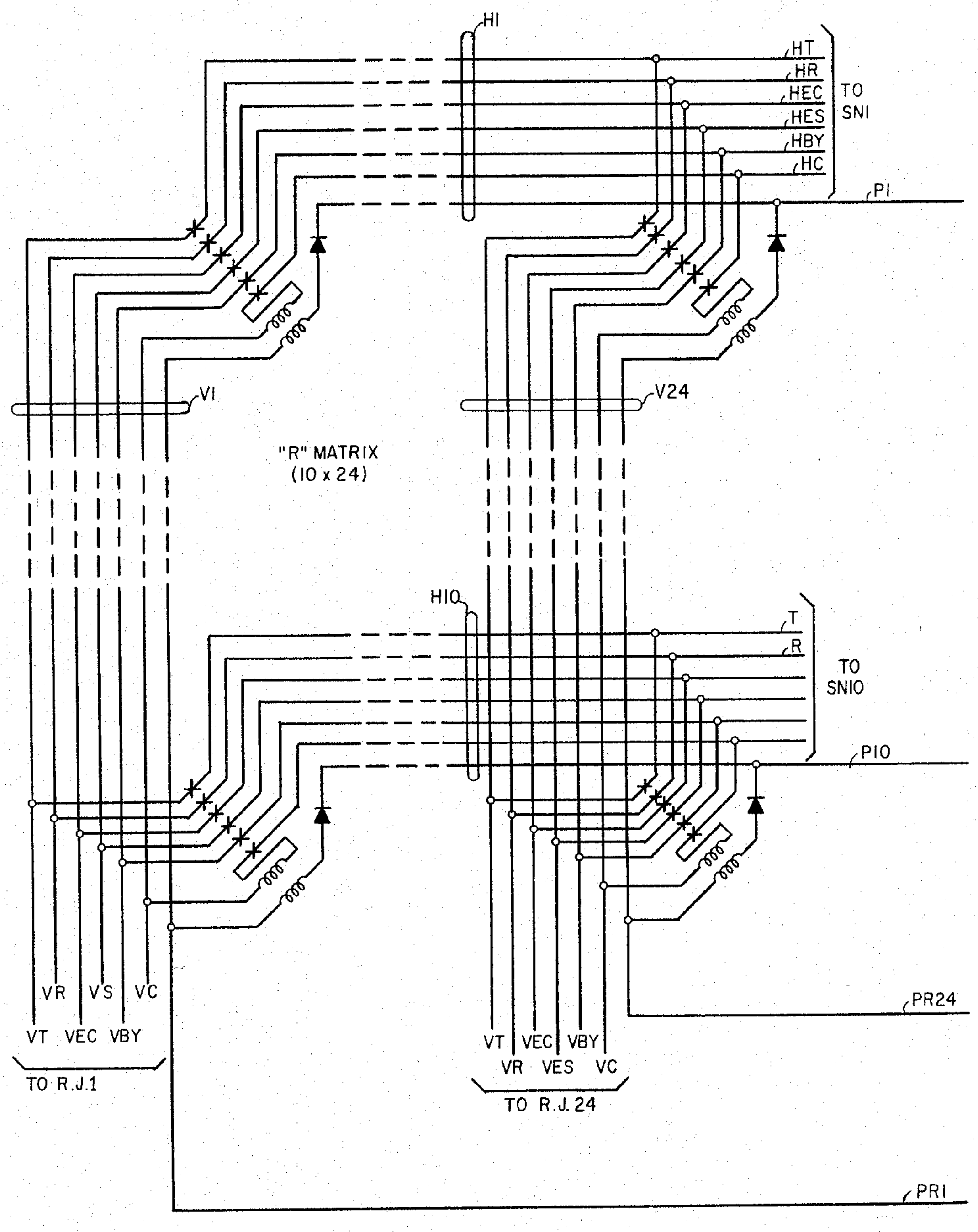
Figure 55:
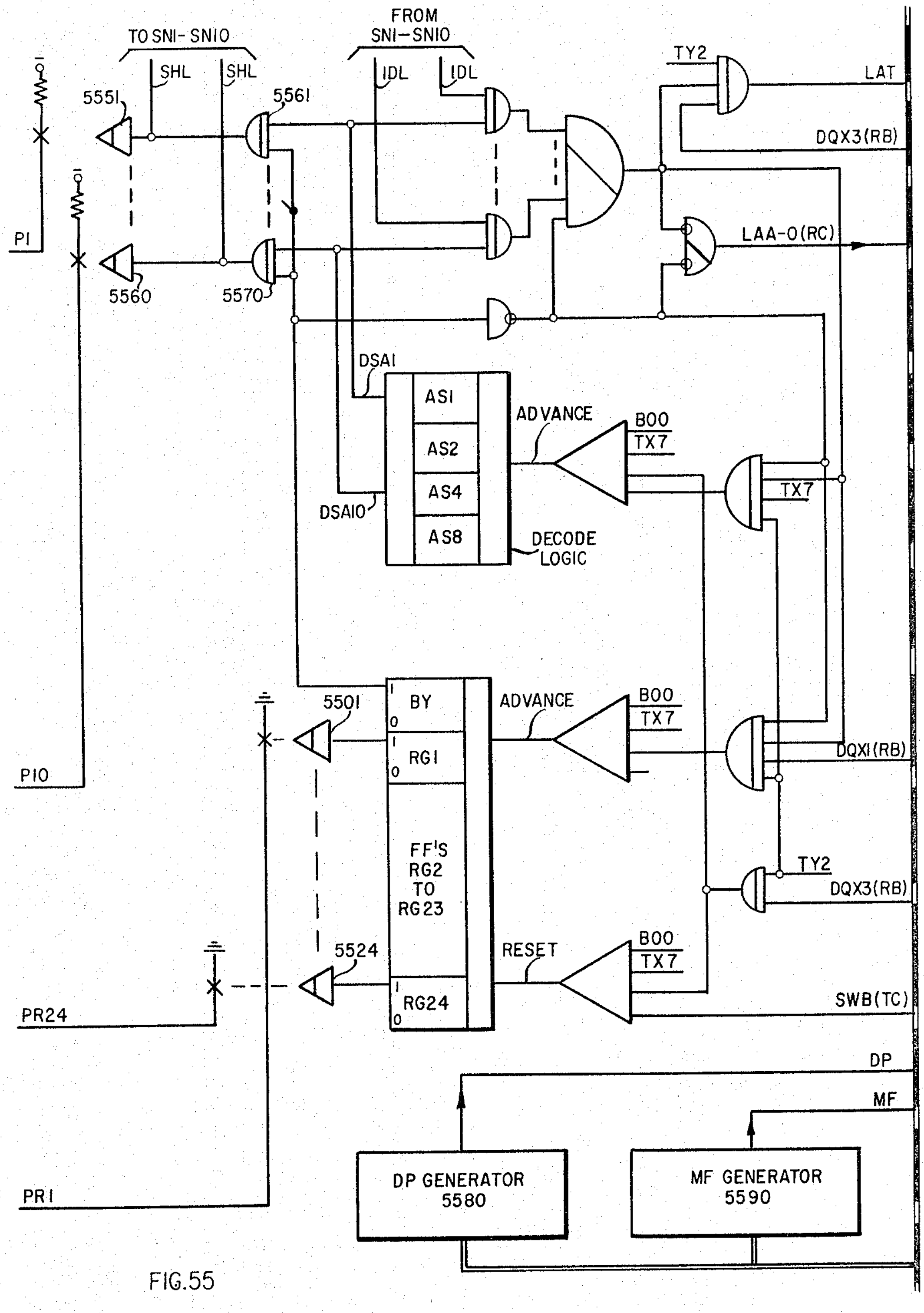
Figure 62:
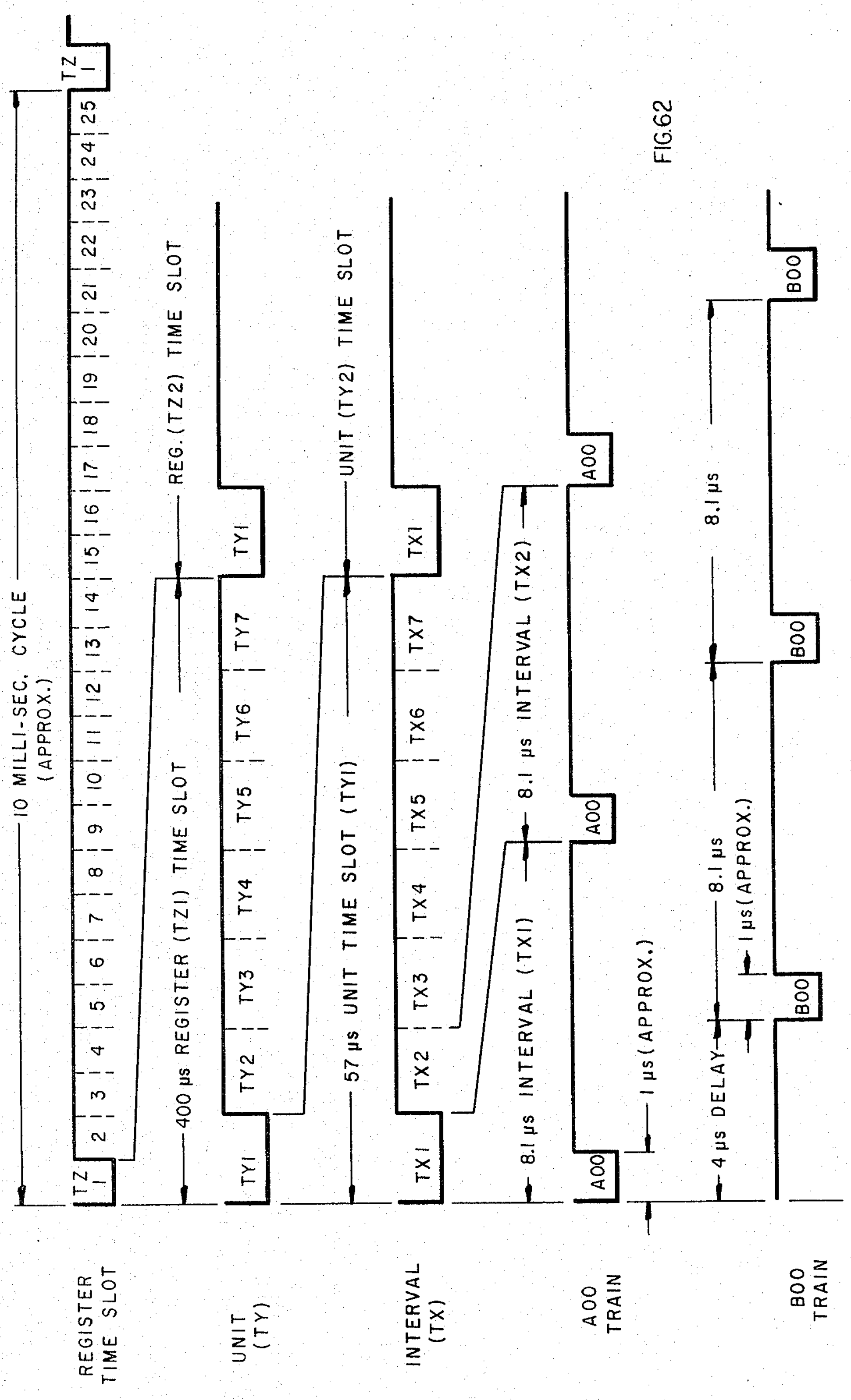
Figure 63:
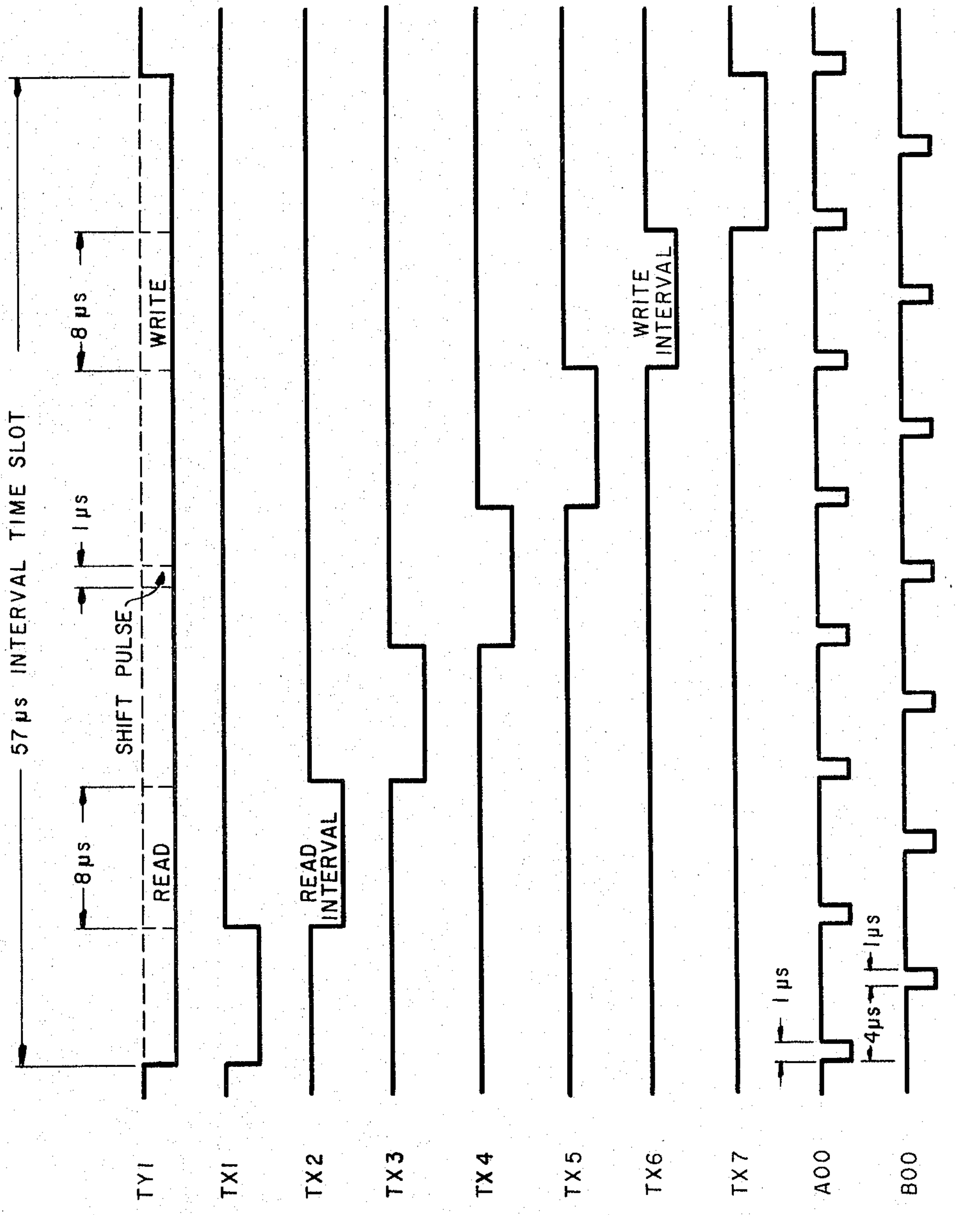
Figure 65:
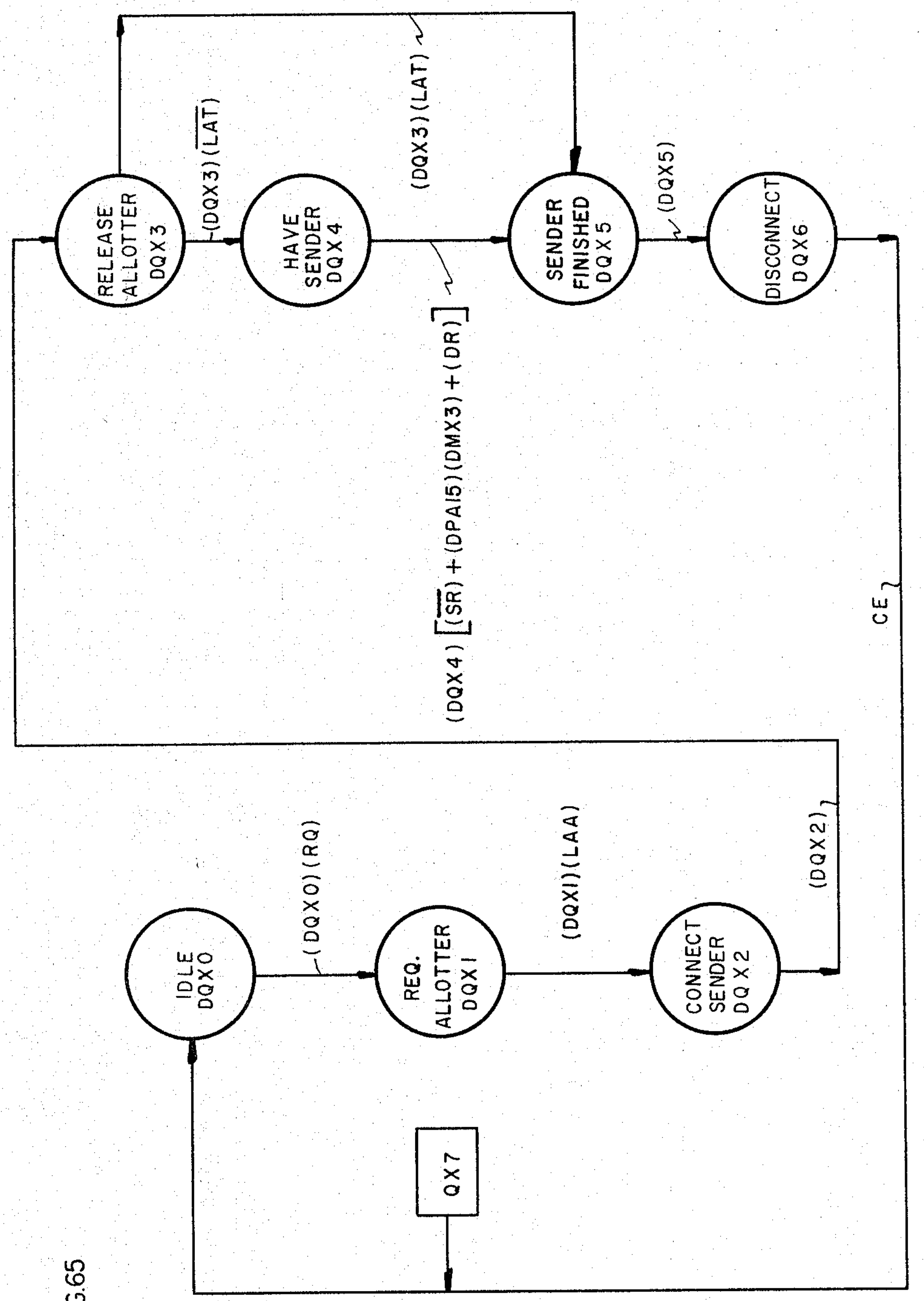
Figure 66:
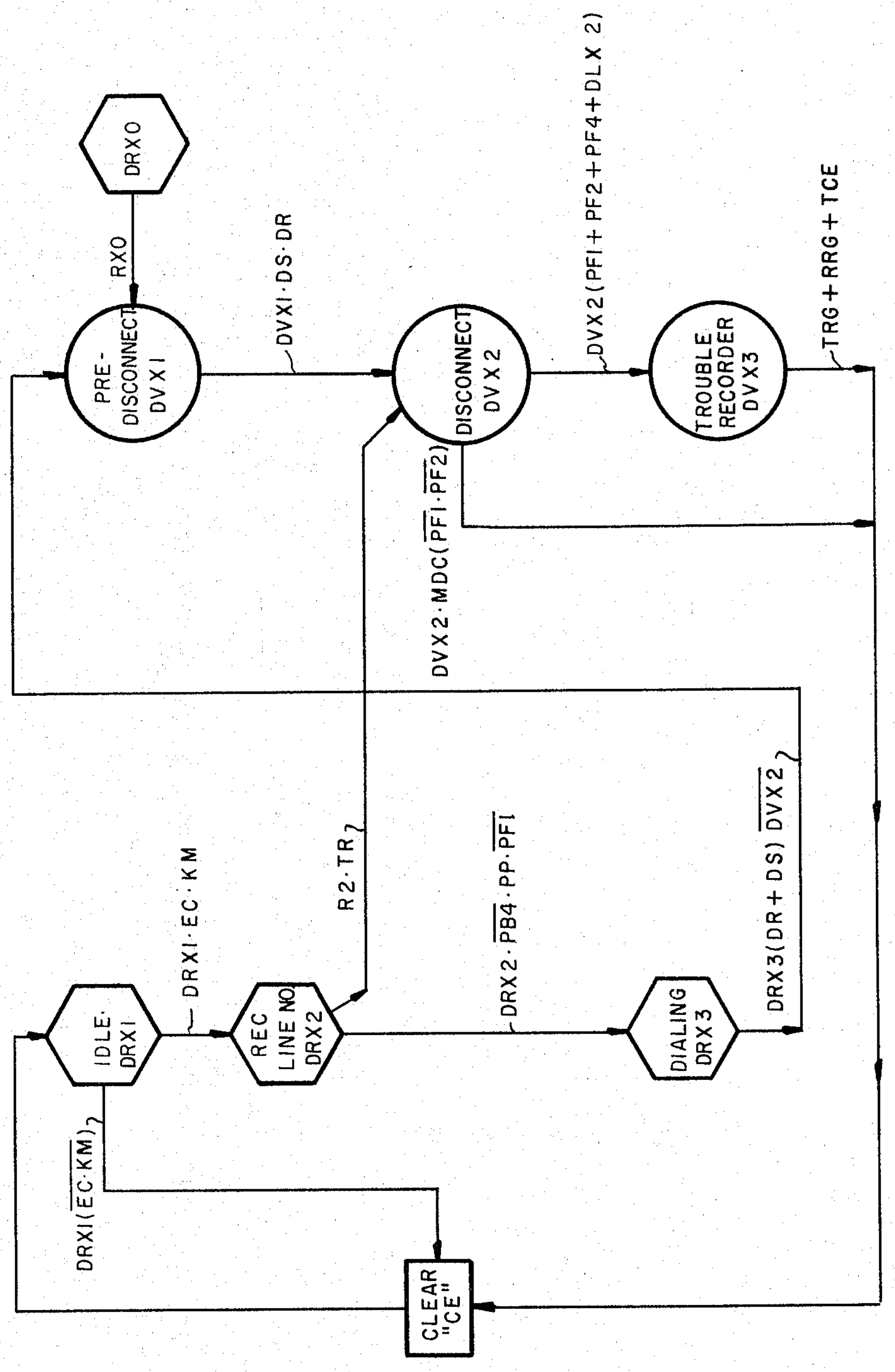
Figure 78:
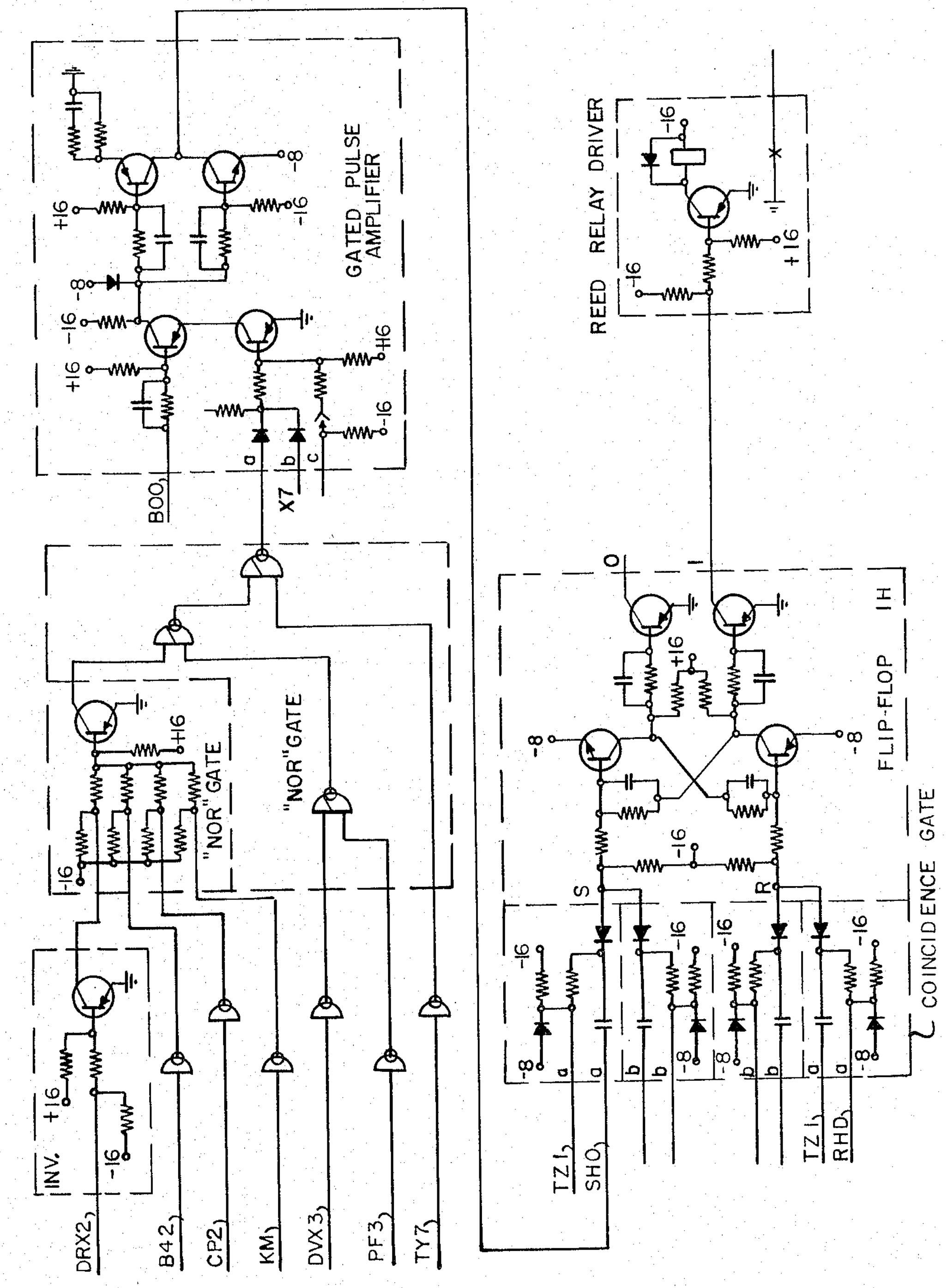
Figure 79:
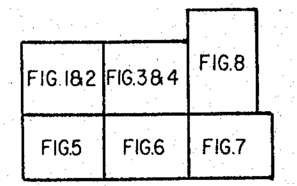
Figure 81:
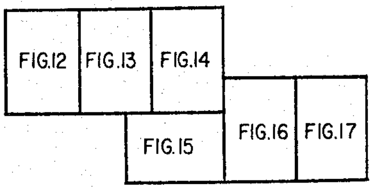
Figure 82:
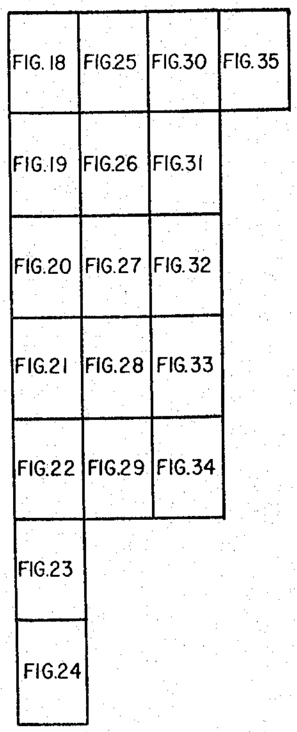
Figure 83:
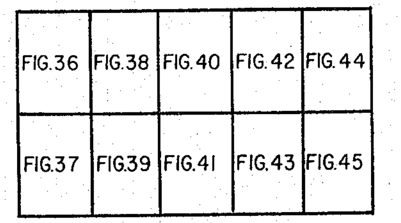
Figure 84:
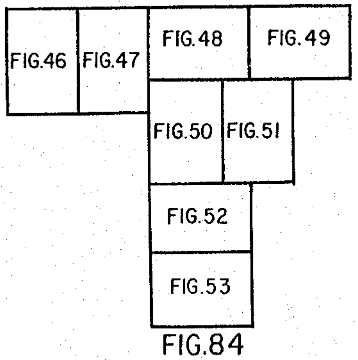
Figure 86:
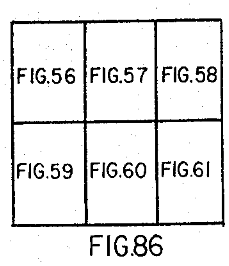
Figure 87:
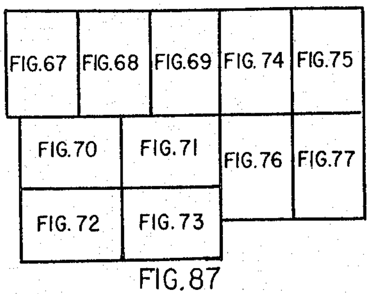

FIGS. 18–34 comprise a symbolic block diagram of the register controller;

FIG. 35 is a symbolic block diagram of the write transfer, memory write control, ferrite-core memory array, and the memory read control;

FIGS. 36–39 comprise a symbolic block diagram of the read-shift buffer;

FIGS. 40–45 comprise a symbolic block diagram of the carry buffer;

FIGS. 46–53 when arranged as shown in FIG. 84 comprise a symbolic block diagram of the register transceiver;

FIG. 54 is a schematic diagram of the register sender matrix;

FIG. 55 is a symbolic block diagram of the sender assigner and the multi-frequency and dial pulse generator;

FIGS. 56–61 when arranged as shown in FIG. 86 comprise a symbolic block diagram of the sender controller;

FIGS. 62–63 are graphs of the wave forms for the time division generator;

FIGS. 64–66 are charts which are useful in understanding the operation of the register;

FIGS. 67–77 when arranged as shown in FIG. 87 comprise a symbolic block diagram of a sender;

FIG. 78 is a schematic diagram of a NOR gate, gated pulse amplifier, flip-flop, inverter gate, and a reed-relay driver;

FIG. 81 shows how FIGS, 17–17 are to be arranged;

FIG. 82 shows how FIGS. 18–35 are to be arranged;

FIG. 83 shows how FIGS. 36–45 are to be arranged; and

Figure 85:
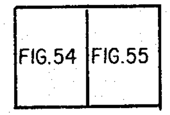

FIG. 85 shows how FIGS. 54–55 are to be arranged.

The system is explained according to the following outline:

A. SYSTEM ORGANIZATION
B. GENERAL DESCRIPTION OF THE REGISTER SENDER
  (1) Components
  (2) Operation
  (3) Call-thru Diagram
C. DETAILED DESCRIPTION OF THE REGISTER SENDER
  1. Components
    (a) Symbolism
    (b) Register junctor; local and incoming
    (c) Register junctor buffer and lead multiplexer
    (d) Register receiver
    (e) Register controller
    (f) Write transfer
    (g) Memory write, ferrite core memory array, and memory read
    (h) Read shift buffer
    (i) Carry buffer
    (j) Register transceiver
    (k) Sender assigner
    (l) Register sender matrix
    (m) Sender controller
    (n) Multi-frequency and dial pulse generator
    (o) Time division generator
    (p) Sender
  2. Operation of the register-sender
    (a) Local call
      1. Reverting call
    (b) Outgoing call
    (c) Incoming call
D. CONCLUSION

A. SYSTEM ORGANIZATION

Referring to FIGS. 1A–8, the system consists of the line group 100, group selector 300, register-sender group 600, and the translator 700. There is also a trunk group 500 which provides access from incoming trunks to the registers, and a control center 800 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designed on an electronic basis and semi-conductor circuitry is employed throughout the system. A ferrite core memory 660 is used for temporary storage whereas the magnetic drum 730 is used for semi-permanent storage.

The sender circuit, 671–80, provides means for transferring information over the voice transmission path from the register-sender to the markers or to distant offices and are claimed in the following pending United States patent application: B. Sherstiuk, A Sender for a Communication Switching System, Serial No. 280,053, now Patent No. 3,278,691, filed May 13, 1963.

The space division switching elements of the system consists of reed relay matrix assemblies.

*Control center*

The control center 800 is designed for the purpose of introducing automation into the maintenance administration of the switchboard. The control console has direct access to all of the stored system program which is written on the magnetic drum. By means of an electric typewriter, this program may be changed by the maintenance personnel to accomplish quickly, for example, subscriber moves, re-routing of calls to intercept, transfer of a call to another line, absent subscriber service, toll restriction, line busy recording, etc. This method of operation has eliminated the need for an IDF and the labor of changing jumper wires.

The electric typewriter contains a tape punch as well as printer and thus provides a copy of the information written onto the magnetic drum.

*Line group matrix*

This section of the system may be thought of as a large switching unit capable of connecting any one of 1000 lines originating calls to any one of 120 circuits called originating junctors 120. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages, A, B, and C make up the outgoing switching stages. Four stages, E, D, B and A, make up the incoming switching stages. The 1000 subscribers' lines divided into ten groups of 100 each, are located on the main distributing frame and from there are jumpered directly to the A stage 112. No intermediate distributing frame is required. The A stage has 600 outlets or links (60 for each of the ten "hundreds" group) appearing as inlets to the B stage 114. The B stage, in turn, has 300 links (30 for each "hundreds" group) appearing as inlets to the C stage 116. The C stage has 120 links to originating junctors 120. The originating junctors provide by-paths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

The switching stage matrices are made up of crosspoint reed relays, 15,000 for a fully equipped 1000 line group or 15 per line (12 per line for two unit calls per line). The reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor, identification, transceiver for communicating with the sender circuit, access to called line for busty test, P.B.X selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

*Group selector matrix*

The intermediate switching functions of the system are performed by a group selector 300. Three stages of crosspoint switches are provided. The first switching stage 312, the A stage, contains 60 cards of 50 crosspoints, each arranged in a 50 x 10 matrix. This switching matrix is associated with the inlet circuit 310 line and cut-off reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. In addition, a second group 317 of 60 switches may be added to expand the outlet capability to 1200 in case of a very large central office. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multi-frequency or dial pulse. In this case, the marker will send back instruction regarding digit changes or a command for the sender to change the type of pulsing. If no change is required, the marker can switch the call through to an alternate trunk without changing the sender's instructions.

Insertion junctors 330, shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

*Trunk group matrix*

The trunk group 500 provides access for incoming trunks from outside of the office or for special intra-office trunks such as operator or wire chief. A trunk group matrix is capable of connecting any one of 75 incoming trunks to any one of sixteen registers on a single output level basis. All trunks in the same group of 75 are either dial pulse (DP) or multi-frequency (MF). Trunk group matrices are added as required to handle large numbers of incoming trunks. Each matrix is independently controlled but outlets are graded to provide sharing of registers.

The trunk group matrix is comparable to the R stage of the line group matrix. The incoming trunk is equipped with loop splitting facilities, and access is provided from the register-sender to an inlet circuit of the group selector. When the call has reached its destination, the incoming trunk switches through to the established path and the crosspoints of the trunk group matrix associated with this call are released by the register-sender.

The matrix consists of a two stage network of crosspoint switches. The incoming trunks, divided into five groups of fifteen trunks each, appear as inlets to the first stage, the A stage. The A stage has twenty outlets or links (four for each of the five groups) appearing as inlets to the B stage. The B stage has sixteen links to registers. Both stages use a basic arrangement of twenty crosspoint switches in a 4 x 5 matrix unit. Three units are wired together to give the 4 x 15 matrix unit used in the A stage, while four single units make up the B stage.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

*The register-sender*

The register-sender group 600 is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using diphase.

*The translator*

The translators 700 of the system provide semi-permanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office.

Each translator can be accessed from twenty register-sender groups and a supervisory console on a one-at-a-time basis. Four basic types of translations are processed.

(1) Directory number translations (DNT): the directory number of the called party is translated into switching instructions to enable the register-sender to direct the routing of the call to its destination. The switching instructions contain the equipment location of the called telephone line and the party ringing instructions.

(2) Line number translation (LNT): The calling party's line identification is translated into the calling party's directory number. The line number translations provide automatic number identification (ANI) for all one and two party lines.

(3) Code translations: The called area, office, or special service code is translated into switching instructions. The translation capabilities required of control switching point (CSP) in the direct distance dialing (DDD) network are provided.

(4) Special feature: Special switching instructions are generated to provide such features as home extension intercom, repertory dialing, automatic call transfer, and other special features.

Information storage is provided by magnetic drums on the basis of one drum per translator. Memory words are recorded on the drum surface from a supervisory console, by simply typing the memory word and appropriate memory address at the console typewriter. This directory number and/or code translation can be added or existing translations altered with a minimum of maintenance effort.

Each drum provides 600,000 bits of information storage. Information is represented in digital form using a four bit binary coding. The magnetic drum is 10 inches in diameter and provided with 150 tracks. Each track stores 4000 bits with a packing density of approximately 130 bits per inch. The drum rotates at 1800 r.p.m. and provides an average access time of approximately 16 milliseconds. The basic time interval of 8.1 microseconds for the system logic is derived from recorded clock tracks. The recording technique employed is return-to-zero (RZ). Reading and writing functions are performed by one fixed read and write head per track. Adjustable register heads are provided for the clock tracks.

Memory words are recorded in parallel along the axis of the drum. Each memory word consists of 40 bits, thus occupying one bit in each of 40 tracks. Three segments along the drum axis with each segment made up to 40 tracks provides storage for 12,000 memory words. The memory words are addressed consecutively around the drum circumference with the first 4000 addresses located in segment one, the second 4000 addresses in segment two, and the third 4000 addresses in segment three.

The drum access circuitry, consisting of read and write amplifiers, all transistorized, are mounted on printed circuit cards in close proximity to the magnetic heads. All logic operations are accomplished through the use of transistorized standard circuits, with a small number of special circuits for pulse generation, shaping, distribution, and buffering.

B. GENERAL DESCRIPTION OF THE REGISTER SENDER

The register sender is a time shared, common control unit with the ability to register and process twenty-four simultaneous calls. The preferred embodiment consists of twenty-four registers and ten senders.

The registers operate in a time division mode. There is one register junctor for every register in the group. Real time to time division entry is provided by the register junctor. Each register consists of two main sections, the first being the common control unit. These time divided circuits are shared by all twenty-four registers. These circuits are used by each register in turn and are organized to provide the needed registration and process control for the registers. The second section consists of a temporary storage facility for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

B(1)—COMPONENTS

Figure 6:
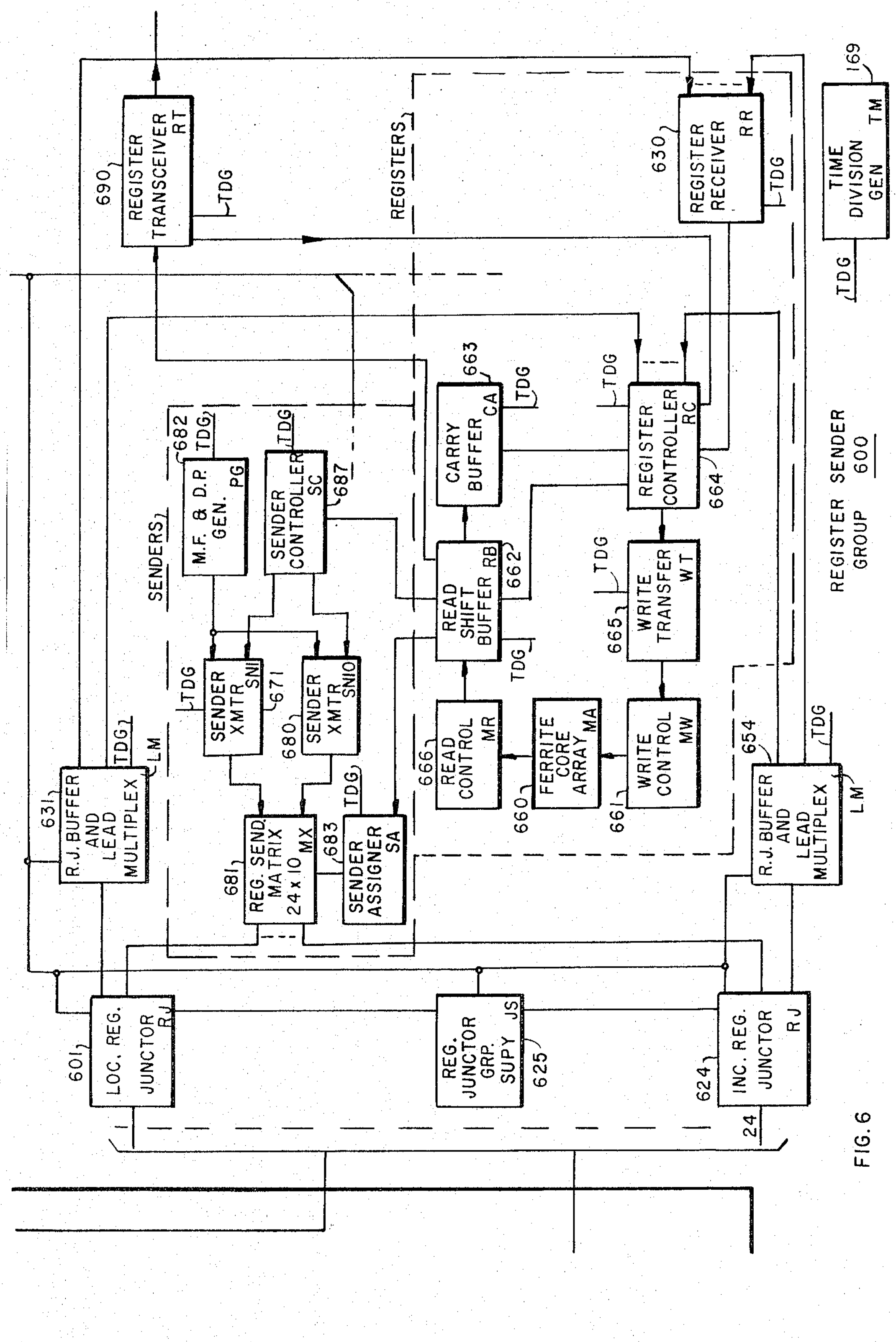
Figure 7:
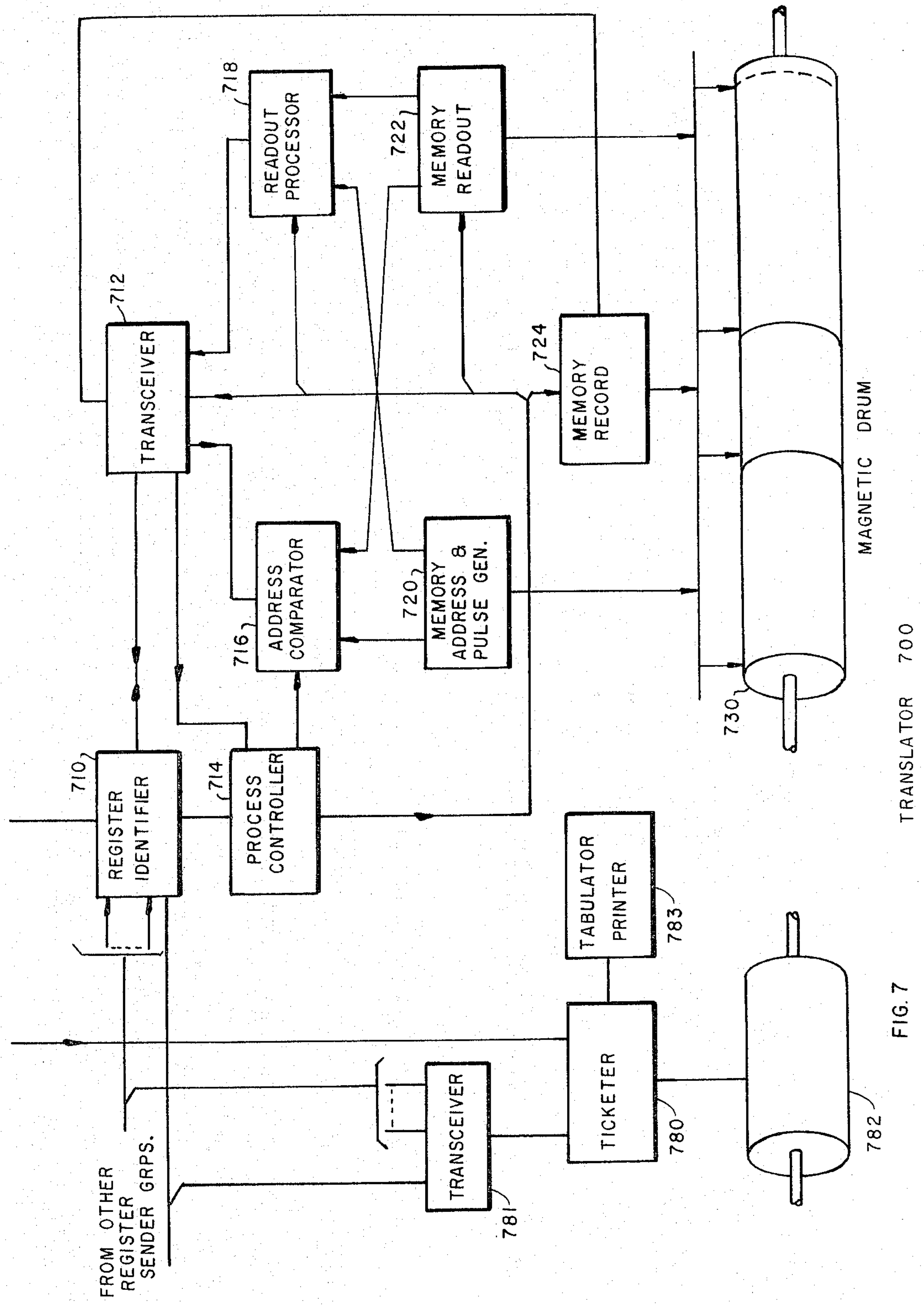
Figure 8:
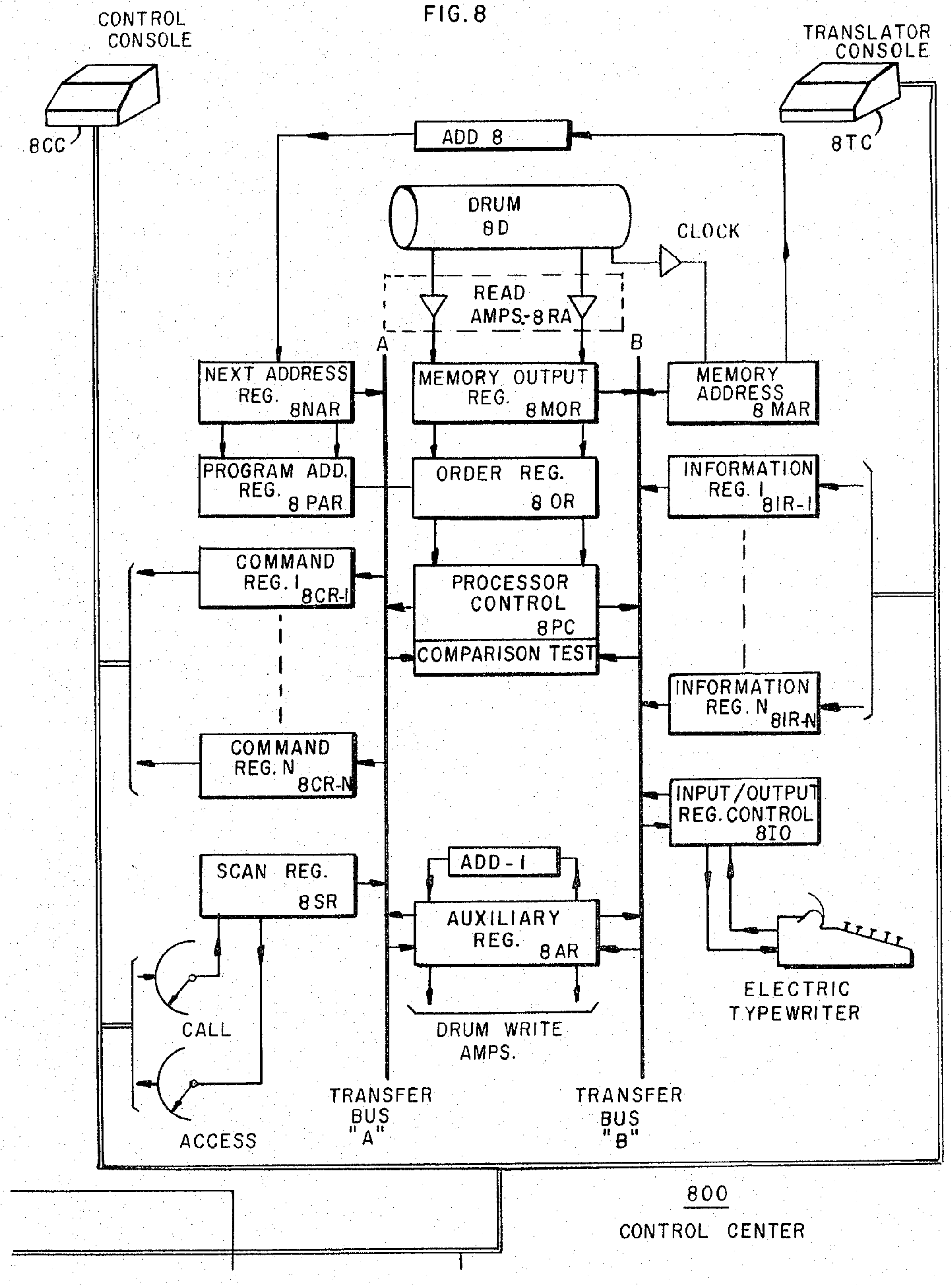

In order to facilitate understanding, the following brief description of each of the circuits within the register sender is given, reference being made to FIG. 6.

The primary function of the register junctor, 601–24, is to provide a buffer between the electronic equipment and the outside plant facilities. As such, the circuit employs reed relays for all switching functions, performing all those functions that require direct connection to the calling line or trunk. These include dial pulse repeating dial tone control, battery feed for the calling line or trunk, calling station identification on party lines, test for coin deposit, coin refund, and test for coin refund. The circuit also controls the switch train and provides for multi-frequency and dial pulse.

The sender circuit, 671–80, provides means for transferring information (dialed digits or switching instruction) over the voice transmission path from the register-sender to the markers or to distant offices. The sender is a universal sender inasmuch as it provides all modes of sending required by the system. Di-phase sending is employed for transmission of switching instructions to the office markers. The di-phase part of the circuit is actually a transceiver since it provides a means of receiving instructions from the markers as well as sending to the markers.

For outgoing calls, the sender provides for both dial pulse and multi-frequency signaling. The circuit operates in conjunction with sender controller 687 which is common to all senders in the register sender group. The sender controller supplies the sender with the digits to be sent out and indicates the mode of sending to be employed.

The sender is mainly an electronic circuit except for outgoing loop supervisory equipment where reed relays are used.

The register receiver 630 is seized by the register controller and assigned to serve the register junctor on a hold-til-finished basis. The circuit receives either the line number identification generated by the link markers or the trunk number identification generated by the trunk markers. On seizure of the circuit, a di-phase link is established to the marker being served. When all the digits have arrived in the register receiver, the information is presented to the register controller for storage in the area of the ferrite core array associated with the register being served. Upon completion of this storage process, the register receiver is released for use by the next register requiring service.

The time division generator generates the time slot pulses, sub-time slot pulses, and control pulses that allow the common equipment to operate in a time division mode.

The time slot pulses create a unique time slot for each of the registers in the group. In association with a group of cores in the core array, they allow a true time division multiplex mode of operation.

The sub-time slot pulses allow the use of a folded word memory; wherein each sub-time slot accesses a section of the invention stored in those cores accessed by a particular time slot. The control pulses allow the controlled generation of decisions while in a particular sub-time slot.

The register controller 664, operating on a time division multiplex basis, controls the progress of each call being processed. Within a particular time slot, this circuit up-dates the information in storage in the section of the core array associated with the time slot register. This updating takes place on a sub-time slot basis and is the result of changes in the information presented since the time slot was served last. All information entering the register sender is available to the register controller for proper arrangement and interpretation.

The memory read 666 and memory write 661 control generates the proper current pulses needed to read and write the cores of the ferrite core array.

The ferrite core array 660 is a sequential access, time slot oriented, temporary storage facility. Each register is assigned a group of cores, which only the time slot with which it is associated can access. This group of cores is accessed in sections by the sub-time slots. Each section of the cores stores part of the total available information. The first section contains registration and translation control information. The second contains sender control information. The third and fourth provide for storage of as many as thirteen dialed digits. The fifth contains the line or trunk identity unless a line number translation has been performed. If a line number translation is performed, the calling party's directory number is stored in these cores. The sixth section contains the translated switching digits.

Since each section contains forty cores and each time slot accesses six sections, the total number of cores per register is two hundred and forty. The total ferrite core memory size per register-sender group is 6,600 cores, wherein one complete register storage is reserved for routining and trouble analysis.

The read shift buffer 662 provides a buffer storage for the memory readout. The read shift buffer is also utilized to shift information, in a particular sub-time slot, from one core position to another. The read shift buffer, by temporarily holding the contents of a section of the memory word, provides a means for this information to be transferred to other circuits within the register sender group.

The carry buffer 663 provides a place where information read from the memory during different sub-time slots can be accumulated until a time is reached, within the time slot, when a decision can be generated on the basis of this information. As a result, by accessing the cores containing the registration and translation control before the time slot is over, an up-dating process is accomplished based on the decisions made during the time slot.

The register transceiver 690 operates as the communication device for information transfer between the register sender group and the system translators. It, like the register receiver, operates on a hold-until-finished basis. This circuit provides two-way di-phase serial communication between the translators and the register sender group. The organization of this circuit is such that the transfer of information from the read shift buffer to the register controller is in a parallel manner. Seizure is dependent on the condition of the control information available in the carry buffer.

The sender controller 687 utilizing information available to it in the read shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call. These digits are obtained from the read shift buffer under the control of the register controller. The sender controller circuit operates in a time division mode and thus serves all registers during each system cycle.

The sender assigner 683, on request of the register controller, will connect an idle sender to the register junctor requiring service. The connection established by the assigner is the beginning of the terminating switch train, which will be extended by the system switching stages on information received from the sender. The sender assigner operates on a hold-til-finished basis.

B(2) OPERATION

The register sender is a combined local and incoming unit and will handle and process calls of all types of which this call is one of many possibilities.

Upon removal of the handset by the calling subscriber, the line marker identifies the line and searches for an idle register junctor. After finding an idle register junctor, the line marker determines if a path can be established from the calling line to that register junctor. If so, the line marker extends a call signal through the register junctor and into the register. This signal is recognized by the register controller during the time slot permanently associated with the register junctor requesting service.

This request for service command causes the register receiver to be attached to the register junctor as soon as it is available. Once the register receiver is seized, a "GO" command is extended to the line marker awaiting service. The line marker then forwards the line identity to the register receiver for storage in the register's core storage area.

As soon as the line identity information is successfully stored, the register receiver is released and a hold signal is sent to the register junctor. This signal causes a release of the line marker and the extension of dial tone to the calling subscriber.

The subscriber dialed digits are repeated by the register junctor on to the time division multiplex "pulse highway." As each pulse is recognized by the register controller, it causes the dialed digit storage information, associated with the register, to be up-dated. As the digits accumulate, they are stored and shifted to their proper location within the register's storage area.

As soon as the first three dialed digits have arrived, a request for the register transceiver is generated and the process digits are coded. The series of digits, called the processing digits, that are contained in the registration and translation control storage area, are given the binary coded decimal values that initiates the translation operation.

This preliminary coding of the process digits will be used by the system translators to select the proper mode of translation. It should be noted that from this point on, in the processing of the call, the register controller will never generate any further coding of the process digits. Each time the system translators return information to the register sender group, the process digits will also be returned. The register controller, on the basis of changes made in the binary coding of the process digits by the translators, will proceed to the next step in the handling of the call. The register controller is organized in a manner that allows it to obey any of the possible instructions and sequence commands inherent in the process digits.

Since a request for the register transceiver has been written, this unit will be seized as soon as it is available. The three dialed digits, the class of service digits, the process digits, will all be loaded in a parallel manner into the register transceiver, from the read shift buffer. The register transceiver requests the service of an idle system translator and as soon as one is attached transmits this information, via a di-phase link, to the translator. For the local call being made the translator will upgrade the process digits and return them to the register transceiver. They are then forwarded to the register controller for storage and the register transceiver is released. In this particular instance they will cause the register controller to wait. They will contain the address of the system translator that must be accessed in order to locate the directory number of the particular local subscriber being called. Since both number group and code translations are located on the same drum, the process digits will indicate that a number group translation is to be performed. The register transceiver as soon as it is seized will receive the seven digits of the called directory number, the class of service of the originating line, and the process digits. The system translator, upon receiving this information, will in this instance, locate the proper switching digits and sender instruction digits. This information in addition to an upgraded set of process digits will be returned to the register transceiver. The information in the register transceiver is forwarded to the register controller for storage. As soon as storage is accomplished, the register transceiver is released for use by any other register requiring service.

The register controller, re-acting to the new coding of the processing digits will, in this instance, cause a request for the sender assigner. As soon as the sender assigner is seized, it will assign an idle sender to the register junctor requiring service. With the sender attached, the sender instruction digits that have been stored with the switching digits now come into play. The sender sequence state control, accessed by the second sub-time slot of the register being served, now forwards the sender control instructions to the sender controller. The sender controller, utilizing the sender control information, forwards the switching digits to the sender. The sender transmits this translated switching information to the proper markers. Two-way communication exists between the system markers and the senders, therefore, the action of the sender will be dependent upon the instructions returned from the markers. The markers are presently arranged to send four different instructions to the sender. These instructions are line idle, line busy, trunk busy, and resend. If line idle is encountered, the signal is repeated to the register junctor which signals the originating junctor to switch through the signals and releases the sender.

The recognition of a sender release signal, by the register controller, causes the register controller to extend a disconnect signal to the register junctor and returns the register's storage area to the idle condition.

If line busy or trunk busy is encountered by the system markers, the disconnect sequence is the same as for the line idle, but in addition, the busy signal is extended to the originating end.

If the resend signal is returned to the sender, the sender will release the terminating switch train and the register controller will cause the initial send state to be introduced. A second attempt to establish the call will then be made. Only one resend signal will be obeyed. If a second resend signal is received, trunk busy will be returned to the calling subscriber.

B(3)—CALL-THRU DIAGRAM

Figure 9:
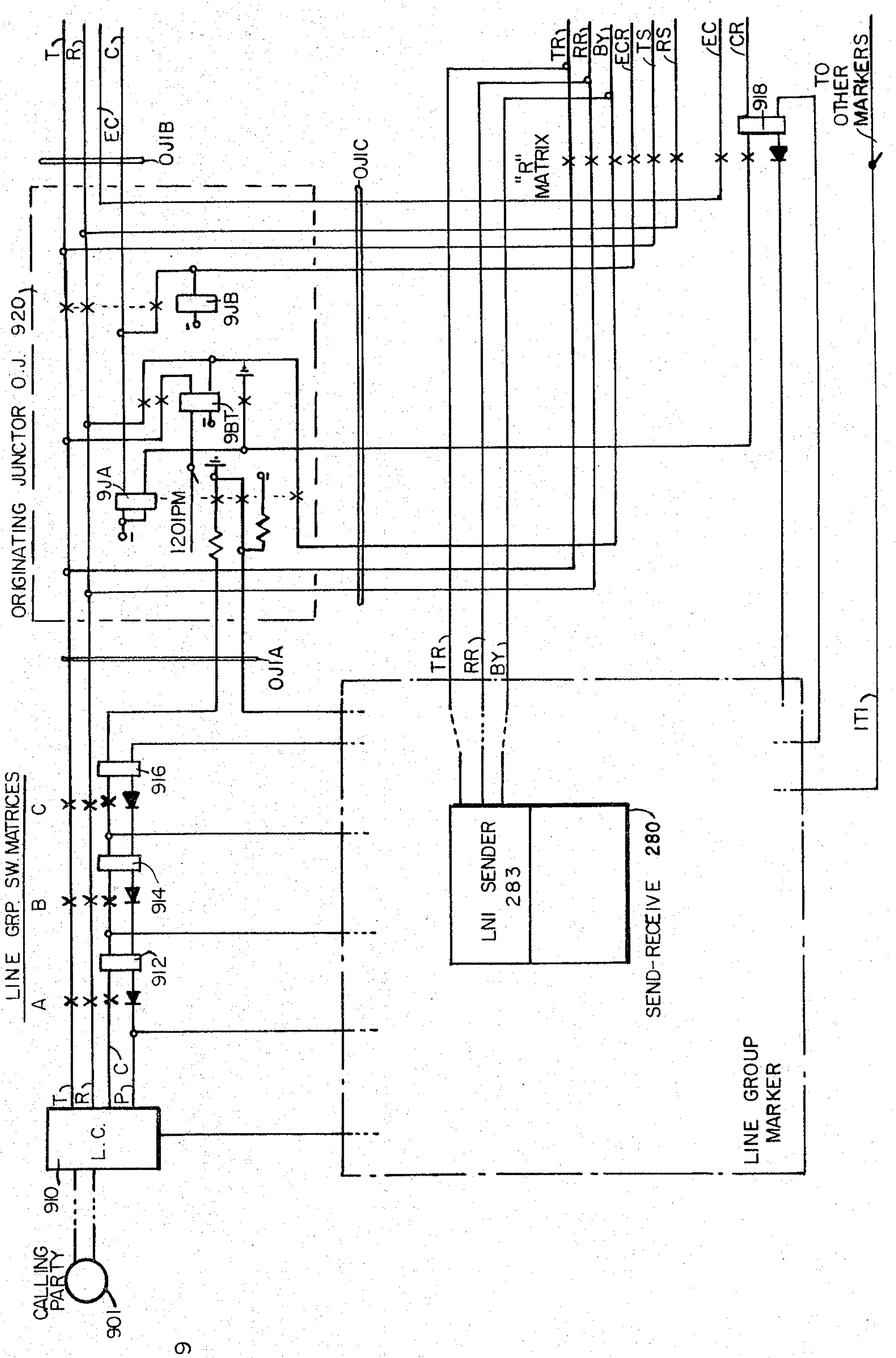
Figure 10:
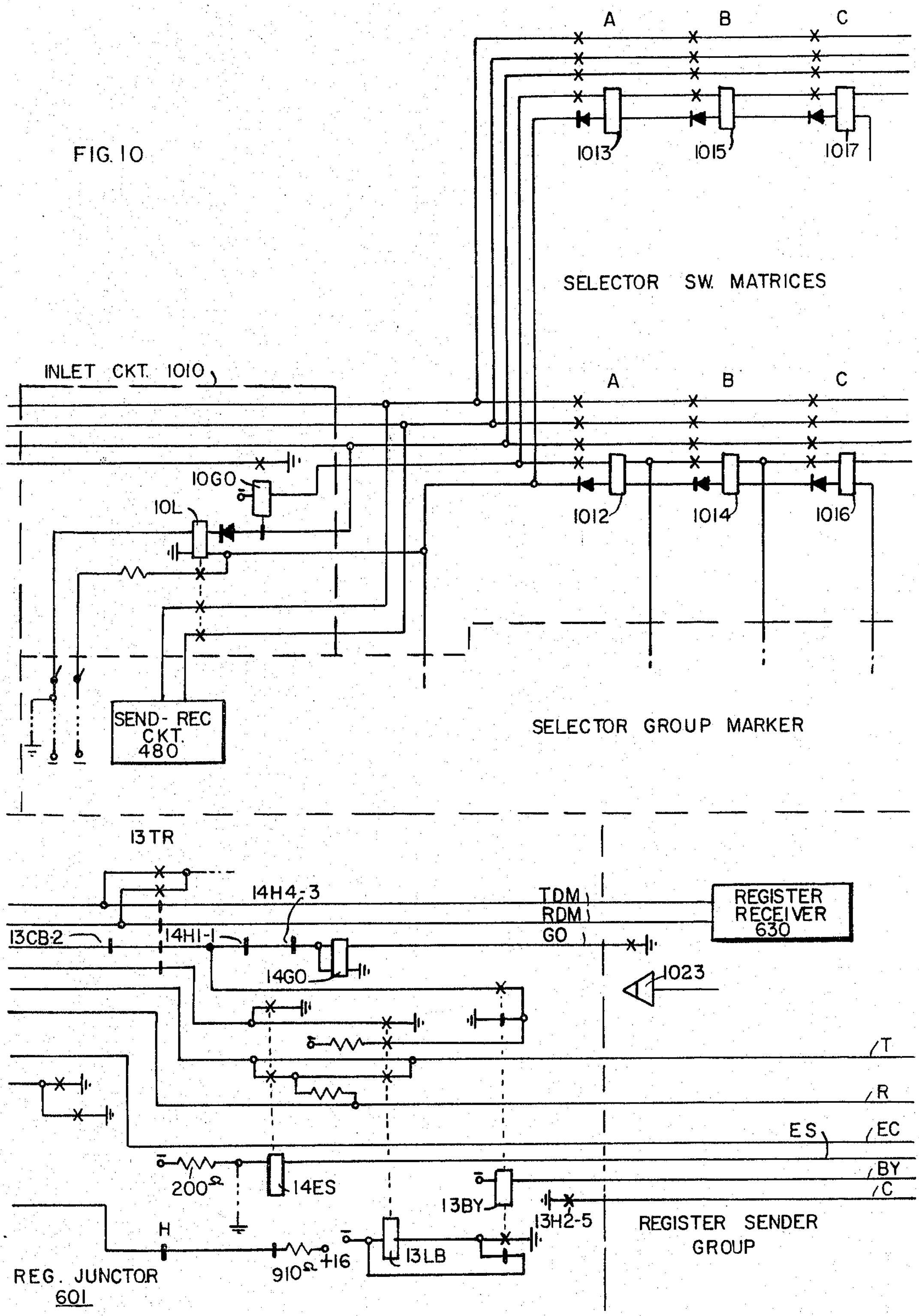
Figure 11:
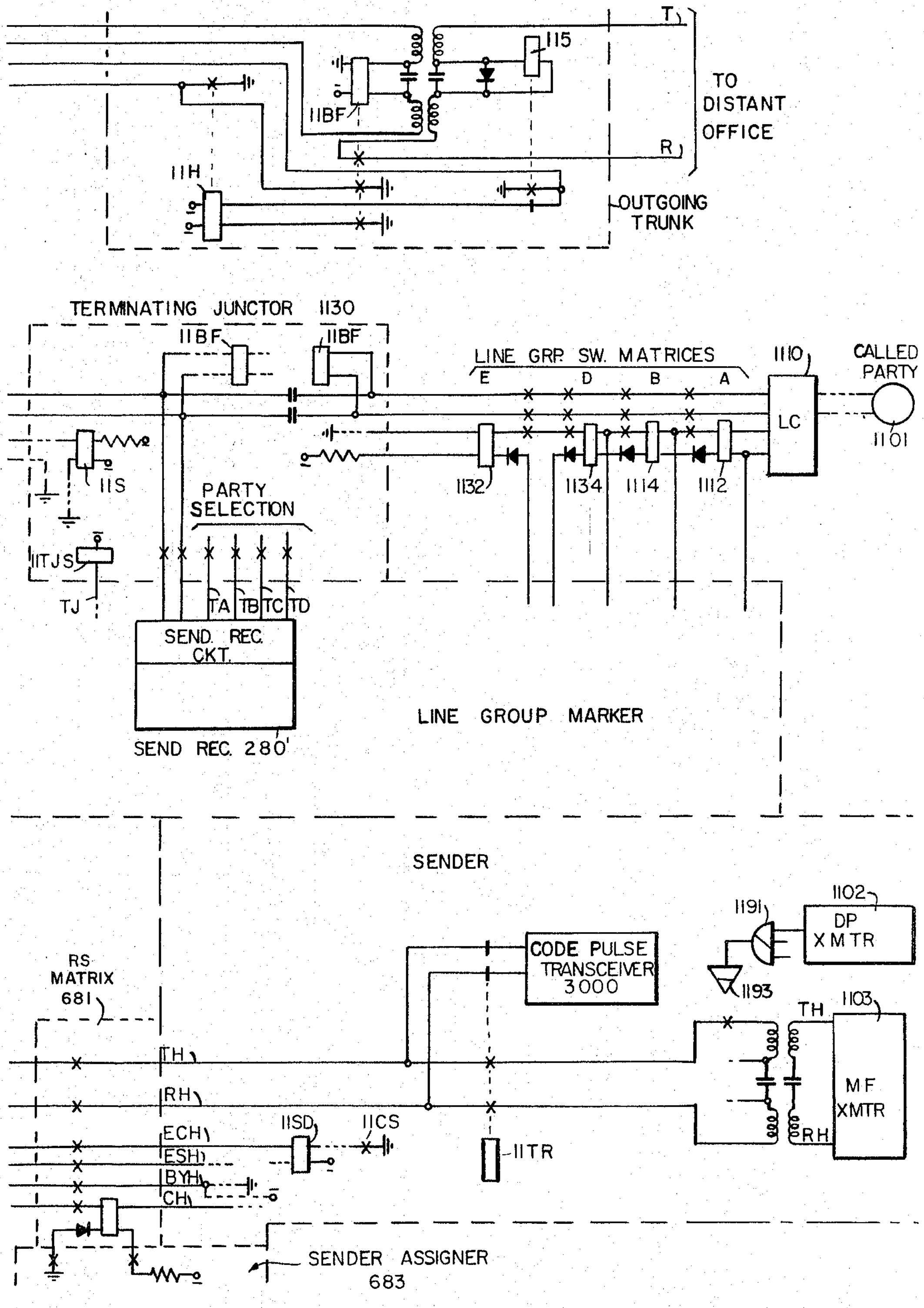
Figure 80:
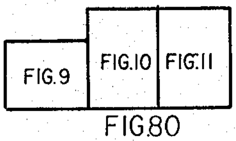

FIGS. 9, 10 and 11 when arranged as shown in FIG. 80 comprise a call-thru diagram which shows a typical connection from a local calling party to either a local called party or to an outgoing trunk. The diagram particularly shows the signaling paths between the switching group markers and the register sender group.

FIG. 9 shows an originating connection through a line group. The calling path extends from a calling party 901 through his line circuit 910 and crosspoints 912, 914 and 916 of the line group switching matrices A, B and C respectively to an originating junctor 920. From the originating junctor the connection extends via line OJ1B to the group selector, and also via line OJ1C and crosspoint 918 of the R matrix to the register sender group. In the line group marker, only the send-receive circuit 280 is shown, with the connection from the LNI sender 283 via the R matrix to the register sender group. In the originating junctor 920 relay 9JB provides contacts for splitting the tip and ring conductors between the calling party and the group selector while there is a connection to the register sender group for this call. Relay 9JA provides for holding the preceding switch train and supplying the busy indicating potential. Relay 9BT is provided to supply trunk busy tone to the calling party and to hold the connection until the calling party hangs up.

In FIG. 10 in the upper half there is shown typical paths through the group selector for either a local call or an outgoing call. The inlet circuit 1010 comprises a line relay 10L and a cutoff relay 10CO. The contacts of the line relay provide a connection into the marker, of which only the connection to the send-receive circuit 480 is shown. A local call may be extended via crosspoints 1012, 1014 and 1016 of the A, B and C switching matrices; and an outgoing call may be extended via crosspoints 1013, 1015 and 1017 of other A, B and C matrices of the selector.

In FIG. 11 at the top there is shown a typical outgoing trunk circuit, the one shown being arranged for loop pulsing and reverse battery supervision. It includes a battery feed relay 11BF on the local side of the repeat coil, a supervisory relay 11S which is shunted by a diode for polarization on the outgoing side of the repeat coil, and a slow release hold relay 11H.

In the center of FIG. 11 there is shown a typical terminating connection through a line group marker. The connection extends through a terminating junctor 1130, and crosspoints 1132, 1134, 1114 and 1112 of switching matrices E, D, B and A; thence through a line circuit 1110 to a called party 1101. In the line group marker only the send-receive circuit 280′ is shown and particularly the connections thereto used in a terminating call, with connections via contacts of relay 11TJS in the terminating junctor. Two of these conductors are used for connection to the line loop receiving the code pulse signals from the sender, and the other four supply party ringing information to the terminating junctor.

The lower parts of FIGS. 10 and 11 show a portion of the register-sender group. In FIG. 10 there is shown part of the register junctor 601, and the register receiver 630.

In FIG. 11 there is shown part of one of the sender transmitters. The connection to the sender transmitter extends from the register junctor 601 via a crosspoint of the RS matrix 681. The relay 11TR shows how normally the code pulse transceiver 3000 is connected to the line loop, and when this relay is operated the code pulse transceiver 3000 is disconnected, and the line loop is extended through contacts of the relay driver 1193 for dial pulse sending and through a repeat coil to an MF transmitter 1103. The dial pulse transmitter 1102 extends through a gate 1191 to drive the relay driver 1193. The showing of the dial pulse transmitter 1102 and multi-frequency transmitter 1103 are merely symbolic here.

C. DETAILED DESCRIPTION OF THE REGISTER SENDER

C(1)—COMPONENTS

C(1)(a) *Symbolism*.—In various parts of the system flip-flops are used as registers. Each of these flip-flops includes two transistors in a bistable circuit configuration. Each flip-flop has eight input terminals and two output terminals. To set a flip-flop to state one, producing a true indication, requires coincidence of a signal on the D.C. input and a trigger pulse on the A.C. input; and in like manner to reset it to state zero, indicating a false condition, requires coincidence of a D.C. input and an A.C. input.

Gated pulse amplifiers are transistor circuits having a direct-coupled gating input terminal and a capacitively-coupled trigger-pulse input terminal. When the two inputs coincide, an output pulse is produced. A typical circuit is shown by R. K. Richards in "Digital Computer Components and Circuits" (D. Van Nostrand Company, Inc., 1957) at page 176.

The logical gates are implemented with NOR gates, each of which is a one transistor logical element whose output can either be considered an AND function of the negations of its inputs, or it can be considered as an OR function of its inputs followed by an inversion. Therefore, the AND gates and the OR gates shown throughout the system are entirely implemented with NOR gates. The electronic units are shown in the drawings as having any number of inputs and output loads, but in actual implementation these would be limited by loading requirements well known in the art.

The inputs to the NOR gates are coupled through individual resistors to the base electrode of the transistor, and the output is taken from the collector electrode. A NOR gate having all of its inputs false produces a true output signal; and if any one of the inputs is true, the output is false. Throughout this system a true signal condition is indicated by a negative potential, and a false condition by ground.

A typical schematic diagram of these circuit elements is illustrated in FIG. 78. These drawings describe in detail the circuit configuration that is represented in simplified block diagram form in FIGS. 16–17 for the lead multiplexer and the register receiver.

The reference characters for flip-flops, reed-relays, or other delay elements have been designated with not more than two letters; i.e. the CE flip-flop in the carry buffer. Whereas, signals originating from logic gates have been designated with three or more letters; i.e. signal DIN2 in the register transceiver. This convention has been followed wherever possible.

Figure 12:
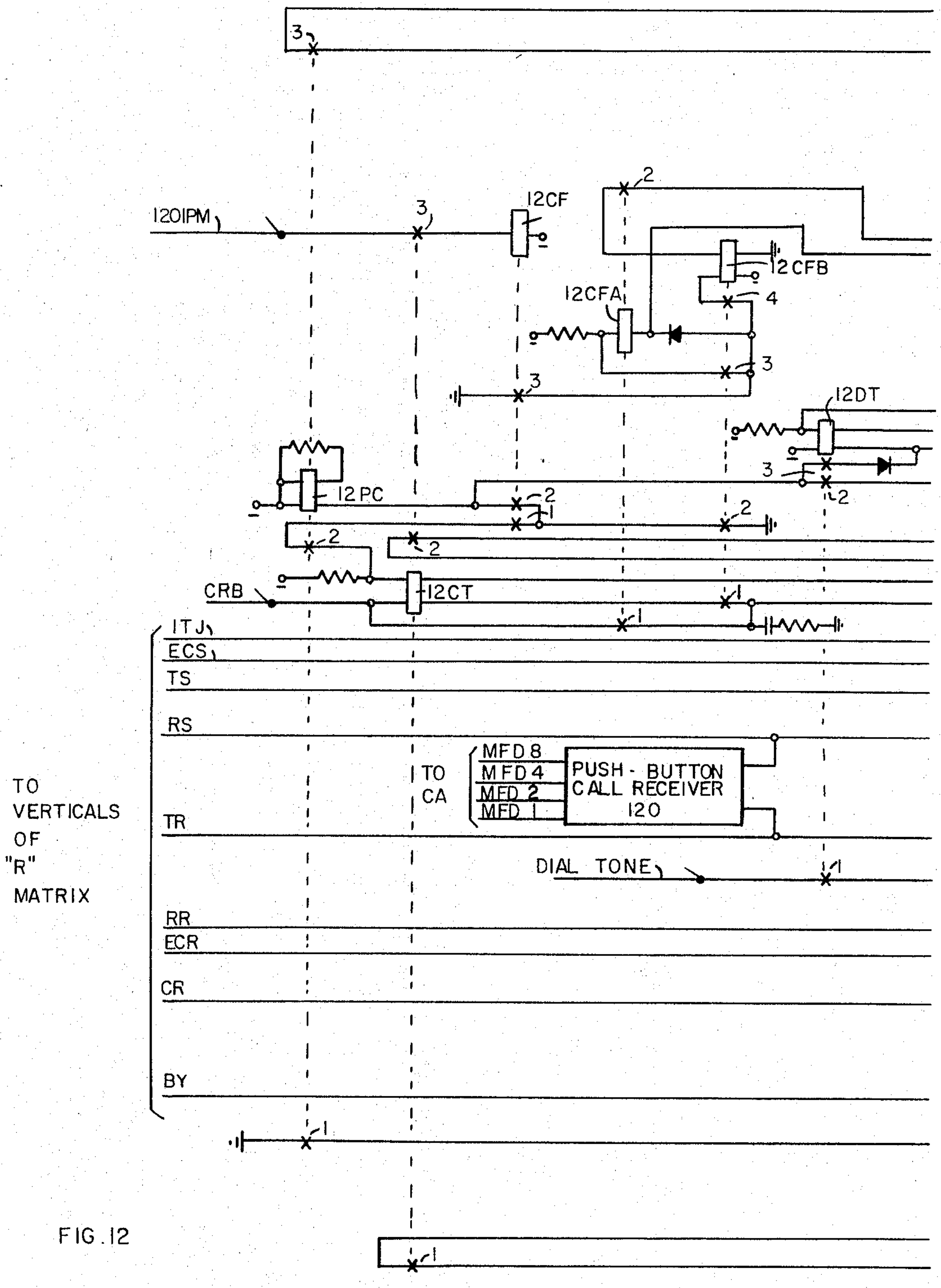
Figure 13:
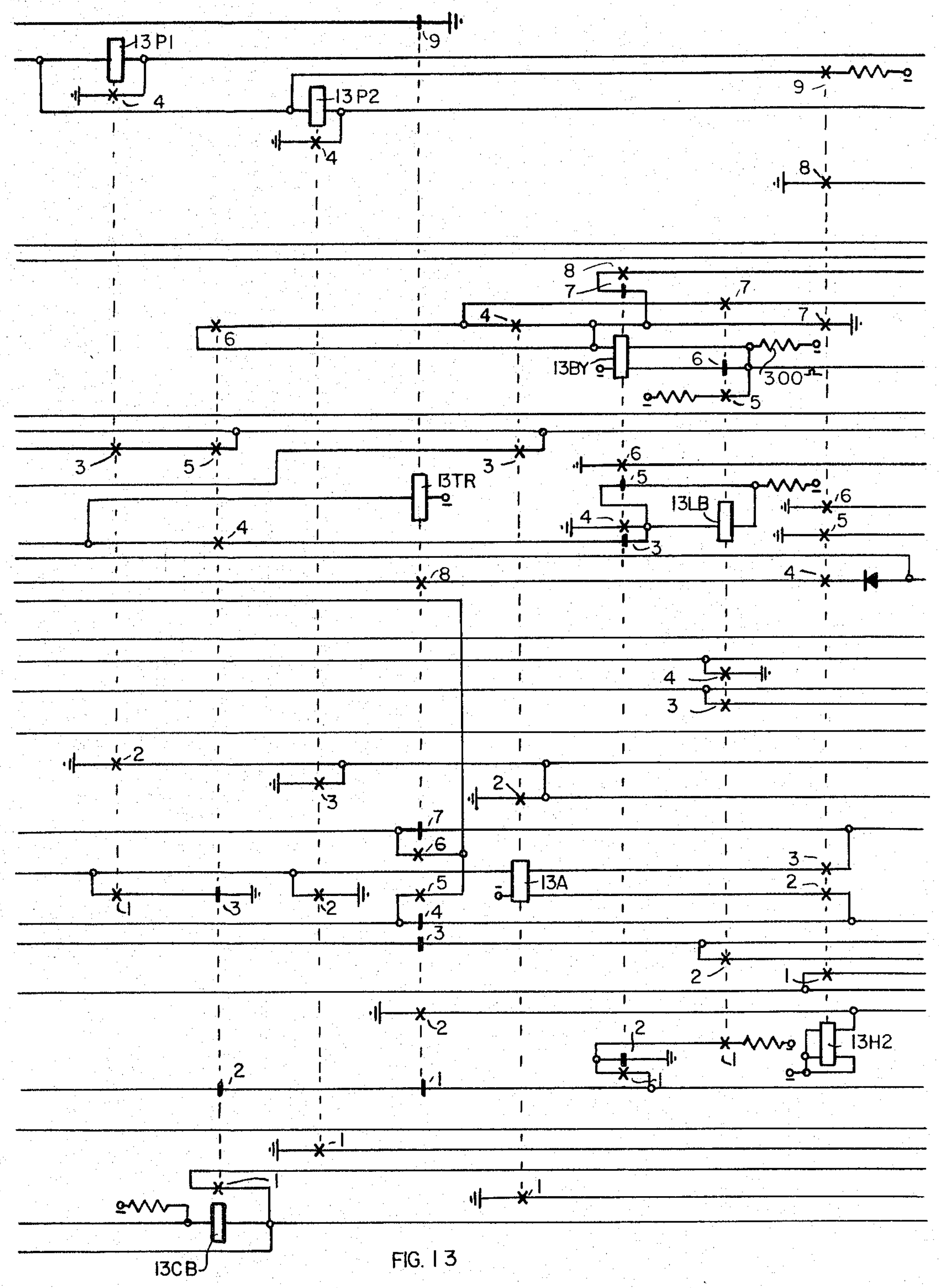
Figure 14:
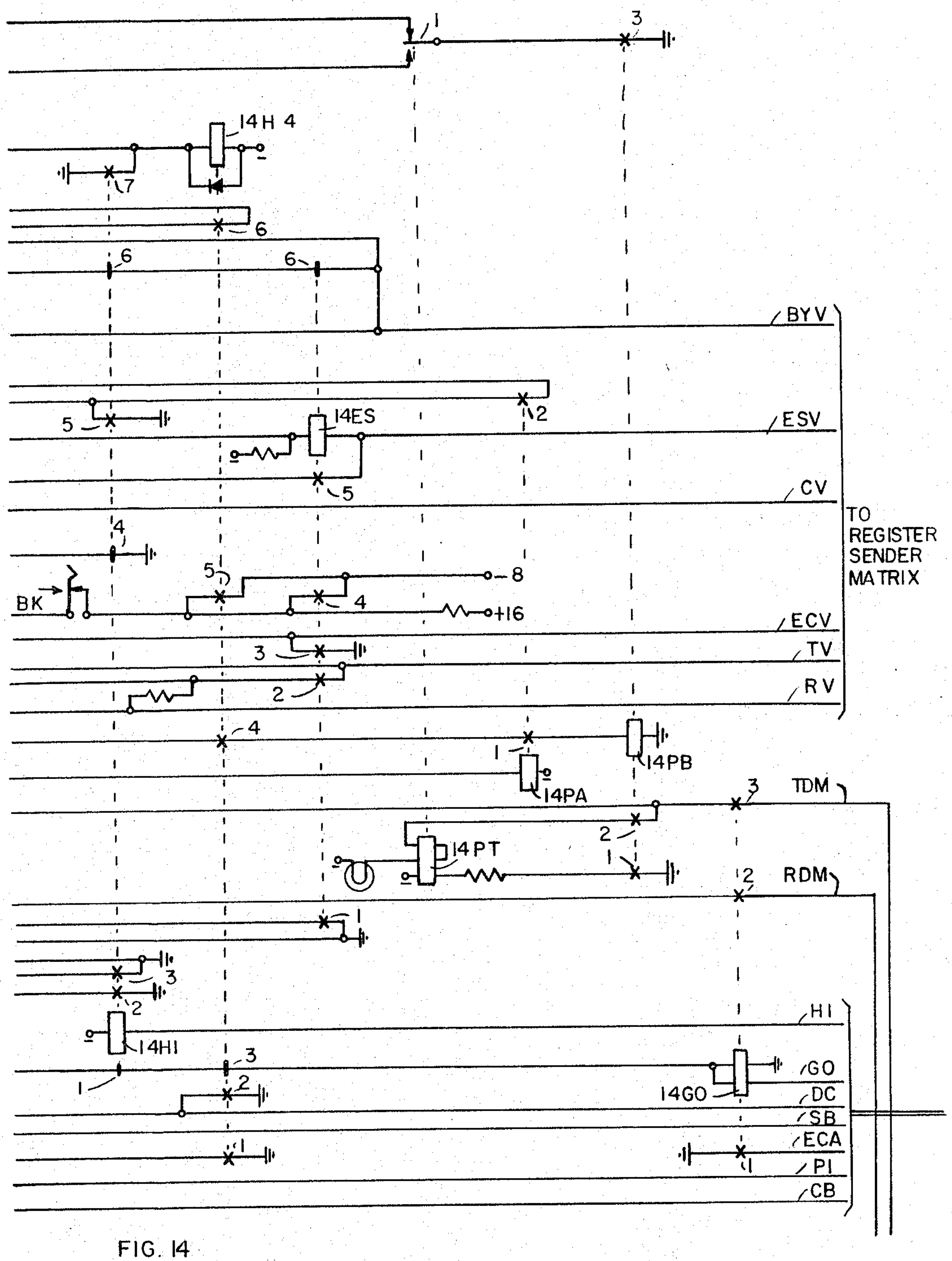

C(1)(b) *Register junctor*.—A local register junctor 601 is shown in FIGS. 12–14, arranged as shown in FIG. 81.

The register junctor portion of the register-sender comprises a maximum of 24 register junctors, local or incoming, in this preferred embodiment. An important function of the register junctor is the provision of a buffer between the electronic equipment of the register-sender group and the outside facilities. As such, the register junctor employs reed relays for all switching functions and performs all functions of the register-sender which require direct connection to the calling line. These functions include dial pulse repeating, dial tone control, battery feed to the calling line, calling station identification on party lines, test for coin deposit on calls from paystation, coin refund on busy or abandoned calls, and test for coin refund.

Upon seizure, the line marker connects low resistance battery over lead BY causing relay 14GO to operate and to connect ground via lead EC to the register receiver in the succeeding equipment. The register receiver then returns a ground signal over lead GO to hold relay 14GO operated. Furthermore, this ground is extended through the winding of relay 14GO to lead BY which causes the line group marker to connect the di-phase sender to the TR and RR leads. After all of the di-phase information is received by the register receiver in the succeeding equipment, the register receiver removes ground from lead GO, thereby causing relay 14GO to restore.

The dial tone is provided for all calls immediately upon seizure. Relay 14H1 operates in response to ground being connected to lead H by the register receiver. As a consequence, relay 12DT operates and locks by means of its first winding. Relay 13H2 operates and connects relay 13A to leads TR and RR. Relay 14H1 also causes relay 14H4 to operate. These H relays hold the register junctor operated and provide a time delay before the release of the register junctor.

The dial tone is provided for all calls immediately upon seizure, being connected through winding 2 of relay 13A to the calling party under the control of relay 12DT. The tone is removed from the line upon the first on-hook signal from the line.

A call from a paystation causes relay 13CB to operate in response to ground being connected to lead CB by the succeeding common equipment. When a call originates from a paystation which is not arranged to prevent dialing before coin deposit, dial tone is reconnected to the line if the calling party fails to deposit the coin. When a call originates from a paystation which is arranged to prevent dialing before coin deposit, dial tone remains connected to the line until the coin is deposited.

Deposit of the coin connects ground through the coin-control relay at the paystation via the preceding equipment to lead TR. When relay 13A restores on the first on-hook signal, the circuit is opened to relay 12PC and relay 14PB operates in series with relay 14PA, which connects sensitive polar relay 14PT to lead TR. If ground is connected to lead TR, relay 14PT operates. After approximately 20 ms., relay 13P2 operates, causing ground to be returned to the subsequent equipment over lead SB to indicate that the coin has been deposited. The operation of relay 13P2 also prepares relay 13A for the receipt of dial pulses.

The 20 ms. delay prevents registration of a momentary operation of the polar relay due to the discharge of ringers, or the discharge of line capacitance. The delay is accomplished by means of relay 12PC which produces a 20 ms. delay in restoration.

If the paystation subscriber had failed to deposit a coin, relay 14PT does not operate and relay 13P1 operates, instead of relay 13P2, after the 20 ms. delay, thereby, causing relay 12DT to reoperate. Therefore, dial tone is reconnected to the line. On the next off-hook indication, relay 12PC reoperates and causes relay 13P1 to restore. This coin test operation is repeated upon either the receipt of each on-hook signal until the coin is finally detected or the succeeding equipment causes the register junctor to release after a time-out period of approximately 35 seconds by removing ground from lead H1 to restore the hold relay 14H1.

The dial pulses are repeated by the register junctor to the common equipment as ground pulses over lead P under the control of relay 13A.

If the call originates from a party line, ground being connected through a three-thousand ohm resistor from the shunt springs of the dial, indicates that the call originates from party number 2 of that particular party line. Absence of ground indicates that the call originates from party number 1 of that particular line. Party identification is made in the same manner as the coin deposit test, with the exception that relay 13CB is not operated. Relay 13P2 indicates to the succeeding equipment which party has originated the call.

After the sender has been coupled to the register junctor, three types of indications of the call progress may be sent from the sender to the register junctor; end of send, line busy, and reorder.

The end of send indication is transmitted upon the successful completion of the call. The junctor immediately returns a release signal to the sender and transmits a signal to the preceding equipment that the call has been successfully completed. This operation is accomplished upon the receipt of ground on lead ESV, causing relay 14ES to operate and to return ground over lead ESV for the release of the sender in the common equipment. Operation of relay 14ES also connects ground to lead ECR to signal the originating circuit. The juncture will continue holding the switch train for an additional 100 ms. to assure that the succeeding circuits have taken over control of the switch train.

The line busy indication is similarly performed with additional operations. To provide line busy indication −50 v. is received from the sender on lead BYV causing relay 13BY to operate. Thereupon relay 13LB operates and causes −50 v. to be repeated by lead BY to the preceding equipment. Relay 13BY is a special reed-type relay which has been disclosed in a copending U.S. patent application by B. Sherstiuk for a Control Circuit, Serial No. 204,936, filed June 25, 1962, now Patent No. 3,210,615. This special relay with break and make contacts is constructed with two differential windings to provide special operation. Relay 13BY operates via its upper winding, contact LB–6 and negative potential via lead BYV, which causes full operation of the relay. Relay 13BY can also operate by its lower winding when ground potential is applied to lead BYV, thereby causing relay 13BY to operate its make contacts only. A third condition may also exist wherein lead BYV is disconnected which causes a differential operation of relay BY to restore the relay to normal. Therefore, when a line busy condition occurs, a minus potential via a 100 ohm resistor in the sender, contacts LB–6, and the upper winding of relay 13BY to cause full operation of relay 13BY. Full operation of relay 13BY causes relay 13LB to operate via contact BY–4. Thereupon, the −50 v. is connected to lead BY via contacts BY–1 and LB–1 to repeat the line busy indication to the marker. It will be noted that a 300 ohm resistor from the negative potential and via contacts LB–5 to lead BYV to replace the resistance battery connected to lead BYV at the sender, because the sender places the resistance battery to lead BYV for a momentary interval only. It is also apparent that the other 300 ohm resistor which is connected directly to the upper winding of relay 13BY provides a reduced amount of current in the lower winding and increases the current in the upper winding to make the ampere-turns in the two windings by the proper selection of these resistors. In this preferred embodiment the lower winding of relay 13BY uses 5,000 turns with 800 ohms resistance and the upper winding uses 1,500 turns with 95 ohms resistance.

The reorder indication is provided from the sender during all calls which cannot be successfully completed, other than the actual line busy condition. Ground is received from the sender via lead BYV, causing relay 13BY to operate only its make contacts and to transmit ground, instead of −50 v., to the preceding equipment via line BY. Consequently the preceding equipment is able to distinguish the line busy indication from the reorder indication. As a result the register junctor signals the sender to release, repeats the reorder indication to the originating equipment, and then returns to idle.

During a reorder condition, ground is received via lead BYV causing relay 13BY to operate only its make contacts. Since this ground potential via lead BYV is present for a momentary interval only, ground is connected to lead BY via contacts H2–7, BY–7, and BY–8 to lock the circuit to the upper winding of relay 13BY via contacts LB–6. Relay 13LB does not operate during reorder due to the fact that ground via contacts BY–4 does not affect relay 13LB, because relay 13LB is short circuited via contact BY–5 which remains closed.

The reorder and the line busy conditions cause relay 13BY to remain operated until the register junctor is released, which causes relay 13H2 to restore and thereby cause relay 44BY to restore.

A trunk busy indication can be generated without the use of the sender, even before the sender is assigned to a particular register. Ground via contacts H2–7, either contacts CB–6 for coin box calls or contacts A–4 when the subscriber has delayed before dialing, contacts 26LB–7, in the absence of line busy, 27H1–5, and 27ES–6 which indicates that the end-of-receive condition is not true. Therefore the ground potential is applied to the upper winding of relay 13BY which causes relay 13BY to operate in the same manner as trunk busy being supplied by the sender.

If a call originates from a paystation, the sender is signalled to release, but the reorder indication is withheld from the originating equipment until the coin has been refunded. Operation of relay 13BY causes relay 13TR to operate and, when relay 14H1 releases in response to the removal of ground from lead H1 by the succeeding equipment, relay 12CT operates via its number one winding. Relay 13CB also releases in response to the operation of relay 13TR. Operation of relay 12CT connects relay 12CF to the 120 I.P.M. impulses, thereby causing relay 12CF to follow the 120 I.P.M. and to cause relays 12CFA and 12CFB to operate and restore in a four state sequence.

During the first state, relay 13CFA is operated and relay 12CFB is restored. This condition allows −110 v. from lead CRB to be connected to lead TR, thereby enabling the coin-box to refund the coin.

During the next state relay 13CFB operates in series with relay 12CFA, maintaining the −110 v. on the line. The third state occurs when relay 12CF reoperates and relay 12CFA releases. If the coin has been successfully refunded, ground is removed from lead TR which causes the second winding of relay 12CT to be open circuited. At the same time the first winding of relay 12CT becomes short circuited, which allows relay 12CT to release.

However, if the coin had not been refunded due to the improper operation of the coin return mechanism in the paystation, ground on lead TR holds relay 12CT operated. Then relay 12CFB restores, which creates the last state in the sequence, and −110 v. is removed from the line in order to retransmit refund current on the next cycle. An impulse is needed for the operation of the coin return release mechanism rather than steady current flow. The four-state cycle is then repeated until the coin is successfully refunded.

If the coin is not refunded within approximately five seconds, relay 14H1 is reoperated opening the circuit to the second winding of relay 12CT and eventually restores relay 12CT to normal. If the coin is successfully refunded, relay 12CT restores which causes the remainder of the relays in the junctor to restore with the exception of relays 14H1 and 13BY. When relay 13TR restores, ground is transmitted via line BY to the preceding equipment. Thereupon, relays 14H1 and 13BY are eventually released by the succeeding equipment.

The trunk busy condition is also generated by the register junctor when the common equipment signals the register junctor to disconnect prior to the end of send indication from the sender. Relay 14H1 releases, thereby connecting ground to lead BYV. The remainder of the operation is performed as described above.

The push-button call receiver 120 receives dialed information from calling parties provided with push-button signalling apparatus, and converts this information into binary-coded information for transmission to the carry buffer via leads MFD1, MFD2, MFD4, and MFD8. This receiver is provided on an optional basis.

Figure 15:
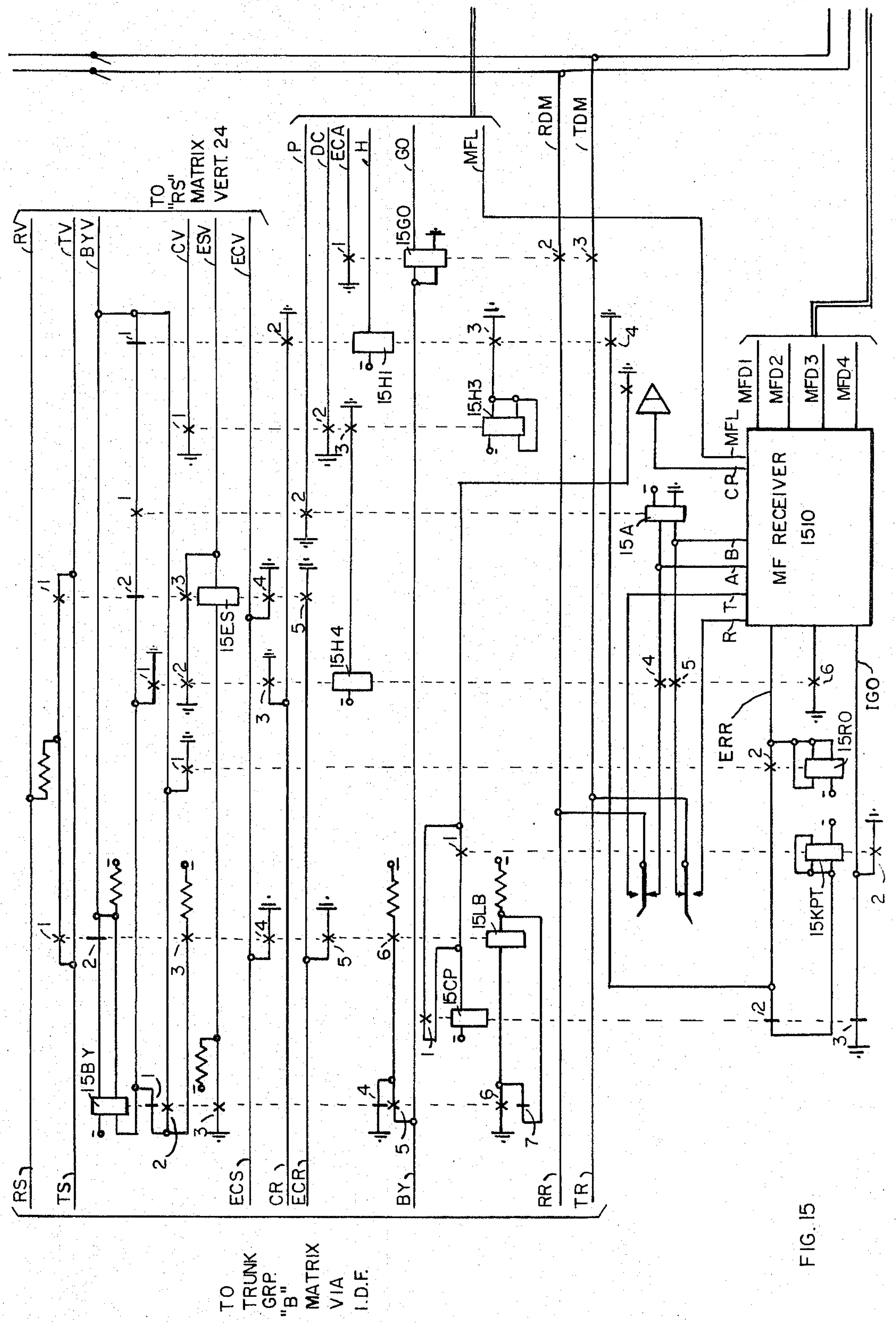
FIG. 15 is a schematic representation of an incoming register junctor.

*Incoming register junctor.*—Referring now to FIG. 15, the incoming register junctor is similar to the local register junctor with the following exceptions: dial tone control, coin control, and party identification apparatus have been omitted and optional provisions have been made for operation with MF receiver 110. The incoming register junctor in FIG. 15 is equipped to handle both multi-frequency and dial pulse calls.

When the register junctor is seized during a multi-frequency call, relay 15H1 operates and causes relay 15KPT to operate. The operation of relay 15KPT prepares a path to relay 15CP which operates when the CP signal, start signal, is received from the succeeding equipment via lead CP. When relay KP operates, the circuit to relay 15KPT is opened, and it restores after a 55 ms. delay which removes ground from lead IGO. Removal of ground from lead IGO allows the information to be transmitted to the succeeding equipment.

After all of the multi-frequency signals are received, ground is removed from lead CP and relay 15CP restores.

If an error in the multi-frequency code is present, ground on lead ERR operates relay 15RO after a 12 ms. delay, thereby causing relay 15BY to operate. Therefore ground is connected to lead BY indicating a trunk busy condition. Consequently an error that persists for approximately 12 ms. causes a trunk busy indication to be transmitted by the register junctor to the incoming trunk. The incoming register junctor is then released.

Figure 16:
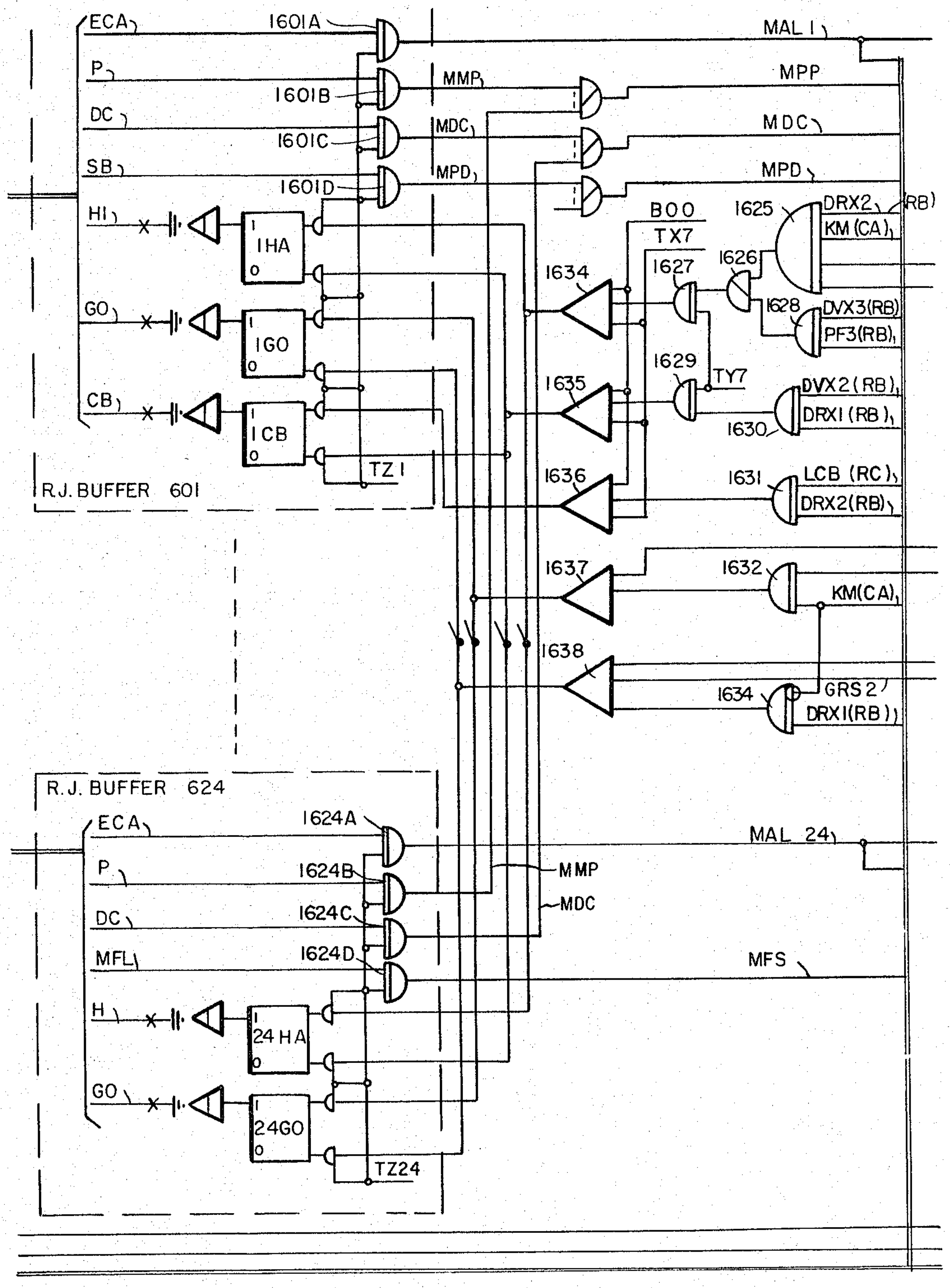
FIG. 16 is a symbolic block diagram of the register junctor buffer and lead multiplexer.

C(1)(*c*) *Register junctor buffer and lead multiplexer.*—Referring now to FIG. 16, the register-junctor buffer and lead multiplexer provides means for a two-way transfer of information between all reed relays, space divided register junctors and electronic time divided register-sender components. The circuit is provided per register junctor, either local or incoming. Since information is transferred from the fast-acting electronic equipment to the more slowly operated relay-controlled register junctors, the information is stored in flip-flops HA, GO, CB, or KP before the register junctor relays are to operate, thereby allowing sufficient time for the relays to operate. All of the 24 sets of flip-flops respond to the commands on a time division multiplex basis from the single group of logic gates 1625–34 and gated-pulse amplifiers 1634–38. Flip-flop H transmits ground via lead H to the register junctor to hold the register junctor. Flip-flop GO transmits ground via lead GO to the register-junctor, indicating that the succeeding equipment is prepared to receive information from the register junctor. Flip-flop CB transmits ground via lead CB to the register junctor to indicate that the call was originated from a paystation. These three flip-flops are provided as buffer flip-flops for each local register junctor.

When this arrangement is associated with an incoming register junctor, flip-flop KP is substituted for flip-flop CB in order to provide the KP signal to the MF equipment associated with the incoming register junctors, preparing the equipment to receive the multi-frequency signals.

Information that is transferred from the register junctor to the electronic equipment is converted on a time division multiplex basis. By way of example, the information from the first register junctor, a local junctor, is gated to the succeeding equipment by AND gates 1600A–D and information from the twenty-fourth register junctor, an incoming junctor, is gated by AND gates 1624A–D. Lead P transfers the dialed information and is referred to as the pulse highway. Lead DC provides information to the succeeding equipment, indicating that the register junctor has returned to the idle condition. Lead SB, when connected to a local register junctor, provides information to the succeeding equipment, indicating which one of the parties of the two-way party line originated the call. Party one produces a true indication and party two produces a false indication. When a call is originated from a paystation, lead SB also indicates whether or not the subscriber has deposited a coin. A true indication represents that the coin has not been detected as yet, and a false indication represents that the coin has been deposited. Lead MFL being connected to an incoming register junctor allows information to be transferred to the succeeding equipment, indicating whether or not MF equipment is utilized. The utilization of MF equipment produces a false indication and the absence of MF equipment produces a true indication.

Figure 17:
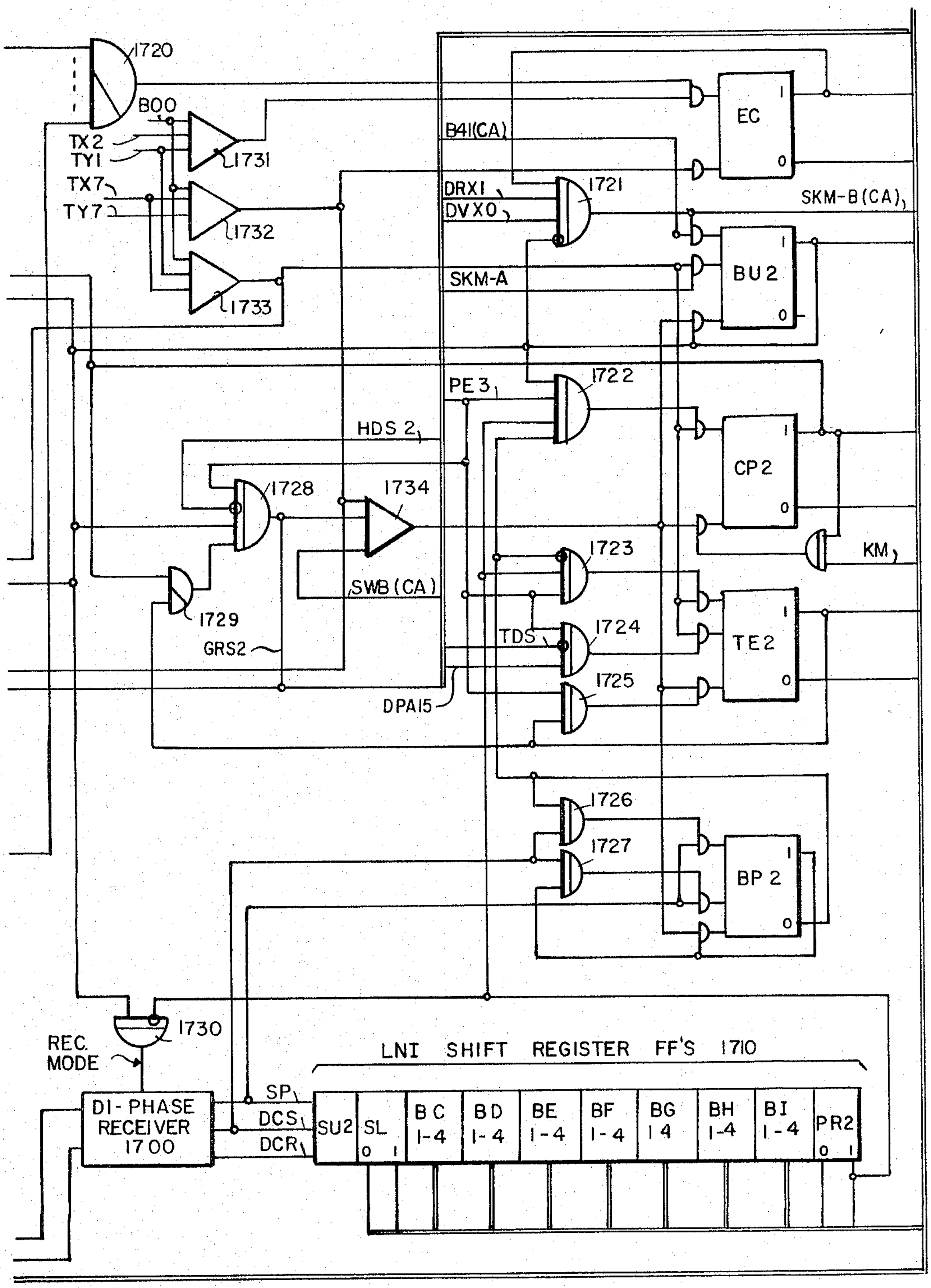
FIG. 17 is a symbolic block diagram of the register receiver.

C(1)(*d*) *Register receiver.*—The register receiver in FIG. 17 provides a means to receive line or trunk number identification from the line or trunk markers. This equipment consists of a diphase receiver 1700 gates 1720–30, a shift register 1710 gated-pulse amplifiers 1731–34, and the associated logic and flip-flops. Flip-flop EC designates that a multiplex request for a register has been received. Flip-flop BU2 designates that the register receiver is in the busy condition. Flip-flop CP2 designates that the register receiver has completed its path. Flip-flop TE2 designates that trouble exists in the register receiver. Flip-flop BT2 is the bad parity indicator, which designates that an odd number of true indications have been received in shift register 1710, that is, a bad parity situation exists.

The markers seize a register junctor which causes the register junctor to request the register receiver by providing a true indication from OR gate 1720 set flip-flop EC. If the register receiver is idle, it sequences to the busy state by means of AND gate 1721 which sets flip-flop BU2. Thereupon, a "go" command is extended to the proper register junctor by means of AND gate 1632 and gated-pulse amplifier 1637 to set the GO flip-flop in the register junctor buffer and lead multiplexer. This command causes the register junctor to send a signal to the LNI sender of the marker to start transmission to the diphase receiver in the register receiver.

The LNI shift register, which comprises flip-flops SU2, SL, BC1–4, BD1–4, BE1–4, BF1–4, BG1–4, BH1–4, BI1–4, and PR2 that are interconnected to form a serial shift-register, is coupled to diphase receiver 1700. Bits of information which are received in the diphase receiver are transferred serially into the shift register.

Upon receipt of the entire portion of information into the shift register, flip-flop PR2 is set causing AND gate 1722 to set flip-flop CP2. With flip-flop PR2 being set, the register junctor signals the LNI sender of the marker to stop transmission. Furthermore, flip-flop PR2 causes AND gate 1730 to move the diphase receiver 1700 out of the receive mode. The LNI information being stored in shift register 1710 is then parallel-transferred to the register controller for storage in the proper ferrite core memory row. The register receiver returns to idle and resets the GO flip-flop. The register receiver is then prepared to service another call.

C(1)(*e*) *Register controller.*—The register controller in FIGS. 28–34 comprises timing logic, information transfer logic, and decision control logic to arrange information from various parts of the system for presentation to the ferrite-core memory. These logic commands are generated entirely by electronic gates being utilized on a time division multiplex basis by the system.

This equipment in association with the read shift buffer arranges the dialed digits to be written into the memory. As many as thirteen dialed digits are capable of being arranged for presentation to the memory. These digits being transmitted to the register controller are in the form of either dial pulse, multi-frequency signalling, or code-pulse.

A maximum of seven digits of line trunk number identification are also arranged for presentment. Two digits of originating class of service information are accumulated in connection thereto. Provision is also made for a maximum of nine digits of translated switching information with three digits of sender control instructions and four process digits for presentation to the memory. The sequence of operation of the registers for the process of a call is based upon these four digits of processing instructions, which are transmitted between the register sender and the translator.

If a call is originated locally and required ticketing, the calling party's directory number is received from the translator. If a call originates from a tributary office for which ticketing is necessary, the calling party's directory number is forwarded from the tributary office, such as by means of multi-frequency signals, and later transferred to the ticketer. In both cases this information is prepared by the register controller for presentment. There are also three digits of ticketer identity information as well as one digit of alternate route instructions. The address of a sender having been assigned is also accumulated for presentation to the memory.

The above-mentioned logic transfers information from various portions of the system to the memory. However, the register controller also generates new commands which are also presented to the memory; i.e., timing control logic and decision control logic. The operation of each component is timed and a time-out signal is generated when a component remains in operation for an undesirable period of time. The timing control logic also analyzes the information received via the pulse highway.

The decision control logic comprises several groups of binary counter logic to provide sequence states for the sequential operation of the register sender group. The register sequence (RX), sender-outpulsing sequence (SX), sender-seizure sequence (QX), and register-disconnect sequence (VX) are generated by these counters. There are also sequence states for the transfer of dialed digits from row three of the memory to row four of the memory. The decision control logic further comprises several miscellaneous commands as follows: trouble indications from the senders, common control logic, and the register junctors; information indicating that the identity of the group selector has been recognized, which is part of the ticketer-identity information; busy condition of the register receiver; request of service and busy condition of the register transceiver; request of service of the sender; trouble recorder information; disconnect of the sender; disconnect of the register; pulse highway information; recognition of MF interdigital pause; completion of dialing; coin-box call; early out-pulse control; and trouble indications for the routiner.

Referring now to FIGS. 18–34, information is transferred to the ten groups of logic which form ten positions, A–J, for presentation to the memory. Each of the groups of logic are divided into four sub-groups to generate four bits of information. For example, position A comprises the four write commands MWA1–4 shown in FIG. 26, which are written into the ferrite-core memory. The forty bits of information are transferred to the columns of the ferrite-core array during each sub-time slot. Therefore, one memory row at a time is simultaneously written into the memory during a time slot. One register-sender group utilizes twenty-four registers. During a register's time slot, the first row of each register is enabled twice, one during the first sub-time slot of the register and once during the seventh sub-time slot of that particular register.

Figure 25:
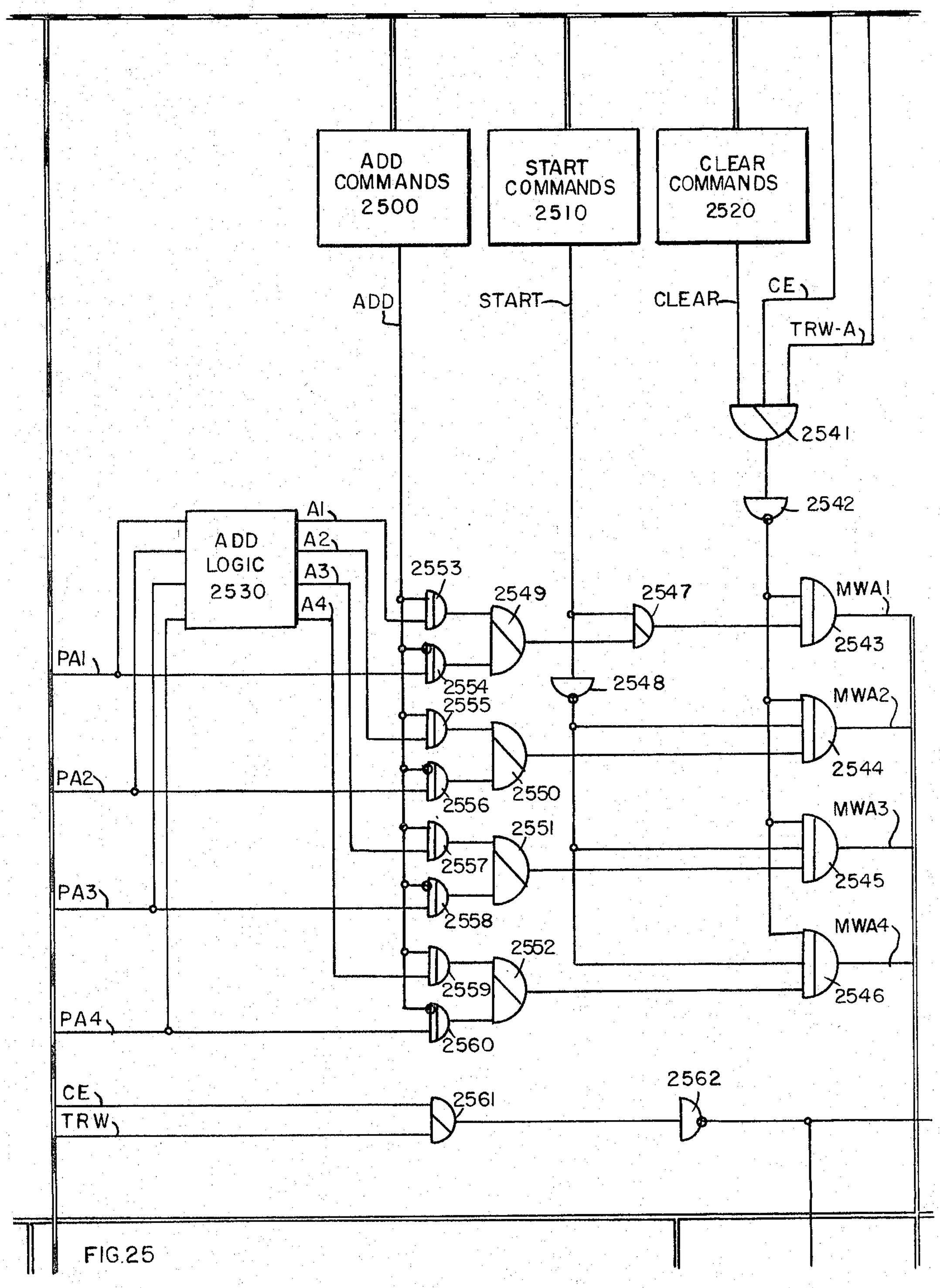

Referring now to FIG. 25, position A for all six rows comprise the counting logic shown in FIG. 25. MWA1–4 comprise a four bits of information generated for the various counters. AND gates 2543–6 provide an inhibit function in order to clear the counter to zero in response to the clear command circuit 2520 or the general clear command CE for the register controller or command TRW–A which is the trouble condition from the control console. The signal CLEAR is generated as follows:

$$
\begin{aligned}
\text{CLEAR} = {} & \text{TY2 DQX5} \\
& + \text{TY3 (FP+FD)} \\
& + \text{TY4 (FP+FD)} \\
& + \text{TY5 FD TB ACC7} \\
& + \text{TY6 CPI KE} \\
& + \text{TY7 DVX0 } (\overline{\text{FD}}\text{ DRX3} + \text{DRX2 }\overline{\text{PB4}}\text{ PP})
\end{aligned}
$$

The start command circuit 2510 initiates the counting logic with the count of one by inhibiting AND gates 2544–46, while allowing AND gate 2543 to be enabled via OR gate 2547. The signal START is generated as follows:

$$
\begin{aligned}
\text{START} = {} & \text{TY2 d } (\overline{\text{DQX0}}\ \overline{\text{DQX5}}\ \overline{\text{DQX6}}) \\
& + \text{TY3 }\overline{\text{DCX0}}\text{ AC DPA0 }\overline{\text{FD}} \\
& + \text{TY4 DCX0 AC DPA0 }\overline{\text{FD}} \\
& + \text{TY5 FD TB }\overline{\text{ACC7}}\text{ DPA0 }\overline{\text{TDS}} \\
& + \text{TY6 DPA0 RT} \\
& + \text{TY7 (d MDC DVX2)} + [(\overline{\text{PB4}}\text{ PP} + \text{d} \\
& \quad + \text{PB4 }\overline{\text{PP}})\text{ DVX0 }\overline{\text{FD}}\text{ DRX3}] + [\text{DRX2 DVX0} \\
& \quad (\text{d} + \text{CP2})]
\end{aligned}
$$

$$
\text{d} = (\text{DPA15 }\overline{\text{DMX3}} + \text{DPAO}
$$

During normal operation, leads PA1–4 from the read-shift buffer provide the counting information to be transferred to the memory via AND gates 2553–60 without being affected by the counting logic of position A. A one is added to the count from read-shift buffer whenever necessary by means of add logic 2530, which is then transferred via AND gates 2553, 2555, 2557 and 2559 under control of the enabling signal ADD generated by add command logic 2500. The signal ADD and add logic A1–4 are generated as follows:

$$\begin{aligned}
\mathrm{ADD}=&\mathrm{TY2\ a\ (\overline{DQX0}\ \overline{DQX5}\ \overline{DQX6})\ \overline{TDS}}\\
&+\mathrm{TY3\ \overline{DCX0}\ \overline{FD}\ AC}\\
&+\mathrm{TY4\ DCX0\ \overline{FD}\ AC}\\
&+\mathrm{TY5\ FD\ \overline{ACC7}\ LLC2\ TB}\\
&+\mathrm{TY6\ (RT+KE)\ LCI\ \overline{TDS}}\\
&+\mathrm{TY7\ a\ [(b+c)\ \overline{FD}\ DRX3+DVX2\ \overline{MDC}\ \overline{TDS}}\\
&\quad+\mathrm{b\ DRX2\ \overline{CP2}]}\\
&\quad\mathrm{LLC2)}
\end{aligned}$$

$$\begin{aligned}
\mathrm{a}&=\mathrm{DMX0+(DMX1\ LC1)+(DMX2\ LLC2)+(DMX3\ LLC2)}\\
\mathrm{b}&=\mathrm{\overline{PB4}\ \overline{PP}\ DVX0\ \overline{TDS}}\\
\mathrm{c}&=\mathrm{PB4\ PP\ DVX0}
\end{aligned}$$

$$\begin{aligned}
\mathrm{A1}&=\mathrm{\overline{PA1}}\\
\mathrm{A2}&=\mathrm{PA1\ \overline{PA2}+\overline{PA1}\ PA2}\\
\mathrm{A3}&=\mathrm{\overline{PA1}\ PA3+PA1\ PA2\ \overline{PA3}+\overline{PA2}\ PA3}\\
\mathrm{A4}&=\mathrm{(PA1\ PA2\ PA3)\ \overline{PA4}+(\overline{PA1\ PA2\ PA3})\ PA4}
\end{aligned}$$

The DMX signals control the rate of count for the counters in rows 1 and 2. As shown by the mode of count logic MX in FIG. 19, the mode is initially DMX0 and changes to the next state each time the corresponding counter reaches a count of 15 (DPA15). In state DMX0 the count advances once each multiplex cycle (approximately 10 milliseconds). In state DMX1 the count is advanced upon each occurrence of timing signal LC1, which occurs every 320 milliseconds. In states DMX2 and DMX3 the count advances upon each occurrence of signal LLC2, which occurs every 1.2 seconds.

Figure 26:
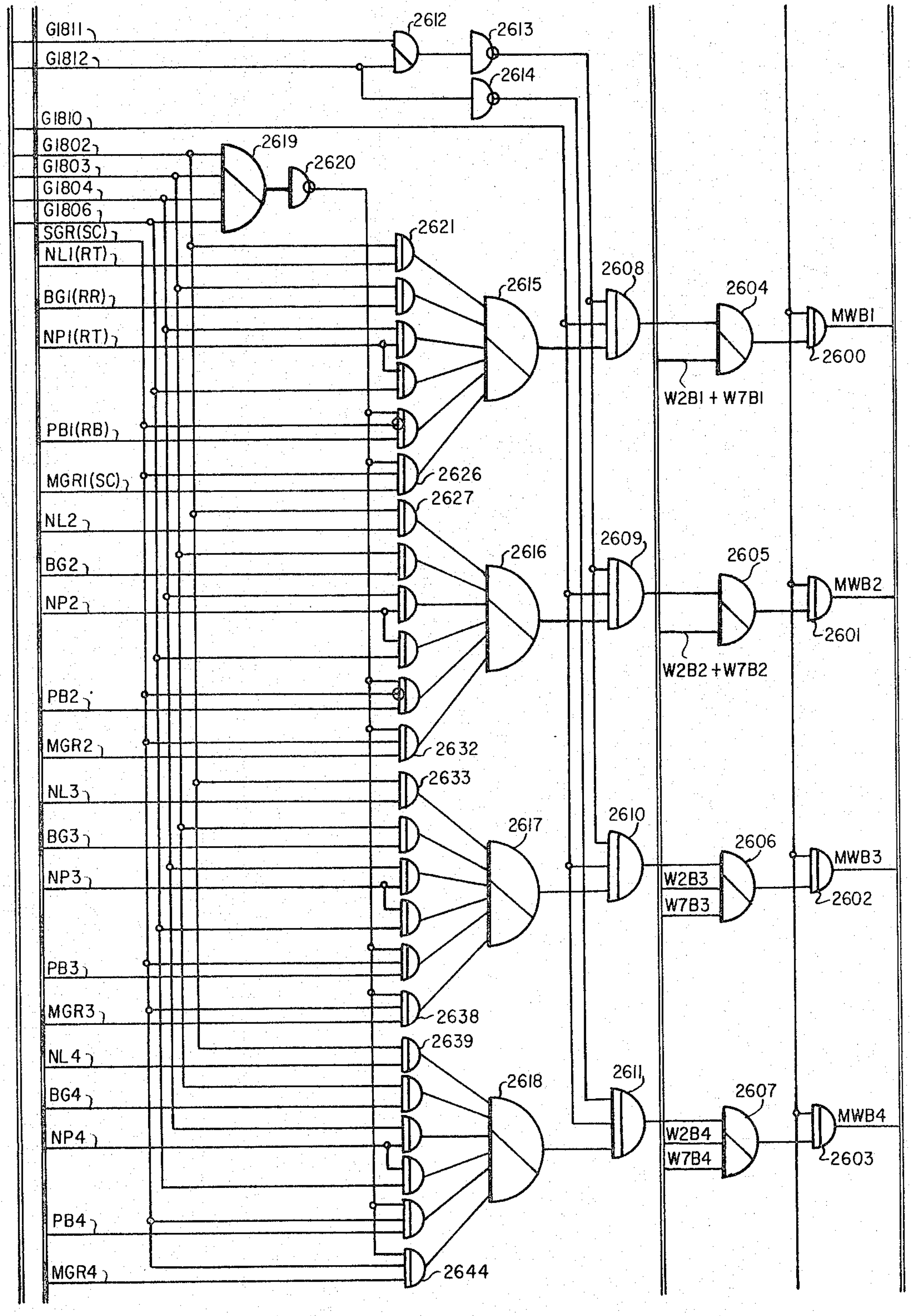
Figure 27:
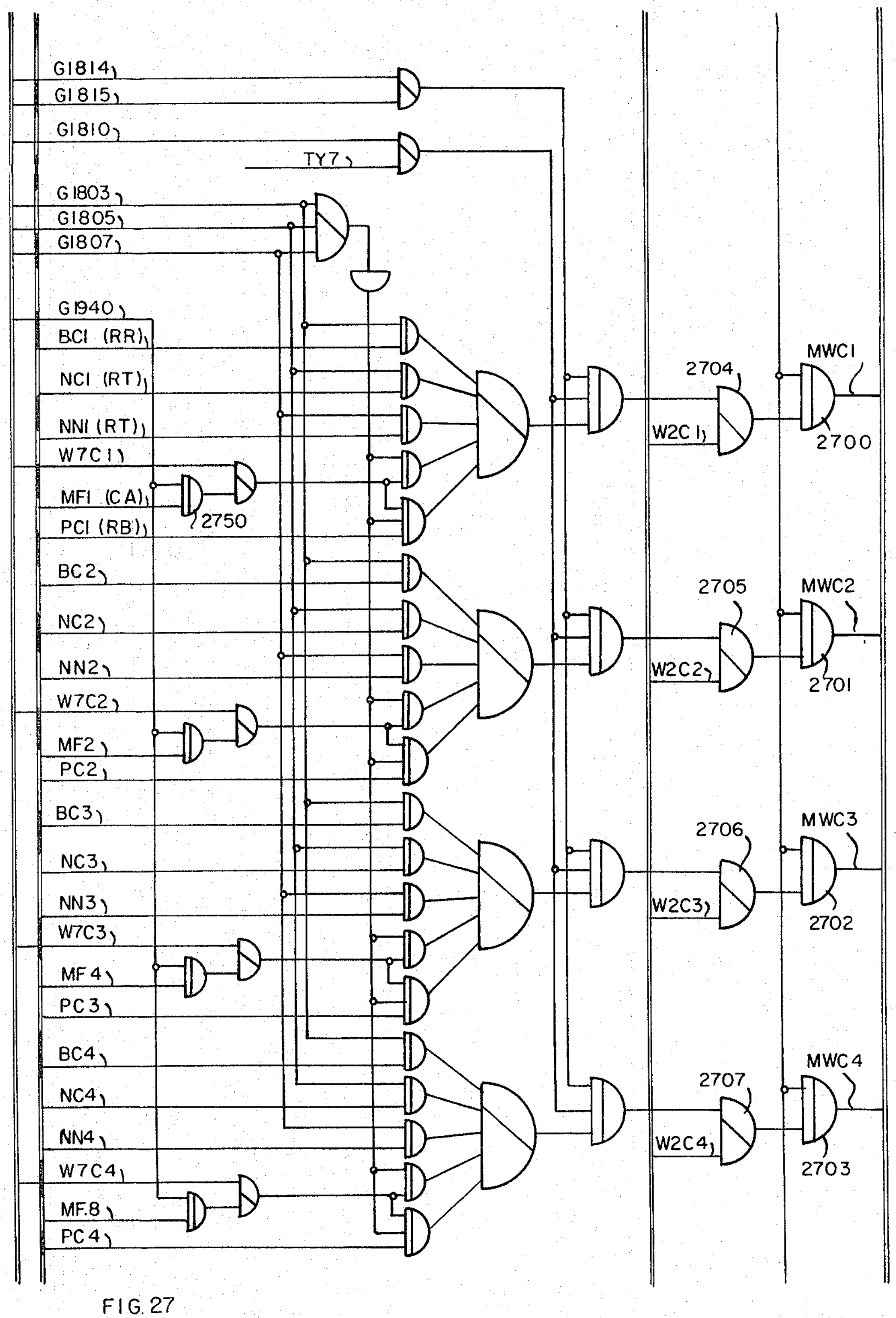
Figure 28:
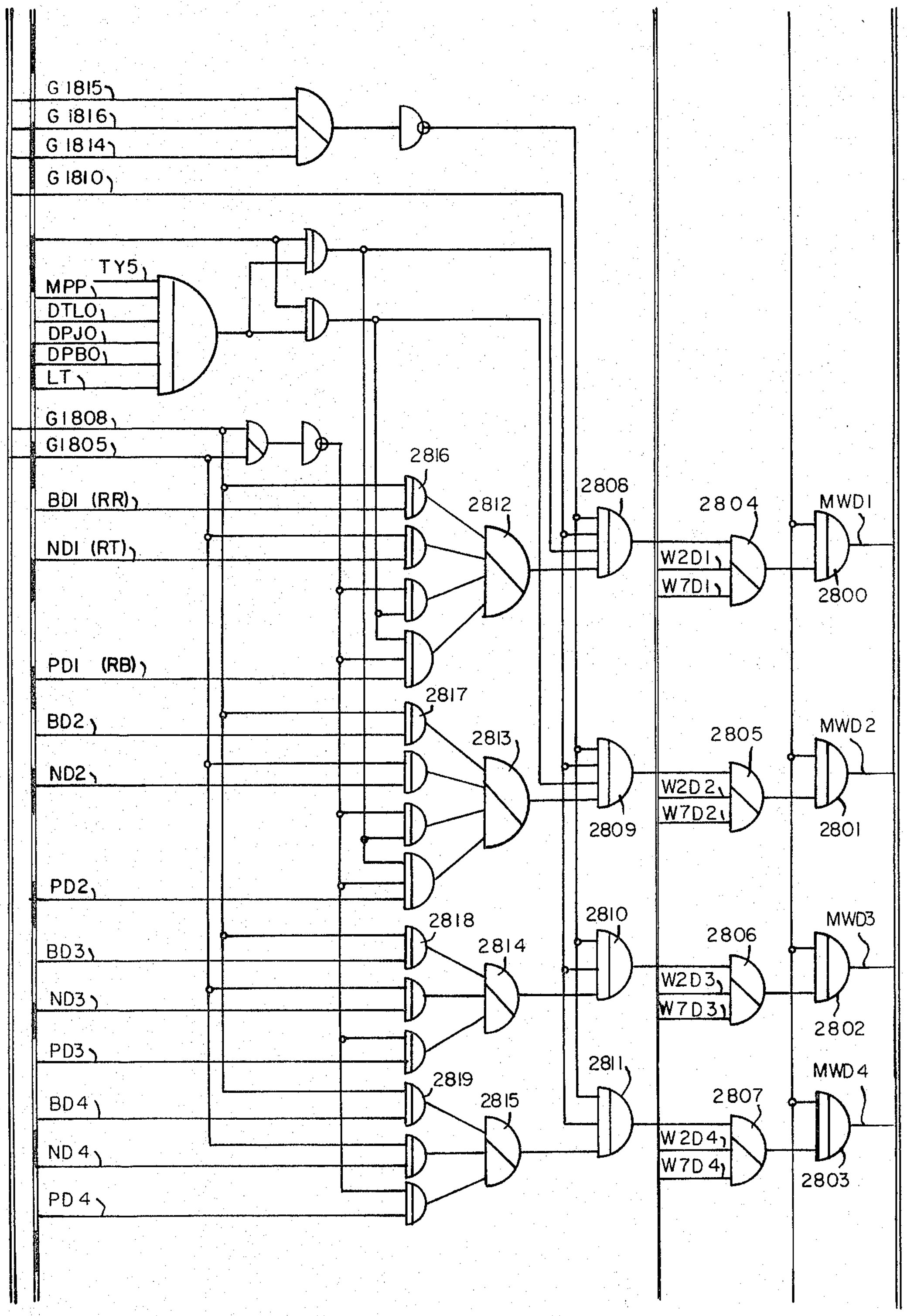
Figure 29:
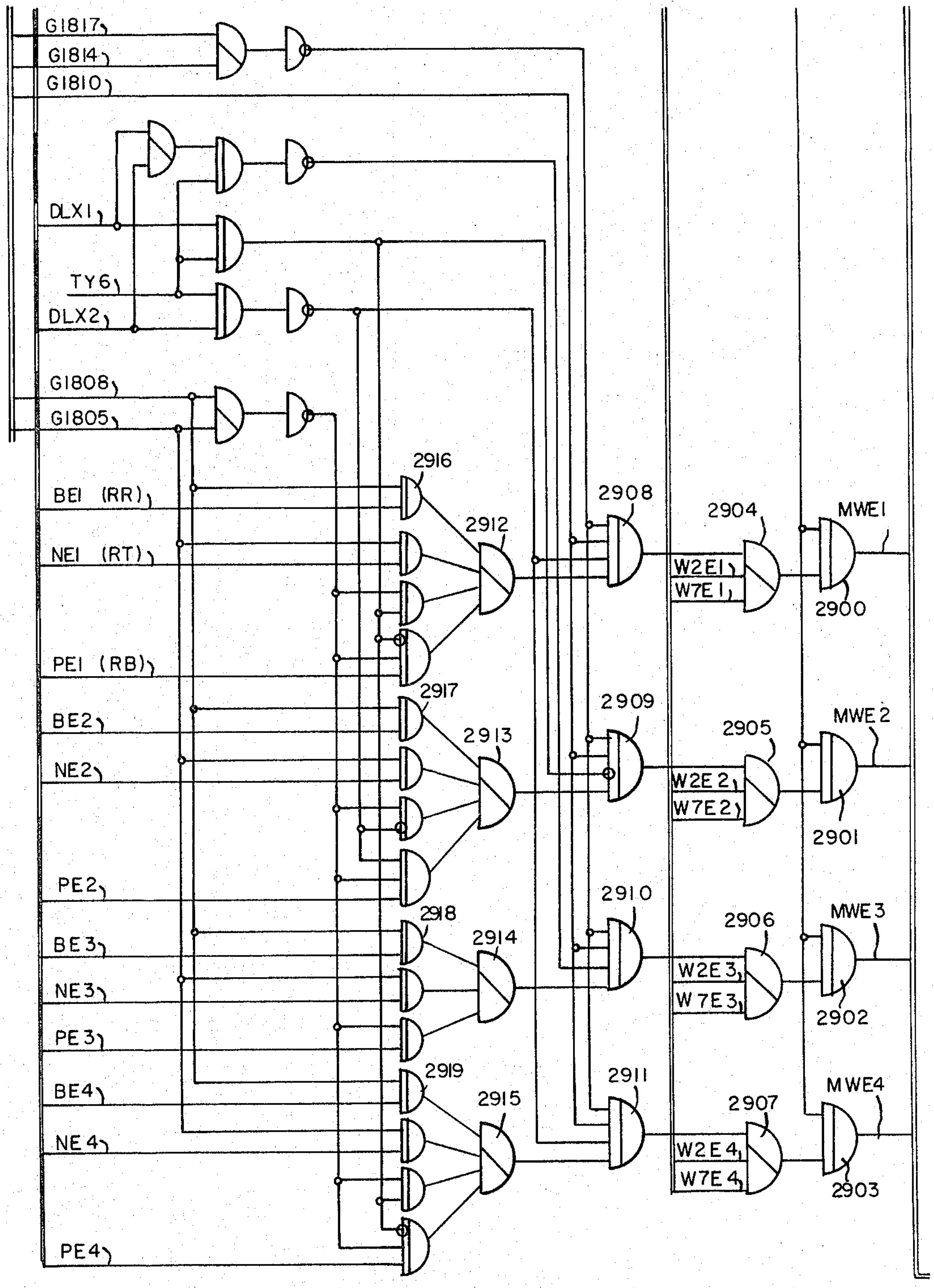
Figure 30:
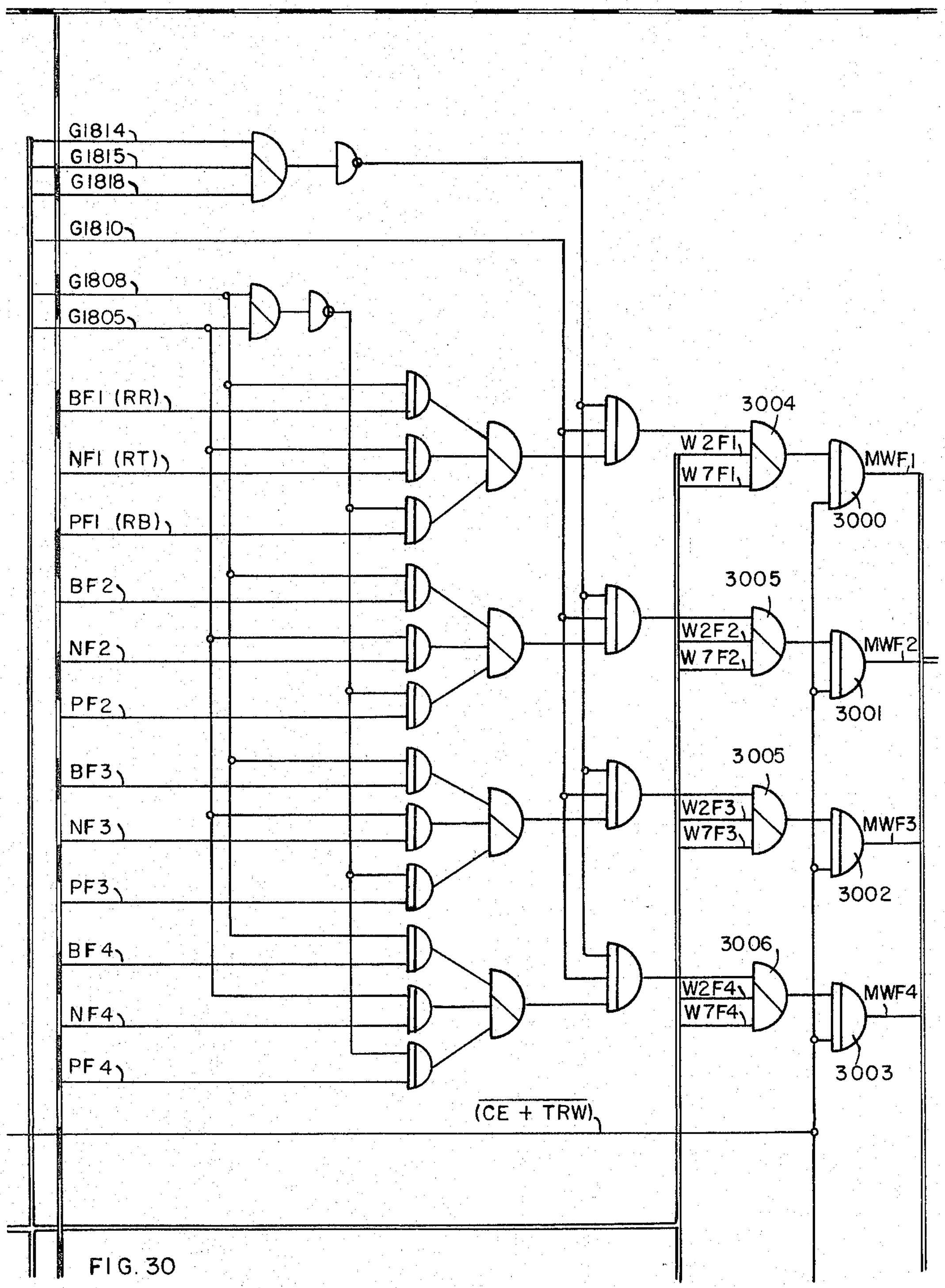
Figure 31:
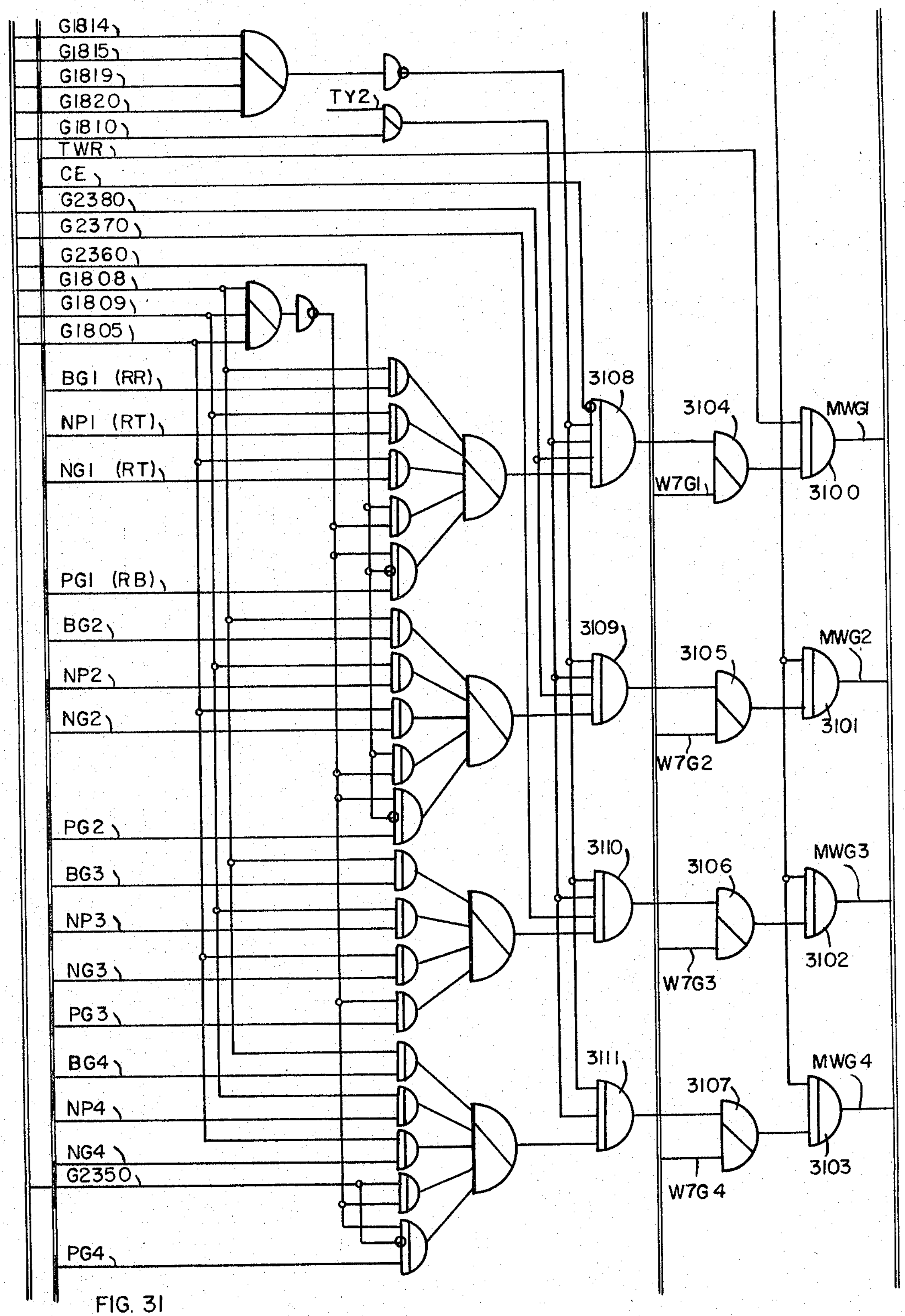
Figure 32:
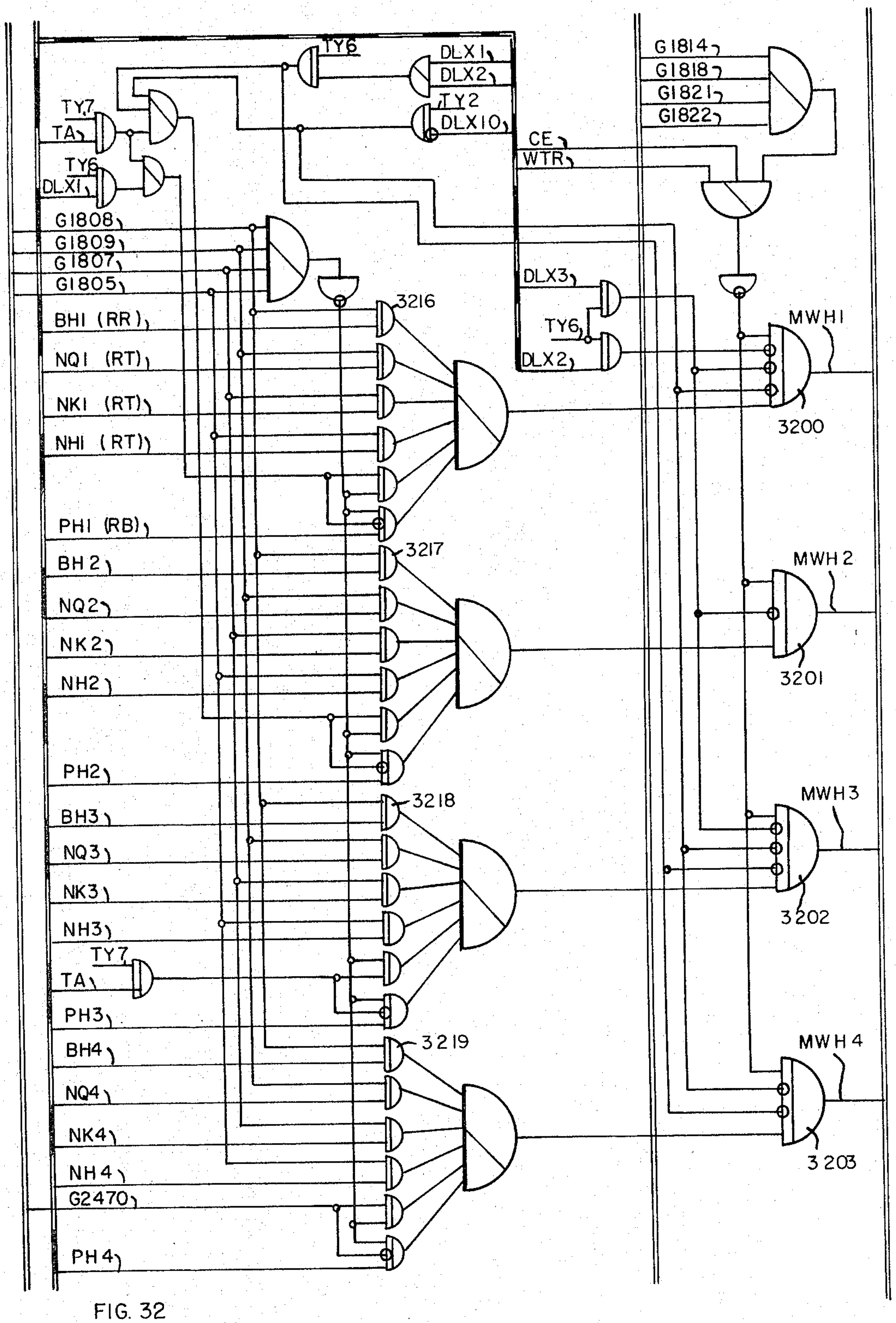

The remaining positions are shown in FIGS. 26–34, wherein FIG. 26 which shows position B is a typical example of the transmission logic necessary for writing the information into the ferrite-core memory. In particular, the third bit of information, MWB3, is generated by AND gate 2602. The output of AND gate 2602 is inhibited via inverter gate 2562 in response to the general clear command CE of the trouble command TRW. The OR gate 2606 allows entry for the write control signal for row 2, W2B3 or the signal for row 1, W7B3. AND gate 2610 provides a delete function via inverter gates 2613–14, which inhibits the output of AND gate 2602 when either G1811 or G1812 becomes true, which are two of the delete commands. If there is no delete command gate 2610 is enabled by the command G1810 during all sub time slots except TY2 and TY7 to rewrite the bit, or to receive via OR gate 2617 information from other parts of the register-sender group for storage in rows 3–6 of the memory. More specifically, signals are transferred from the register transceiver or register receiver to OR gate 2617 under control of AND gates 2633–36 in response to transfer commands G1802–4 and G1806, which also supplies a signal via gates 2619 and 2620 to inhibit rewrite of the bit at gate 2637. Gate 2638 transfers signals from the sender controller to row 3 when enabled by signal SGR, which also inhibits gate 2637.

Figure 18:
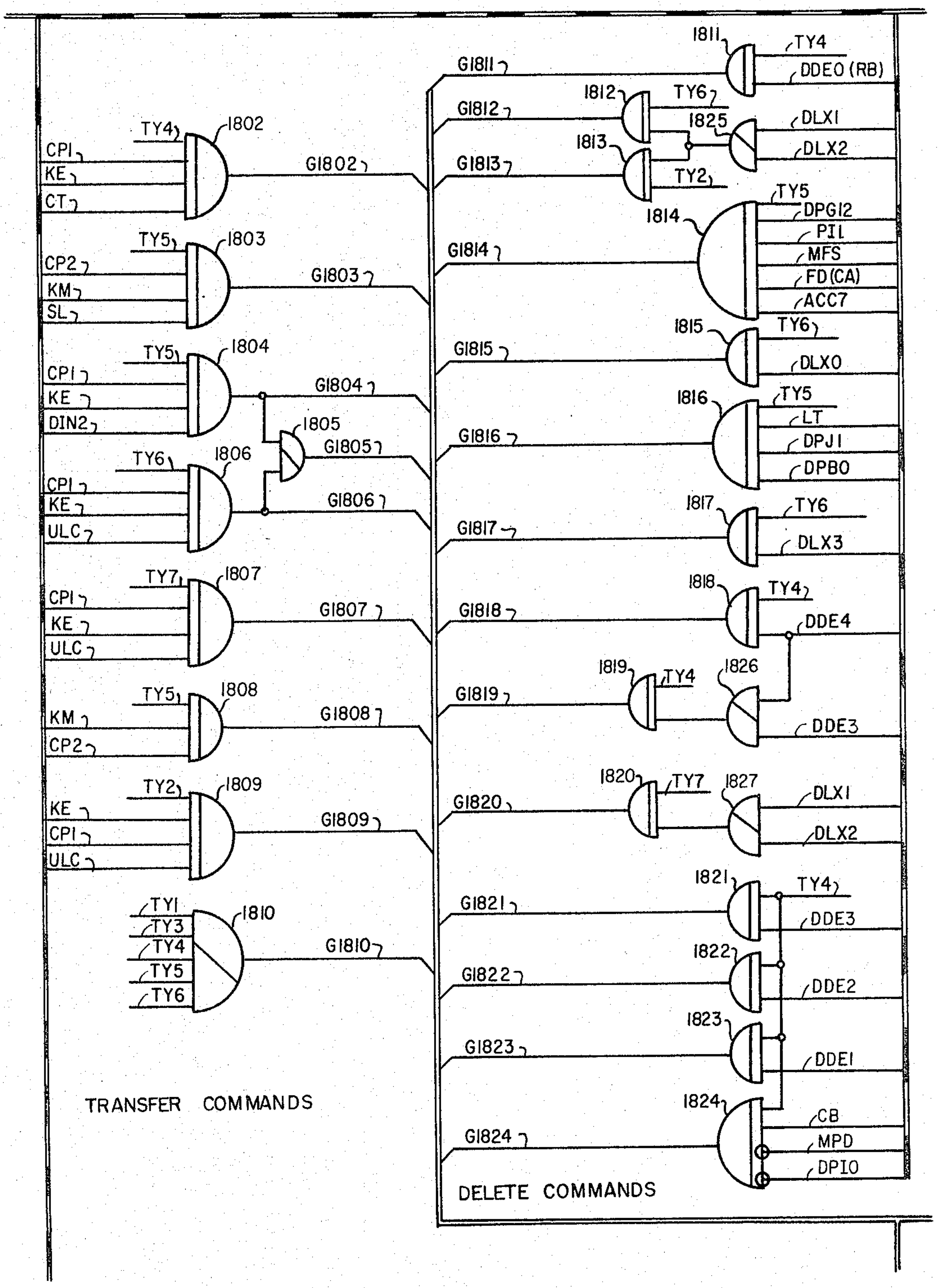

Referring now to FIG. 18, the transfer commands are shown on the left side of the sheet and comprise AND gate 1801–N. The delete commands are shown on the right portion of the sheet and comprise logic gates 1811–27. These commands are used in positions B-J inclusive. The special signals such as the ones generated for sub time slots 2 and 7 are shown in FIGS. 19–24.

Figure 19:
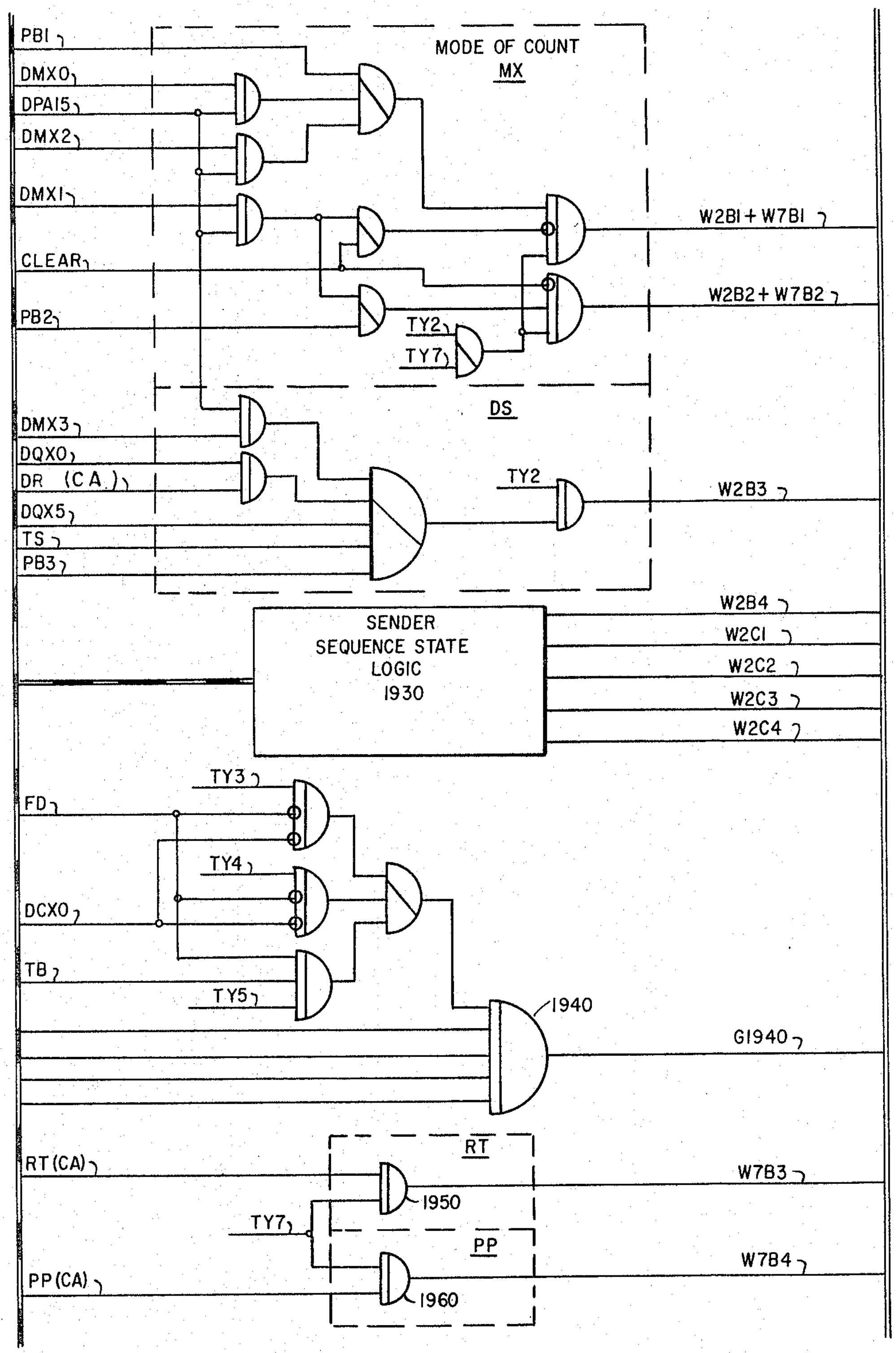

Referring to FIG. 19, the mode of count, MX, generates signal (W2B1+W7B1) and signal (W2B2+W7B2), which is used for position B for OR gates 2604 and 2605 respectively. The mode of count is used to control the counting logic for position A and changes the type of counting in response thereto.

Signal W2B3 is the disconnect sender bit DS for row 2, position B3 of the memory. This signal is gated to the memory via OR gate 2606.

The sender sequence state logic 1930 generates signals W2B4, and W2C1–4 to provide five bits for row 2 and are connected to OR gates 2607 and 2704–7. The sender sequence states are normally advanced one state each time the sender requests more digits, except as affected by the skip digit. See the section on the sender controller. The logic is as follows:

$$\begin{aligned}
&\mathrm{W2B4}\\
&\quad=\mathrm{TY2\ (PB4+SEQ\ \overline{PB4}+DQX3\ \overline{LAT}\ DSX0)}\\
&\quad\mathrm{(\overline{SEQ}+\overline{PB4})\ \overline{AR14}}\\
&\quad\mathrm{(\overline{SN1}\text{–}\overline{RS}+\overline{SN2}\text{–}\overline{RS}+\ \ldots\ +\overline{SN10}\text{–}\overline{RS})}\\
&\quad\mathrm{[\overline{DSX4}+(PI1+PI2+PI3+PI4)}\\
&\qquad\mathrm{\{PI1+PI3+(\overline{PI2}+PI4)\ (PI2+\overline{PI4}\}]}\\
&\quad\mathrm{(\overline{DSX8}+PI1\ PI3+\overline{PI1}\ \overline{PI2}\ \overline{PI4})}
\end{aligned}$$

$$\begin{aligned}
&\mathrm{W2C1}\\
&\quad=\mathrm{TY2\ (\overline{SN1\text{–}RS}+\overline{SN2\text{–}RS}+\ \ldots\ +\overline{SN10\text{–}RS})}\\
&\qquad\mathrm{\overline{AR14}}\\
&\quad\mathrm{[DSX8\ PI1+\overline{SEQ}+\overline{PB4}+\overline{PC1}+\overline{PI4}\ DSX4}\\
&\qquad\mathrm{(PI1+\overline{PI3}+PI4)\ (PI1+PI2+PI4)]}\\
&\quad\mathrm{[DSX8\ PI1+SEQ\ PB4\ \overline{PC1}+\overline{PI4}\ DSX4}\\
&\quad\mathrm{(PI1+\overline{PI3}+PI4)\ (PI1+PI2+PI4)]}\\
&\quad\mathrm{(\overline{DSX5}+PI1+\overline{PI2}+PI3+\overline{PI4})}
\end{aligned}$$

$$\begin{aligned}
&\mathrm{W2C2}\\
&\quad=\mathrm{TY2\ (\overline{DSX5}+PI1+\overline{PI2}+PI3+\overline{PI4})}\\
&\quad\mathrm{(\overline{SN1\text{–}RS}+\overline{SN2\text{–}RS}+\ \ldots\ +\overline{SN10\text{–}RS})\ \overline{AR14}}\\
&\quad\mathrm{[SEQ\ PB4\ PC1\ \overline{PC2}+PC2}\\
&\qquad\mathrm{+(DSX8\ PI3)\ (PI1+\overline{PI2})]}\\
&\quad\mathrm{[\overline{DSX4}+(\overline{PI1}+PI3+PI4)\ (PI1+\overline{PI2}+\overline{PI3}+PI4)}\\
&\qquad\mathrm{(PI1+PI2+PI3+PI4)]}\\
&\quad\mathrm{[SEQ\ PB4\ PC1\ PC2+PC2+DSX8\ PI3}\\
&\qquad\mathrm{(P1+\overline{PI2})]}
\end{aligned}$$

$$\begin{aligned}
&\mathrm{W2C3}\\
&\quad=\mathrm{TY2\ (\overline{SN1\text{–}RS}+\overline{SN2\text{–}RS}+\ \ldots\ +\overline{SN10\text{–}RS})}\\
&\qquad\mathrm{\overline{AR14}}\\
&\quad\mathrm{\{[\overline{DSX5}+PI1+\overline{PI2}+PI3+\overline{PI4}+\overline{SEQ}+\overline{PB4}}\\
&\qquad\mathrm{+\overline{PC1}+\overline{PC3}]+[DSX4\ \overline{PI4}\ (PI1+PI3)]\}}\\
&\quad\mathrm{\{[DSX4\ \overline{PI4}\ (PI1+PI3)]+PC3}\\
&\qquad\mathrm{+[SEQ\ PB4\ PC1\ PC2\ \overline{PC3}]}\\
&\qquad\mathrm{+[\overline{DSX5}+PI1+\overline{PI2}+PI3+\overline{PI4}]\}}\\
&\quad\mathrm{[\overline{DSX8}+PI1+\overline{PI2}+\overline{PI3}+\overline{PI4}]}
\end{aligned}$$

$$\begin{aligned}
&\mathrm{W2C4}\\
&=\mathrm{TY2\ (\overline{SN1}\text{–}\overline{RS}+\overline{SN2}\text{–}\overline{RS}+\ \ldots\ +\overline{SN10}\text{–}\overline{RS})}\\
&\qquad\mathrm{\overline{AR14}}\\
&\quad\mathrm{[(\overline{SEQ}+\overline{PB4}+\overline{PC1}+\overline{PC2}+\overline{PC3}+\overline{PC4})}\\
&\qquad\mathrm{+DSX8\ \overline{PI1}\ PI2\ PI3\ PI4)}\\
&\qquad\mathrm{+DSX4\ \overline{PI1}\ \overline{PI2}\ \overline{PI3}\ PI4)]}\\
&\quad\mathrm{[(DSX4\ \overline{PI1}\ \overline{PI2}\ \overline{PI3}\ \overline{PI4})}\\
&\qquad\mathrm{+(DSX8\ \overline{PI1}\ \overline{PI2}\ \overline{PI3}\ PI4)+PC4}\\
&\qquad\mathrm{+(SEQ\ PB4\ PC1\ PC2\ PC3\ \overline{PC4})]}
\end{aligned}$$

Signal G1940 is generated via logic gates 1940–44 for use with AND gate 2750 for position C1.

AND gate 1950 generates signal W7B3 which is the RT bit for row 1, position B3. This signal is used by OR gate 2606.

AND gate 1960 generates signal W7B4 which is the PP bit for row 1, position B4. This signal is used by OR gate 2607.

Figure 20:
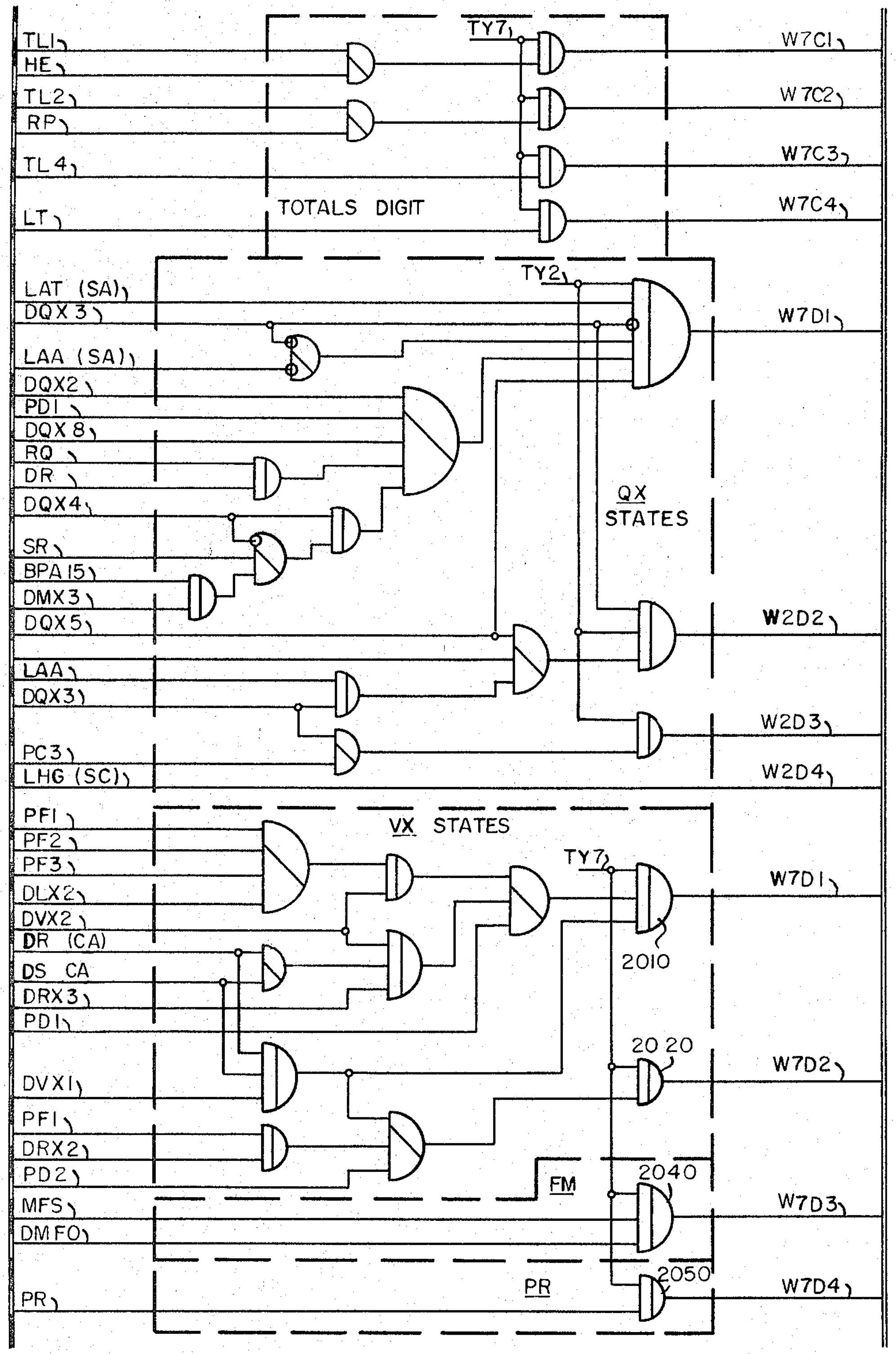

Referring now to FIG. 20, the totals digit is transferred to the memory via leads W7C1–4 by means of the associated logic. The totals digit represents the number of dialed digits accumulated.

The QX states are stored in the memory via leads W2D1–3 and are generated by the associated logic. Refer now to FIG. 65 which shows a state diagram for the QX states. The VX states are generated via lead W7D1–2 by the associated logic. Refer now to FIG. 66 which shows the state diagram for the VX states.

AND gate 2040 generates signal W7D3 which is the FM bit for row 1, position D3. This signal is used by OR gate 2806.

AND gate 2050 generates signal W7D4 which is the PR bit for row 1, position D4. This signal is used by OR gate 2906.

Figure 21:
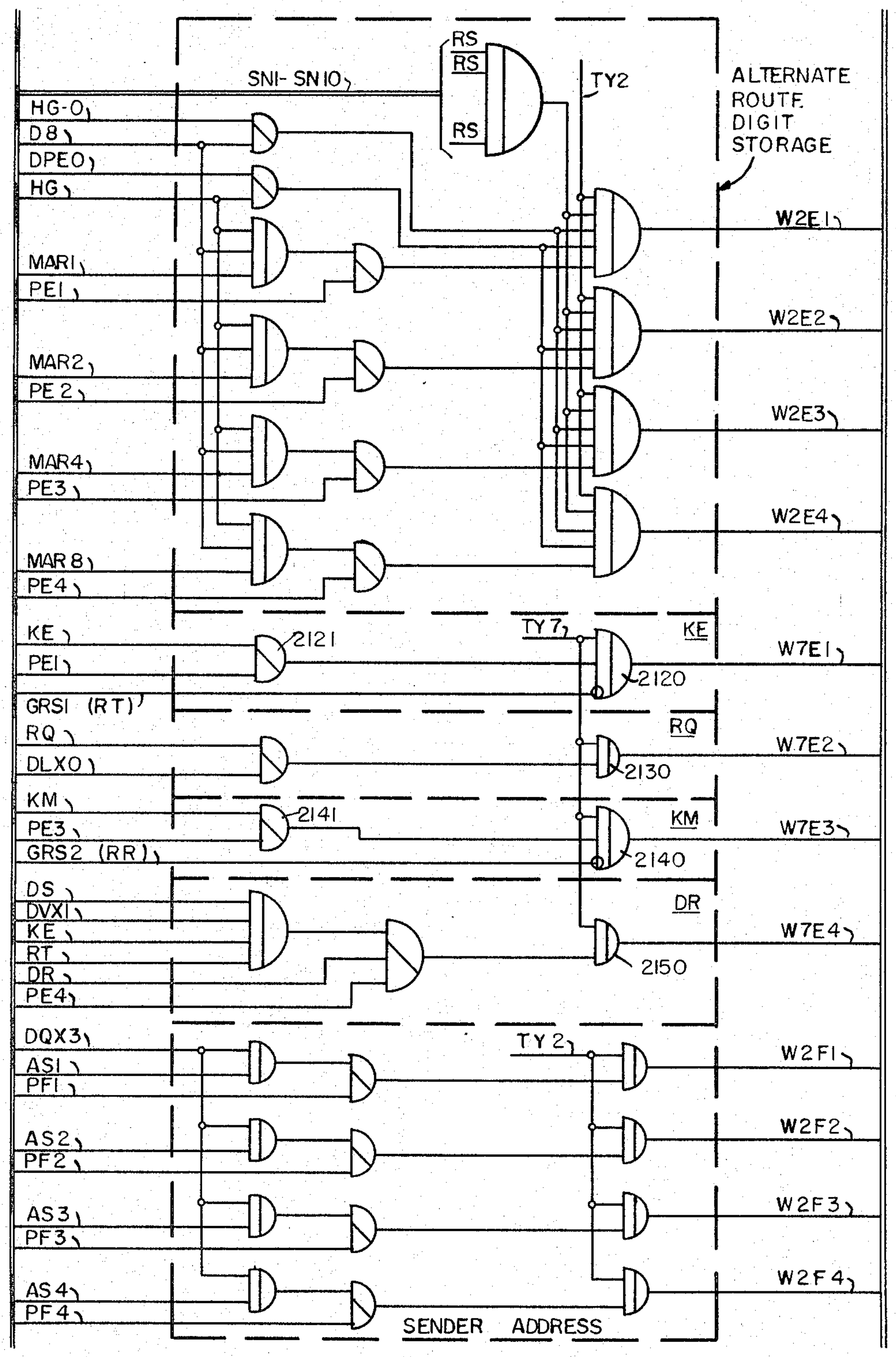

Referring now to FIG. 21, the alternate route digit storage is written into the memory via leads W2E1–4 in response to the associated logic. This alternate route information is stored in row 2, position E and therefore these signals are connected to OR gates 2904–07.

AND gate 2120 generates signal W7E1 which is the KE bit for row 1, position E1. This signal is used by OR gate 2904.

AND gate 2130 generates signal W7E2 which is the RQ bit for row 1, position E2. This signal is used by OR gate 2905.

AND gate 2140 generates signal W7E3 which is the KM bit for row 1, position E3. This signal is used by OR gate 2906.

AND gate 2150 generates signal W7E4 which is the DR bit for row 1, position E4. This signal is used by OR gate 2907.

Signals W2F1–4 comprise the sender address for row 2, position F. These signals are used by OR gates 3004–7.

Figure 22:
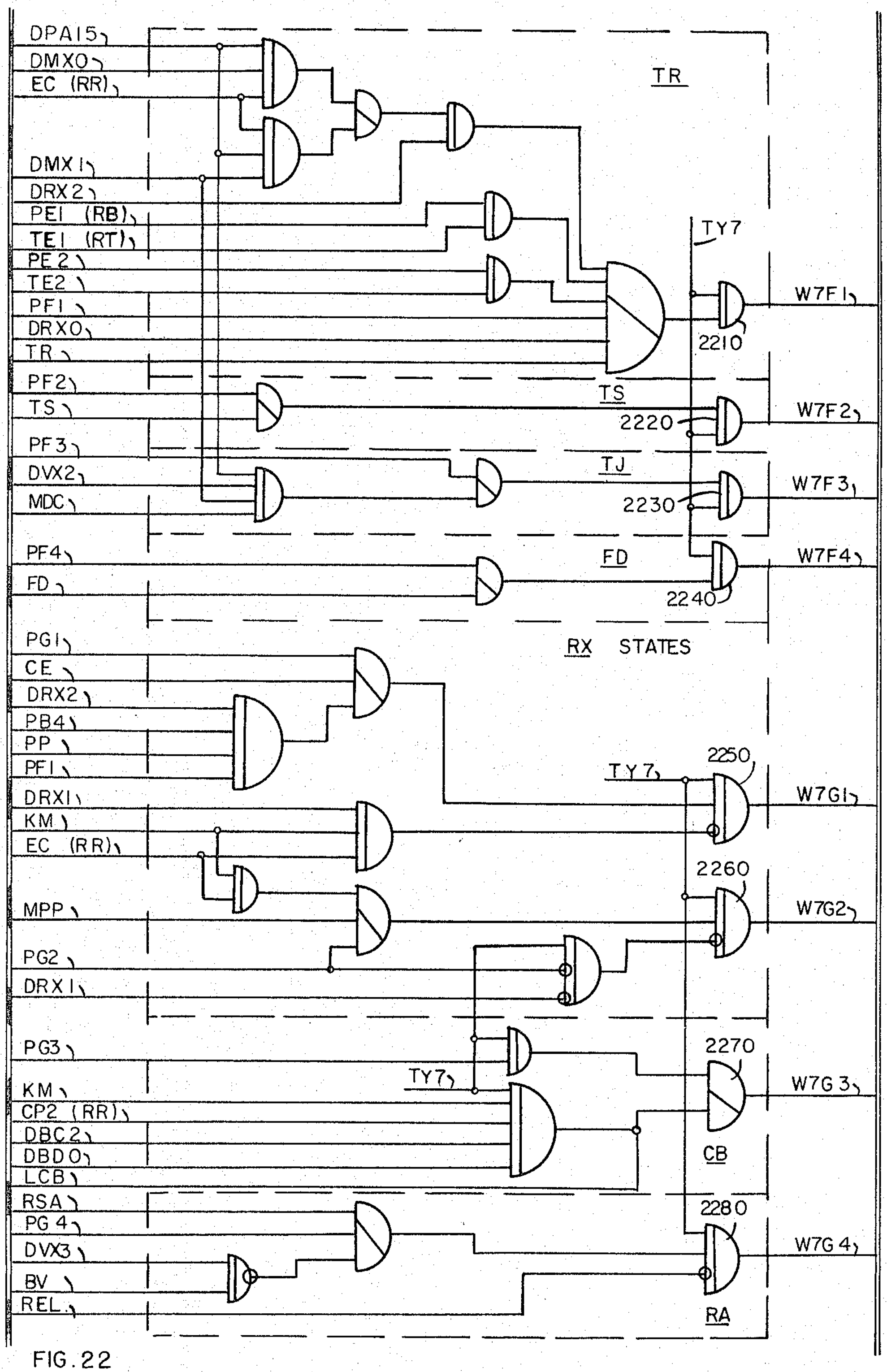

Referring now to FIG. 22, AND gate 2210 with its associated logic generates signal W7F1 which is the TR bit for row 1, position F1. This signal is used by OR gate 3004.

AND gate 2220 with its associated logic generates signal W7F2 which is the TS bit for row 1, position F2. This signal is used by OR gate 3005.

AND gate 2230 with its associated logic generates signal W7F3 which is the TJ bit for row 1, position F3. This signal is used by OR gate 3006.

AND gate 2240 generates signal W7F4 which is the FB bit for row 1, position F4. This signal is used by OR gate 3007.

Signals W7G1–2 comprise the RX states which is the first two bits of position G in row 1. These signals are used by OR gates 3104–5 respectively. See the flow chart in FIG. 66.

AND gate 2270 with its associated logic generates signal W7G3 which is the CB bit for row 1, position G3. This signal is used by OR gates 3106.

AND gate 2280 with its associated logic generates signal W7G4 which is the RA bit for row 1, position G4. This signal is used by OR gate 3107.

Figure 23:
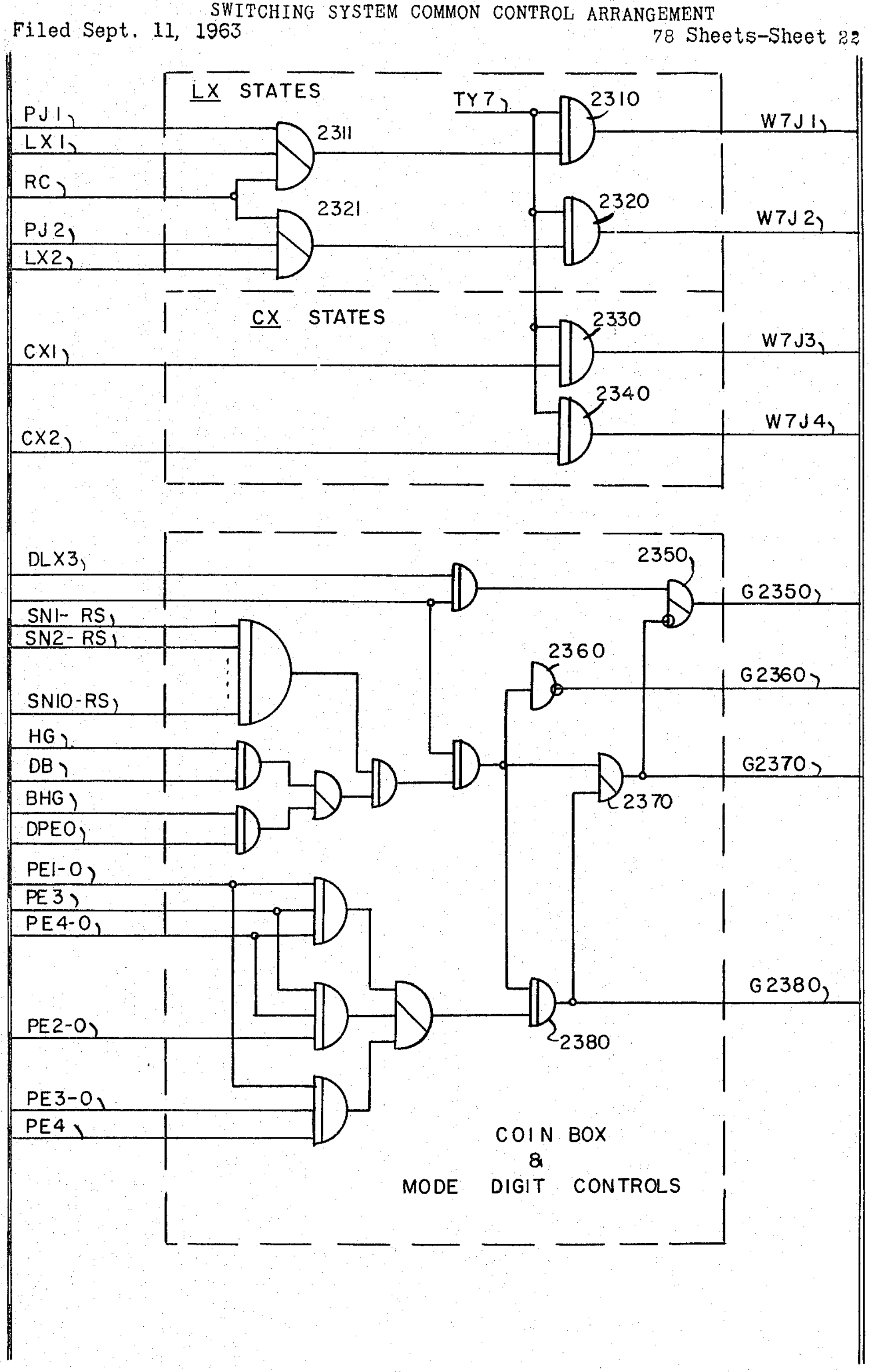

Referring now to FIG. 23, signals W7J1–2 comprise the signals for the LX states for row 1, positions J1–2. These signals are used by OR gates 3400–1.

Signals W7J3–4 comprise the CX states which are transferred to bits J3 and J4 in row 1 of the memory. These signals are used by OR gates 3402–3.

Figure 24:
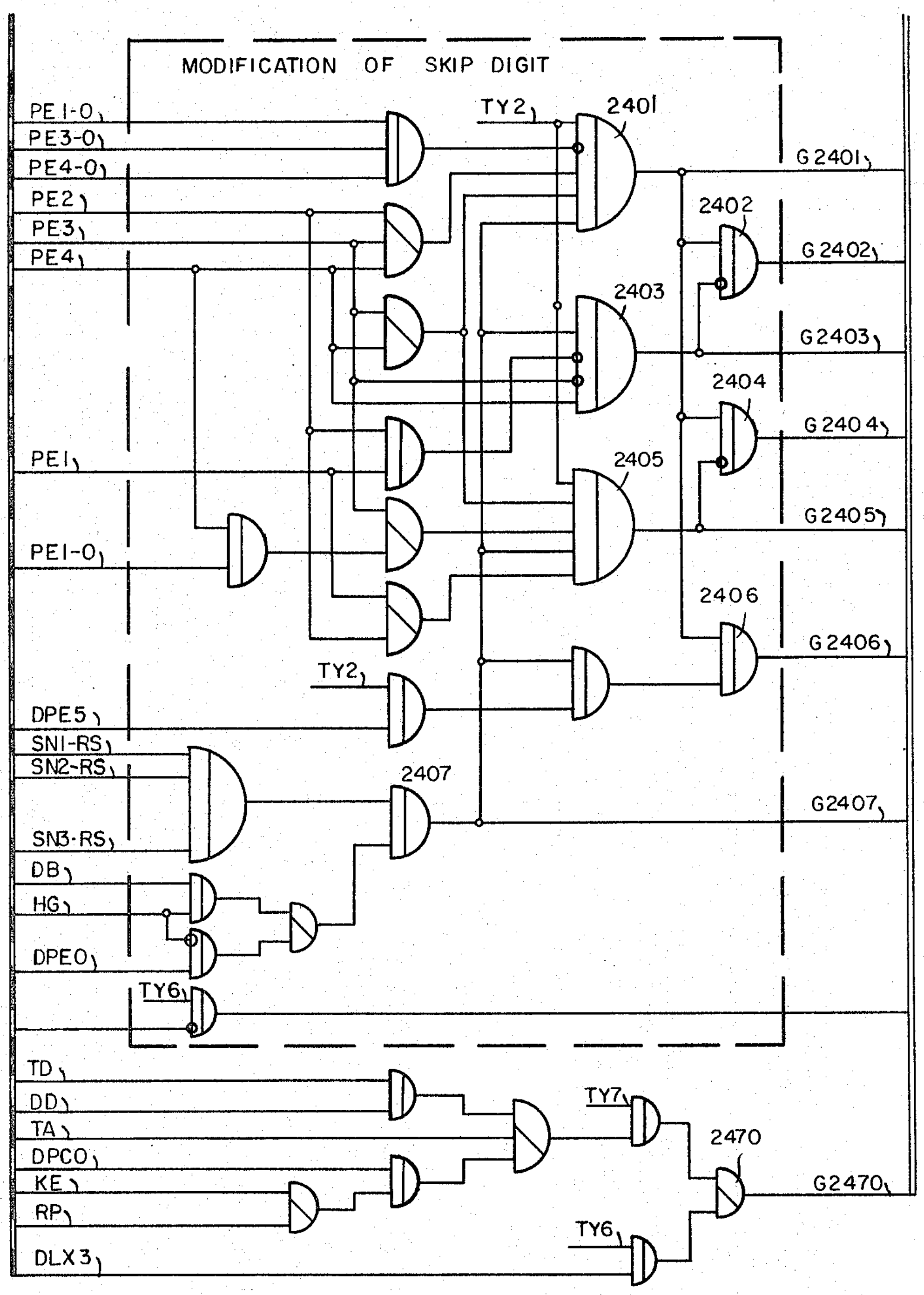

Signals G2350, G2360, G2370 and G2380 comprise the coin box and mode digit controls, which are used by AND gates 3108–11 for position G. Referring now to FIG. 24 AND gates 2401–7 with its associated logic generate the modification of skip digit signals for position I in FIG. 33.

Figure 33:
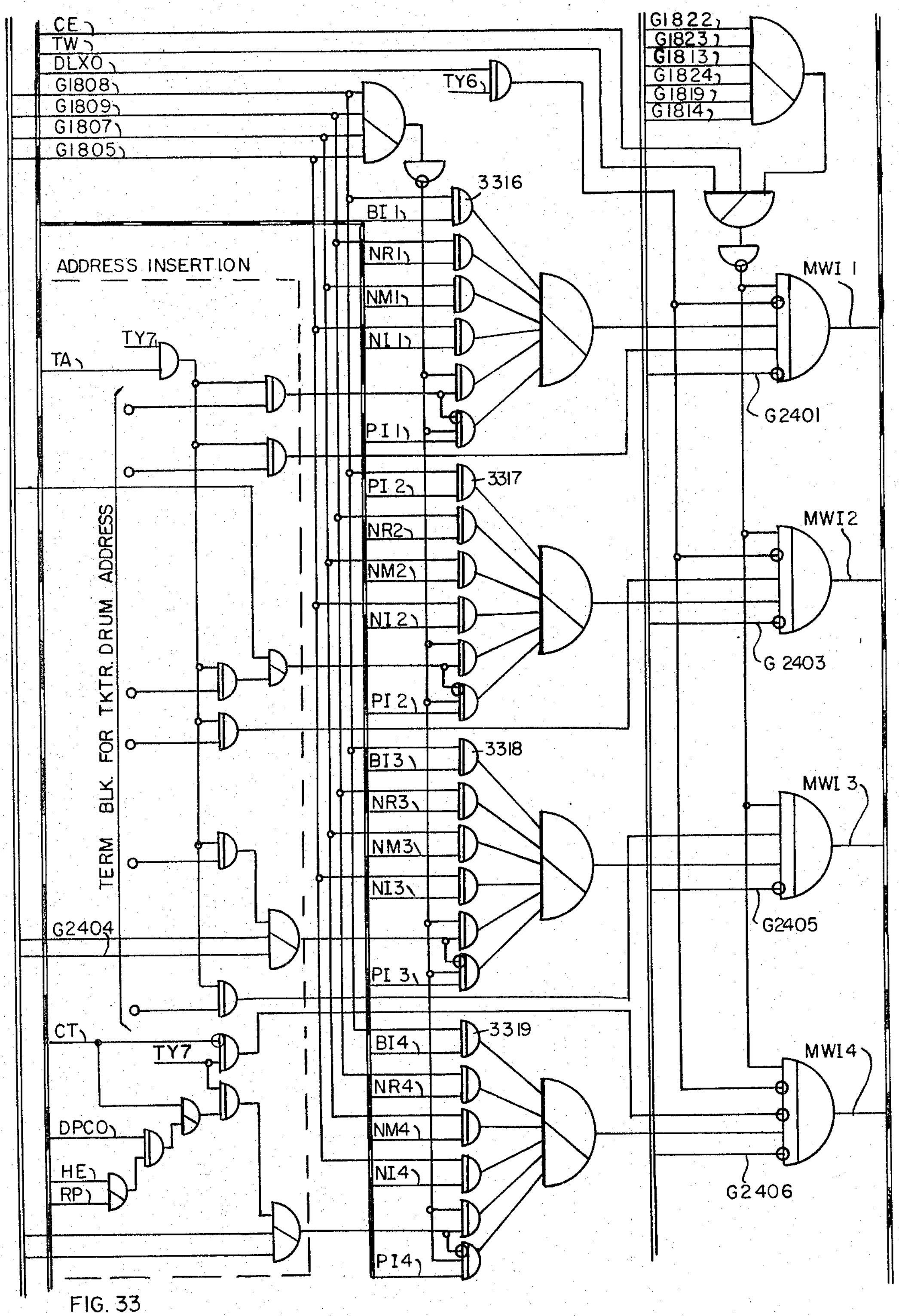
Figure 34:
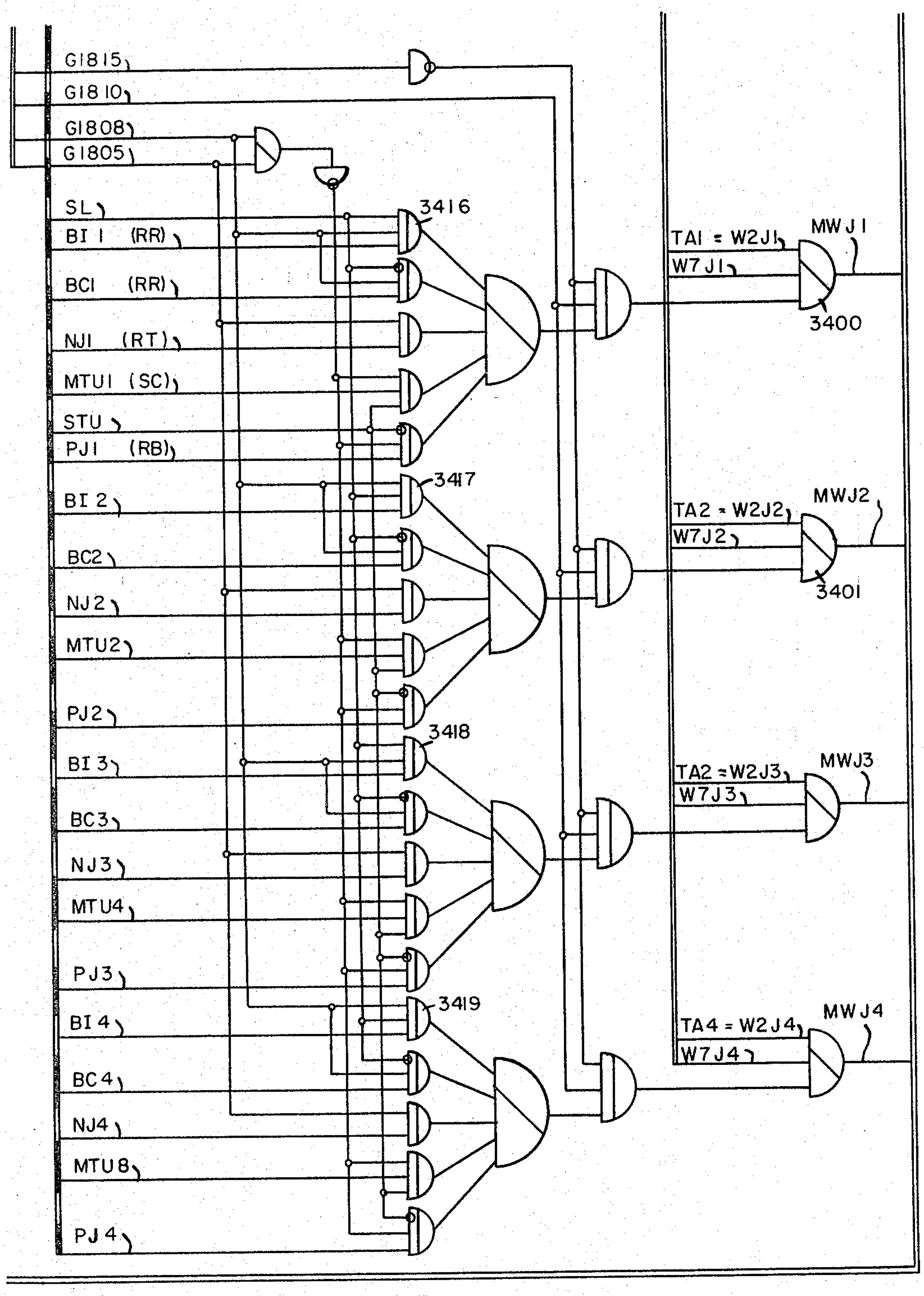

In FIG. 33, the terminal block for ticketing down access is strapped for each register-sender group with a particular address.

C(1)(f) *Write transfer*.—Referring now to FIG. 35, write transfer 665 allows the forty bits of information from the register controller to be transferred to the write control. During normal operation the forty bits of information that are formed in the register controller pass through the write transfer without being altered in any way. It comprises gating logic to provide alternative inputs for the flow of information for maintenance purposes, thereby allowing insertion of information into the ferrite core memory from the control center, register routiner, or the read shift buffer via memory test logic 3500. The register controller causes the information to be rewritten into the memory without being altered. However, the register controller can inhibit the normal flow of information by generating signal TRW, which inhibits each of the forty output AND gates of the register controller.

For purposes of maintenance one of the 24 registers is selected, and the forty write commands for one or all six rows in that particular register are inhibited. The inhibited rows of that register then become static. Special information can then be written into the memory from external sources, for example the control center. There is also a twenty-fifth register time slot used exclusively for routining and maintenance purposes. This information is written during one register-sender cycle.

C(1)(g) *Memory write control, ferrite core array, and memory read control*.—Referring now to FIG. 35, the memory write control and the memory read control provide proper current pulses needed to transfer information to and from the cores of the ferrite core array. The write commands being generated by the register controller are sequentially accessed. The constant current generator and amplifier 3547 supply a fixed amount of current to the write drivers 3541A–3546A during the control pulse TX6 of each sub-time slot. The six write drivers are enabled during the sub-time slots TY1–7 respectively with write driver 3541A being enabled twice, during TY1 and TY7. The enabled write drivers pass current through the strobe circuit 3549. This current then passes through the memory cores and terminates in the word switches 3551–75 which are enabled during each time slot TX1–24. A row in the memory through which this current passes is determined by the proper selection of a word switch and a write driver.

When a binary one is written into the memory, the appropriate write driver, in coincidence with the appropriate word switch, determines the time slot and sub-time slot, thereby defining a register and a row in that particular register. The binary one is then written into the appropriate core during control pulse TX6 by means of the write command from the register controller.

The memory read control provides a source of constant current to read drivers 3541B–46B from current generator and amplifier 3548 during control pulse TX2 of each sub-time slot. The read current flows into strobe circuit 3549 causing the strobe cores in the strobe circuit to switch. The strobe ferrite cores cause a correct polarity pulse, after amplification, to act as a gate pulse for the sense amplifiers 3501B–40B. This strobe circuit thereby causes the information stored in a ferrite memory core to be accurately read from the memory. Stored information is therefore distinguished from a random noise voltage.

Whenever a binary one is stored in a ferrite core, a signal is sent to the sense amplifiers from the memory core during control pulse TX2 of one of the read drivers sub-time slots, TY1–7, thereby amplifying this signal and providing an output in coincidence with the strobe circuit pulse. This output sets the flip-flops in the read shift buffer.

The ferrite core memory array provides temporary storage for the register sender and is sequentially accessed and time slot oriented. Each register is assigned six rows of ferrite cores, each row comprising 40 cores. Each register is accessed during each time slot. Each row is accessed by sub-time slots TY1–7. The first row of each register is accessed during TY1 and TY7 of each time slot. The information contained in row one is selectively modified during TY7 and is rewritten during TY1, as modified, when that register's time slot next appears. This procedure allows the remaining five rows to collect information that ultimately will affect the storage of information in row one, because the information in row one mainly comprises request of service indications for register sender components, the translator, and other similar indications.

The total number of cores per register is 240. There are 24 registers to store information for 24 separate subscribers. There is an additional six rows of storage for maintenance by the register-sender routiner, which is assigned to time slot TZ25. Therefore the total number of ferrite cores in the ferrite core memory array is 6,000.

A position consists of four bits of information and therefore each row comprises ten positions of information. Refer to FIG. 64 for the designation of each bit in a register. In row 1, position A provides storage for information from three counters: awaiting line-loop timer, line-loop timer, and the down check timer.

In position B the first two bits store counting information to control the counters in position A of row one. Bit 3 of position B stores the request for the register transceiver to send information to the translator. Bit 4 of position B stores the subscriber's line-loop indication, the P highway.

In position C the first three bits store the total digit which is one of the four processing digits to be transmitted to the translator. Bit 4 of position C stores the LT bit which is used in conjunction with the totals digit.

Position D, bits 1 and 2, store information from a counter to provide the disconnect sequence control VX. Bit 3 stores the multi-frequency interdigital pause. Bit 4 controls the sender out-pulse sequence states for early outpulse.

In position E, bit 1 information is stored to indicate that this register is using the register transceiver. Bit 2 stores information to request the sender. Bit 3 indicates that this register is now using the register receiver. Bit 4 stores the disconnect register indication.

In position F, bit 1 stores the register equipment trouble indication. Bit 2 indicates that trouble has developed in either the sender assigner or the sender. Bit 3 is the register junctor trouble indication. Bit 4 is the finished dialing indication.

In position G, bits 1 and 2 comprise the register sequence states RX. Bit 3 indicates that a coinbox call is in progress. Bit 4 indicates that this register is using the control center.

Position H is the instruction digit which is one of the four processing digits.

In position I, bits 1–3 comprise the drum address digit which is one of the four processing digits. Bit 4 is the code translation indication which is used in conjunction with the four processing digits being sent to the translator.

In position J, bits 1 and 2 comprise an internal translation which is necessary for a reverting call or for a call to the CKO operator. Bits 3 and 4 comprise the sequence states for the transfer of dial digits from row 3 to row 4.

In row 2, position A stores information from a counter which times the sender. In position B, bits 1 and 2 comprise a counter for the control of the counter in row 2 of position A. Bit 3 is the disconnect sender indication. The sender-outpulsing sequence states comprise a five stage counter utilizing bit 4 of position B and all of position C.

In position D, bits 1–3 comprise the sender-seizure sequence QX. Bit 4 is an indication that the information has been stored in position B of memory row 3 which is the GR digit, a portion of the ticketer identity information received from the group selector marker.

The alternate route digit from the group selector marker is stored in position E for modification of the skip digit, position I of row 2, and the mode of send digit, position G of row 2. Position F indicates the sender address.

Position D is the mode of send information which is one of the three digits of instruction for the sender received from the translator.

In position H, bits 1–3 comprise the end of send control being one of the three sender instruction digits. Bit 4 of position H is the ticketing digit which indicates that ticketing is required.

The third digit of sender instruction, the skip digit, is stored in position I.

In position J trouble analysis information is stored for the control center.

In row 3 position A comprises a counter for the dial digit accumulator to store a dialed digit in binary code.

In position B information is stored indicating that the identity of the group selector has been recognized, which is part of the ticketer-identity information from the group selector marker. This indication is preveiously referred to as the GR digit.

Positions C–I store dialed digits. After a dialed digit is accumulated by the counters in position A, it is shifted in binary form to position C upon the next cycle of the registers. Thereafter the digits are shifted serially upon each cycle until all the dialed digits are stored in positions C–I.

If the dialed digits arrive in the register sender in the form of multi-frequency signals, then the decoded signals directly enter position C rather than being accumulated and coded at position A.

Position J is the tens digit which is part of the ticketer-identity information from the group selector marker.

In row 4, position A is another counter to accumulate dial digits in exactly the same manner as the counter in position A of row 3.

In position B, bits 1–3 comprise the delete digit which is one of the four processing digits for the translator. Bit 4 is the early out-pulse indication, which is an indication for the translator that early out-pulsing is required.

Positions C–I store dial digits in exactly the same manner as positions C–I in row 3. The first seven dialed digits that are written into the memory are stored in positions C–I of row 4. The remaining dial digits to be written into the memory are stored in positions C–I of row 3.

Position J stores the units digit, which is part of the ticketer-identity information from the group selector marker.

In row 5, position A stores information from a counter to time the receipt of information being received from the register for row 5 of the memory.

Position B stores one digit of the calling party's class of service information.

Positions C–I store the LNI and TNI information being received in parallel form via the register controller. These positions also store the calling party's directory number. If the call is from a local subscriber, the line number identification is transferred to the translator. The calling party's directory number is then received from the translator after translation of the LNI and written into these same positions in the memory. If the calling party is not a local subscriber, the calling party's directory number is received from the tributary office and shifted serially into positions C–I of row 5, entering at position C.

Position J stores further information regarding the calling party's class of service.

In row 6, position A stores information from a counter to time the register transceiver, which transfers information from the translator for storage in positions B–J of row 6.

Positions B–J store switching information received from the translator.

C(1)(h) *Read shift buffer*. Referring now to FIGS. 36–39, the read shift buffer provides a temporary storage for information which is read from the ferrite core memory, and directs the arrangement of dialed digits for storage in the memory. This buffer arrangement comprises the read-buffer control, read-buffer flip-flops, decoder logic, reverting-call parity circuit.

The read buffer which comprises flip-flops PA1–4, PB1–4, PC1–4, PD1–4, PE1–4, PF1–4, PG1–4, PH1–4, PI1–4, PJ1–4, and CY1–4 receives information in a parallel manner during the read control pulse TX2 from the read control. The system logic then makes use of the information from the read-buffer flip-flops.

When the read shift buffer is used to direct the arrangement of dialed digits, it receives information during the read interval. The dialed digits are shifted serially from one position to the next succeeding position, one position per multiplex cycle, in a shift-register manner during the shift interval. Read-buffer control directs this operation. The read-buffer control provides the D.C. commands for the read-buffer flip-flops in such a manner that the same D.C. command resets a given position and sets the next succeeding position. For example, AND gates 3620–23 reset position DC1–4 and also reset position PD1–4. In this manner a digit of information can be transferred from position C through position D, and so on down to position I, in a serial shift-register manner. This shift-register operation for the read-buffer flip-flops is used for the arrangement of dialed digits. When the signal DCX2 is true at gate 3604, a digit is shifted from position I in row 3 to flip-flops CY1–4, and then is transferred via gates 3605–14 to position C in row 4.

Figure 38:
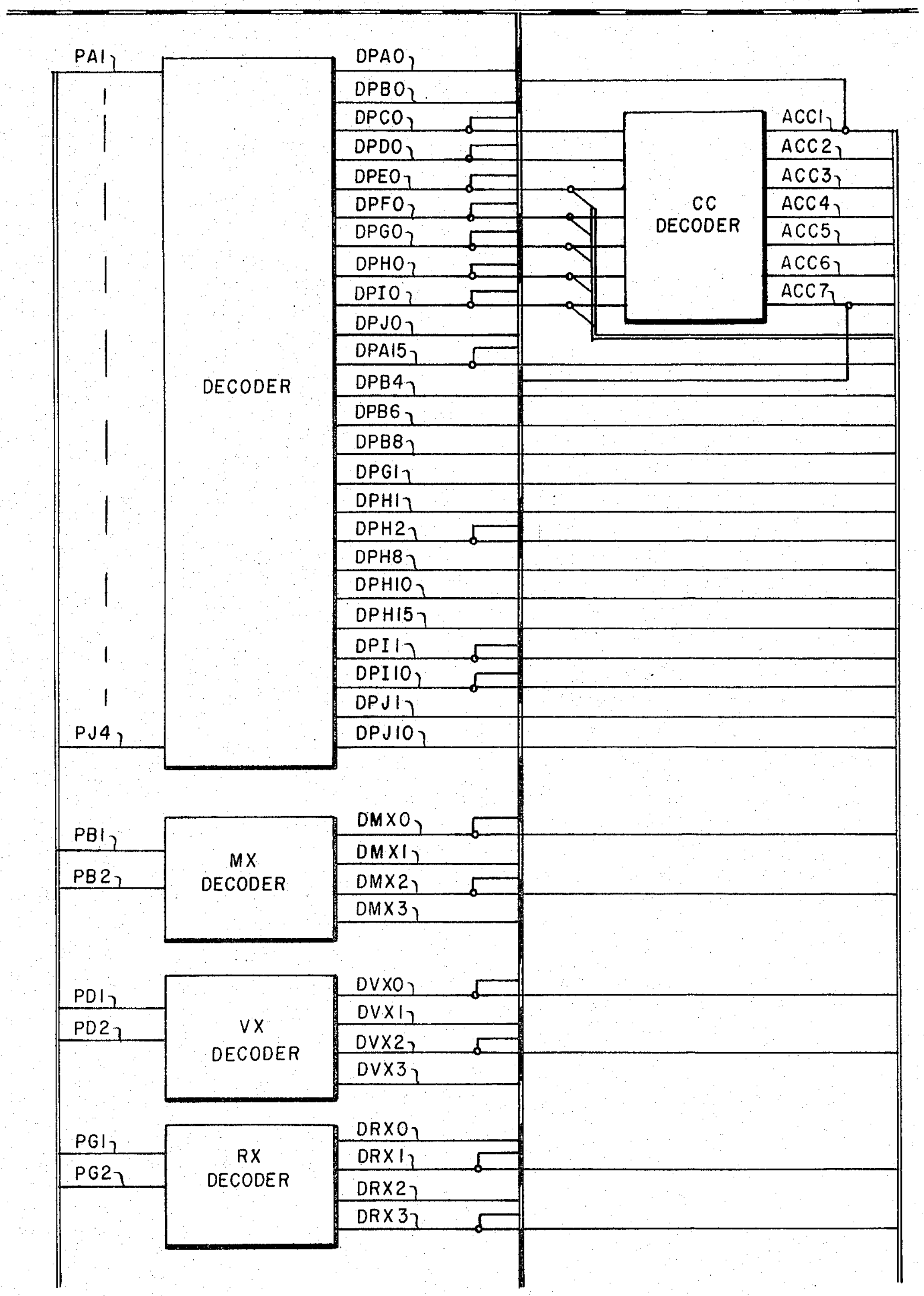
Figure 39:
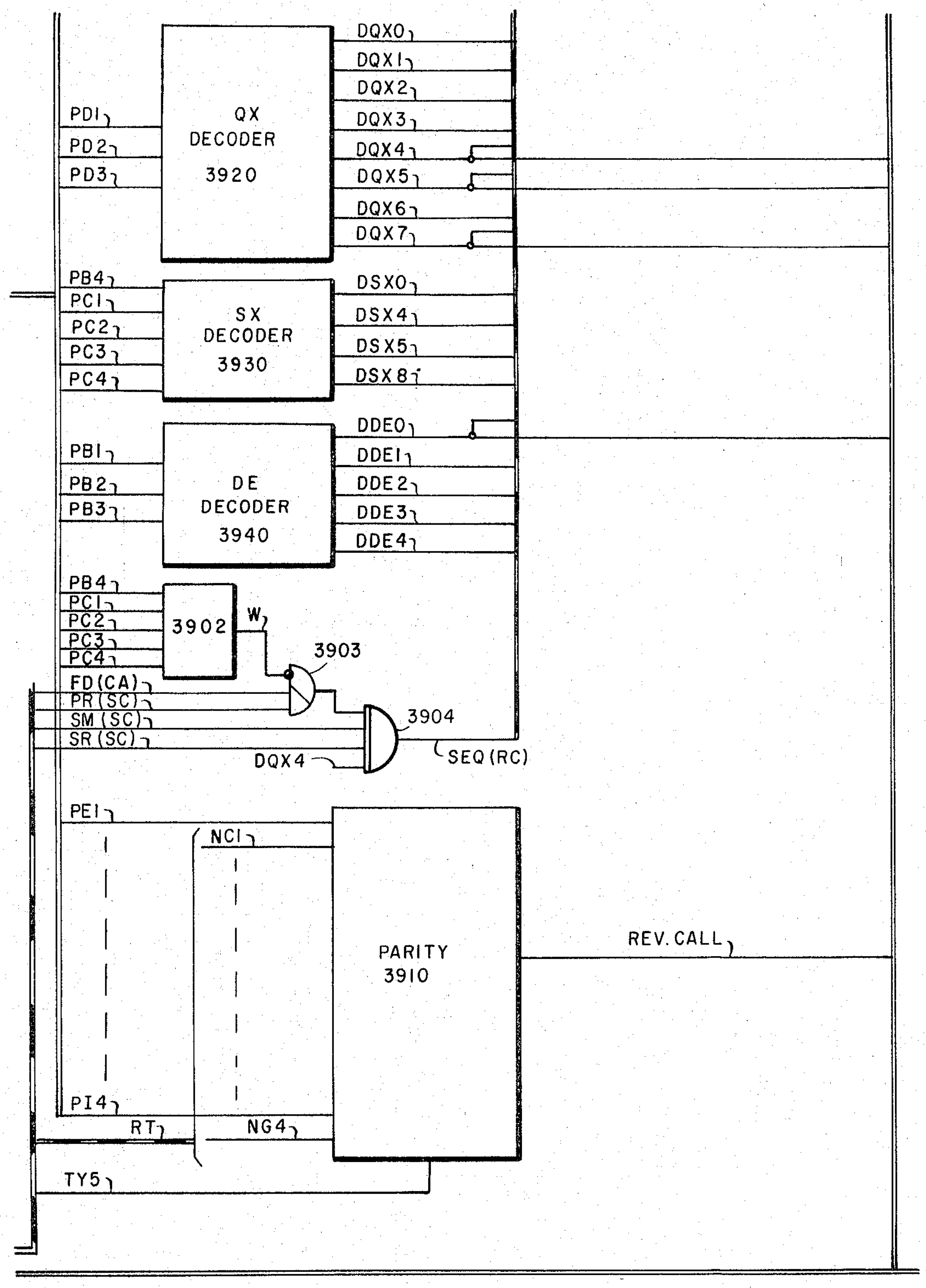

Decoder logic in FIGS. 38 and 39 converts information from binary to decimal for various groups of bits from the read buffer flip-flops. The reverting-call parity circuit 3910 performs a reverting-call test. The comparison is made between the line number identification of the calling subscriber which is stored in the memory row 5 by viewing leads PE1–PI4, and the translated switching information which are returned from a directory number translation by viewing leads NC1–NG4. Should the reverting-call coincidence occur, the parity circuit generates signal REV. CALL to inform the register controller to modify the translated switching instructions and part of the sender instructions so that the call will route to the reverting-call trunk.

The equations of logic 3902 and of gates 3903 and 3904 is as follows:

$$W = S9+S10+S11+S12+S13+S14+S15+S17+S18+S19+S21+S22+S23$$

$$SEQ = DQX4\ SM\ SR\ (FD+\overline{FD}\ \overline{W}) + DQX4\ SM\ SR\ \overline{FD}\ W\ PR = DQX4\ SM\ SR\ (FD+\overline{W}+PR)$$

C(1)(i) *Carry buffer.*—Referring now to FIGS. 40–45, the carry buffer provides a means for transferring information from one memory row to another memory row, and for entering the multi-frequency digits into the ferrite-core memory array. The carry buffer comprises the carry flip-flops with associated input logic, the decoder logic 4410–12, the long-count counters LC1 and LC2, and the multi-frequency digit entry flip-flops MF1, 2, 4, and 8.

The fact that the registers each comprise several memory rows leads to the problem of passing information between memory rows of the same register. Information that a translation is possible is determined by the type and number of digits in storage which exists in memory row four. This information must be passed to memory row 1 during TY7, which initiates the action required for translation. The same problem is encountered when information must be transferred from one memory row to another memory row. The method of solving this problem is the use of a buffer storage, the carry flip-flops. Information contained in row 1 of the memory may be placed in the carry flip-flops during the first sub-time slot of a register, thus making that information available to any other row. Since the first memory row is enabled twice, during the first sub-time slot and the last sub-time slot, any of the other rows in the register may also pass information to row 1 by means of the carry register.

The carry buffer consists of 37 bits of buffer storage, comprising flip-flops AC, CB, CE, CT, CX1, CX2, DD, DR, DS, EP, FD, FM, FP, FT, HE, HS, KE, KM, LX1, LX2, PP, RA, RC, RP, RQ, RT, ST, TA, TB, TD, TL1, TL2, TL4, TL8, TS, TR, and TN. The D.C. settings of these flip-flops are located in the carry control logic shown in FIGS. 40–41.

Flip-flop AC is a command to advance the count of the dial digit storage, the accumulator, of row 3 or row 4. The information to add is obtained in row 1 from analysis of the pulse highway. Flip-flop CB indicates that a coin-box call is in progress. Flip-flop CE indicates that the register should be cleared, which means that the stored information in a register must be erased. This information is placed in the carry register during the registers first sub-time slot whenever the register is returning to the idle condition from the disconnect states. It is also used to erase any false information that may arise in any row whenever the register is in the idle sequence state.

Flip-flop CT indicates that a code translation is in progress. Flip-flops CX1–2 provide sequence control for the transfer of dial digits from row 4 to row 3. Flip-flop DD indicates that row 3 or row 4 contain at least one dialed digit. Flip-flop DR is the disconnect register indication. Flip-flop DS is the disconnect sender indication. Flip-flop ED is the early outpulsing of dial digits indication. Flip-flop FD indicates that dialing is finished. Flip-flop FM is the multi-frequency interdigital pause indication. Flip-flop FP is an indication of an interdigital pause during dialing, stating that the count of a dialed digit in rows 3 and 4 is complete. The information of the interdigital pause is obtained in row 1 from the analysis of the pulse highway.

Flip-flop FT signifies a fast time-out. This function being true reduces the normal 20 second time-out period to 4 seconds. If the subscriber has dialed an operator, the normal time-out is reduced to 4 seconds. The other case, where a fast time-out is required, is in timing of the downcheck lead from a local register junctor.

Flip-flop HE indicates that time-out translation of one digit is in progress. Flip-flop HS indicates that the sender's instructions are in storage. Flip-flop KE indicates that this register is using the register transceiver. Flip-flop KM indicates that this register is using the register receiver. Flip-flops LX1–2 comprise the internal translation control. Flip-flop PP is the subscriber's line loop indicator. Flip-flop RA indicates that this register is connected to the control console. Flip-flop RC indicates that a time-out translation of two digits is in progress. Flip-flop RQ indicates a request for the sender. Flip-flop RT is the request for the register transceiver. Flip-flop ST is the multi-frequency end-of-send recognition. Flip-flop TA is the initiate ticketing access indication. Flip-flop TB indicates that a call is in progress and will be ticketed. Flip-flop TD is the dial digit time-out indication. Flip-flops TL1, 2, and 4 comprise the three bits of the totals digits. Flip-flop TS indicates that trouble is present in the sender transmitter or the sender assigner. Flip-flop TR indicates that trouble is present in the register common control equipment. Flip-flop TN indicates that a 1A1 code has been dialed.

The majority of these flip-flops re-write the information into the memory as received from the read shift buffer. However, flip-flops AC, CE, DD, FP, FT, HE, HS, RC, RP, ST, TA, TD, and TN are added to store the necessary additional information which is provided by the carry buffer.

The decoder logic 4410–15 is that portion of logic which is used to convert information from binary to decimal for various groups of bits in the carry flip-flops. The long-count counter comprising flip-flops LC1–2 provide two slow rates of counting. They can provide the counter with repetition rates of 300 milliseconds on lead LC1 and 1.2 seconds on lead LLC2 for the mode of count as stored in position A of row 1 and row 2 in the memory. The D.C. settings of LC1 and LC2 are connected to astable-multivibrators AS1 and AS2 respectively, AS1 having a repetition rate of 300 milliseconds and AS2 having a repetition rate of 1.2 milliseconds.

The multi-frequency entry flip-flops MF1, 2, 4 and 8 provide a means for placing the multi-frequency digits into the ferrite core array when information is received in the multi-frequency receiver.

Figure 40:
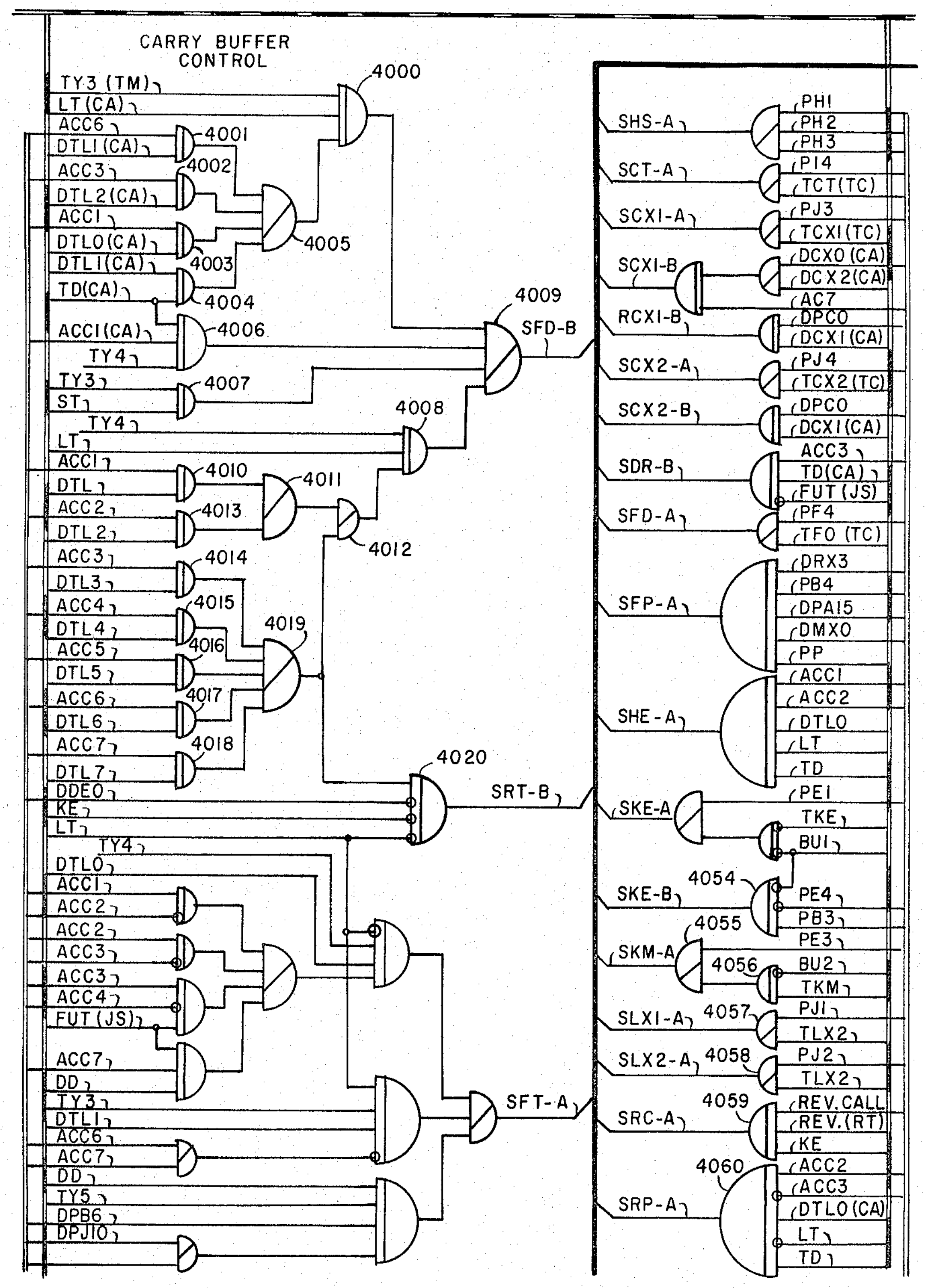
Figure 41:
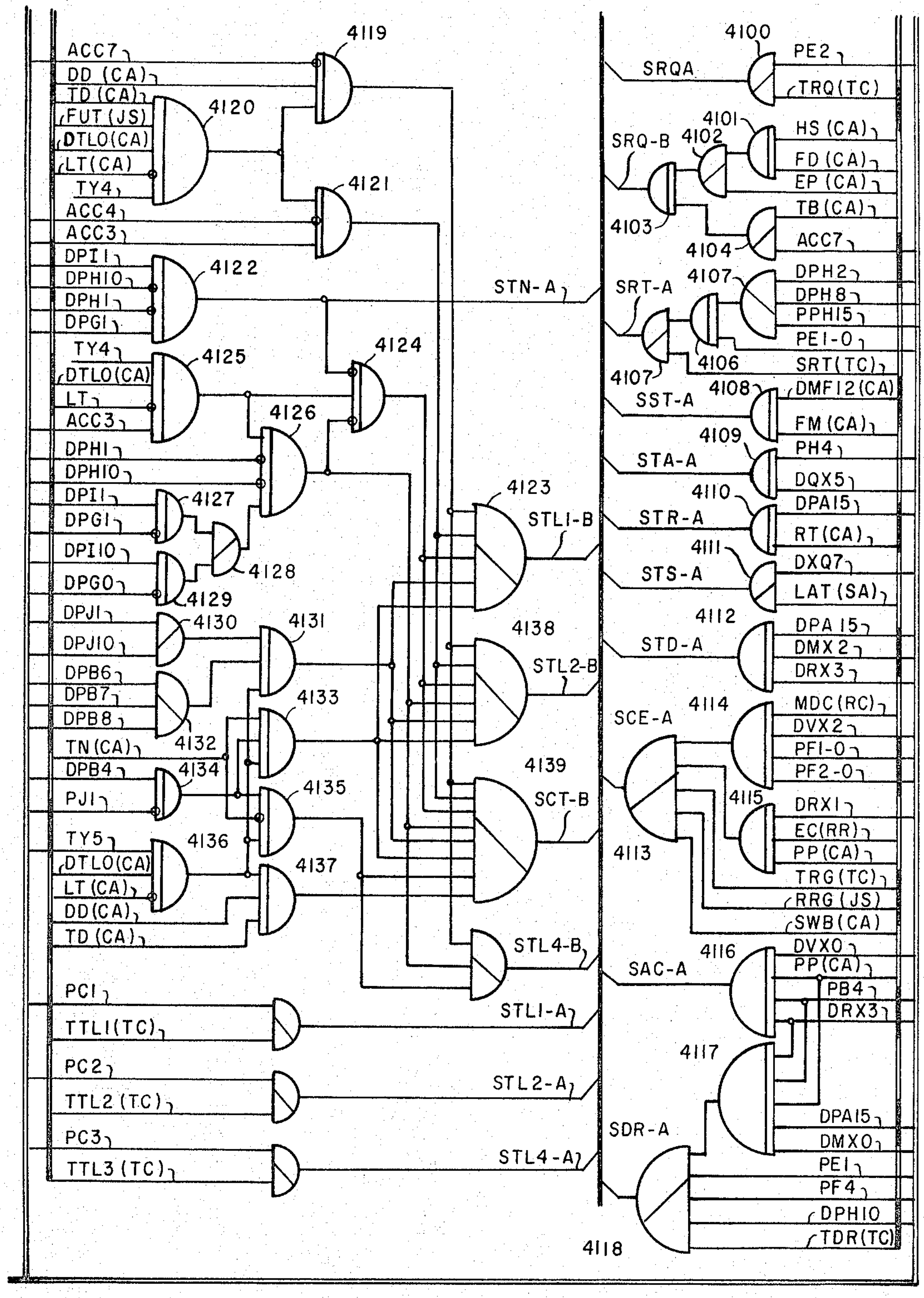

The carry-buffer control logic shown in FIGS. 40–41 provide the set and reset commands for the carry buffer flip-flops. These commands are generated as a result of the information received from the ferrite core memory and other portions of the register-sender. For example, logic gates 4000–19 generate the signal SFD–B which is the D.C. set command for flip-flop FFD at the B input option. The signal SFD–B is generated, in general, when the totals digit agrees with the accumulated dialed digits in row 3 or in row 4 of the memory; i.e. signal SFD–B is generated when the following becomes true:

TY4 ACC1 BTL1 LT

This condition enables gates 4008, 4009, 4010–12; which occurs when one dialed digit has been accumulated (ACC1) to correspond with a decoded totals digit of one (DTL1).

The remaining logic gates provide the D.C. set commands for the A and B options for the carry control flip-flops.

C(1)(j) *Register transceiver.*—Referring now to FIGS. 46–53, the register transceiver provides a means for communicating between the register sender and the translator or the ticketer. Serial transfer is used employing di-phase transmission techniques. Information transferred between this component and the read shift buffer or the register controller is accomplished in a parallel manner. The register transceiver operates on a hold til finished basis. Seizure of this circuit depends upon control signals developed in the register controller.

Figure 47:
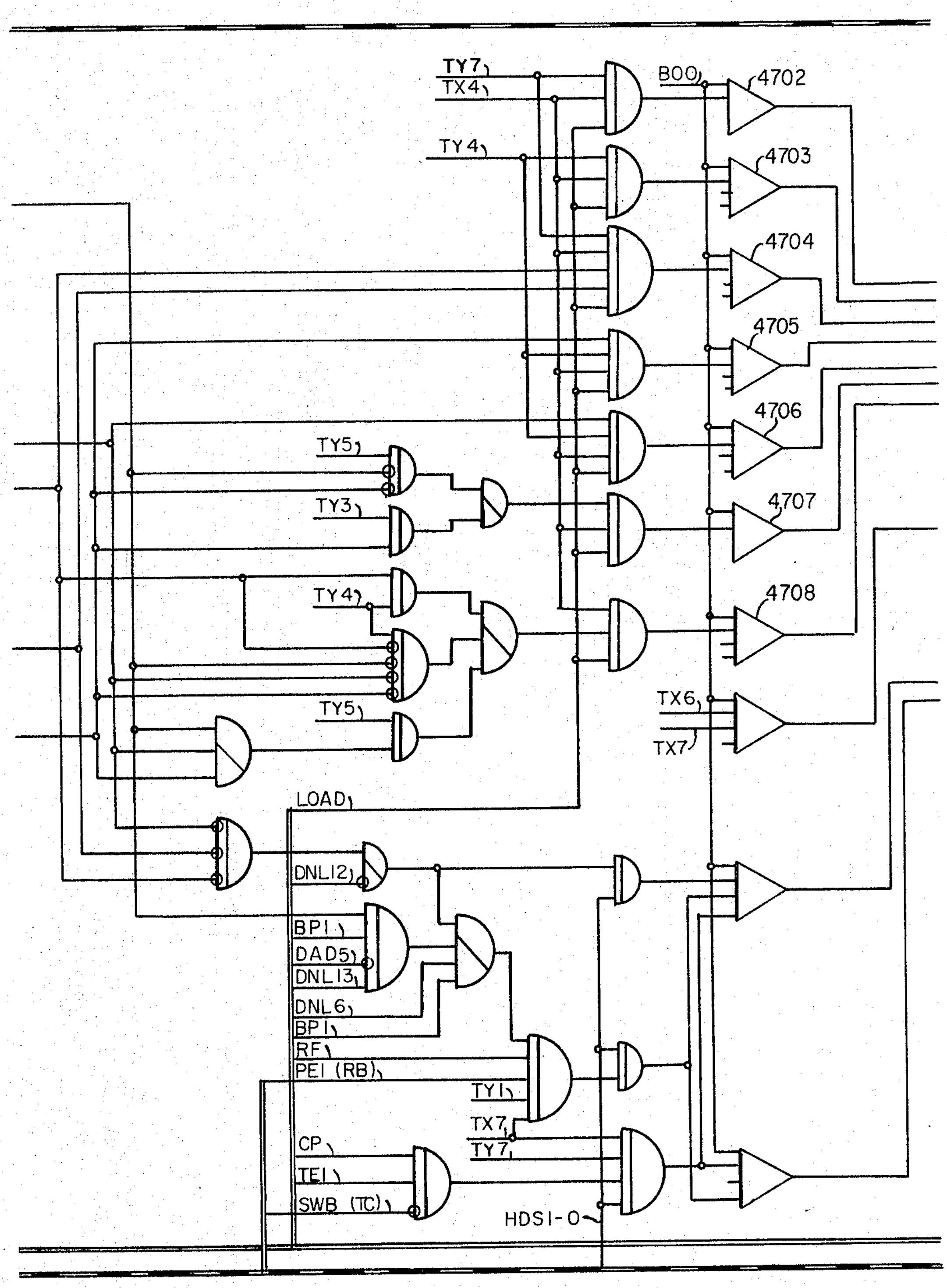
Figure 48:
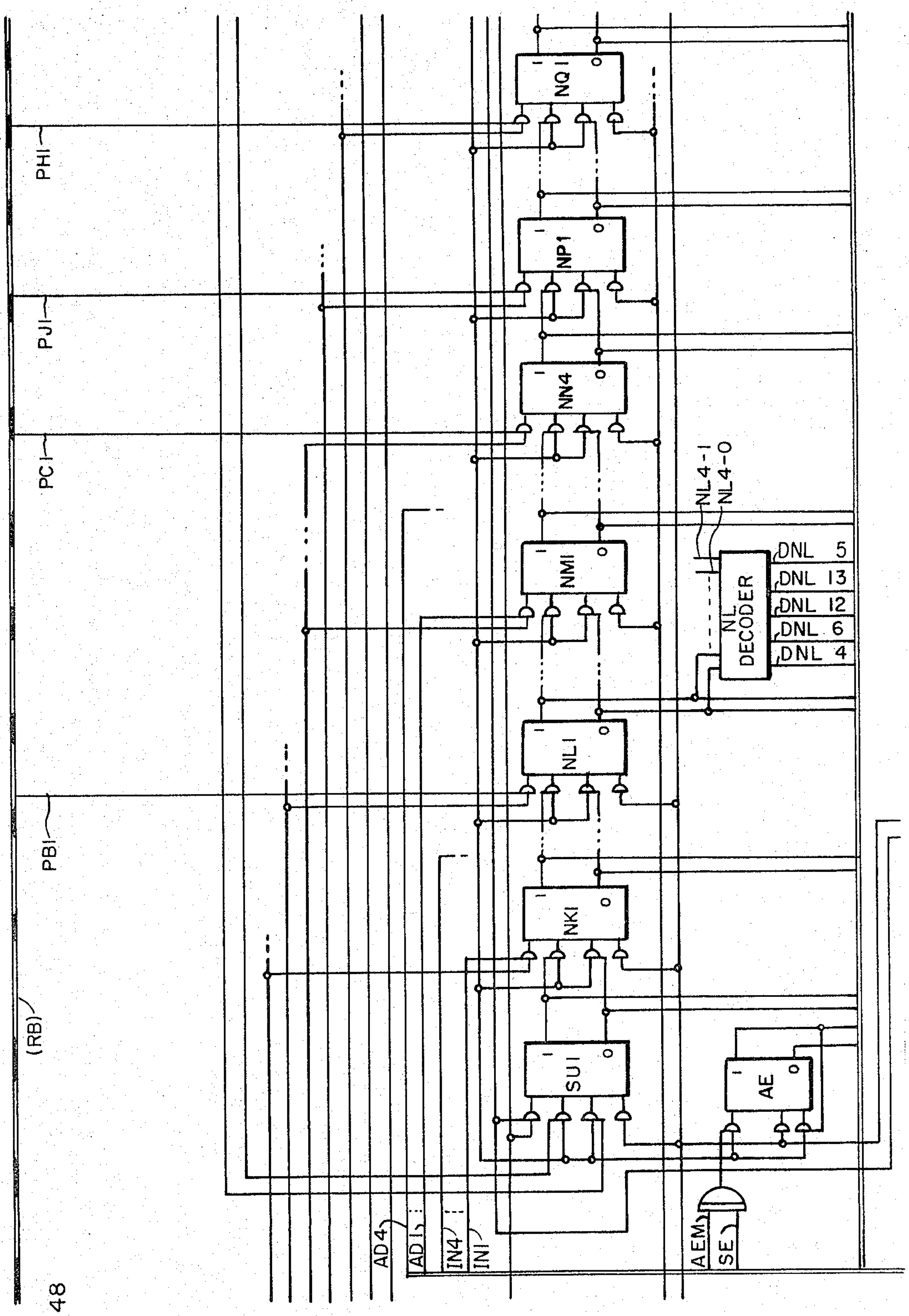
Figure 49:
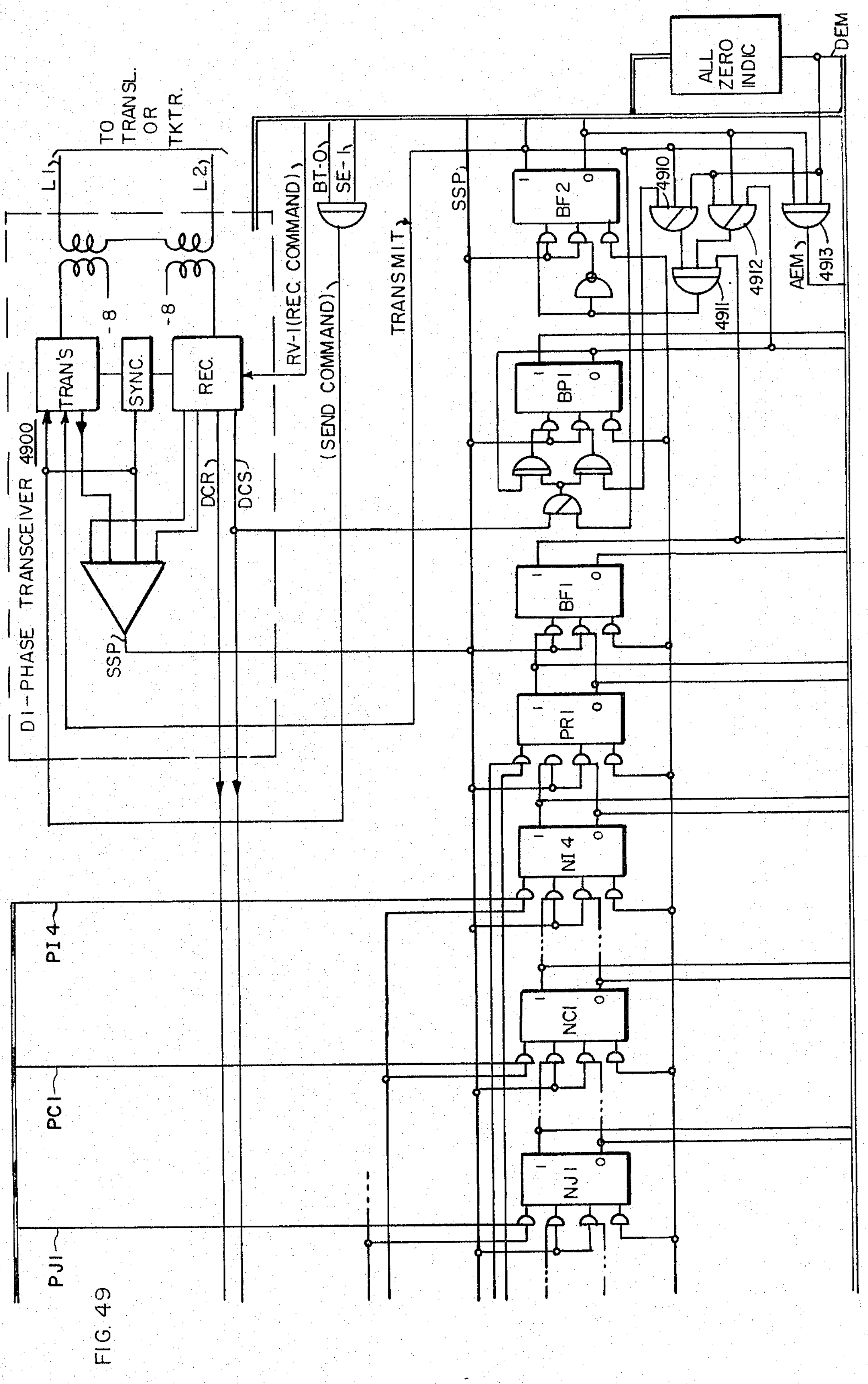
Figure 50:
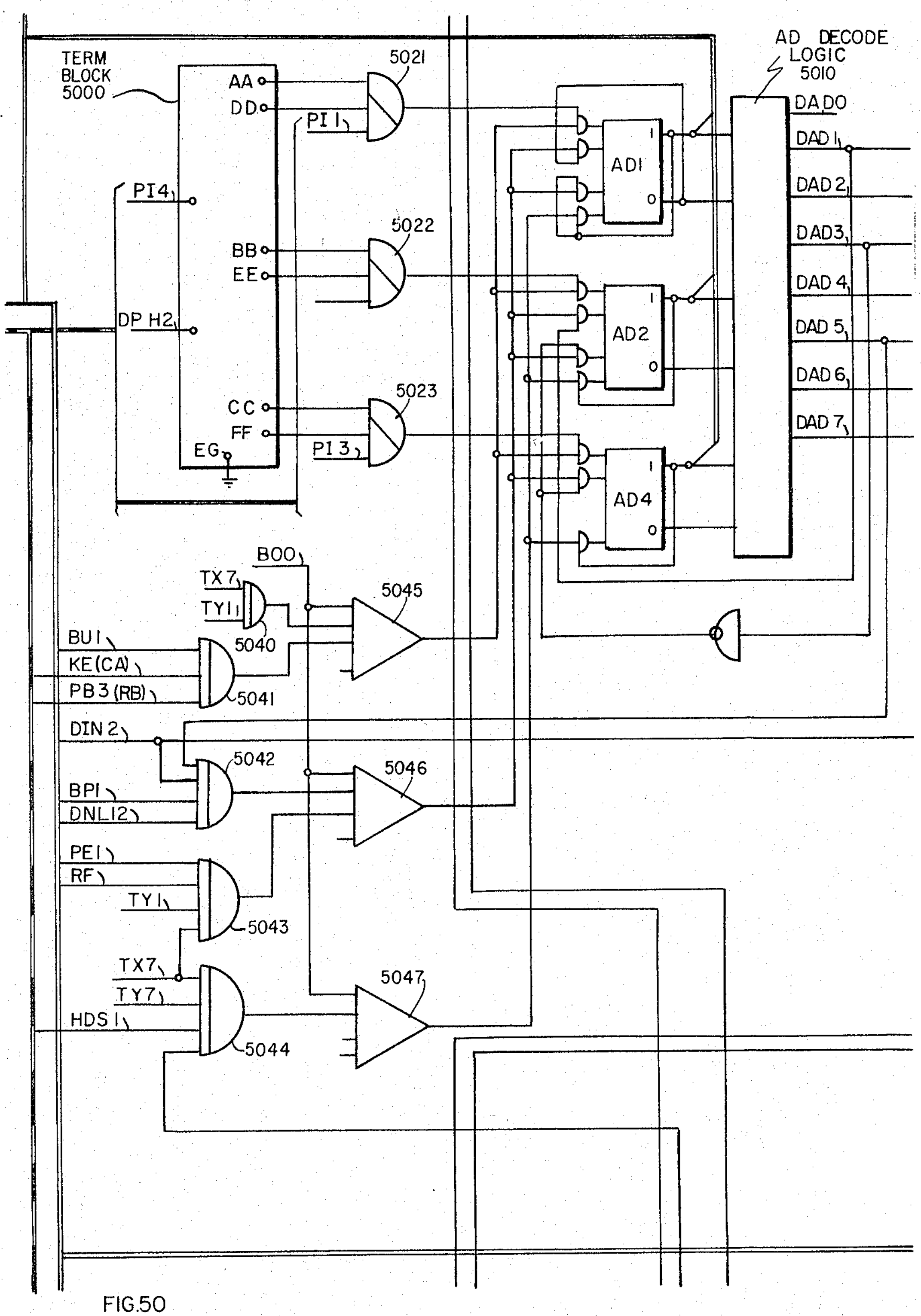
Figure 51:
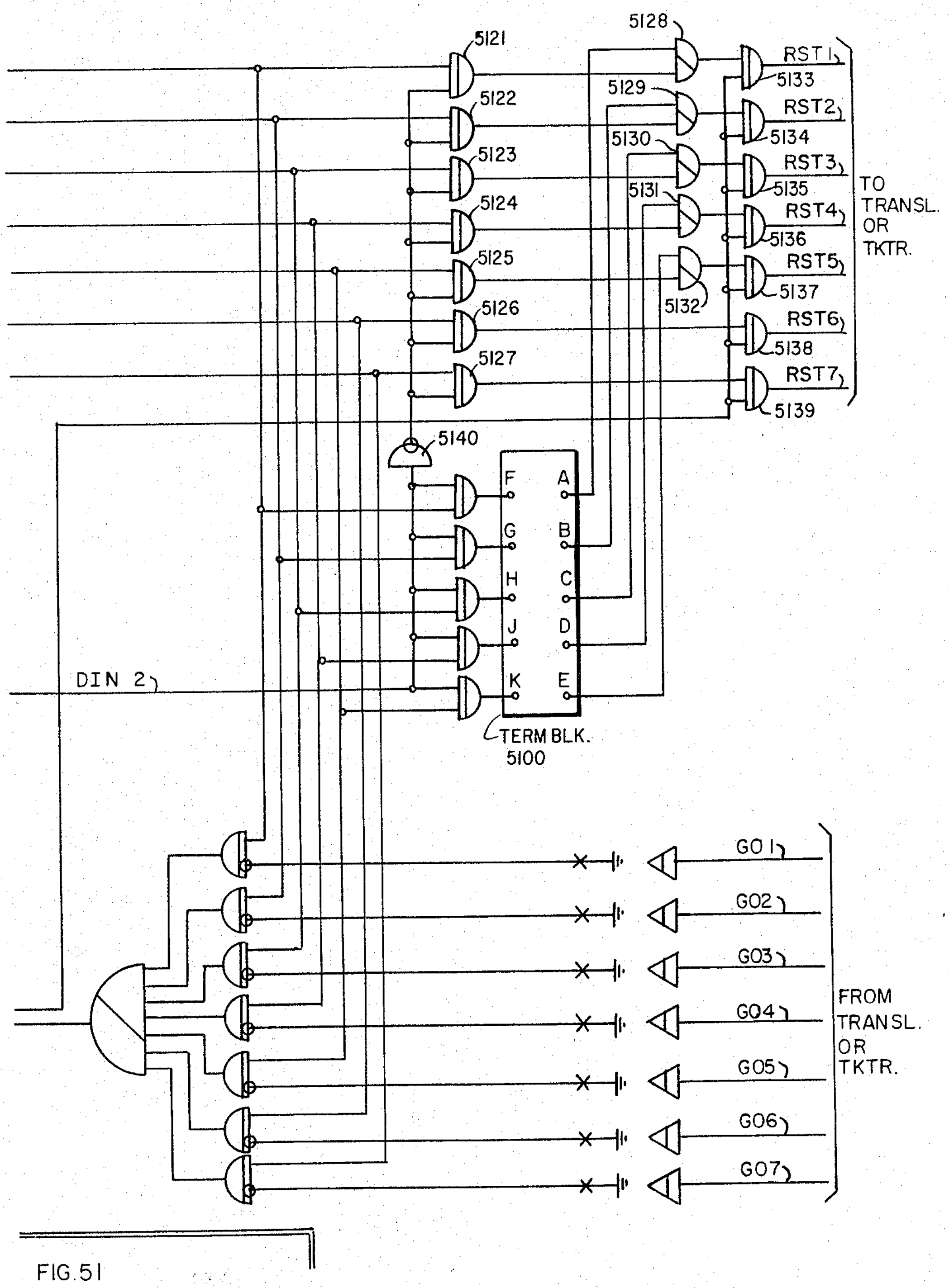
Figure 52:
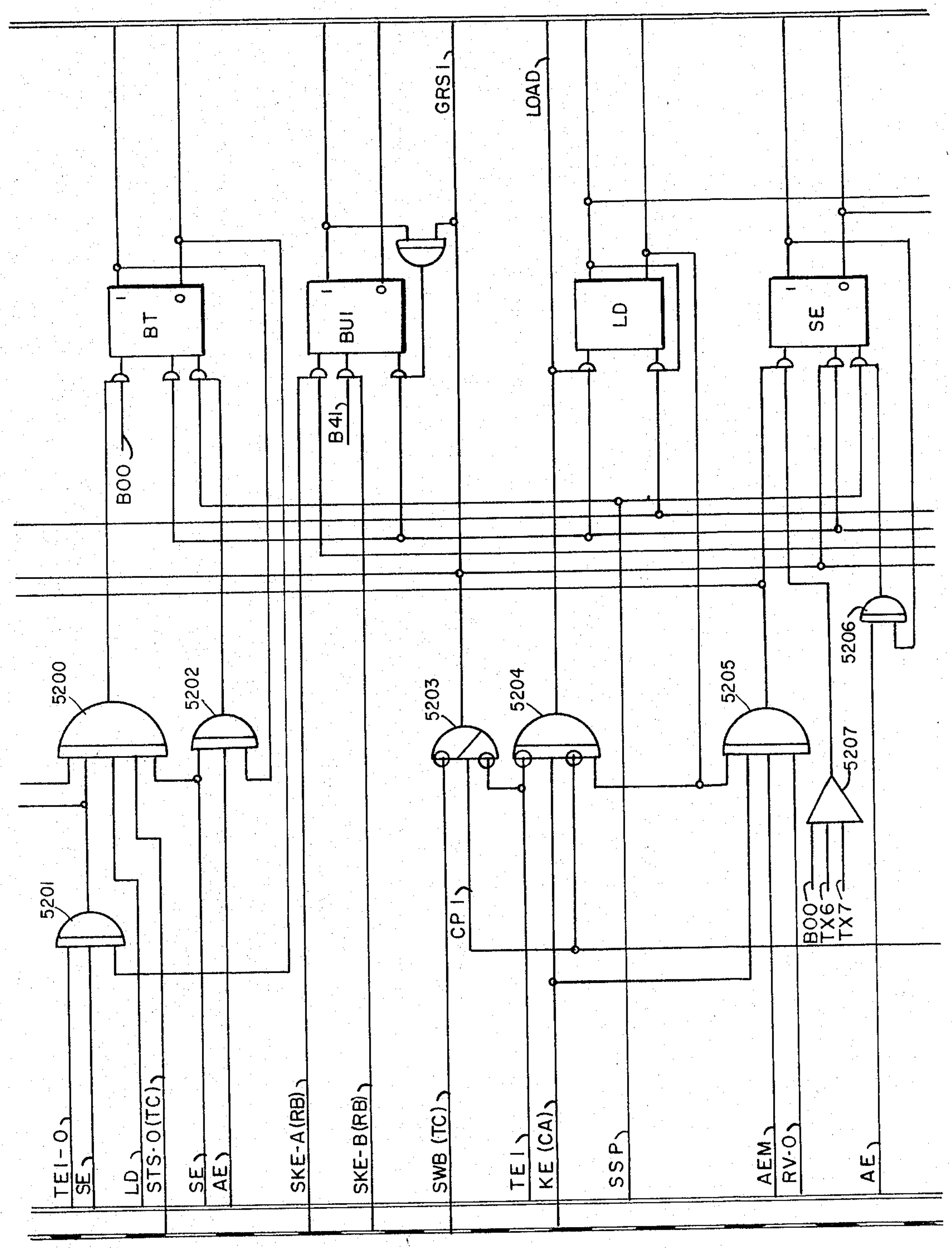
Figure 53:
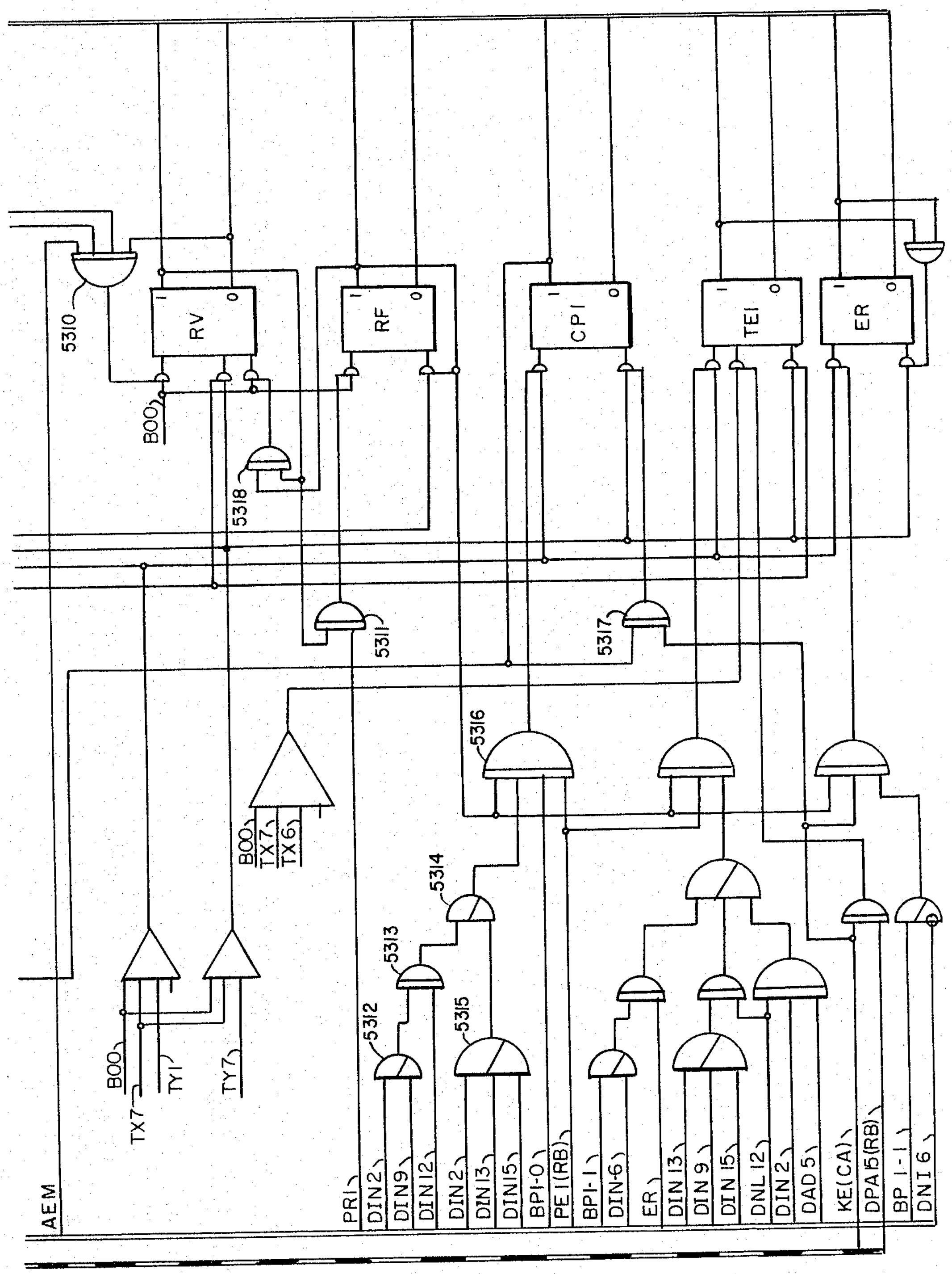

The register transceiver comprises a shift register and diphase sender-receiver 4900, as shown in FIGS. 48 and 49, control flip-flops as shown in FIGS. 52–53, address flip-flops AD1–3, and instruction flip-flops IN1, 2, 4, and 8. The information from the memory is transmitted to the control input and output logic as shown in FIG. 47 for shift register to load the shift register in a parallel manner. This information is then transferred from the shift-register flip-flops and transmitted in serial form to the translator for translation of the called party's number. Both code translation and directory number translation may be performed. The translated information is received by diphase receiver and serially shifted into the same shift register. This information is then read out of the shift register in a parallel manner for presentation to the register controller.

The register transceiver also takes the line number identification from the memory and transmits it to the translator in the same manner as described above for a line number translation.

The register transceiver also transmits the necessary ticketer information to the ticketer. This information includes the area code, the office number, the station number of the called subscriber, and the directory number of the calling subscriber.

There are four processing digits which are also used in communication between the register-sender group and the translator. They are as follows: AD drum address digit, DE delete digit, IN instruction digit, and TL totals digit. The following table describes the various values for the processing digits:

*Delete digit—"DE"*

SYM DIG BINARY DESCRIPTION

DE=
1=100=Delete first dialed digit.
2=010=Delete first two dialed digits.
3=110=Delete first three dialed digits.
4=001=Delete first four dialed digits.
5=101=Perform reverting call check.
6=011=Improper parity received by trans.
7=111=Unassigned.

The fourth bit of the delete digit is called the "EP" bit and is used to indicate if early-out-pulsing is required. (1=required, 0=not required.)

*Address digit—"AD"*

AD=
1=100=Address of translator #1
2=010=Address of translator #2
3=110=Address of translator #3
4=001=Address of translator #4
5=101=Address of translator #5
6=011=Address of translator #6
7=111=Address of translator #7

The fourth bit of the address digit is called the "CT" bit and indicates if code translation is required. (1=required, 0=not required).

*Instruction digit—"IN"*

IN=
1=1000=Station to station send paid call.
2=0100=Line number translation.
3=1100="PPCS" call.
4=0010=Directory number translation.
5=1010=Call transfer.
6=0110=Unassigned.
7=1110=Drum write.
8=0001=Time-out translation.
9=1001=Ticketing 3rd access.
10=0101=Register disconnect.
11=1101=Busy verification call.
12=0011=Conference call.
13=1011=Ticketing 2nd access.
14=0111=Directory number trans. and "PPCS" call.
15=1111=Ticketing 1st access.

*Totals digit—"TL"*

TL=
1=1000=One dialed digit sent to translator.
2=0100=Two dialed digits sent to translator.
3=1100=Wait for and send three dialed digits.
4=0010=Wait for and send four dialed digits.
5=1010=Wait for and send five dialed digits.
6=0110=Wait for and send six dialed digits.
7=1110=Wait for and send seven dialed digits.
8=0001=Eight digit called number.
9=1001=Fast time out to finished dialing.
10=0101=Ten digit called number.
11=1101=Three digit called number.
12=0011=Four digit called number.
13=1011=Five digit called number.
14=0111=Six digit called number.
15=1111=Seven digit called number.

Figure 46:
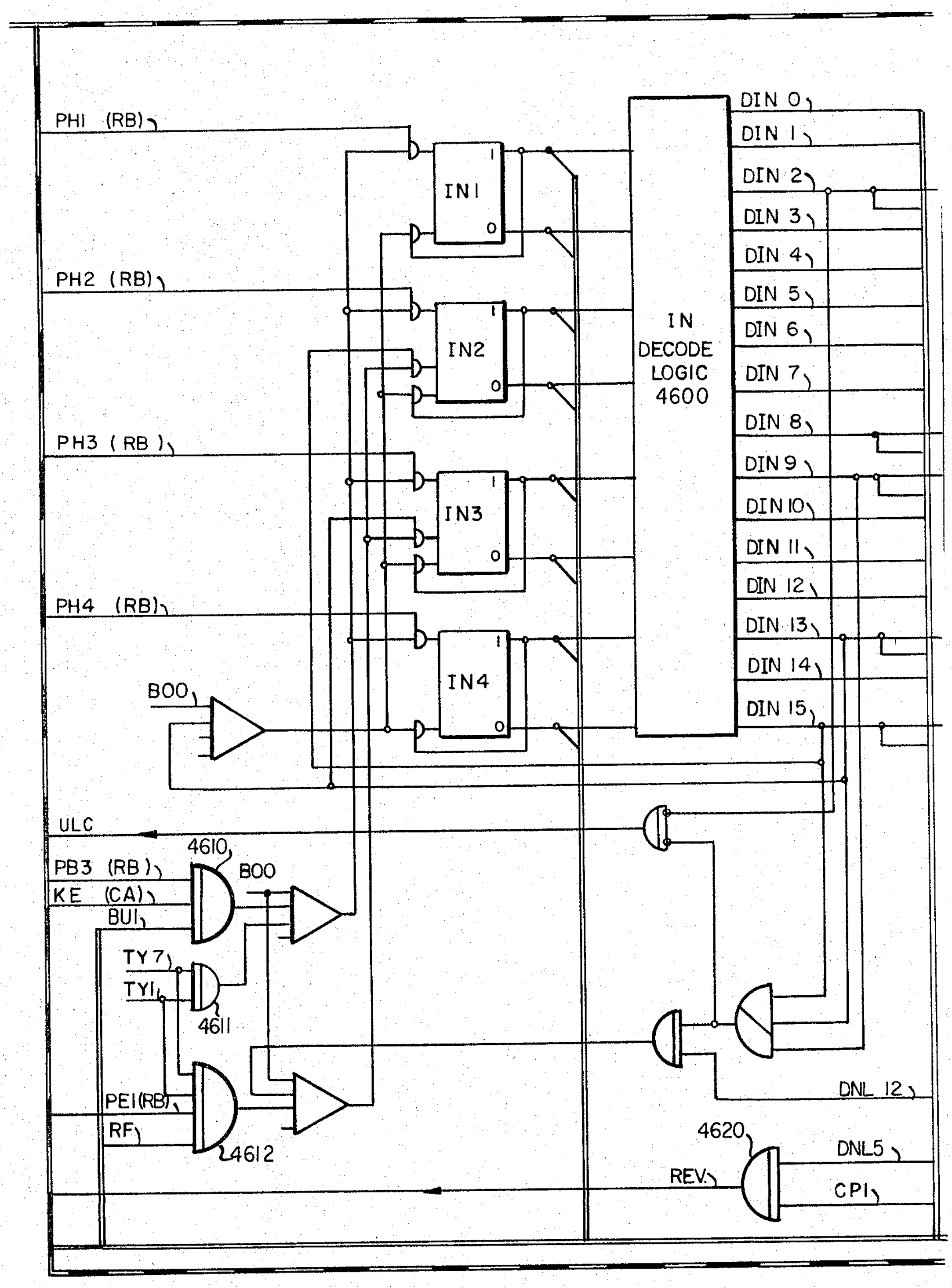

Flip-flops IN1, 2, 4, and 8 as shown in FIG. 46, are four binary weighted flip-flops used to store the instruction digit from the memory, which is one of the four processing digits for the translator. Flip-flops AD1, 2, and 4 are three binary weighted flip-flops used to store the address digit of the processing digits for the translator for which service is requested. Decode logic 4600 decodes the binary information stored in the AD flip-flops into a one-out-of-fifteen code.

There are seven control flip-flops: BU1, CP1, LD, RF, RV, SE, and ST. Flip-flop BU1 indicates that the register transceiver is busy. Flip-flop CP1 indicates that the translator transceiver has completed its task. Flip-flop LD indicates that the shift register has been loaded. Flip-flop RF indicates that the receive operation is finished. Flip-flop RV indicates that the register transceiver is in the receive mode. Flip-flop SE indicates that the register transceiver is in the send mode. Finally, the flip-flop ST indicates that serial transmission may now be sent.

The AD flip-flops receive the drum address from the register storage via terminal block 5000. The drum address is decoded from binary to a one-out-of-seven code via the decoder logic 5010 to provide the decoded signals DAD1–7 to signal the translator or ticketer via transmission gates 5121–39 to leads RTS1–7. It can be noted that the drum address is diverted through terminal block 5100 when DIN2 becomes true which inhibits AND gates 5121–27 via inverter gate 5140. DIN2 designates that a line number translation is necessary and since the drum location is not known for the equipment numbers the drums are sequentially accessed via a grading plan for the particular office in order to provide equal use of the drums. The initial translator address for line number translation is dependent on the number of translators in a given office. Therefore, the terminal block 5000 has been provided and is wired as shown in the following table:

| Number of Translators Furnished | Terminals | |
|---|---|---|
| | DPH2 | EG |
| 1 | AA & CC | BB |
| 2 | CC | AA & BB |
| 3 | AA & BB | CC |
| 4 | BB | AA & CC |
| 5 | AA | BB & CC |

Furthermore the translator address for code translation is dependent on the location of the code translator is a given set of translators. Therefore PI4 is wired as shown in the following table:

| Location of Code Translator | Terminals | |
|---|---|---|
| | PI4 | EG |
| 1 | DD | EE & FF |
| 2 | EE | DD & FF |
| 3 | DD & EE | FF |
| 4 | FF | DD & EE |
| 5 | DD & FF | EE |

The first translator that a given register-sender group accesses for line number translation is dependent on the number of translators furnished in a given office, and also according to the desired grading plan. The terminal block 5100 has been provided for this purpose and is wired as shown in the following table:

| Number of Translators furnished | Register-Sender Group | Terminals | | | | |
|---|---|---|---|---|---|---|
| | | F | G | H | J | K |
| 5 | 1, 6, 11, 16 | A | B | C | D | E |
| | 2, 7, 12, 17 | B | C | D | E | A |
| | 3, 8, 13, 18 | C | D | E | A | B |
| | 4, 9, 14, 19 | D | E | A | B | C |
| | 5, 10, 15, 20 | E | A | B | C | D |
| 4 | 1, 5, 9, 13, 17 | — | A | B | C | D |
| | 2, 6, 10, 14, 18 | — | B | C | D | A |
| | 3, 7, 11, 15, 19 | — | C | D | A | B |
| | 4, 8, 12, 16, 20 | — | D | A | B | C |
| 3 | 1, 4, 7, 10, 13, 16, 19 | — | — | A | B | C |
| | 2, 5, 8, 11, 14, 17, 20 | — | — | B | C | A |
| | 3, 6, 9, 12, 15, 18 | — | — | C | A | B |
| 2 | 1, 3, 5, 7, 9, 11, 13, 15, 17, 19 | — | — | — | A | B |
| | 2, 4, 6, 8, 10, 12, 14, 16, 18, 20 | — | — | — | B | A |
| 1 | 1 thru 20 | — | — | — | — | A |

When the register transceiver is called upon to transmit information from the register sender, flip-flop BU1 is set in response to logic in the read-shift buffer. Thereupon the address AD flip-flops are set in response to signals from the read-shift buffer, thereby indicating which drum will receive the information. Simultaneously, the insruction IN flip-flops are set to indicate the method by which the shift register will be loaded.

Once this preliminary information is stored, flip-flop SE is set during the coincidence of sub-time slot TY7 and the control pulse TX6. During the same sub-time slot flip-flop LD is set during control pulse TX7, which indicates that the shift register is loaded. When one of the GO1–7 commands is received from a translator or a ticketer to indicate to the register transceiver that information can now be sent, this signal sets the ST flip-flop, thereby causing diphase transmission to the appropriate translator or ticketer. The shift register serially transfers the information to the diphase sender, which in turn transfers the information to the translator or ticketer in high-speed serial binary form.

When the shift register has transferred all of its information, the signal AEM from AND gate 4913 indicates that the shift register is empty and causes flip-flop SE to reset. Flip-flop RV is simultaneously set to indicate that the register transceiver is now in the receive mode. When information is ready to be transmitted to the register transceiver, the shift register receives the information from the diphase receiver in a serial manner. When all of the information is finally received and stored in the shift register, flip-flop PR1 of the shift register is set. Thereupon AND gate 5311 causes flip-flop RF to be set, indicating that all of the information is received.

When the time slot of the particular register which is being served by the register transceiver next appears, flip-flop CP1 is set in response to the KE bit of information stored in row 1, bit 1 of position E, which indicates that the register is the one which is being served by the register transceiver. Thereupon the shift register is unloaded in a parallel manner and transmitted to the register controller for storage in the ferrite-core memory.

C(1)(k) *Sender assigner.*—Referring now to FIG. 55, the sender assigner provides the selection control to establish a connection from a register junctor to an idle sender. It couples any one of 24 register junctors to any one of the 10 senders.

The sender assigner comprises a ten-step counter, which includes flip-flops AS1, 2, 4, and 8; and a 24-step counter which includes flip-flops RG1–24. This counter sequentially scans the idle test leads SN1–IDL to SN10–IDL from the ten associated senders. The scanning process is continued as long as the sender assigner is not busy and an idle sender is not available. As soon as an idle sender is found, the counter stops. This count represents the identity of the idle sender that will be attached to the next register junctor requesting service.

This sender identity marks the corresponding sender pull lead (P1–10) of the register sender matrix with a battery indication by means of one of the ten reed relay drivers 5551–60 in response to AND gates 5561–70. The time slot of the register which is demanding the service similarly marks the register pull lead PR with a ground indication. Flip-flops RG1–24 cause the appropriate reed relay driver (5501–24) to connect ground to the corresponding register pull lead. Thus these two marks cause the appropriate reed relay in the register sender matrix to operate, thereby establishing a connection between the register junctor and the idle sender.

Once the connection has been established, flip-flop BY is reset, thereby allowing the ten-step counter to start the scanning process again. Once a sender has been assigned to the register, the idle test lead of the sender should become busy within 20 milliseconds. Otherwise, the sender assigner will signal the register controller that trouble has occurred in the register sender matrix or in the sender, and a disconnect cycle starts. If the sender idle test lead was marked busy within the allotted 20 milliseconds, there is no indication of trouble and the release of the sender assigner follows. However, before the sender assigner is released, the identity of the attached sender is forwarded to the register controller for storage.

C(1)(l) *Register sender matrix.*—Referring now to FIG. 54, the register sender matrix provides a switching stage between the register junctors and the senders. The register sender matrix is a single stage matrix capable of connecting any one of twenty-four registers to any one of ten senders. The crosspoint reed relay has two windings, operate and hold, and six make contacts. The leads switched by the contacts are: two transmission loop leads, T and R, the crosspoint hold lead C, the group selection call signal lead EC, the end of send signalling lead ES, and the busy signalling lead BY. The PR lead controls the operation of the reed relays.

C(1)(m) *Sender controller.*—Referring now to FIGS. 56–61, the sender controller provides the gating control needed for proper transfer of information to the senders of the translated switching digits, dialed digits, and one of the following: LNI, TNI, or the directory number of the calling subscriber. It also controls the sending mode used to outpulse these digits. Gating control is also provided for the return of alternate route instructions and ticketer identity.

Flip-flops SS1, SS2, SS4, SS8 and SS16 comprise the sender sequence state buffer storage area which receives the sender sequence state information stored in the memory via the reed-shift buffer (PB4, PC1–4). The sender sequence states are decoded via decode logic 5600 from binary to a one-out-of-31 code to provide 31 sender sequence states S1–31. The states are modified by the sender sequence state logic 1930 in the register controller as shown in FIG. 19 and is advanced by means of signal SEQ which is generated by logic gates 3903–4 and logic 3902 in the register controller as shown in FIG. 39

The following tables explain the interaction of the sender states with information from the registers and translators:

| Snd. Seq. State | Mem. Pos. Affected | Snd. Seq. State | Mem. Pos. Affected | Snd. Seq. State | Mem. Pos. Affected |
|---|---|---|---|---|---|
| S1 | A,B | S11 | D3 | S21 | D11 |
| S2 | C,D | S12 | D4 | S22 | D12 |
| S3 | None | S13 | D5 | S23 | D13 |
| S4 | None | S14 | D6 | S24 | None |
| S5 | H,T | S15 | D7 | S25 | None |
| S6 | U,P | S16 | None | S26 | A1,A2 |
| S7 | Q | S17 | D8 | S27 | N1,N2 |
| S8 | None | S18 | D9 | S28 | N3,N4 |
| S9 | D1 | S19 | D10 | S29 | N5 |
| S10 | D2 | S20 | D20 | S30 | None |
| | | | | S31 | None |

Delete Digit

| DE | EP |
|---|---|
| 12=001 | 1=Successful LNT. |
| 13=101 | 1=Unsuccessful LNT. |

Skip digit—"SK"

| Sum. | | Dig. | | Binary | | From | To |
|---|---|---|---|---|---|---|---|
| SK | = | 1 | = | 1000 | = | S4 | S10 |
| | | 2 | = | 0100 | = | S4 | S6 |
| | | 3 | = | 1100 | = | S4 | S11 |
| | | 4 | = | 0010 | = | S4 | S12 |
| | | 5 | = | 1010 | = | S4 | S14 |
| | | 6 | = | 0110 | = | S4 | S9 |
| | | 7 | = | 1110 | = | S4 | S15 |
| | | 8 | = | 0001 | = | S4 | S16 |
| | | 9 | = | 1001 | = | S8 | S10 |
| | | 10 | = | 0101 | = | S5 | S8 |
| | | 11 | = | 1101 | = | S8 | S11 |
| | | 12 | = | 0011 | = | S8 | S12 |
| | | 13 | = | 1011 | = | S8 | S14 |
| | | 14 | = | 0111 | = | S8 | S16 |
| | | 15 | = | 1111 | = | S8 | S15 |
| | | 16 | = | 0000 | = | No Skip | |

End of send—"ES"

| Sym. | | Dig. | | Binary | | When End of Send Sig. is Sent |
|---|---|---|---|---|---|---|
| ES | = | 1 | = | 100 | = | S3 |
| | | 2 | = | 010 | = | S8 |
| | | 3 | = | 110 | = | S16 |
| | | 4 | = | 001 | = | S20 |
| | | 5 | = | 101 | = | S24 |
| | | 6 | = | 011 | = | S31 |
| | | 7 | = | 111 | = | S25 |

| Sum. | | Dig. | | Binary | Signal Sent In | | |
|---|---|---|---|---|---|---|---|
| | | | | | S4 | S8 | S25 |
| MD | = | 1 | = | 1000 | =None | MF | None |
| | | 2 | = | 0100 | =None | DP | None |
| | | 3 | = | 1100 | = | Unused | |
| | | 4 | = | 0010 | =None | None | MF |
| | | 5 | = | 1010 | =None | MF | DP |
| | | 6 | = | 0110 | =None | DP | MF |
| | | 7 | = | 1110 | =None | None | DP |
| | | 8 | = | 0001 | =DP | None | None |
| | | 9 | = | 1001 | =DP | MF | None |
| | | 10 | = | 0101 | =MF | DP | None |
| | | 11 | = | 1101 | =MF | None | None |
| | | 12 | = | 0011 | =DP | None | MF |
| | | 13 | = | 1011 | =DP | MF | DP |
| | | 14 | = | 0111 | =MF | DP | MF |
| | | 15 | = | 1111 | =MF | None | DP |
| | | 16 | = | 0000 | = | | |

If MD=10 or MD=14 is sent to register-sender groups by the translator then the "ST" digit must also be sent. This is a digit to be stored in the Q position of the register-sender group memory.

The sender sequence states are gated during TY3–6 via logic gates 5701–36 to provide time division multiplexing control for the switching digits to be out-pulsed from the register via the read-shift buffer. The information to be out-pulsed by the sender is gated to the senders via logic gates 5801–45 together with the aforementioned time division multiplexing signals to leads A1, A2, A4, A8, B1, B2, B4, and B8 which are connected to the A and B storage areas in each of the senders. Either one or two digits at a time are forwarded to the senders.

When the digits furnished are to be out-pulsed in a multi-frequency mode, the start (KP) and end of send (stop) digits are generated and also forwarded by means of OR gates 5805–8. The stop designation is equal to 12 in the B position and is generated via logic gates 6001–12. During TY2, LST becomes true which enables OR gates 5807–8, thereby generating a 12 which is an end of send indication. The start signal is generated by causing an 11 to be generated in the B position. Logic gates 6022–26 generate signal LMF which causes OR gates 5805–6, and 8 to be enabled and to thereby generate an 11. The generation of an 11 in position B signifies the KP digit which informs the sender to start sending.

Logic gates 6101–36 comprise the gating control for the alternate route instructions and ticketer identity which is transferred from the senders to the register storage area. Also, the AT signals are transferred from the control center (TC) to the register storage area. This information is stored in row 3 and row 4 of the memory by means of multiplexing gates 6125–36 in conjunction with subtime slot signals TY3 and TY4. The alternate route via leads MAR1, 2, 4, and 8 and the identity of the group selector via lead MGR1, 2, 4, and 8 is transferred from the sender to the register. Subsequently, via the same gates, the tens and units address for the group selector outlet are also transferred to the register. In order to distinguish between the first and second send, flip-flop HG is set which enables AND gates 6117–24 and inhibits AND gates 6109–16 in order to switch from leads MGR1, 2, 4 and 8, MAR1, 2, 4, and 8 to MTU1, 2, 4 and 8, wherein the tens digit are placed in row 3 of the memory by using TY3 and the units digit is placed in row 4 of the memory by using TY4.

Figure 56:
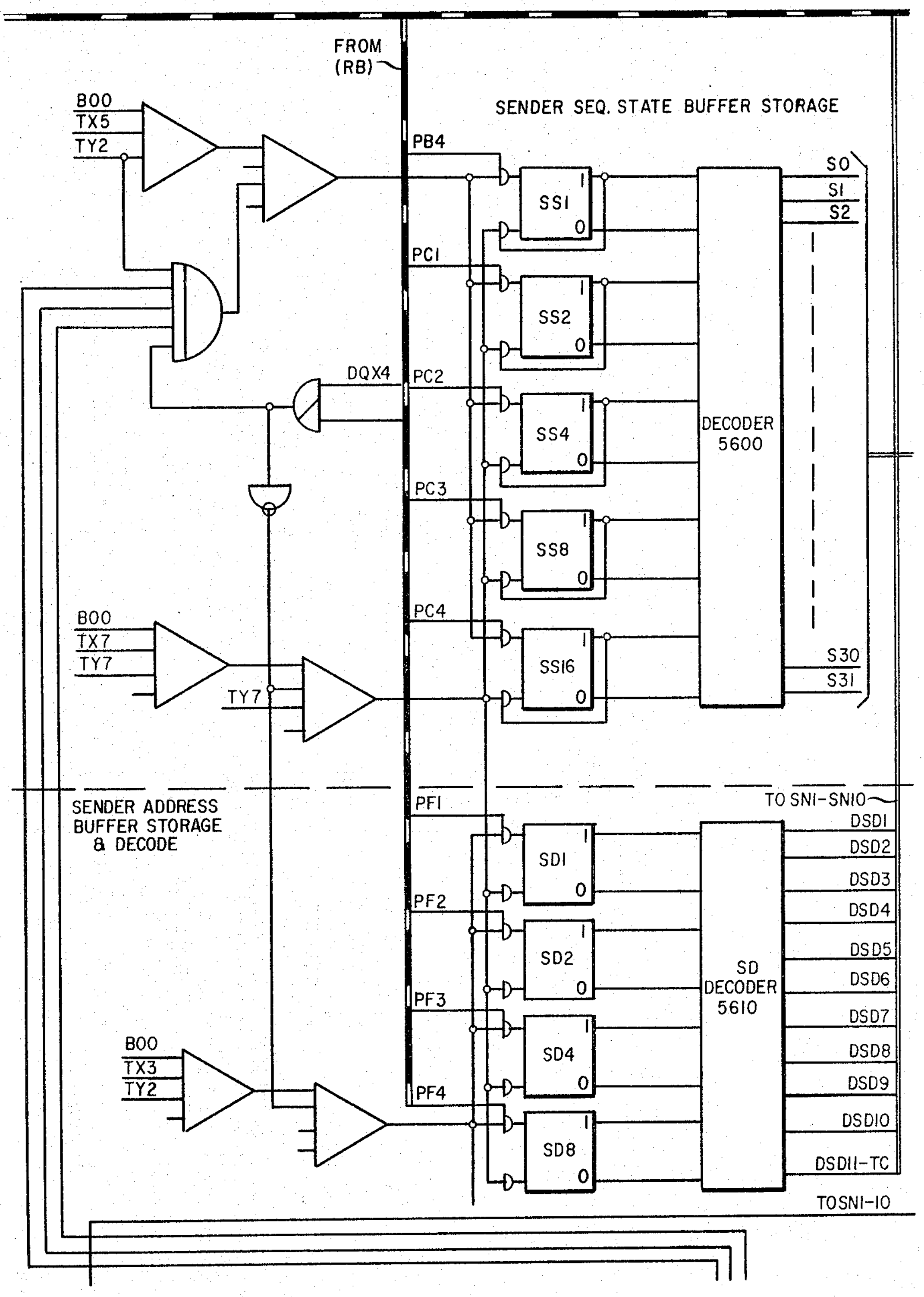
Figure 57:
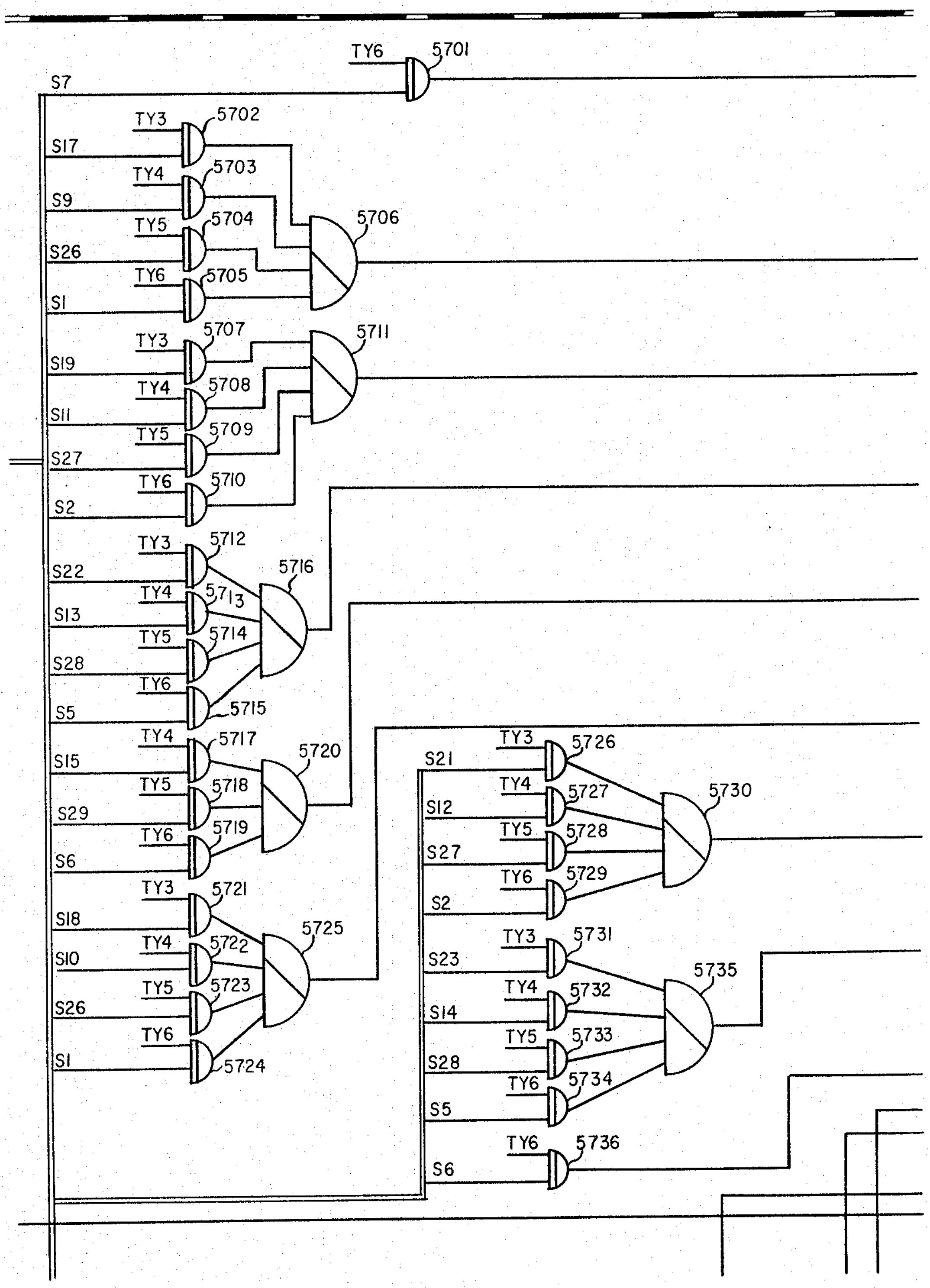
Figure 58:
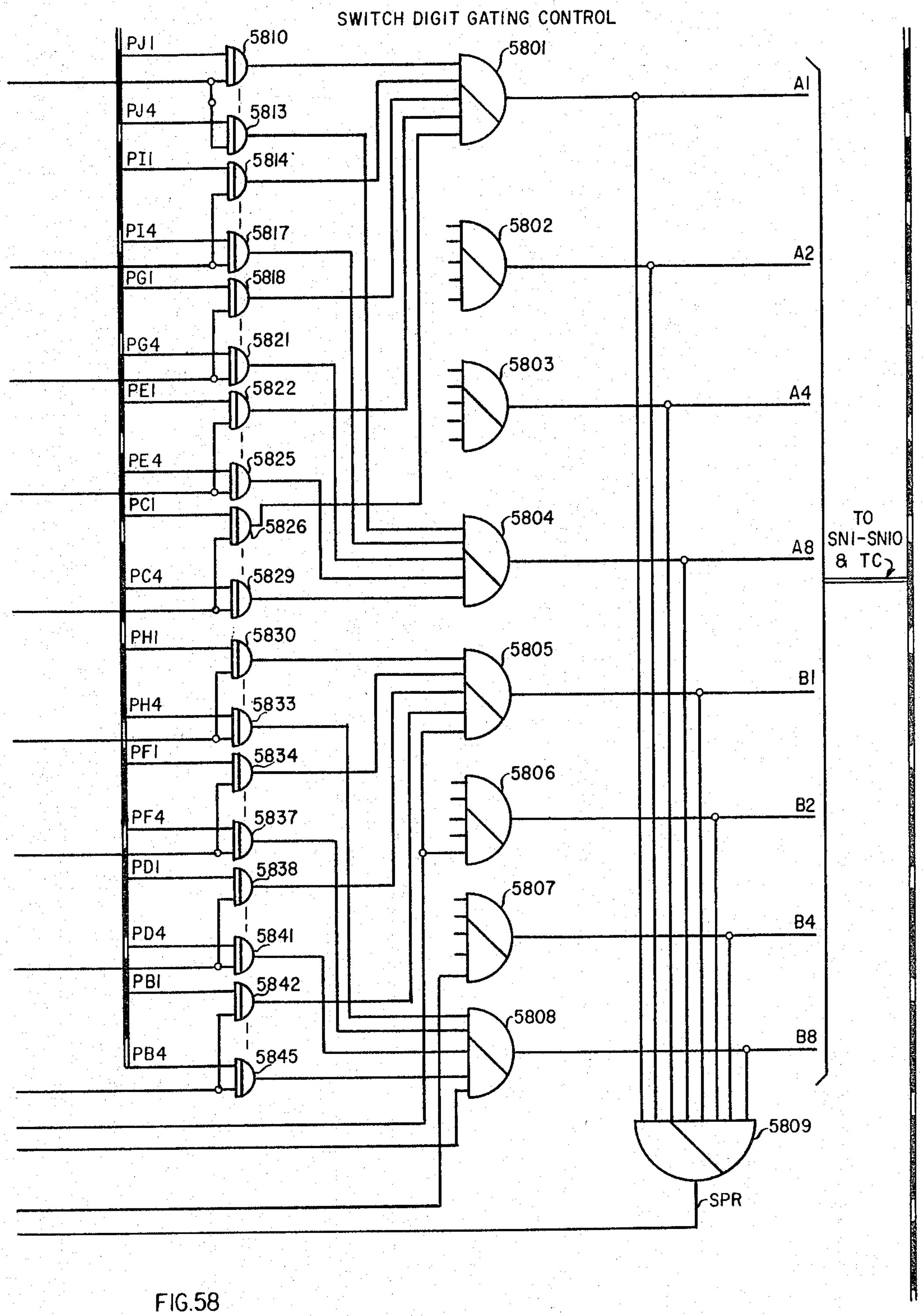
Figure 59:
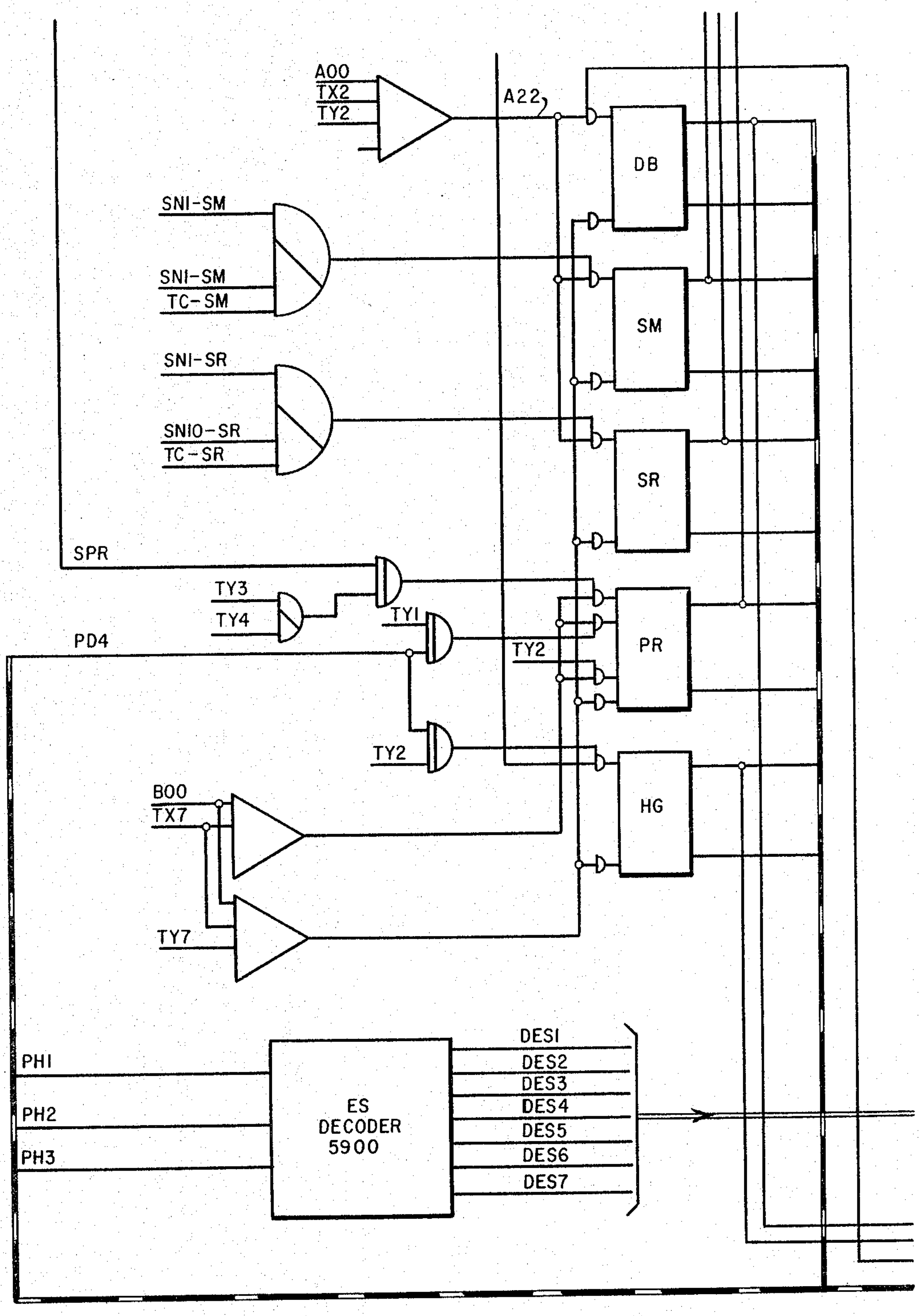

Flip-flops SD1, 2, 4, and 8 as shown on FIG. 56 comprise a binary weighted buffer storage area for the sender address information. The sender address is received from the read-shift buffer and is decoded by SD decoder 5610 to provide signals DSD1–11. These decoded signals are transferred to the respective senders to exchange information to and from the sender controller and the senders. DSD11 is transferred to the control center (TC).

Figure 60:
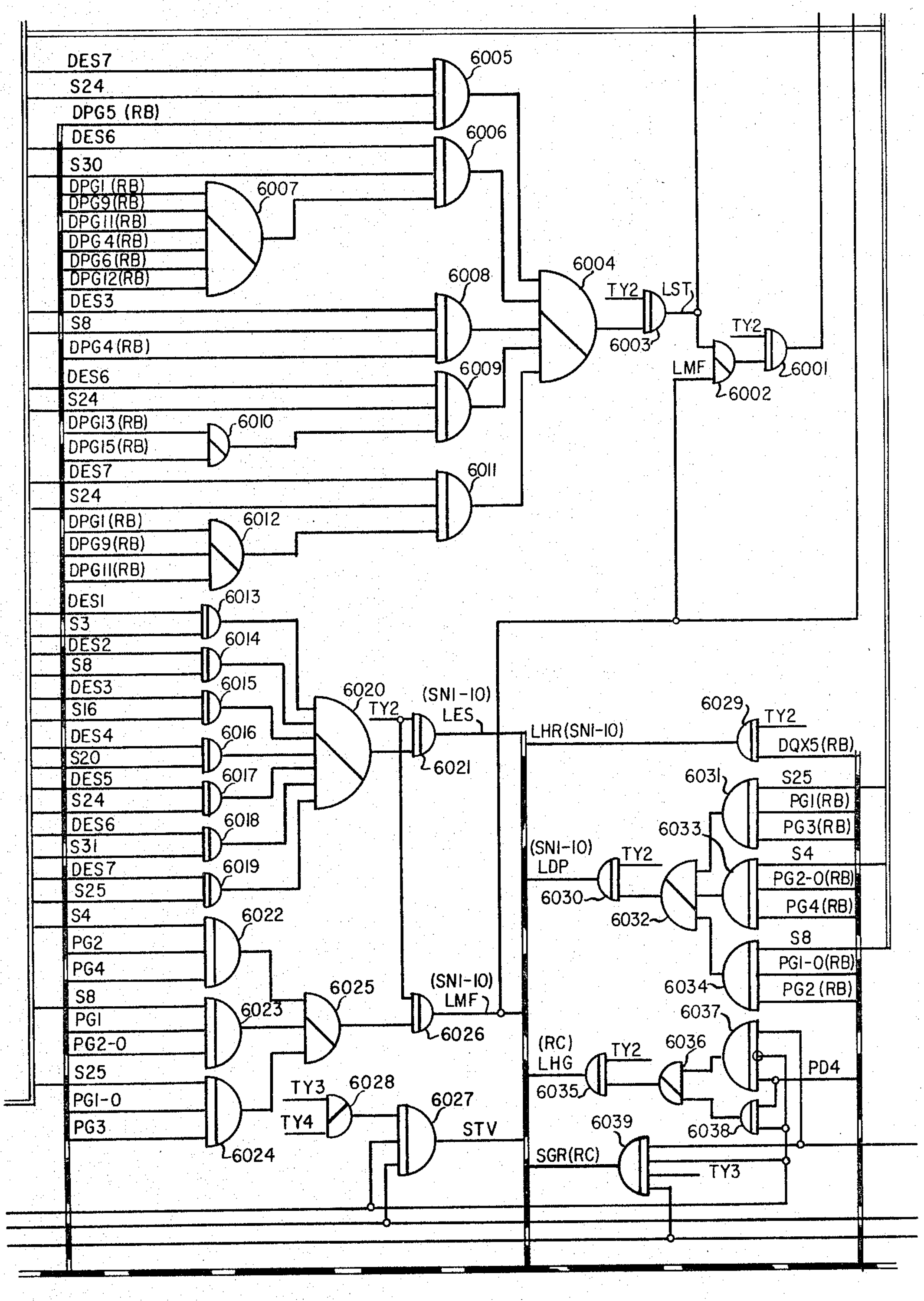
Figure 61:
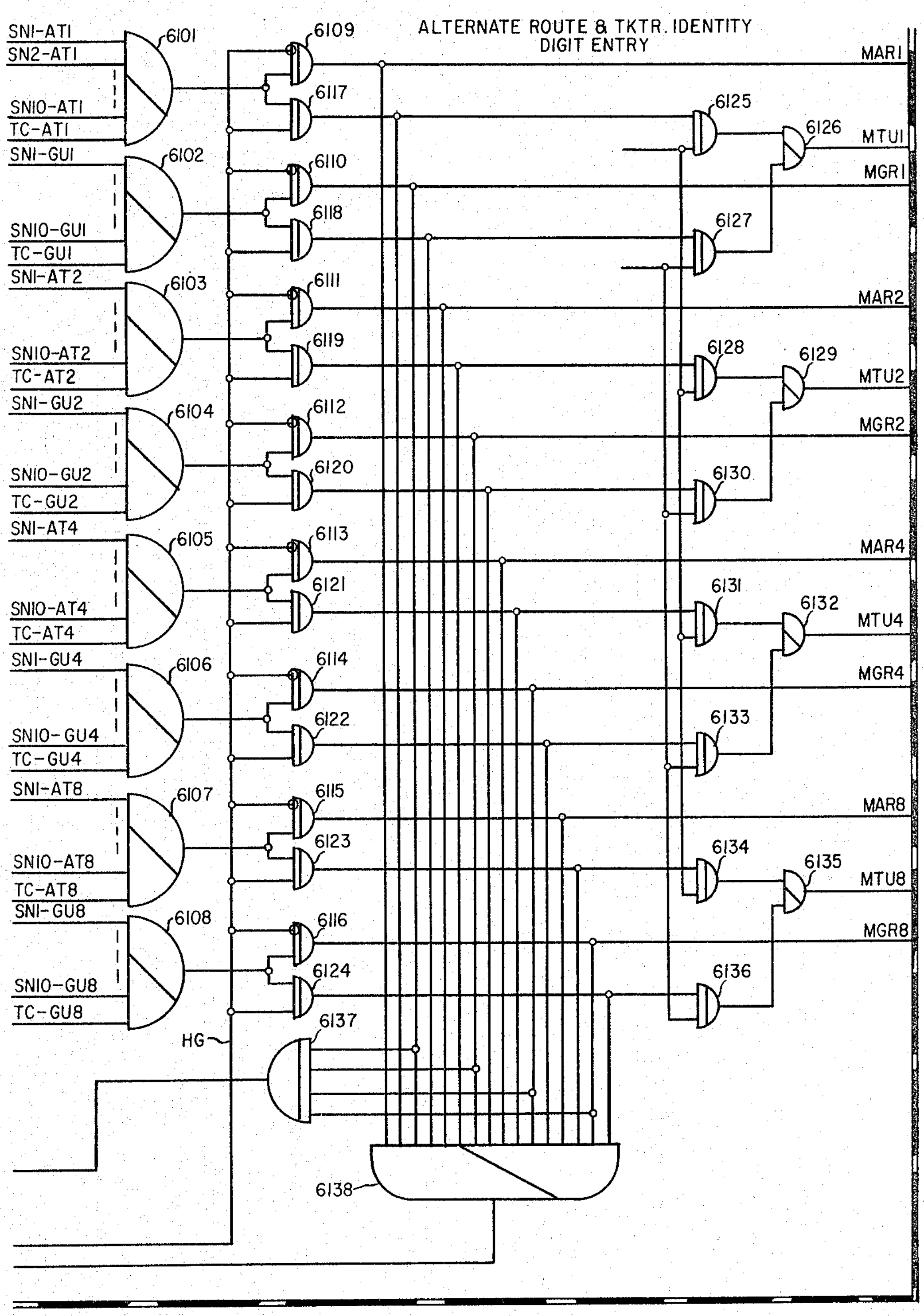

Referring now to FIG. 60, signal LES is generated via logic gate 6013–21 for the senders to indicate an end of send condition. Logic gates 6022–26 generate signal LMF which is transferred to the senders indicating a multi-frequency mode of sending. Signal STU is generated by means of logic gates 6027–28 to indicate that the TN and UN digits are to be stored. Signal LHR is generated by AND gate 6029 and is transferred to the sender to reset the HL flip-flop in the sender. Signal LDP is generated via logic gates 6030–34 and is transferred to the sender which indicates that out-pulsing is required in a dial-pulse mode. Signal LHG is generated via logic gate 6035–38 and is transferred to the register controller which writes HG in the memory to designate a first send for the alternate route and ticketing identity digit. AND gate 6039 generates signal SGR and transfers it to the register controller, designating that the GR digit to be stored.

Flip-flop DB designates that the digits received from the sender should be properly stored during the present system cycle. It is set in response to OR gate 6138, which is enabled via any one of AND gates 6109–24.

Flip-flop SM is set to designate that a request has been made for more digits by the sender.

Flip-flop SR is set to designate that the sender is available for use by the register.

Flip-flop PR is set to designate that the digits have been presented to the sender for out-pulsing and more may be sent. This flip-flop is set via OR gate 5809 which generates signal STR in response to OR gates 5801–8.

Flip-flop HG is set to designate that the GR digit is in storage.

The ES decoder 5900 decodes leads PH1–3 from the read-shift buffer to provide a one-out-of-seven code, DES1–7. This code is the end-of-send signal which is used to generate signal LES by logic gates 2013–21 for the end of send signal for the senders.

C(1)(n) *Multi-frequency and dial pulse generators.*—Referring now to FIG. 55, the MF generator 5590 and the DP generators 5580 provide pulses required by the senders for out-pulsing and multi-frequency and dial pulse modes of sending. This circuit consists of two generators, one providing pulses for dial pulse sending and the other for MF sending. The generators are identical except they are wired for different setting of speed and percent make.

Each generator comprises a four bit, sixteen count binary counter, which is driven by pulses reoccurring each ten milliseconds from the time division generator.

The flip-flops which provide MF and DP pulses are set at the beginning of each cycle. The reset of these flip-flops is controlled by the time division generator to allow the output of the flip-flops to be separated in increments of approximately one millisecond.

C(1)(o) *Time division generator.*—Referring now to FIGS. 62–63, the time division generator 6 provides the register time slot pulses TZ1–25, sub-time slot pulses TY1–7, and interval pulses TX1–7 so that the common equipment can operate in a time division mode. The time division generator comprises 125-kc. clock, gating logic, and the three ring counters TX, TY, and TZ.

The 125-kc. clock is a free running astable multivibrator producing two pulse trains, A00 and B00, of eight microsecond periods with one microsecond pulse width. Pulse train B00 is delayed from pulse train A00 by four microseconds.

The three ring counters are connected in tandem and use pulse trains A00 and B00 as timing pulses to generate the register time slot pulses, sub-time slot pulses, and control pulses. Each register time slot pulse TZ1–25 is a unique time slot for each register and is four hundred microseconds in duration. There are seven sub-time slot pulses TY1–7 in a register time slot. Each of the seven sub-time slot pulses is associated with a memory row and the pulse duration is fifty-seven microseconds. The sub-time slot pulse is further divided into seven control pulses TX1–7. These control pulses are used to generate commands and perform logic for each memory row and are of eight microsecond duration.

The sub-time slot pulses, the control pulses, and the pulse trains, A00 and B00, are also combined by coincidence gates to form single commands for use throughout the register sender. For example, the coincidence of B00, TX7, and TY6 form the single command B76.

C(1)(p) *Sender.*—The senders are universal, in that they provide all modes of sending required by the system. For intra-office signalling a high-speed code sending technique is used, while for sending to an outlying office the senders provide for either dial pulse or multi-frequency signalling, as required by that office. Sending modes may be changed while in the process of routing an individual call.

A "resend" feature is provided to improve the grade of service by allowing a second attempt to complete a call over a different route, if the route first chosen runs into link blockage. It is also used where faulty operation was caused by an intermittent failure (for example, spurious pulses due to noise "spikes" on the intra-office transmission lines).

When required, the calling as well as the called number can be outpulsed. The calling number may be sent in any of the three outpulsing modes (dial pulse, multi-frequency, code pulse).

The sender is divided into the following functional parts: loop and switch train supervisory unit, di-phase sending controller, and the multi-frequency and dial pulse controller.

The loop and switch train supervisory unit employs reed relays and is intended primarily for isolation of the electronic equipment from the switch trains and outside plant facilities. The specific functions of this circuit are:

(1) Signalling between the sender and the register junctor (seizure, holding, release, reorder, and end-of-send signals).

(2) Trunk supervision.

(3) Sender alarm and traffic metering facilities.

The switching digits sent from the sender to the markers are supplied, two digits at a time, by the common control, on request of the sender. The markers return one of the following instructions, and the sender responds accordingly:

(1) Clear—this instruction causes this circuit to return to the initial "receive" state, to await the "connect" information from the succeeding marker.

(2) Recorder (trunk busy) line busy and line idle—these instructions result in 120 i.p.m. busy, 60 i.p.m. busy, and switch through, respectively. They indicate to the sender that its functions on this call are complete. The instructions are repeated by the sender to the register junctor, which in turn signals the sender to release from the call.

(3) Incomplete—this instruction is sent by the line group marker, and indicates that additional digits are required by the marker to process the call. The circuit clears the transceiver, loads the succeeding two digits, sends the digits to the marker, returns to the receive state, and awaits further instructions from the marker.

(4) Resend—this instruction allows a second attempt to establish the connection, over a different route to the called destination, if the first attempt fails because the links are blocked. The main purpose of this feature is to improve the grade of service.

(5) Trunk identity—this information identifies a point in the switch train where the call may be monitored for answer and disconnect supervision. This number is stored in the register-sender group, and if the call required billing, the number is transferred, along with the calling and called numbers, to the ticketing equipment for call-progress monitoring and time recording.

(6) Alternate route—consists mainly of instructions for the addition or deletion of digits to or from the called number, as determined by the route chosen by the marker. The sender does not analyze these values—it simply recognizes the presence of each digit. After the digits have been recognized and stored by the common equipment, the transceiver goes back to the initial "receive state."

*Loop and switchtrain supervisory unit*

Figure 67:
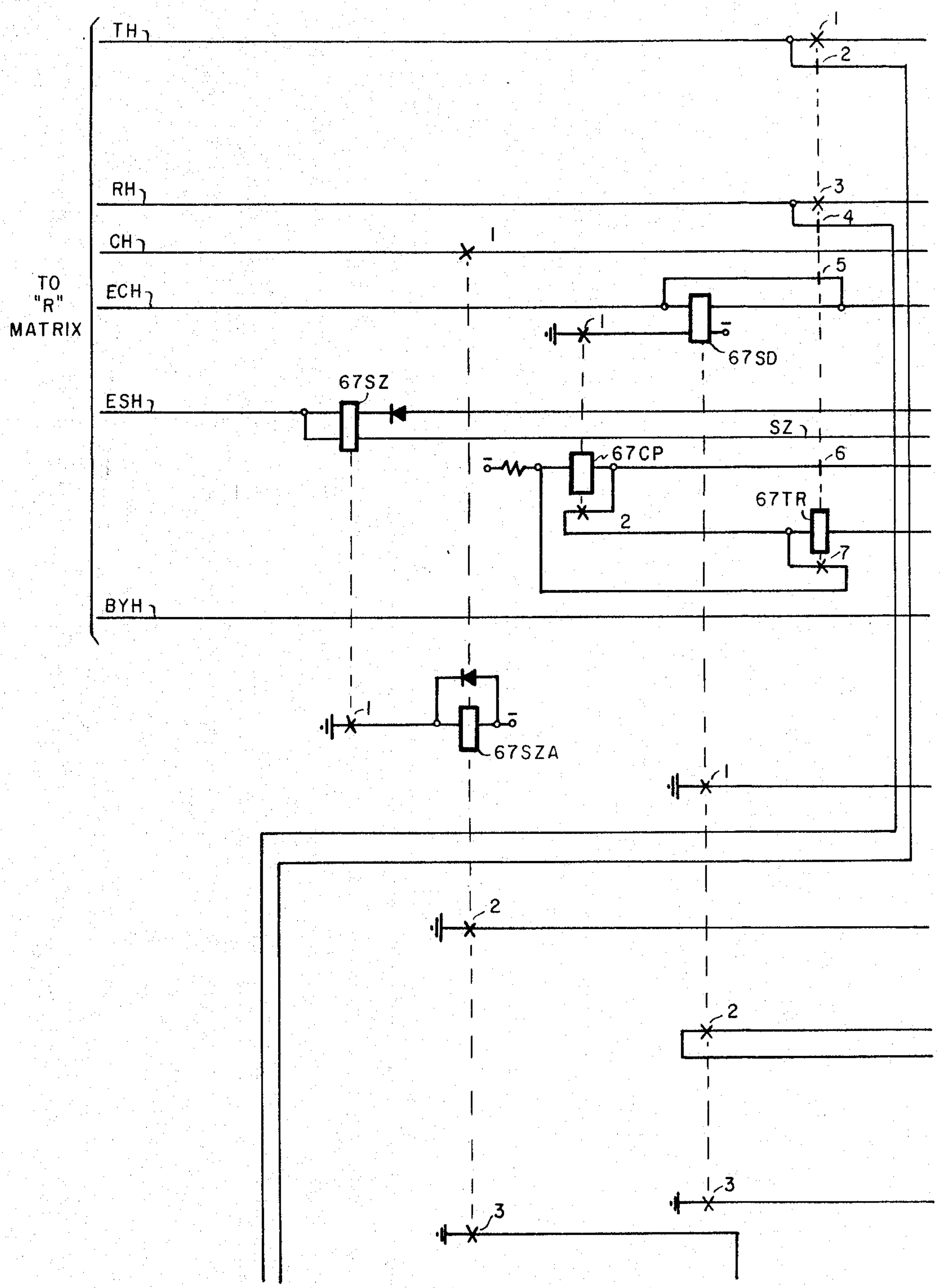
Figure 68:
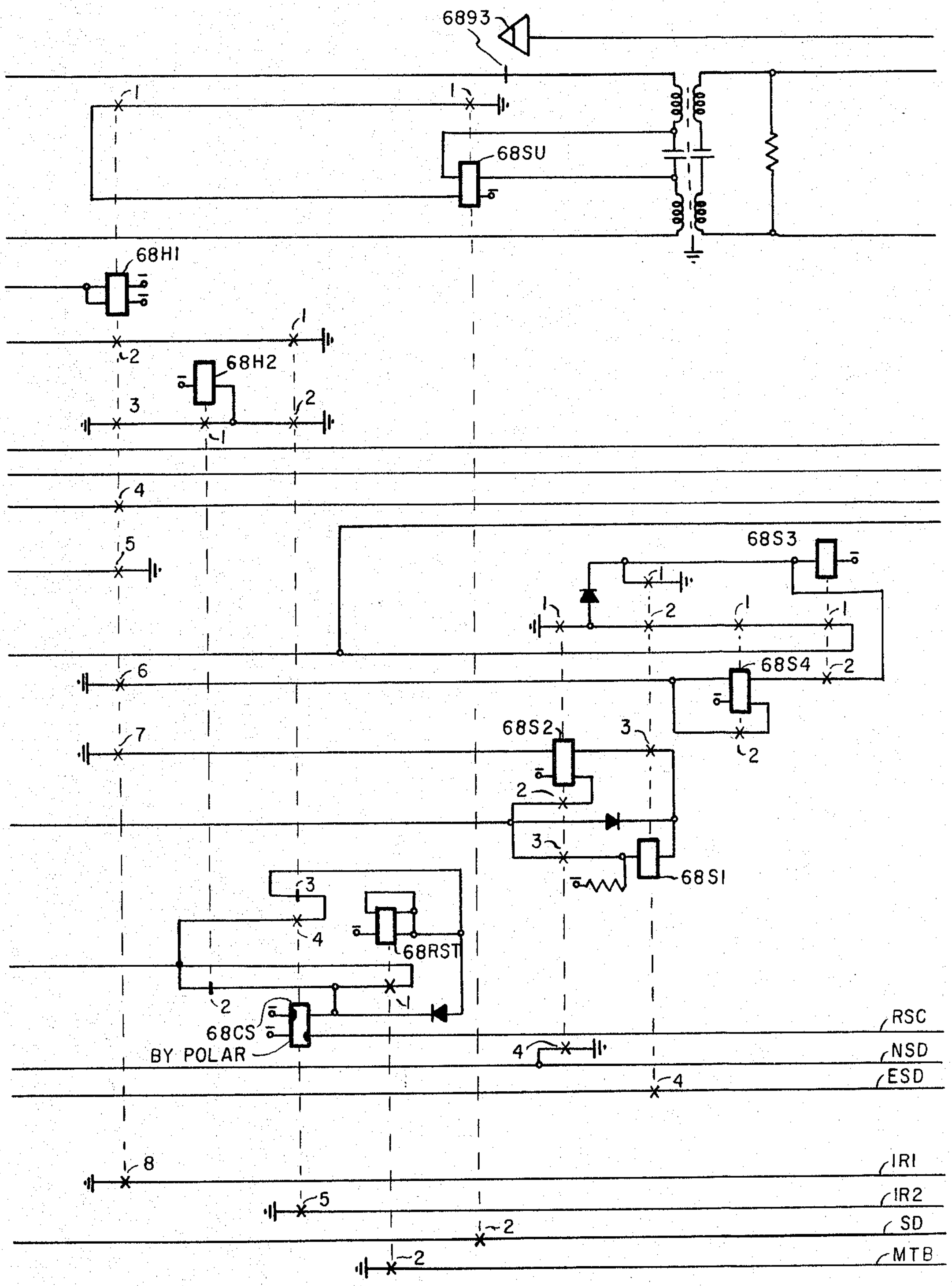
Figure 69:
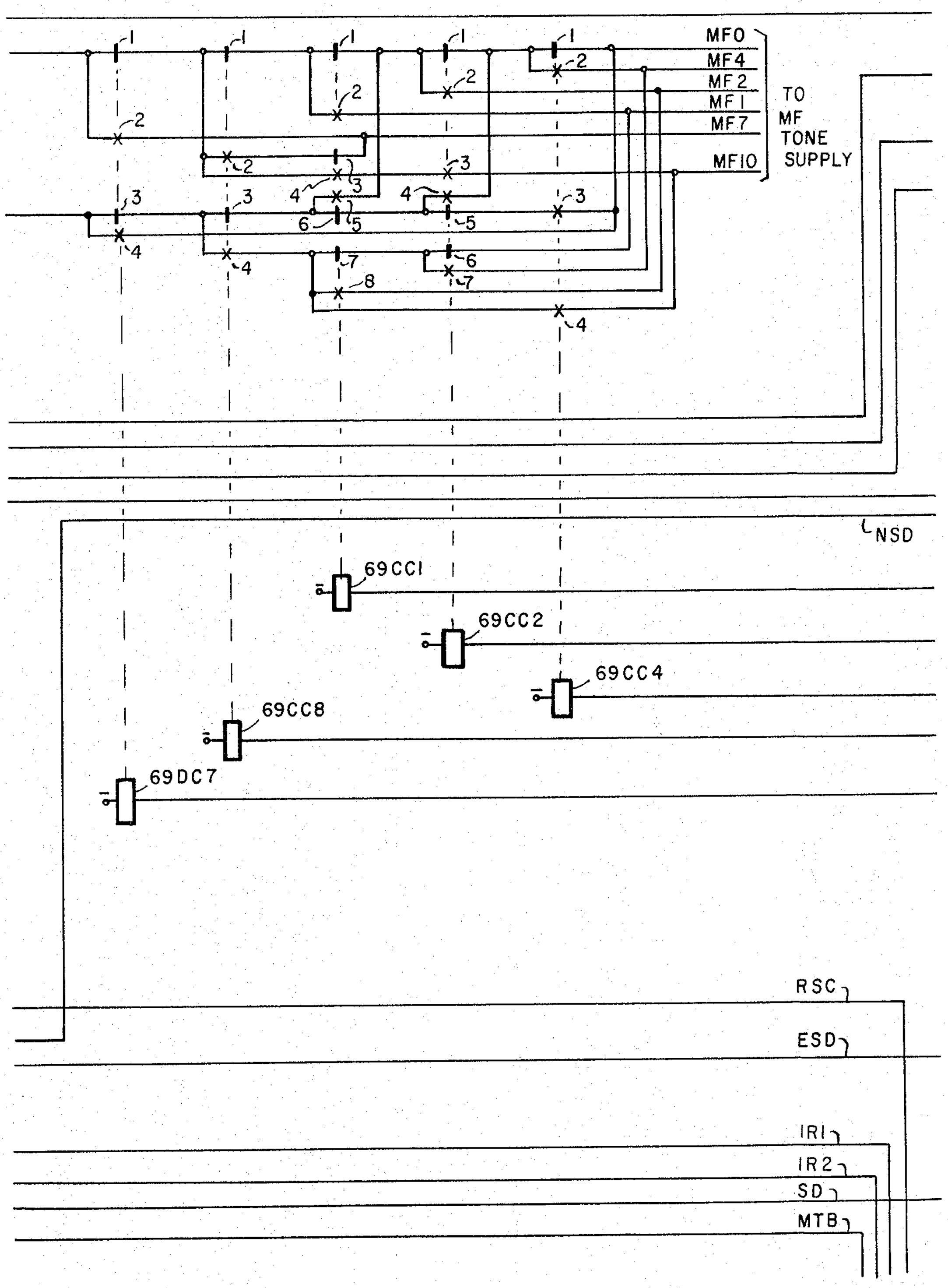
Figure 70:
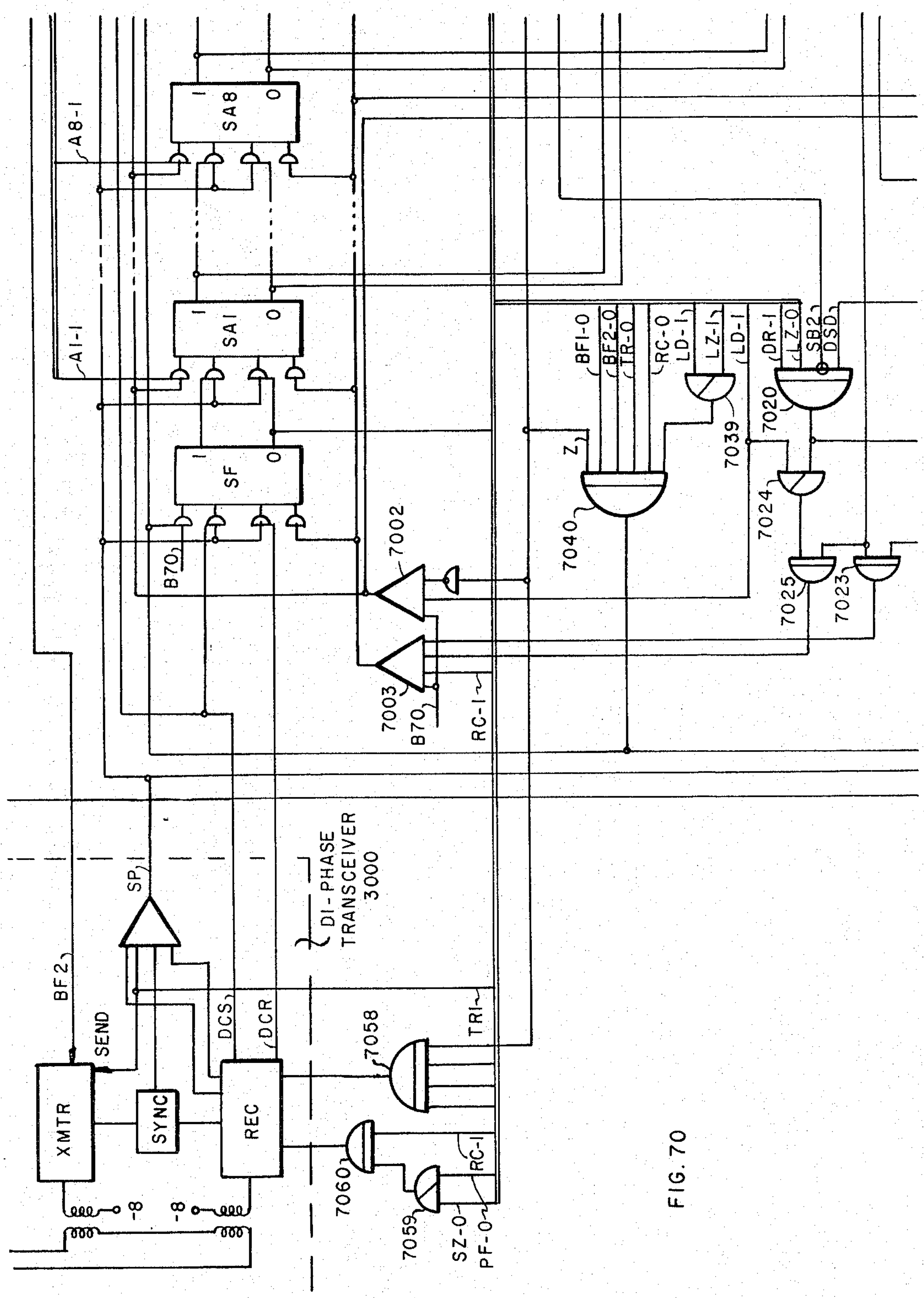
Figure 71:
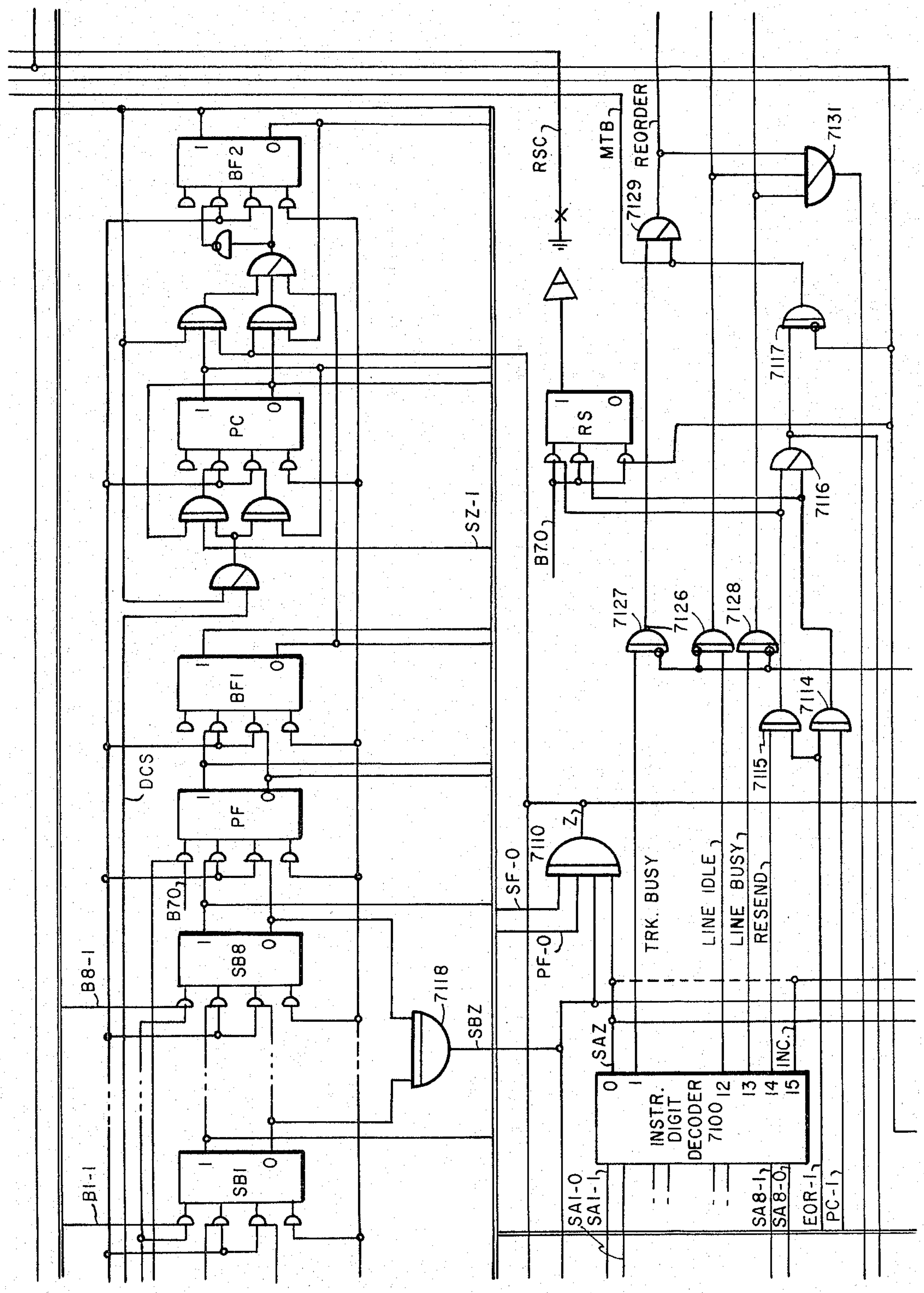
Figure 72:
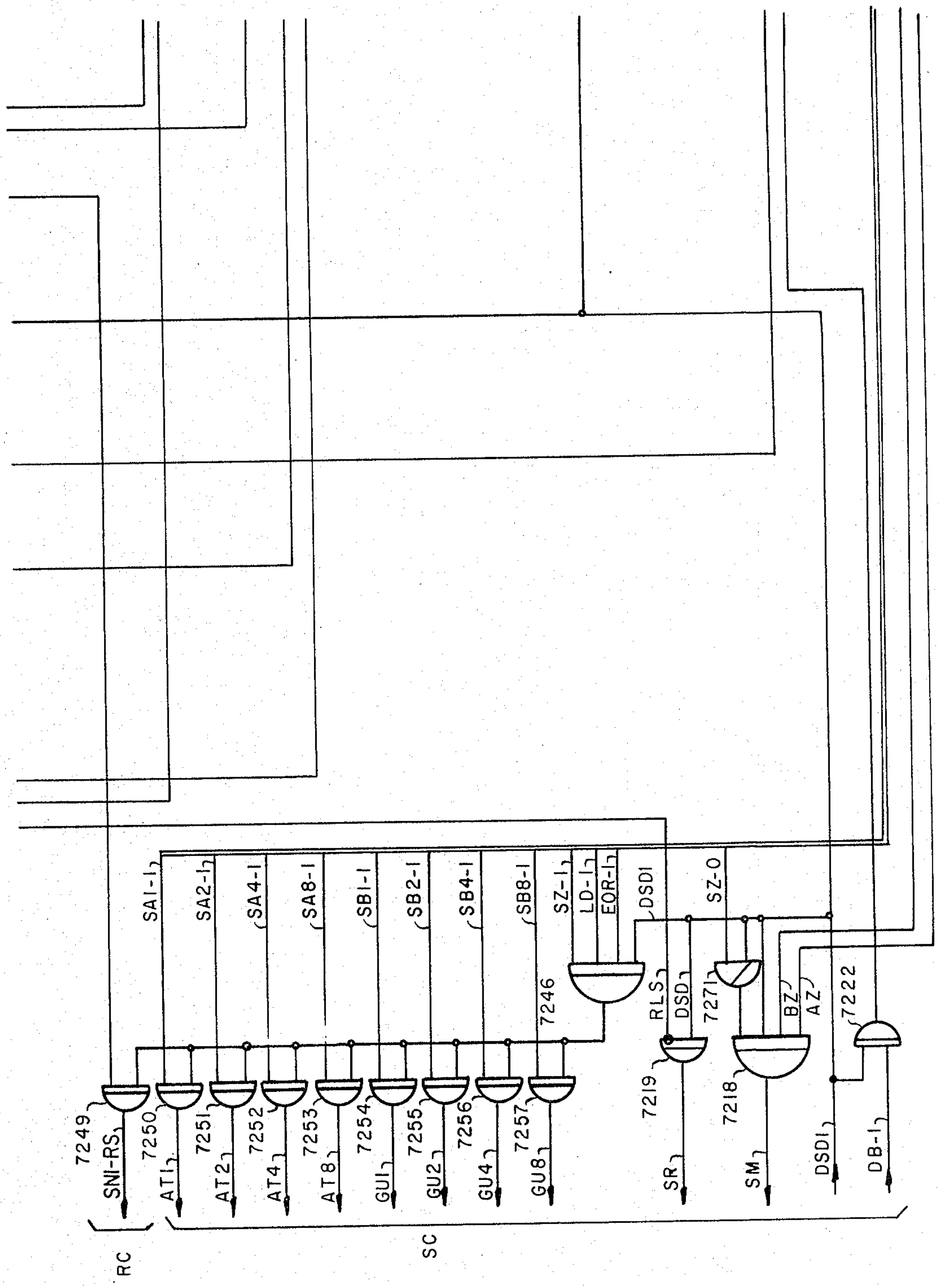
Figure 73:
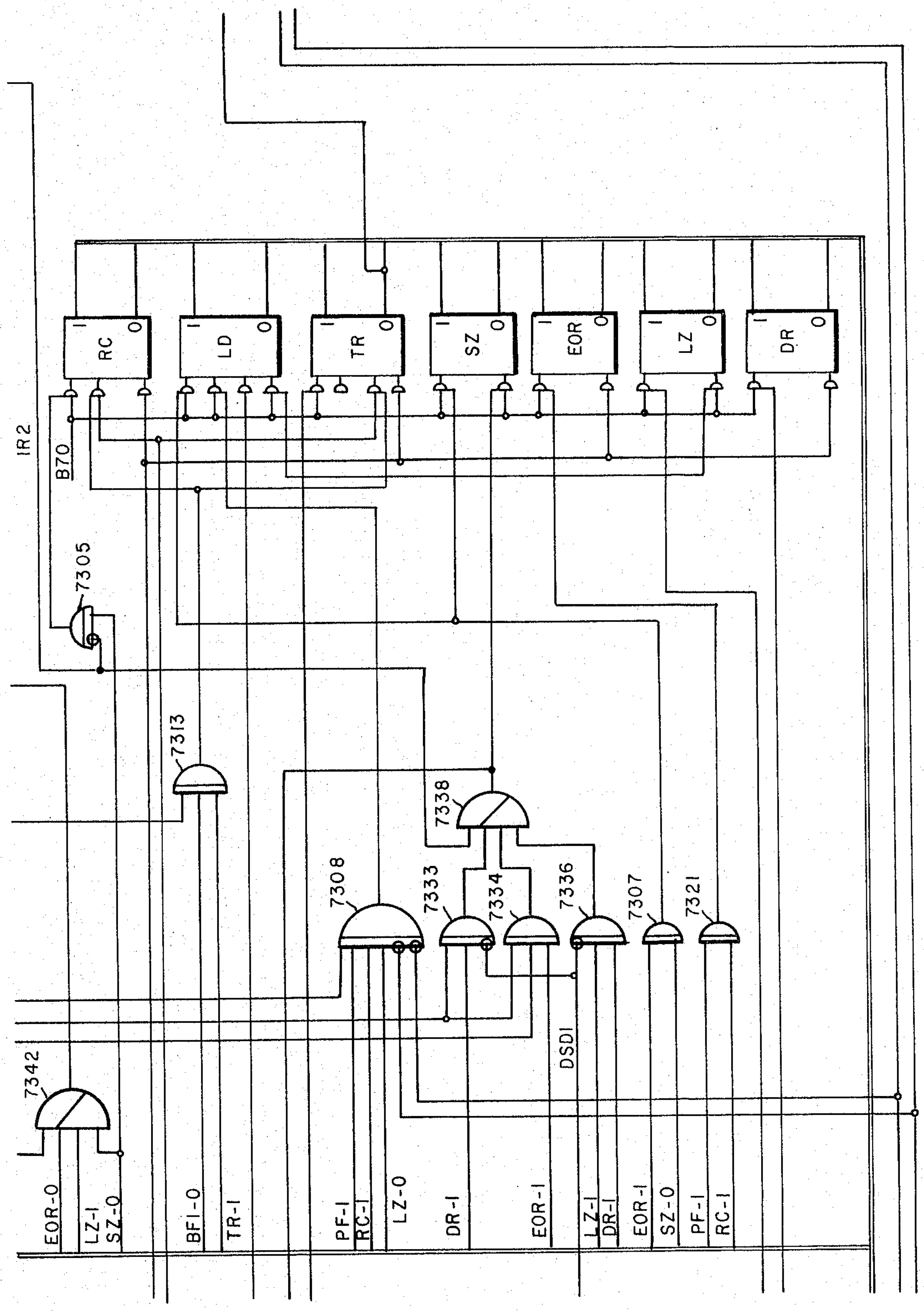
Figure 74:
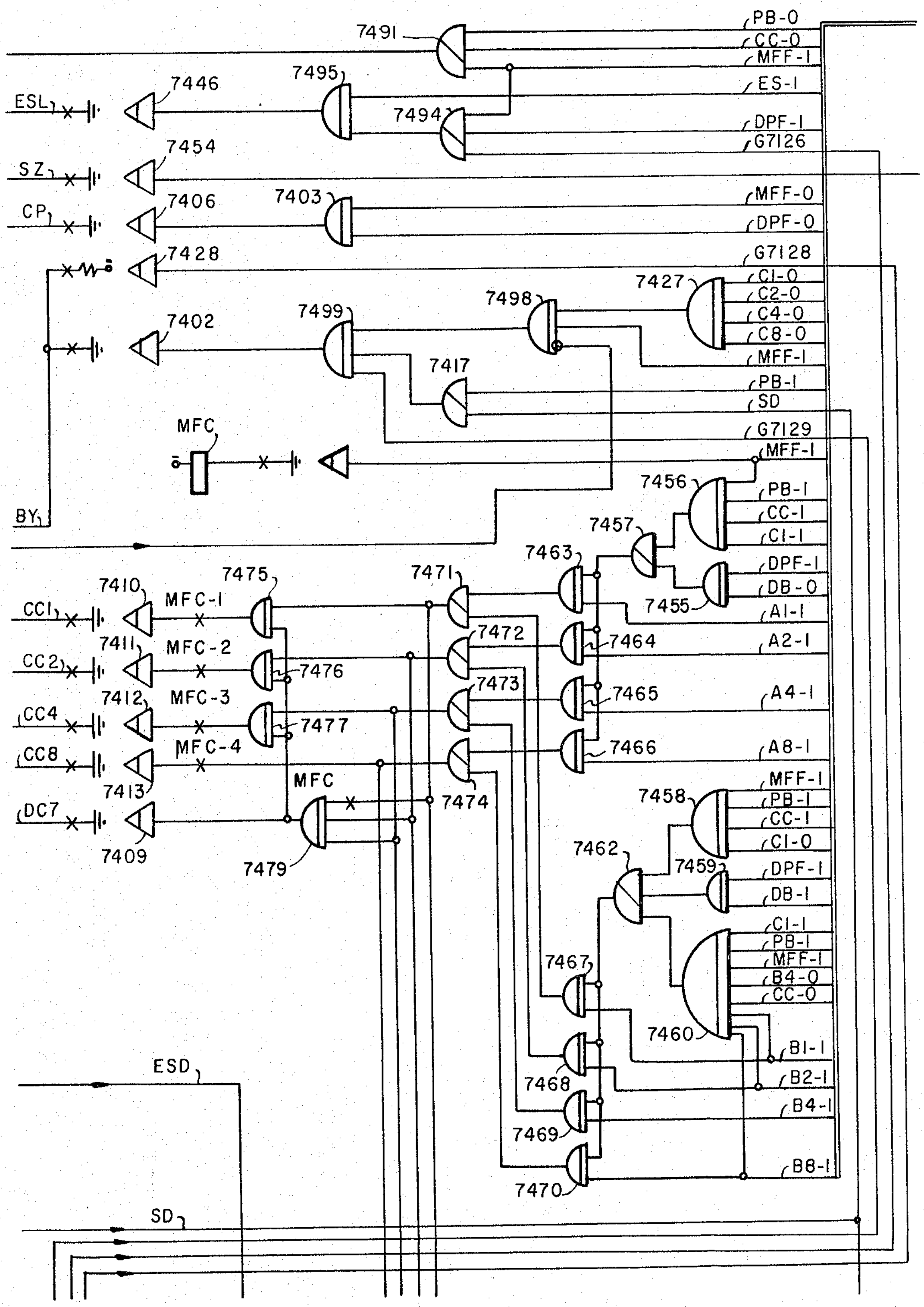
Figure 75:
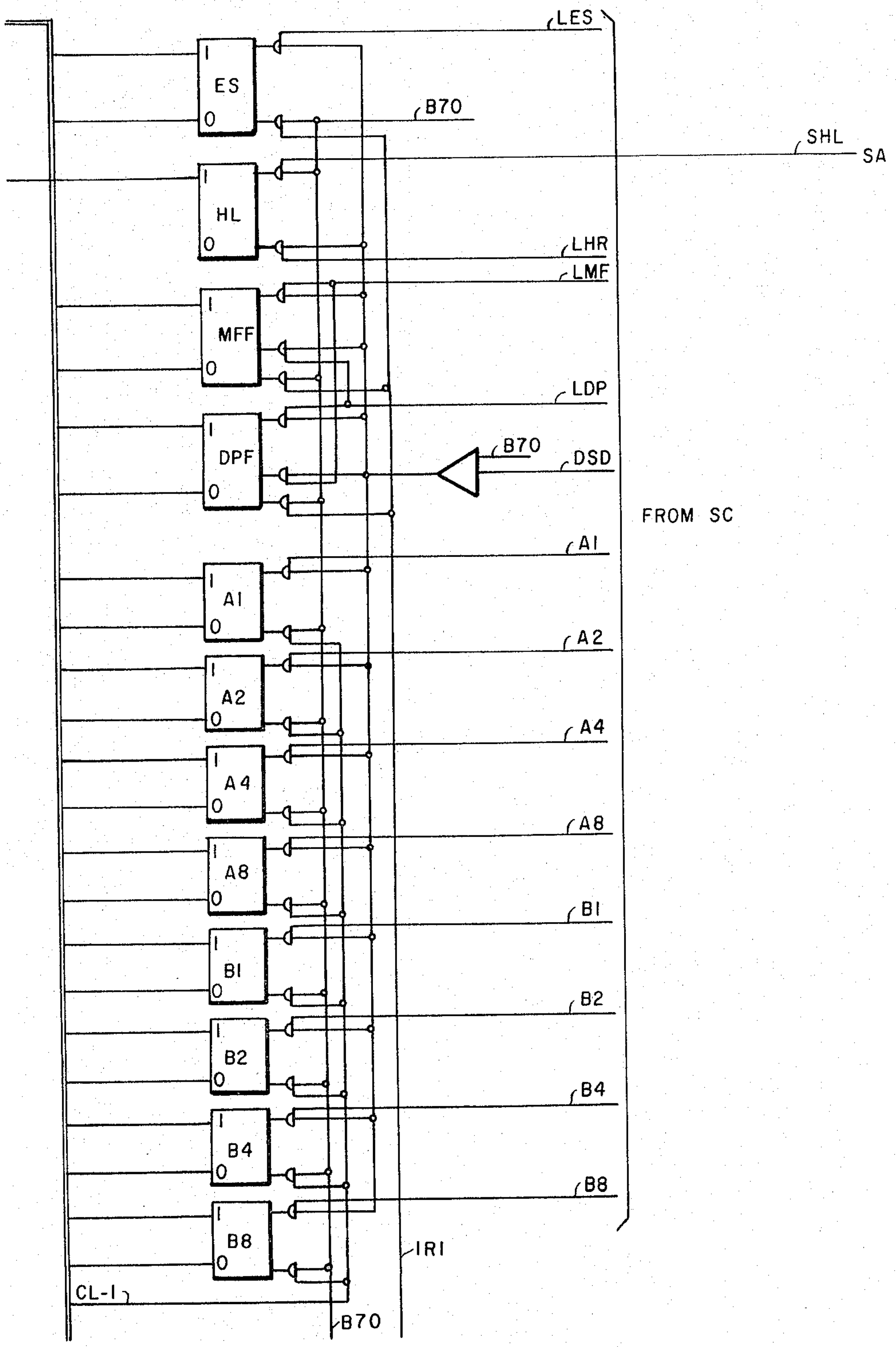
Figure 76:
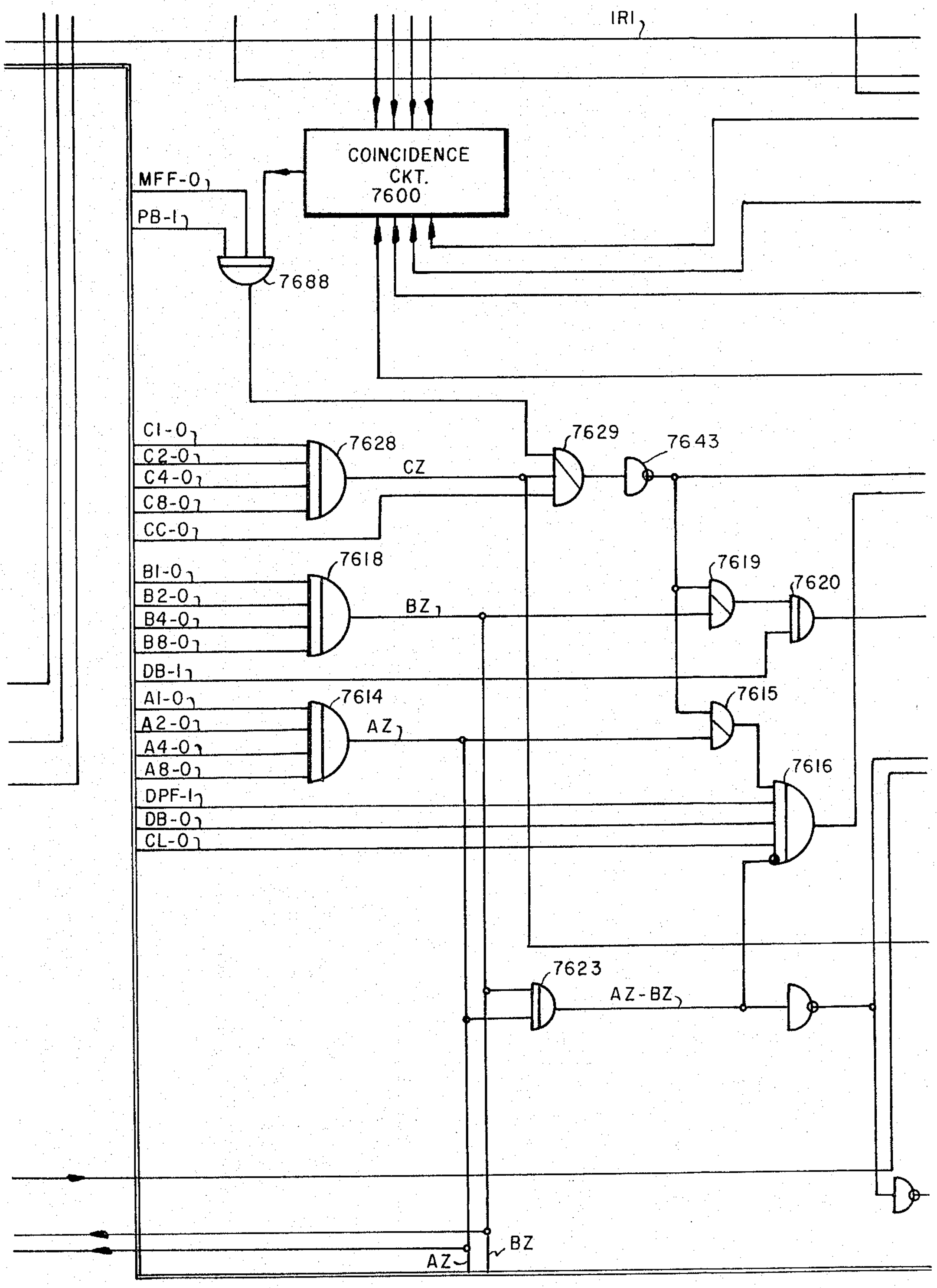
Figure 77:
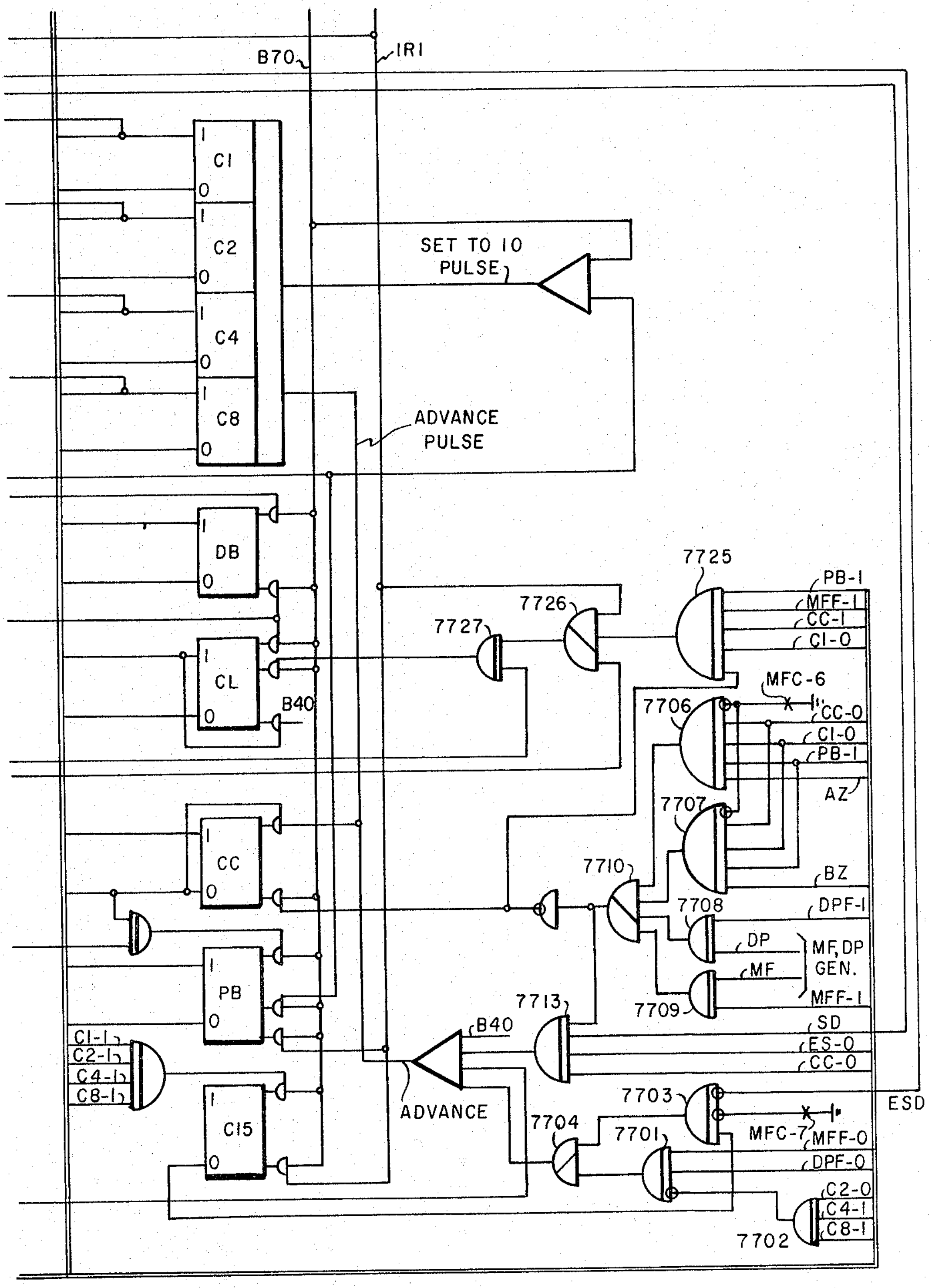

Referring now to FIGS. 67–69, relays 68H1–2 are the hold relays which provide holding potentials for the various relays in this circuit. Relay 67SZ is the seizure relay which indicates that a connection has been established between the register junctor and the sender. Relay 67SZA operates in connection with relay 67SZ during the seizure sequence and provides a certain amount of delay upon release of the circuit. Relay 67TR is the transfer relay which switches the line loop from di-phase sending to the multi-frequency and dial pulse mode of sending, and also provides locking ground for relay 67CP while the transfer is being completed. Relay 67CP is the code pulse (di-phase) relay which indicates a code pulse call is in progress, and also locks relay 67SD as normally no stop-dial conditions occur during this type of a call. Relay 67SD indicates a stop dial condition, informing the sender to stop outpulsing. Relays 68S1–4 count the number of stop dials (three stop dials indicate a busy condition). Relay 68SU is the supervisory relay indicating that a path has been completed to an outgoing trunk.

Relay 68CS is the call signal relay which requests the service of the group selector marker and holds the switch train by extending a ground potential. Relay 68RST is the resend timer which causes relay 68CS to remove the holding ground from the switch train in the group selector marker, and to provide a 50-millisecond delay that assures a complete release of the switch train, and then to cause relay 68CS to reoperate thereby extending the holding ground for another switch train in the group selector marker. Differential reed relay 68CS is operated via its upper winding and ground via contacts 67SZ–2, thereby causing relay 68RST to operate via contacts 28CS–4. The operation of relay 68RST connects lead MTB to ground potential, thereby indicating a "resend" condition (absence of ground after the resend condition indicates a busy condition). During a resend condition ground on lead RSC in response to flip-flop RS (FIG. 71) and its associated relay driver opposes and releases relay 68CS via its lower winding to release the switch train by removing ground from lead ECH. Relay 68RST remains operated for approximately 50 milliseconds, then releases to open the upper winding of relay 68CS via contacts 68RST–1. Thereupon relay 68CS reoperates all of its contacts, thereby connecting ground potential to lead ECH to provide a holding potential for the new switch train in the group selector and preventing relay 68RST from reoperating by the operation of break contacts 68CS–3.

Relays 69CC1, 2, 4, and 8 and 69DC7 are for the purpose of decoding the binary additive code into the multi-frequency signalling code (two out of six), connecting the tone leads to the line so that the two tone leads are always connected to the different sides of the line. Relay 69DC7 symbolizes the digital 7 code.

*Di-phase sending controller*

Referring now to FIGS. 70–73, the di-phase sending controller comprises a shift register, di-phase transceiver 7000, control flip-flops, and other associated logic. Di-phase transceiver 7000 communicates with the line group marker and the group selector marker in a high speed serial manner in connection with the shift register. The shift register comprises eight flip-flops SA1–8 and SB1–8 for two digits of four bits each, suffix bit flip-flop SF, and three prefix flip-flops PF and BF1–2.

The shift register is used to transmit two digits at a time to the markers. From the markers, instruction digits or alternate route instructions are received in the first digit position (flip-flops SA1–8). Ticketing digits may also be received in the second digit position (flip-flops SB1–8).

Flip-flop PC is used in connection with the shift register to determine whether an even number of true indications have been received by the shift register, thereby designating the receipt of valid information. The instruction digit SA1–8 is received from the markers and is decoded by instruction digit decoder 7000 to provide five indications as follows: trunk busy, line idle, line busy, resend, and incomplete. The instruction digit is also transferred to the sender controller by means of logic AND gates 7250–57. The sender controller has the capability of decoding the remaining ten indications regarding alternate route information as shown in the following table:

| | Sender | Alternate Route Instruction to Controller |
|---|---|---|
| 1 | Trunk Busy | |
| 2 | | |
| 3 | | MF called number. |
| 4 | | DP called number. |
| 5 | | DP called number plus 2 digits. |
| 6 | | DP called number plus 3 digits. |
| 7 | | MF called number plus 3 digits. |
| 8 | | DP called number less 3 digits. |
| 9 | | MF called number less 3 digits. |
| 10 | | DP called number plus 5 digits. |
| 11 | | |
| 12 | Line Idle | |
| 13 | Line Busy | |
| 14 | Resend | |
| 15 | Incomplete | |

Flip-flop RC indicates that the shift register is in the receive state and enables the demodulator in di-phase transceiver 7000. Flip-flop TR indicates that the shift register is in the transmit mode and enables the modulator in the di-phase transceiver 7000. Flip-flop EOR indicates end of receive and provides synchronism with the di-phase transceiver 7000. Flip-flop SZ indicates seizure of the di-phase transceiver 7000. Flip-flop LZ indicates load zeros into the shift register for ticketing information. Flip-flop SZ and LZ are used in combination to indicate various conditions as follows: $\overline{SZ}$ $\overline{LZ}$ indicates connect; SZ $\overline{LZ}$ indicates the first setting of the shift register and; SZ LZ indicates the second setting of the shift register. Flip-flop DR indicates that digits have been recognized by the sender controller. Flip-flop RS indicates a resend condition as decoded by the instruction digit decoder 7100.

Logic gates 7305, 7313, 7308, 7333, 7338, 7334, 7336, 7307, and 7321 provide set and reset commands for various control flip-flops. Logic AND gate 7118 determines when each of the four ticketing digit flip-flops SB1–8 are reset in the shift register and generates signal SBZ in response thereto. Logic AND gate 7110 indicates that all of the flip-flops in the shift register are in the reset condition and generates logic signal Z in response thereto. Logic inhibit gates 7126–28 allow the trunk busy, line idle and line busy indications to be transferred to the multi-frequency and dial pulse controller portion of the sender. These signals are inhibited by logic OR gate 7342 when flip-flops EOR and S2 are reset and flip-flop LZ is set. The output of OR gate 7129 is the "reorder" signal. The reorder command can be generated by the trunk busy indication and also by means of a second resend indication. Ground on lead MTB prevents the first resend signal from being transmitted through OR gate 7129. After the switch train has been released in response to a resend command, ground is removed from lead MTB, so that a second resend signal through OR gate 7129 generates the reorder signal. Gated pulse amplifier 7002 and its associated logic provide the send commands for the shift register and gated pulse amplifier 7003 and its associated logic provide the reset commands for the shift register. Logic AND gate 7219 provides the logic signal SR which indicates that this particular sender is connected to the sender controller. Logic AND gate 7218 generates command SM which indicates to the sender controller a request for more information to be received in the A and B flip-flops. Logic AND gate 7222 is used to set flip-flop DR to indicate that information has been successfully received by the sender controller as there are ten logic commands DSD individually associated with each sender and is multiplexed by the sender controller to identify each sender transmitter. Logic gate 7249 generates a signal in response to resend or parity check to the register via the register controller RC. Logic gates 7060 and 7058 control the receiver and the diphase transceiver 7000.

*Multi-frequency and dial pulse controller*

Referring now to FIGS. 74–77, the multi-frequency and dial pulse controller comprises the four A flip-flops and the four B flip-flops which provide a buffer storage area to receive switching digits from the sender controller at a two-at-a-time basis. These digits are then transferred to the shift register for di-phase transmission, or they are used for multi-frequency or dial pulse out-pulsing over the TH and RH leads in FIG. 67. The four stage ring counter C is used in connection with both dial pulse and multi-frequency sending. When the dial pulse mode is employed, counter C terminates the out-pulsing when the value of the digit in either the A or B store is equal to the value of the count of counter C, thereby generating a coincidence signal from coincidence circuit 7600. Upon coincidence, the counter C is set to the count of ten in response to logic gates 7629 and 7643. Thereupon, counter C counts from 10 up to 0 which provides the interdigital pause. Counter C is advanced in the dial pulse mode in response to logic gates 7713, 7710, and 7708 which respond to the dial pulse generator. These gates simultaneously set flip-flop CC which generates a signal to enable gate 7491 to close the loop for out-pulsing. The A digit is out-pulsed first under the control of logic AND gate 7459 and the B digit is out-pulsed alternately under the control of logic AND gate 7455.

During the multi-frequency mode of sending, first the digits stored in the A flip-flops are gated to reed relay drivers 7409–13 under the control of logic AND gate 7456 to enable AND gates 7463–66 to provide the necessary tones for multi-frequency (two-out-of-six code) signalling. Logic AND gate 7456 follows flip-flop CC which responds to logic gate 7709. Logic gate 7709 is directly connected to the multi-frequency generator to provide the necessary timing intervals for multi-frequency sending. During this mode of sending; only flip-flop C1 of counter C is utilized to select first the A store and then the B store for transmission. When the digit B is being out-pulsed, logic AND gate 7458 controls the operation. Logic AND gate 7460 generates the KP digit which is the digit 11 and is the first digit to be out-pulsed.

If a stop dial condition occurs prior to count 15 of counter C during MF sending, at the end of the stop dial, the counter follows AC pulse train (18 kc.) under control of gate 7703 to count to 15. Thereupon flip-flop C15 is set to disable the fast operation of counter C, thereby providing no unnecessary delay in the resultant holding of the multi-frequency equipment at the distant office.

Logic gate 7703 provides fast operation of the counter C during an end of send condition. During multi-frequency operation counter C counts to 12 and then stops due to inhibit gate 7701 and AND gate 7702. The count from 12 to 0 provides a time delay (between 300–400 milliseconds) to allow the distant office to prepare to receive pulses and to return the stop dial indication, when required.

When a blank position in counter C in encountered, AND gate 7706 allows counter C to advance to the next count and logic AND gate 7707 allows the counter to advance for the even position being blank.

Flip-flop ES signifies the end of send condition. Flip-flop HL indicates the hold flip-flop upon seizure. Flip-flop MFF is the multi-frequency flip-flop that represents the multi-frequency mode of sending. Flip-flop DPF represents the dial pulse mode. Flip-flop DB is the gate-digit-B flip-flop which causes the digit B to be gated from the B store while in the set position and during DP sending allows the digit A to be gated from the A store during the reset condition. Flip-flop CL is the clear indication which resets the A and B store. Flip-flop CC, as mentioned before, is the counter control and provides the timing interval for out-pulsing. Flip-flop PB is the pulse blocking flip-flop which when in its reset state prevents out-pulsing to provide the interdigital pause while allowing the counter C to remain counting.

Reed relay driver 7496 connects ground potential to lead ESL when an end-of-send condition occurs in response to logic AND gate 7495 and logic OR gate 7494. Reed relay driver 7454 connects ground to lead SZ in response to flip-flop HL being set upon seizure. Reed relay driver 7402 connects ground to lead BY in response to logic gates 7499, 7417, 7498, and 7428 to indicate a trunk busy indication to the register junctor. Reed relay driver 7428 causes resistance battery to be connected to lead BY to indicate a line busy indication, thereby distinguishing line busy and trunk busy. Reed relay MFS is operated in response to a reed relay driver which operates when flip-flop MFF is set.

Logic AND gate 7688 enables the output of the coincidence circuit 3600 when flip-flop MFF is reset and flip-flop PB is set. Logic AND gate 7614 indicates that the A flip-flops are all reset and generate the command AZ. Logic AND gate 7618 indicates that the B flip-flops are all in the reset condition and generate the command BZ. Logic AND gate 7628 indicates that the counter C is reset (count 0) and generates the command CZ.

Logic AND gate 7620 and its associated logic gates set flip-flop CL and simultaneously reset flip-flop DB. Logic AND gate 7616 and its associated logic gates set flip-flop DB. The flip-flop CL may alternatively be set in response to logic gates 7727, 7726, and 7725 during the multi-frequency mode of sending.

C(2)—OPERATION OF THE REGISTER-SENDER

C(2)(a) *Local call*.—Assume now that one of the local subscribers 901 initiates a call to another local subscriber. Upon removal of the handset by the calling subscriber the line marker 200 identifies the line and searches for an idle register junctor. After finding an idle register junctor, such as local register junctor 601, the line marker determines if a path can be established from the calling line to that register junctor. Assuming that this is so, the line marker causes crosspoints 912, 914, 916 and 918 to operate to extend the connection from the line circuit 910 to originating junctor 920; and from there to the register junctor 601. At the same time the line marker extends a call signal from the LNI sender 283 in the form of negative battery potential through a relay winding to lead BY and thence to the register junctor 601. In the register junctor, relay 14GO operates over its upper winding, and at its contacts GO–1 ground is extended on lead ECA to the buffer-multiplexer 631. This signal is an input to AND gate 1601A which is individual to the register junctor 601. During the time slot of the associated register an output signal on lead MAL1 through OR gate 1720 with pulse B21 via gated pulse amplifier 1731 sets the flip-flop EC; thereby producing the following condition:

Command: B21 MAL1
Set EC

If the register receiver is idle, it sequences to the busy state by setting flip-flop BU2 via AND gate 1721 to provide the following condition.

Command: B41 $\overline{\text{BU2}}$ DRX1 DVX0 EC
Set BU2 (A)
Set KM (B)

It will be noted that this command from AND gate 1721 also sets the KM flip-flop in the carry buffer at the B option. Thereupon a GO command is extended to register junctor 601 by means of gated pulse amplifier 1637 with its associated logic to set flip-flop 1GO in the register junctor buffer and lead multiplexer which generates the following condition.

Command: B71 BU2 KM TX1
Set 1GO

Relay 14GO operates in response to a ground signal from the relay driver associated with flip-flop 1GO to request LNI from the marker.

Furthermore, the "have register receiver" condition KM is written in the memory in row 1, position E, bit 3 by logic gates 2140–41 in the register controller as a result of the following.

Command: TY7 KM $\overline{\text{GRS2}}$

The register sequence state RX is advanced from idle (DRX1) to receiving LNI (DRX2) by means of logic gates 2250, 2253, and 3100 of the register controller for the following condition.

Command: TY7 DRX1 KM EC

The timer in row 1, position A is started to time the receipt of the LNI information in the shift register of the register receiver 630. The command to start counter A is generated by start logic 2510 of the register controller as follows.

Command: TY7 DRX2 DVX0 DPA0

A one is added to the count of counter A after each cycle of the register in order to time the interval before the LNI is received to determine if trouble has developed. A trouble condition exists at a count of 15, which is 15 times approximately 10 milliseconds, or about 150 milliseconds.

Reed relay 14GO remains operated by a ground on lead GO from the buffer-multiplexer. This additional path to ground through the lower winding of relay 14GO reduces the resistance to ground on lead BY, which in the LNI sender 283 causes a relay to operate to connect the diphase sender to the TR and RR leads. The diphase signals are transmitted via leads TR and RR in the register junctor to the leads TDM and RDM to the diphase receiver 1700 of the register receiver, and into its shift register 1710. This information includes the calling party's equipment location number and class of service. Upon receipt of the entire portion of the information into the shift register, flip-flop PR2 is set causing AND gate 1722 to set flip-flop CP2 by means of the following condition.

Command: B71 BU2 PE3 $\overline{\text{BP2}}$ PR2
Set CP2

The counter A of the register controller is started by means of the following command:

Command: TY7 DRX2 DVX0 CP2

The LNI information is transferred in parallel from the shift register into row 5 of the memory via the register controller by means of the following transfer command at gate 1808.

Command: TY5 CP$\overline{2}$ KM $\overline{\text{SL}}$

This enables transmission gates 2816–19 for position D, 2916–19 for position E, 3016–19 for position F, 3116–19 for position G, 3216–19 for position H, 3316–19 for position I, and 3416–19 for position J. There is no entry into position B for a local call.

The signal GRS2 from the gate 1728 becomes true as a result of the signal condition BU2 PE3 $\overline{\text{HDS2}}$ CP2. As a result of the generation of signal GRS2 bit PE3 is inhibited at gate 2140 from being rewritten into row 1 of the memory, so that KM is not true in the next multiplex cycle. Flip-flop PR2 causes AND gate 1730 to move the diphase receiver 1700 out of the receive mode. The output of flip-flop CP2, through AND gate 1632, gated pulse amplifier 1637 to flip-flop 1GO, thereby resetting flip-flop 1GO; and at the same time logic gates 1625–28 and gated pulse amplifier 1634 to flip-flop 1HA, flip-flop 1HA is set. In the register junctor, the removal of ground from lead GO signals the LNI sender of the marker to stop transmission. Relay 14GO restores. Ground on lead H1 operates relay 14H1, which causes the operation of relays H2 and H4. Negative 8-volt potential is extended via contacts 14H4–5 and manual switch BK to lead ITJ to mark the register junctor busy. Relay 13A is connected to leads TR and RR and operates over the calling party's loop. Relay 12DT operates over its upper winding and locks over its lower winding. Dial tone from source DT is connected through contacts DT–1 and the lower winding of relay 13A to the tip conductor TR. Thereupon, the shift register is reset together with flip-flops BU2, 1GO, and CP2 by means of the following condition.

Command: B77, GRS2

Reset shift register, BU2, 1GO, CP2

Relay 13A at its contacts 13A–1 sends ground to AND gate 1601B to record in memory row 1, position B, bit 4 that the calling party is connected to the P highway. AND 1960 generates signal PP to provide W7B4 to write MWB4 via AND gate 2603 as a result of the following conditions.

Command: TY7 PP

Thence the registers enters state DRX3 which is the dialing state as a result of the following command.

Command: TY7 DRX2 $\overline{\text{PB4}}$ PP $\overline{\text{PF1}}$

Nothing further happens until the calling party commences dialing.

Beginning of the first dialing impulse ($\overline{\text{PP}}$ PB4)

When the calling party starts to dial, at the first interruption of the line loop, relay 12DT restores to remove dial tone from the line.

Each time that a change of loop conditions occur, the following command results in the register controller.

Command: TY7 [($\overline{\text{PB4}}$ PP+PB4 $\overline{\text{PP}}$) DRX3 DVX0 $\overline{\text{FD}}$]

This condition causes the counter in position A to start at the count of "one."

Figure 42:
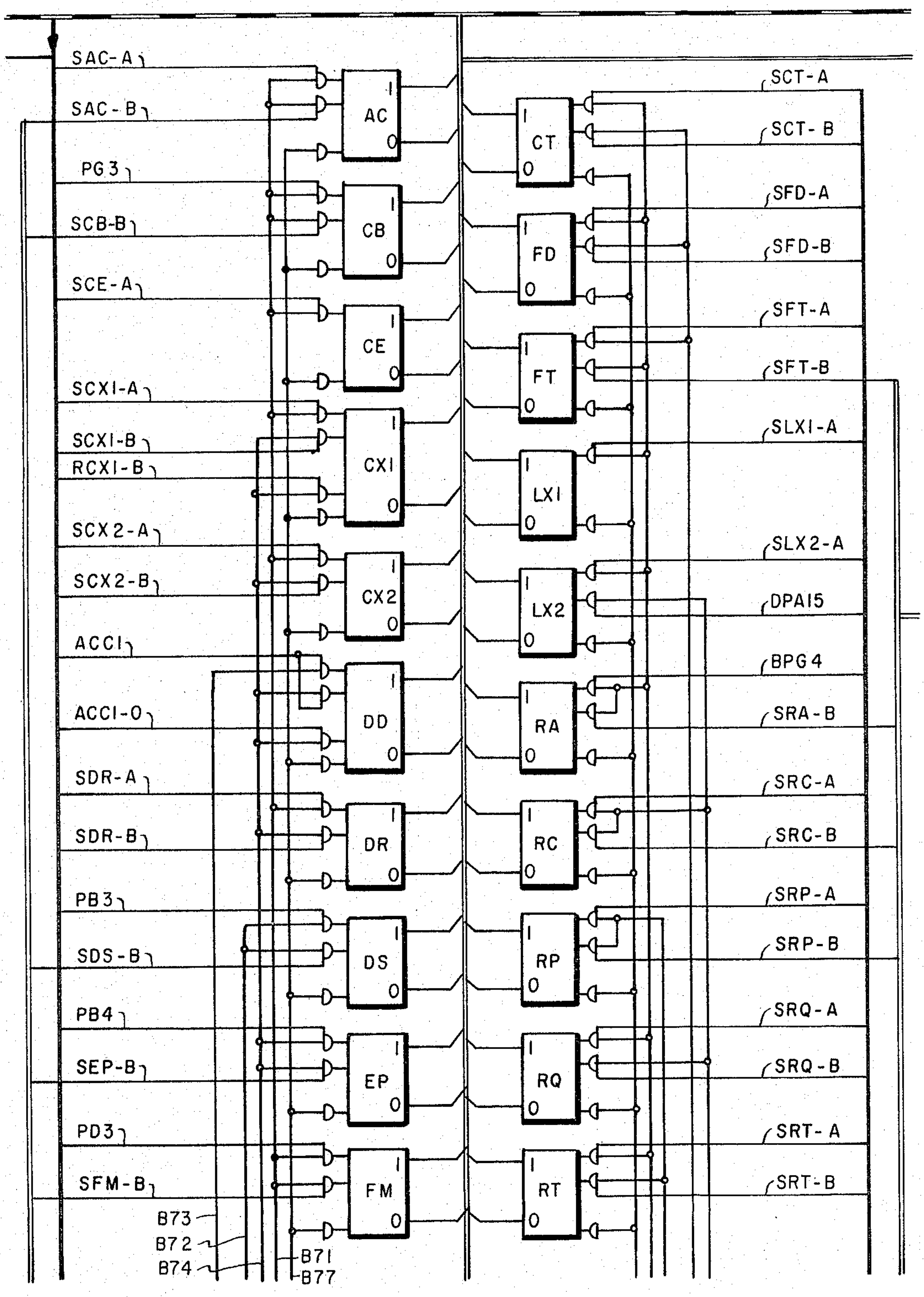

At the end of the first dialed impulse, flip-flop AC of the AC of the carry buffer as shown in FIG. 42 is set as a result of AND gate 4116 generating signal SAC–A.

Command: B71 PP $\overline{\text{PB4}}$ DRX3 DVX0
Set AC

Flip-flop AC is set to indicate that a "one" should be added to the accumulators in row 4. The accumulator is started at the count of "one" in row 4 by the following condition.

Command: TY4 DCX0 AC DPA0 $\overline{\text{FD}}$

At the end of each dialed impulse flip-flop AC is set and the add command (TY4 DXC0 $\overline{\text{FD}}$ AC) becomes true to thereby advance the accumulator in row 4. At the end of each interdigital pause flip-flop FP is set at input A to indicate the existence of the interdigital pause. This condition creates the following condition.

Command: B71 PP PB4 DRX3 DPA15 DMX0
Set FP (A)

The number in the accumulator is transferred to position C in row 4 by means of the following.

Command: TY4 DXC0 FP DPC0

The shift control (FIG. 36) shifts the digit to position I, whereupon the following condition results.

$$\text{ACC1}=\overline{\text{DPI0}}$$

Similarly, the second digit is dialed and shifted to position H. The accumulator then records this digit and provides the signal ACC2 as follows.

$$\text{ACC2}=\overline{\text{DPI0}}\ \overline{\text{DPH0}}$$

After accumulating three digits the following condition occurs.

$$\text{ACC3}=\overline{\text{DPI0}}\ \overline{\text{DPH0}}\ \overline{\text{DPG0}}$$

Flip-flops TL1–2 and CT at the B option during B70 are set via logic gates 4120–23, and 4138–39 as a result of the following condition.

Command: TL4 ACC3 DTL0 $\overline{\text{TL8}}$
Sets TL1 and TL2: CT

Thereupon, the request translation flip-flop RT is set via logic gates 4014, 4019 and 4020 to indicate that the register transceiver is requested by means of the following condition.

Command: B74 AAC3 DTL3
Sets RT

Bit PE1 is written into the memory via logic gates 2120–21 and 2904 and 2900 to write MWE1 by means of the command TY7 RT. As a result, in the next multiplex cycle flip-flops KE of the carry buffer and BU1 of the register transceiver are set at their B options via AND gate 4054 which sets both of these flip-flops simultaneously as follows.

Command: B41 $\overline{\text{BU1}}$ $\overline{\text{PE4}}$ PB3=SKE–B
Set KE and BU1

*Translation*

When the register transceiver 690 becomes idle, its shift register is loaded with the first three dialed digits; processing information comprising a request for code translation and total digit; and the class of service information. The instruction information is transferred to the IN flip-flops via leads PH1–4 from the read-shift buffer as a result of the following condition which affects AND gate 4610 in the register transceiver.

Command: B71 KE BU1 PB3

Next, the AD flip-flops are set in accordance with the strapping of terminal block 5000 to store the address of the drum by means of gated pulse amplifier 5044 and AND gates 5040–41. The AD flip-flops receive this information as a result of the following condition.

Command: B71 KE BU1 PB3 PI4

Signal LOAD is generated via AND gate 5204 as a result of the following condition.

Command: KE $\overline{\text{CP1}}$ $\overline{\text{TE1}}$ $\overline{\text{LD}}$=LOAD This signal causes the following information to be transferred to the shift register shown on FIGS. 48–49 as follows:

| GPA | Command | |
|---|---|---|
| 4702 | (TY7 TX4 LOAD) | IN1–4 into NK1–4. |
| 4703 | (TY4 TX4 LOAD) | PB1–4 (row 4) into NL1–4. |
| 4704 | (TY7 TX4 LOAD) | AD1–3 into NM13, PI4 (row 1) into NM4, PC1–4 into NN1–4. |
| 4707 | (TY5 TX4 LOAD) | PJ1–4 (row 5) into NJ1–4, PB1–4 (row 5) into NB1–4. |
| 4708 | (TY4 TX4 LOAD) | PC1–4 to PI1–4 inclusive (row 4) into NC1–4 to NI1–4 inclusive. |

Furthermore, flip-flop LD is set which indicates that the shift register has been loaded as a result of the following condition.

Command: B77 LOAD
Set LD

Thereupon, the register transceiver sequences until flip-flop RF is set indicating that the information from the translator has been received via AND gate 5311. Flip-flop RF then causes flip-flop CP1 to be set via logic gates 5312–16 as a result of the following condition.

Command: B71 PE1 RF $\overline{\text{BP1}}$ . . .
Set CP1

The shift register is unloaded into the memory as a result of the following transfer commands:

G1802 TY4 CP1 KE CT
G1804 TY6 CP1 KE ULC
G1807 TY7 CP1 KE ULC
G1809 TY2 CP1 KE ULC

The information is transferred from the register transceiver into the memory via gates in FIGS. 26–34 as follows:

| | B | C | D | E | F | G | H | I | J |
|---|---|---|---|---|---|---|---|---|---|
| Row 2 | ---- | ---- | ---- | ---- | ---- | NP | NQ | NR | ---- |
| Row 4 | NL | ---- | ---- | ---- | ---- | ---- | ---- | ---- | ---- |
| Row 6 | NB | $\overline{\text{NC}}$ | $\overline{\text{ND}}$ | $\overline{\text{NE}}$ | $\overline{\text{NF}}$ | $\overline{\text{NG}}$ | $\overline{\text{NH}}$ | $\overline{\text{NI}}$ | $\overline{\text{NJ}}$ |
| Row 7 | ---- | NN | ---- | ---- | ---- | ---- | NK | NM | ---- |

Therefore, row 1 of the memory contains the following information:

Position C: TL=7 (LT=0)
Position H: IN=4
Position I: AD=8, CT=0

Thereupon, signal GRS1 is generated via OR gate 5203 by means of the following condition.

Command: GRS1=CP1+ . . .

Signal GRS1 causes flip-flop BU1 to be reset together with the remaining flip-flops as a result of the following condition.

Command: B77 GRS1
Reset BU1 and other flip-flops

Flip-flop CP1 is reset via AND gate 5317 as a result of the following condition.

Command: B77 KE CP1
Resets CP1

Since signals GRS1 is now true, PE1 is inhibited via AND gate 2120 as a result of the following condition.

Command: W7E1=TY7 (KE+PE1) $\overline{\text{GRS1}}$
Rewrite of PE1 is inhibited

Thereupon, the register transceiver is returned to idle and is released. Seven digits are then accumulated in the aforesaid manner until flip-flop RT is set at its B option via the logic gates 4018–20 as a result of the following condition.

Command: B74 ACC7 DTL7 ($\overline{KE}$ TL8 $\overline{DDE0}$
Sets RT (B)

Flip-flop RT causes the RT bit to be written into the memory via AND gate 1950 to generate signal W7B3 during sub-time slot TY7 as follows.

Command: TY7 RT
Writes W7B3 (RT)

Figure 43:
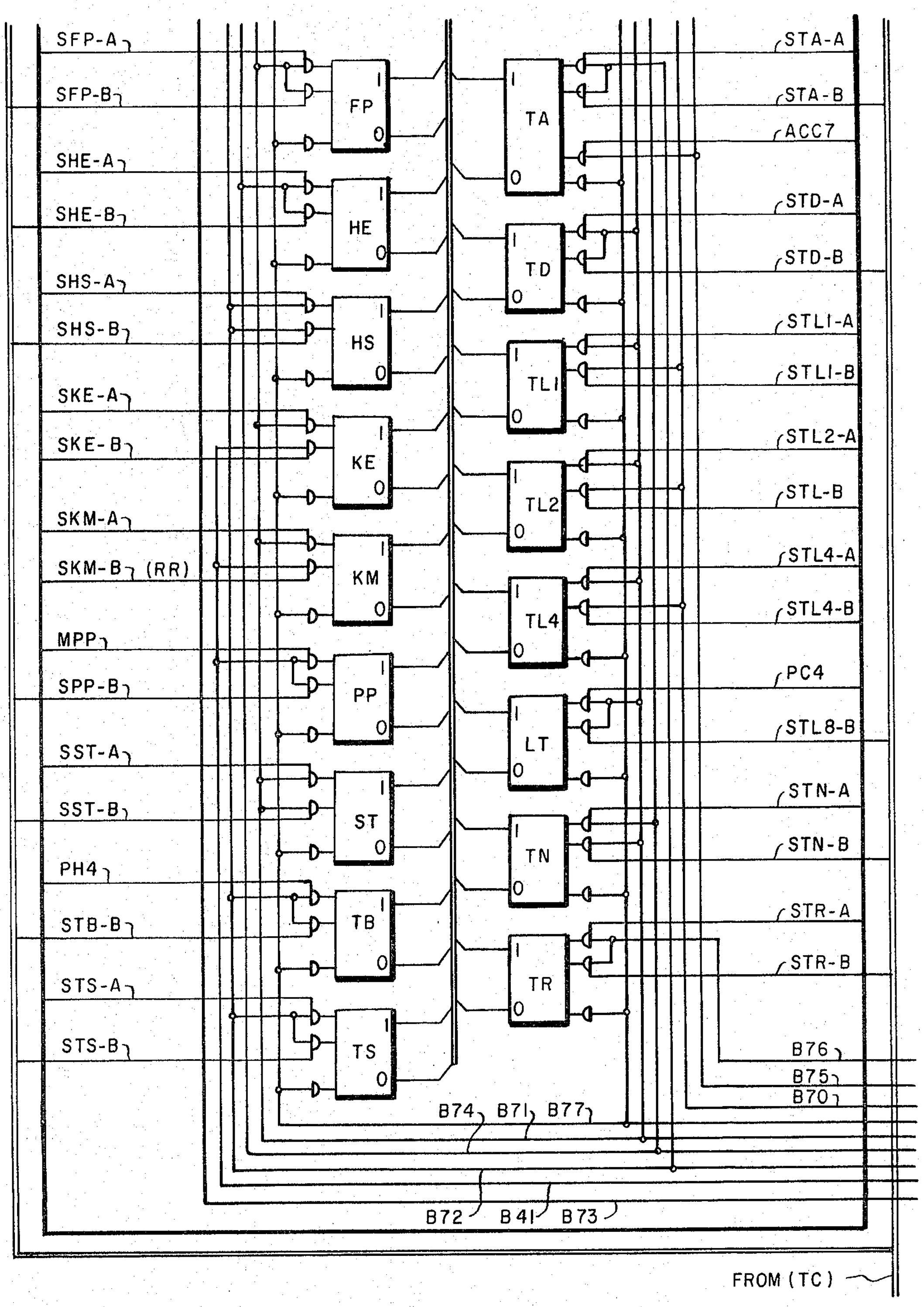
Figure 44:
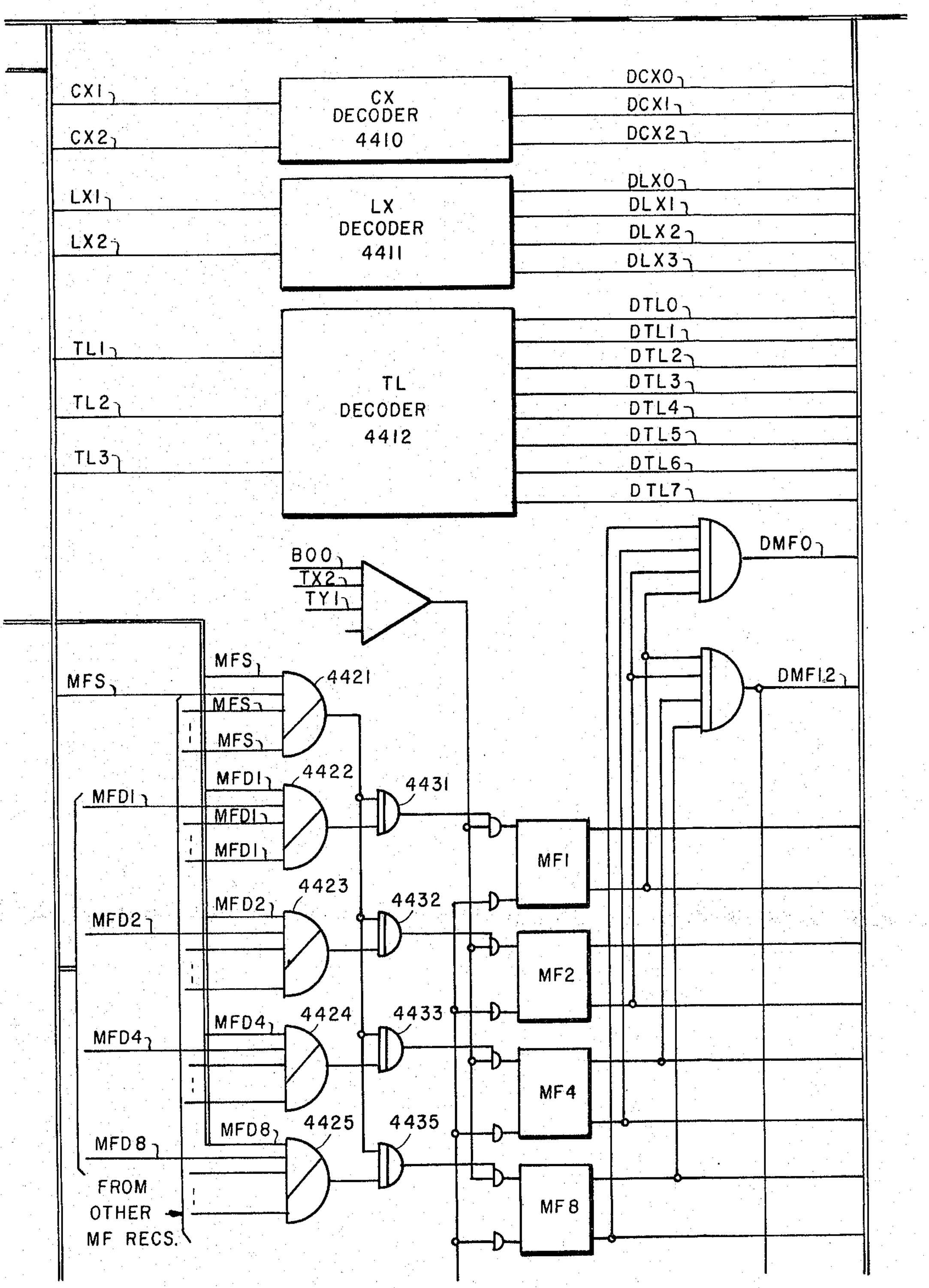
Figure 45:
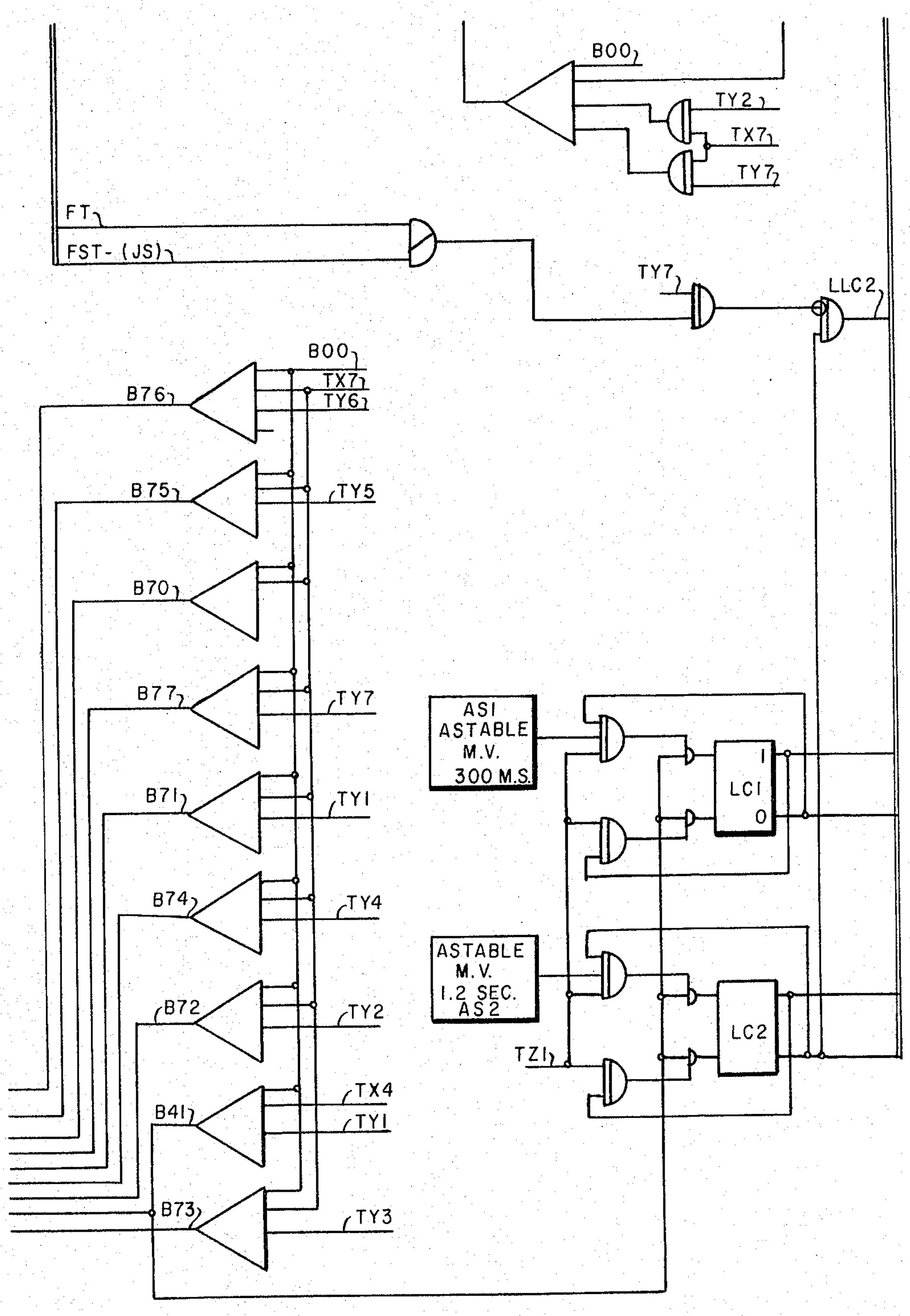

The signal PB3 via the read-shift buffer sets flip-flops KE as shown in FIG. 43 and BU1 as shown in FIG. 52, both flip-flops being set via AND gate 4054 of the carry buffer by the following condition.

Command: B41 $\overline{BU1}$ $\overline{PE4}$ PB3=SKE–B
Sets KE and BU1

Flip-flops PH1–4 are loaded into flip-flops IN1–4 of of the register transceiver with the instruction DIN=4; also, flip-flops PI1–3 are loaded into the AD flip-flops with an address of DAD=8. The condition to transfer this information is generated at AND gates 4610 and 5041 as a result of the following condition.

Command: B71 KE BU1 PB3

The command LOAD is generated for this purpose as a result of the following condition.

Command: KE $\overline{CP1}$ $\overline{TE1}$ $\overline{LD}$=LOAD

The loading commands remain the same as mentioned above. Flip-flop LD is also set as a result of signal LOAD being true as follows.

Command: B77 LOAD
Set LD

Thereupon, the register transceiver sequences until flip-flop RF is set via AND gate 5311 in response to flip-flop PR1 being set, which indicates that the information from the translator has been received. The information is then transferred from the shift register to the memory as mentioned previously; the transfer commands are the same with the exception of G1802 which only affects position B of row 4 (EP and DE). This time, however, switching digits are stored in row 6 of the memory. TL, IN, and AD are blank in row 7; MD, ES and SK are placed in row 2 with LT=1. As a result, signal GRS1 which is generated via OR gate 5203 causes flip-flops BU1 and the other flip-flops of the register transceiver to be reset as a result of the following condition.

Command: GRS1=CP1+ . . .
B77 GRS1
Reset BU1 and other flip-flops

Flip-flop CP1 is reset via AND gate 5317 upon the next multiplex cycle as a result of the following condition.

Command: B77 KE CP1
Resets CP1

The bit PE1 is inhibited via AND gate 2120 since signal GRS1 has become true. The following condition causes W7E1 to be inhibited.

Command: W7E1=TY7 (KD+PE1) $\overline{GRS1}$
Rewrite of PE1 is inhibited

The register transceiver is thereby returned to idle and is released by the register.

After all seven dialed digits have been accumulated flip-flop FD is set at the B option in FIG. 42 via logic gates 4009, 4008, 4012, 4019 and 4018 as a result of the following condition.

Comand: B70 TY4 LT ACC7 DTL7
Sets FD (B)

This condition indicates that dialing has been completed. Next, flip-flop HS is set as shown in FIG. 43 at the A option via OR gate 4040 as a result of the following condition.

Command: PH1+PH2+PH3 (ES)
Sets HS

Flip-flop HS being set indicates that the sender instructions are in storage. Flip-flop RQ is set in response to logic gates 4103–4 which indicates that the sender is requested. The following condition results.

Command: B75 ACC7 HS FD
Sets RQ (B)

At this point the sender connect state DQX0, which indicates that no sender is attached to this register advances to DQX1, request for the service of the sender-assigner. Thereupon, the sender connect states advance as follows.

Command: DQX0 RQ
Advance from DQX0 to DQX1 (request sender assigner)
Command: DQX2 LAA
Advance from DQX1 to DQX2 (connect sender)
Command: DQX2
Advance from DQX2 to DQX3 (release sender assigner)
Command: DQX3 $\overline{LAT}$
Advance from DQX3 to DQX4 (have sender)

The sender is then requested to perform its operation as per its sequence states.

Assume that sender 671 is selected, the sender assigner supplies a signal on lead SHL to set flip-flop HL. Relay driver 7454 operates to supply ground to lead SZ.

Relay 67SZ operates in response to a ground condition on lead SQ and battery via lead ESH and the winding of relay 14ES in the register junctor. Relay 14ES in the register junctor does not operate being a low resistance relay. Relay 67SZA operates in response to ground from contacts SZ–1. Relay 68CS operates from battery over its upper winding, contacts H2–2 and contacts SZA–2 to ground. Only the make contacts of relay 68CS operate at this time. Relay 68H1 operates in response to ground via lead CH and contact SZA–1. This path also provides the holding potential for the register-sender matrix 681. Relay 68RST operates via a path through contacts CS–3, CS–4 and SZA–2. This provides a locking path at contacts RST–1 for relay 68CS. Relay 68HS operates via contacts CS–2 and locks via its own contacts H2–1 and contacts H1–2.

Relay 67CP operates in response to ground via lead CP from relay driver 7406, which is operated via gate 7403, due to the condition of MMF flip-flop and DPF flip-flop both being in the zero state. The operation of relay 67CP causes relay 67SD to operate, as stop dial conditions do not occur during a local call.

The address of sender 671 is now stored in the memory of the register handling this call, and decoder logic 5610 supplies signal DSD1 during each occurrence of the register's time slot. As long as the sender remains seized, as indicated by ground on leads RLS from contacts SZA–3, each occurrence of signal DSD1 at gate 7219 causes signal SR to be generated and supplied to the sender controller, where it sets flip-flop SR.

Ground on lead IR2 from contacts CS–5 is applied through gate 7305 to set flip-flop RC. Since storage positions A and B are empty, signals AZ and BZ are true (also flip-flop SZ has not been set), gates 7271 and 7218 cause signal SM to be generated during DSD1, and sent to the sender controller where it sets flip-flop SM. The output of flip-flop SM causes signal SEQ to be generated at AND gate 2904 as a result of the condition (DEQX4 SM SR FD). Signal SEQ causes the sender sequence states logic 1930 to advance from DSX0 to DSX1 as follows: TY2 SEQ $\overline{PB4}$ $\overline{AR14}$ $\overline{SN1-RS}$ $\overline{DSX4}$ $\overline{DSX8}$. As a result W2B4 becomes true and W2C1–4 remain false.

Upon the next multiplex cycle, the outputs of the read-shift buffer for bits PB4, PC1–4 are transferred to the SS flip-flops of the sender controller during sub-time slot TY7 for storage and are decoded via decoder logic 5600, which thereby generates sender sequence state S1. Thereupon, digits $A_T$ and $B_T$ are transferred from positions I and H of row 6 of the memory to the sender via the sender controller. AND gates 5705 and 5724 are enabled during sub-time slot TY6 in coincidence with sender sequence state S1 to thereby enable AND gates 5814–17 and 5830–33, which causes positions I and H to be transferred from the read-shift buffer to leads A1, 2, 4, and 8, B1, 2, 4, and 8 via OR gates 5801–8. Since digits $A_T$ and $B_T$ are blanks for a normal local call, signal SM remains true which cause the sender sequence states to advance from S1 to S2 which causes digits $C_T$ and $D_T$ to be transferred from the memory to the sender.

Ground potential from contacts of relay 68CS extending through contacts of relays 68H1 and 67TR, via lead ECH, through the register junctor and the originating junctor on lead EC causes operation of relay 10L of the selector inlet. The selector marker, when it recognizes this request for a call, causes all line relays of the group to release except the one associated with this call. The send-receive circuit 480 of the marker is now connected via contacts of relay 10L, and the tip and ring conductors of the line, via the originating junctor, the "R" matrix to leads TS and RS, the register junctor, the RS matrix 681 to leads TH and RH and through break contacts of relay 67TR to the di-phase unit of the sender.

The selector marker sequence circuit supplies a "connect" digit (1010 1010) into the shift register which is then sent to the sender shift register. In the sender circuits, the signals PF–1 and RC–1 enable gate 7321 to set the flip-flop EOR. The signals SZ–0 and EOR–1 enable gate 7307 to set the flip-flops SZ and LD. The signals LD–1 via gates 7024 and 7025 along with signal RC–1 enable the gated pulse amplifier 7003 to clear the shift register and reset flip-flop RC. The signal condition (Z BF1–0 BF2–0 TR–0 RC–0 LD–1) enables gate 7040 to set flip-flops TR, PF and SF. At the same time signal LD–1 enables the gated pulse amplifier 7002 to lead the $C_T$ and $D_T$ digits into the shift register and reset flip-flop LD. The signal TR–1 via gates 7726 and 7727 sets the flip-flop CL to clear the A and B storage positions. Flip-flop CL then resets. Signal SM is generated to request more digits. The sender sequence states advance from S2 to S3 to S4 to S5 as a result of signal SM being generated and remaining true each multiplex cycle. During state S5 the digits $H_T$ and $T_T$ are transferred from row 6, positions E and D of the memory to the storage positions A and B of the sender.

The two digits $C_T$ and $D_T$ in the shift register are transmitted to the selector send-receive circuit 480.

The selector marker then uses these two digits to identify the level, and to scan for an idle outlet in that level. Assuming that the selected outlet is via crosspoint 1017, the marker causes crosspoints 1012, 1014 and 1016 to operate in series over their lower windings to thereby extend the connection to the terminating junctor; which returns ground on lead CO to hold the crosspoints in series with the cutoff relay 25CO. The send-receive circuit 480 then transmits a "clear" instruction (0000 0000) to the sender, and the marker releases.

In the sender after the two digits have been sent and the shift reigster has all zeros, the signal condition (Z BF1–0 TR–1) at gate 7313 resets flip-flop TR and sets flip-flop RC so that the circuit is ready to receive.

When the flip-flop EOR is set at the end of receive, gate 7334 recognizes the all zero condition by the signals SAZ and SBZ being true and via gate 7338 resets flip-flop SZ and also supplies the signal via gate 7023 to enable gated pulse amplifier 7003 to clear the shift register and other flip-flops. The conditions are now the same as at initial seizure so that gate 7305 is enabled to set flip-flop RC. The circuit is now ready to receive from the line group marker send-receive circuit.

When the line group marker recognizes the call signal it causes its send-receive circuit 280′ (FIG. 11) to transmit a "connect" signal which is received in the sender shift register. When the prefix bit is received gate 7321 sets flip-flop EOR, which enables gate 7307 to set flip-flops SZ and LD. The signals LD–1 and RC–1 enable gated pulse amplifier 7003 to clear the shift register and reset flip-flop RC. Gated pulse amplifier 7002 is enabled to load the shift register and reset flip-flop LD. At the same time the flip-flops TR, PF and SF are set. The signal PR–1 via gates 7726 and 7727 sets flip-flop CL to clear the A and B storage positions, after which flip-flop CL resets. The signal SM at the output of gate 7218 becomes true and is supplied to the sender controller which causes the sequence to be advanced to S6, and another two digits, the units and party digits from row 6, positions C and B to be supplied to the sender A and B storage positions.

The two digits, hundreds and tens, which have been loaded in the shift register are transmitted to the line group marker send-receive circuit 280′. When the signal Z becomes true at the end of transmit, gate 7313 is enabled to reset flip-flop TR and set flip-flop RC to prepare for receiving.

The line group send-receive circuit returns the signal "incomplete." At the end of reception the output from gate 7321 sets flip-flop EOR. The signal "incomplete" from output 15 of decoder 7100 enables gate 7308 to set flip-flop LD. The signal LD–1 enables gate 7040 to set flip-flops TR, PF and SF and at the same time signal LD–1 enables amplifier 7002 to load the shift register and reset flip-flop LD. The signal TR–1 via gates 7726 and 7727 sets the flip-flop CL to clear the A and B stores, and flip-flop CL resets. The signal SM is generated at gate 7218. The sequence is advanced to S7 in response to signal SM. The $Q_T$ digit is transferred from position J of row 6 of the memory to the sender via the sender controller. This digit is blank and therefore signal SM remains true to advance the sequence to S8 upon the next multiplex cycle. Thereupon, the sender controller generates the signal LES via logic gates 6014, 6020, and 6021 in order to return signal LES to the sender, thereby setting flip-flop ES. The two digits, units and party, in the shift register are transmitted to the line group marker send-receive circuit 280′. When the signal Z becomes true at the end of transmission the gate 7313 is enabled to reset flip-flop TR and set flip-flop RC to prepare for receiving.

The line group marker now has sufficient switching information to identify the called line, which we have assumed to be at station 1101.

*Line idle*

A busy test is made of the called line, and if it is idle the marker scans for an idle path and if it finds such a path supplies the pull potential to set up the connection. For example the crosspoints 1132, 1134, 1114 and 1112 in matrices E, D, B and A respectively may be operated. The party digit has been supplied via leads TA, TB, TC, and TD and contacts of relay TKS to the terminating junctor to designate the ringing signal.

In the meantime the send-receive circuit 280′ transmits the instruction "line idle" to the sender.

A ringing signal is transmitted to the called line and ringback tone is transmitted to the calling line from the terminating junctor (see U.S. patent application 230,887 for details of how this is accomplished). The call from now on is supervised by the terminating junctor.

The line idle signal from output 12 of decoder 7100 via gate 7126 and gate 7494 is supplied to gate 7495, which in coincidence with signal ES–1 enables relay driver 7446. This supplies ground on lead ESL which causes relay 67SZ to restore. This causes the other relays in FIGS. 67, 68 and 69 to restore. The signal is also forwarded via lead ESH to the register junctor to cause it to release. A signal is also supplied via gate 7131 to gate 7023. At the end of receive the signal at gate 7334 becomes true and is supplied via gate 7338 to gate 7023. The output of gate 7023 then enables gated pulse amplifier 7003 to reset the shift register and other flip-flops.

*Line busy*

If the called line is busy, the line group send-receive circuit will return a "line busy" instruction instead of "line idle," which in the sender appears at output 13 of decoder 7100. This signal via gates 7128, 7131, and 7023 enables amplifier 7003 to clear the shift register and reset other flip-flops. From gate 7128 the signal is also supplied to operate relay driver 7428, which connects battery potential lead BY. The register junctor recognizes this signal to release the register and the sender. Busy tone is supplied to the calling party from the terminating junctor.

*Resend*

The resend feature according to the invention makes use of a special reed-type relay 68CS of the type disclosed in the copending U.S. patent application for a Control Circuit, Ser. No. 204,936, filed June 25, 1962. The resend feature also makes use of a relay 68RST which has a shorted winding for slow release. It will be recalled that upon initial seizure of the sender, relay 68CS operated by its upper winding and contacts H2–2 and SZA–2. This causes only the make contacts of relay 68CS to operate. The ground from contacts SZA–2 then extends through contacts CS–4 and CS–3 to operate relay 68RST. This provides a holding path for relay 68CS via contacts RST–1 after relay 68H2 operates. Ground from contacts RST–2 extends via lead MTB to the di-phase controller circuit to override any output signal from gate 7117, and thereby prevent such signal from reaching the recorder lead at the output of gate 7129.

Either marker after receiving switching digits may return the "resend" instruction in place of one of the other instructions when transmission occurs from a marker send-receive circuit to the sender di-phase transceiver. This signal will appear at output 14 of decoder 7100 and applied to gate 7115. Also the sender itself may generate the resend command. For example if the di-phase transceiver upon the receipt of signals does not have parity, the signal PC–1 enables gate 7114. It is also possible to generate the resend command in response to any other fault condition, although not shown in the drawings herein. In any case at the end of receive the signal EOR–1 enables both gates 7114 and 7115, and the output from either of these gates will set the flip-flop RS and apply a signal through gate 7116 to gate 7117. As already noted the signal at the output of gate 7117 is not effective because its output is grounded by lead MTB. Flip-flop RS operates a relay driver to apply ground to lead RSC. Relay 28CS now has both of its windings energized, and because they are differentially wound the relay restores. This removes ground via contacts CS–4 from relay 68RST, and also removes the call signal ground at contacts CS–1 from lead ECH. This causes the terminating switch train to release. For example if the connection has been extended to the terminating junctor of the called line group, removal of ground from lead ECO at the point of the terminating junctor causes the terminating junctor to release, which in turn removes ground from lead CO which causes the selector to release. After approximately 50 milliseconds relay 68RST restores, which removes the ground potential from the upper winding of relay 68CS, and also removes ground from lead MTB. The ground on lead RSC to the lower winding is now effective to cause relay 68CS to operate all of its contacts, thereby reapplying ground at contacts CS–1 to lead ECH to again operate the line relay 25L in the selector inlet circuit.

The resend signal from the output of gate 6116 is also supplied to gate 3249, so that upon appearance of the signal DSD1 the signal SN1–RS is transmitted to the register controller logic 1930 to return to sequence state SO. This causes the register to return to the beginning of the sender sequence operation, so that a completely new attempt is made using this same sender transmitter to complete the connection.

Since break contacts CS–3 are operated to their open condition relay 68RST now remains restored, and there is no ground on lead MTB. Therefore if a second resend command occurs it will be supplied via gate 7117 and gate 7129 to generate the reorder signal, which in turn is applied via gate 7499 to operate the relay driver 7402.

*Trunk busy*

If a "trunk busy" instruction is returned via one of the markers it appears at output 1 of decoder 7100 and via gates 7127 and 7129 generates the reorder signal. This signal via gate 7499 operates relay driver 7402 to apply ground potential to lead BY. This signal is transmitted via lead BYH to the register junctor, where it is recognized and among other things applies ground via the lead BY through cross-point 6418 of the "R" matrix to operate relay 64BT in the originating junctor. At this point 120 i.p.m. busy tone is returned to the calling line. The register and the sender are released.

Note that if three stop dial indications are counted by relays 68S1–4, this designates that the trunk is busy at the distant office, and ground is applied via contacts S2–1, S1–2, S4–1, and S3–1 to lead BYH. This causes 120 i.p.m. busy signal to be supplied to the calling line, and the sender and register to release.

*Disconnect*

The usual sequence of operation for disconnect begins in response to the sender signal SR becoming false. The sender assigner sequence states are advanced from DQX4 to DQX5 as follows.

Command: DQX4 $\overline{\text{SR}}$
Advance from DQX4 to DQX5 (sender finished)

Thereupon, the sender assigner sequence states advance from DQX5 to DQX6 upon the next multiplex cycle as follows.

Command: DQX5
Advance from DQX5 to DQX6 (disconnect)

However, during state DQX5 a "1" is written into bit B3 of row 2 in the memory which sets flip-flop DS during interval B72. Signal W2B3 is generated as follows.

Command: TY2 DQX5
Writes a "1" in W2B3

Flip-flop DR is set at its A option as follows.

Command: B71 DRX3 $\overline{\text{PB4}}$ DPA12 DMX0 PP
Set DR (A)

The register and disconnect sequence states advance from DRX3 to DZX1 as shown in FIG. 66 as a result of the following condition.

Command: DRX3 DR $\overline{\text{DVX2}}$
Advance from DRX3 to DVX1 (pre-disconnect)

Flip-flop DS is set in response to bit PB3 becoming true which indicates a disconnect sender condition as follows.

Command: B72 PB3
Set DS

When both flip-flops DS and DR become set, which indicates a disconnect sender and a disconnect register situation, the register and disconnect sequence states advance from DVXI to DVX2 as follows.

Command: DVX1 DS DR
Advance from DVX1 to DVX2 (disconnect)

Flip-flop CE in the carry buffer is set via logic gates 4113–14 at the A option as follows.

Command: DVX2 MDC ($\overline{PF1}$ $\overline{PF2}$)
Set CE

Thereupon, the register and disconnect sequence states DRX1 and DVX0. It can be noted that there are other possibilities for returning to the idle state as indicated in the various state diagrams and tables.

Figure 1:
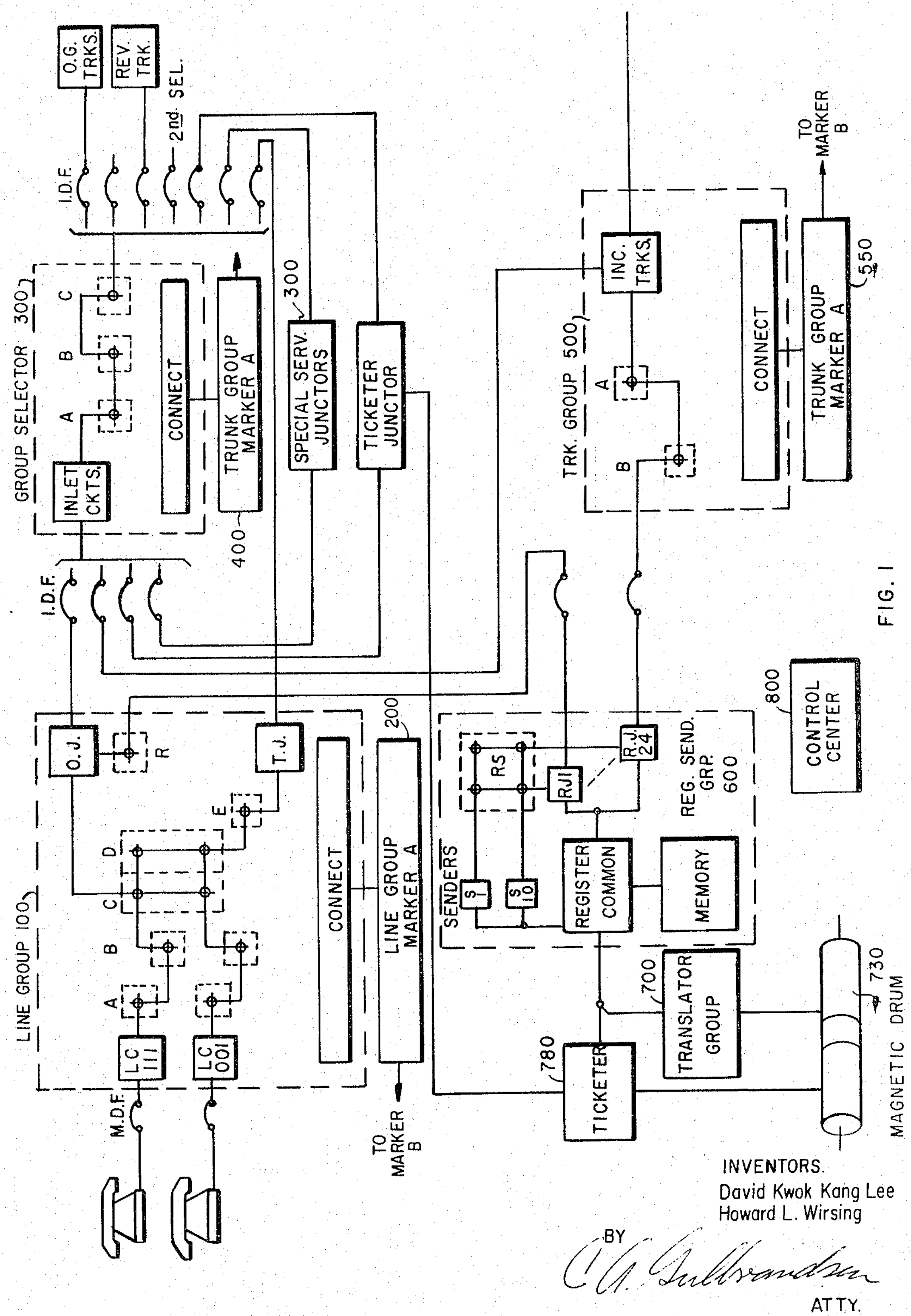
Figures 1A, 2:
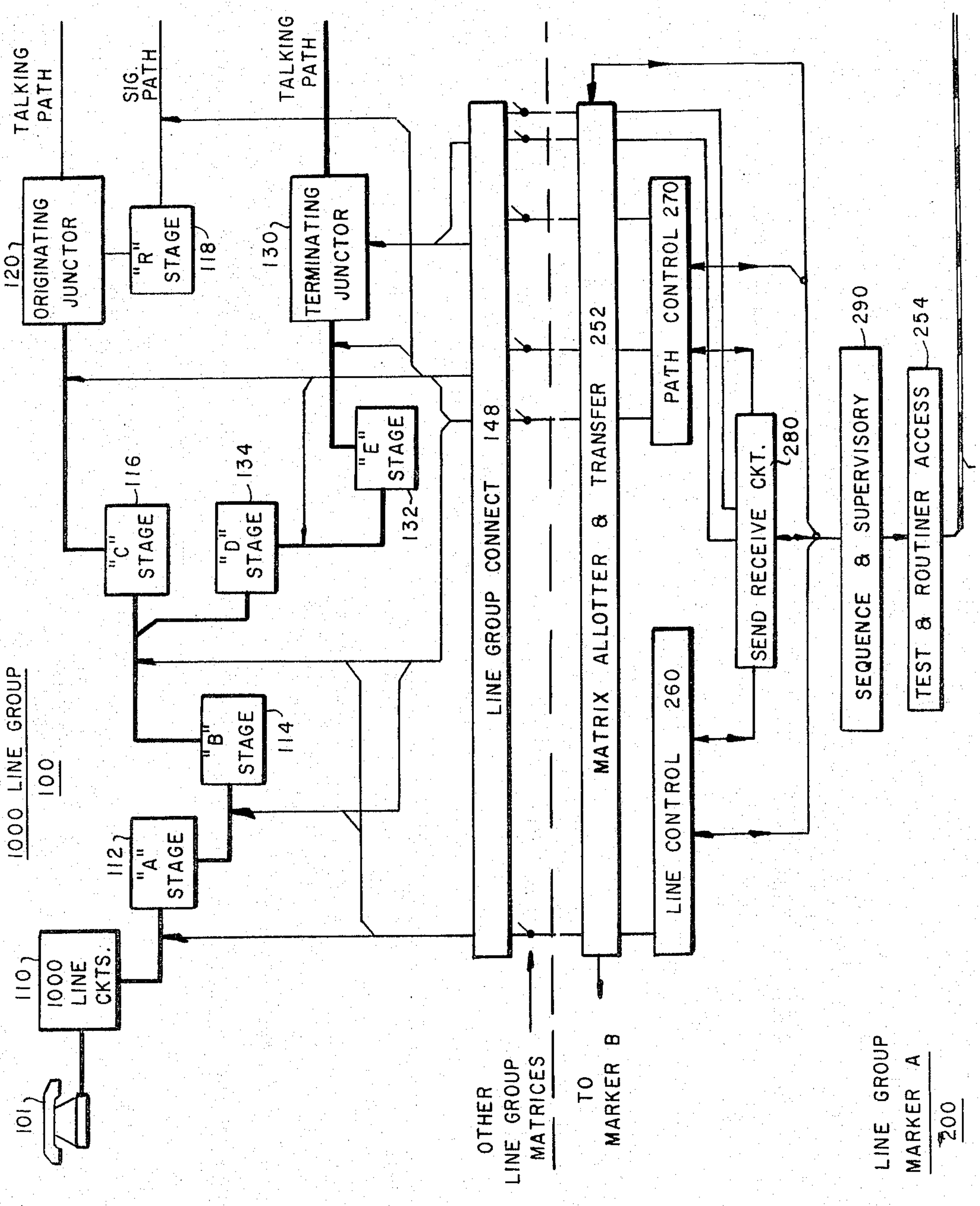
Figure 4:
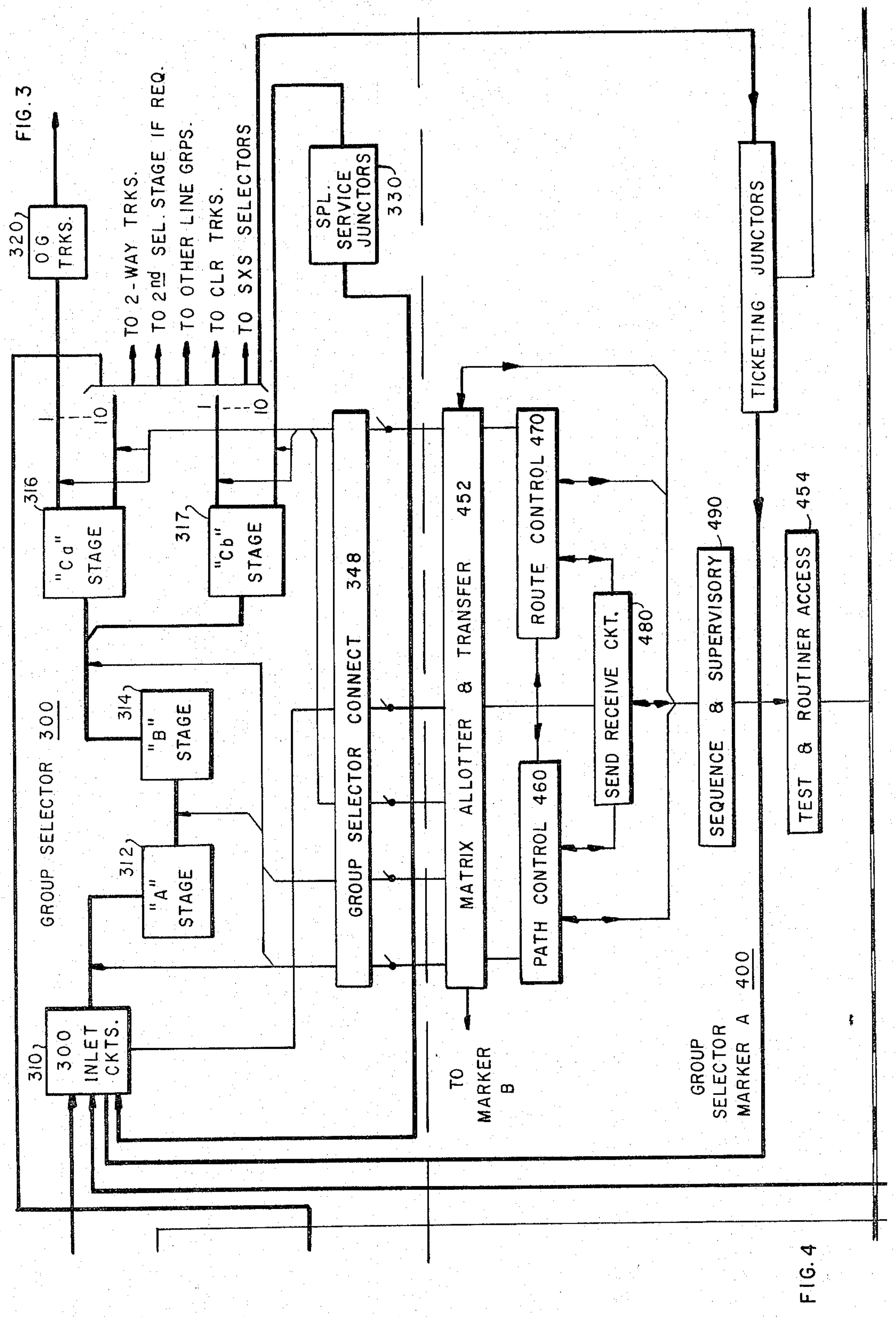
Figure 5:
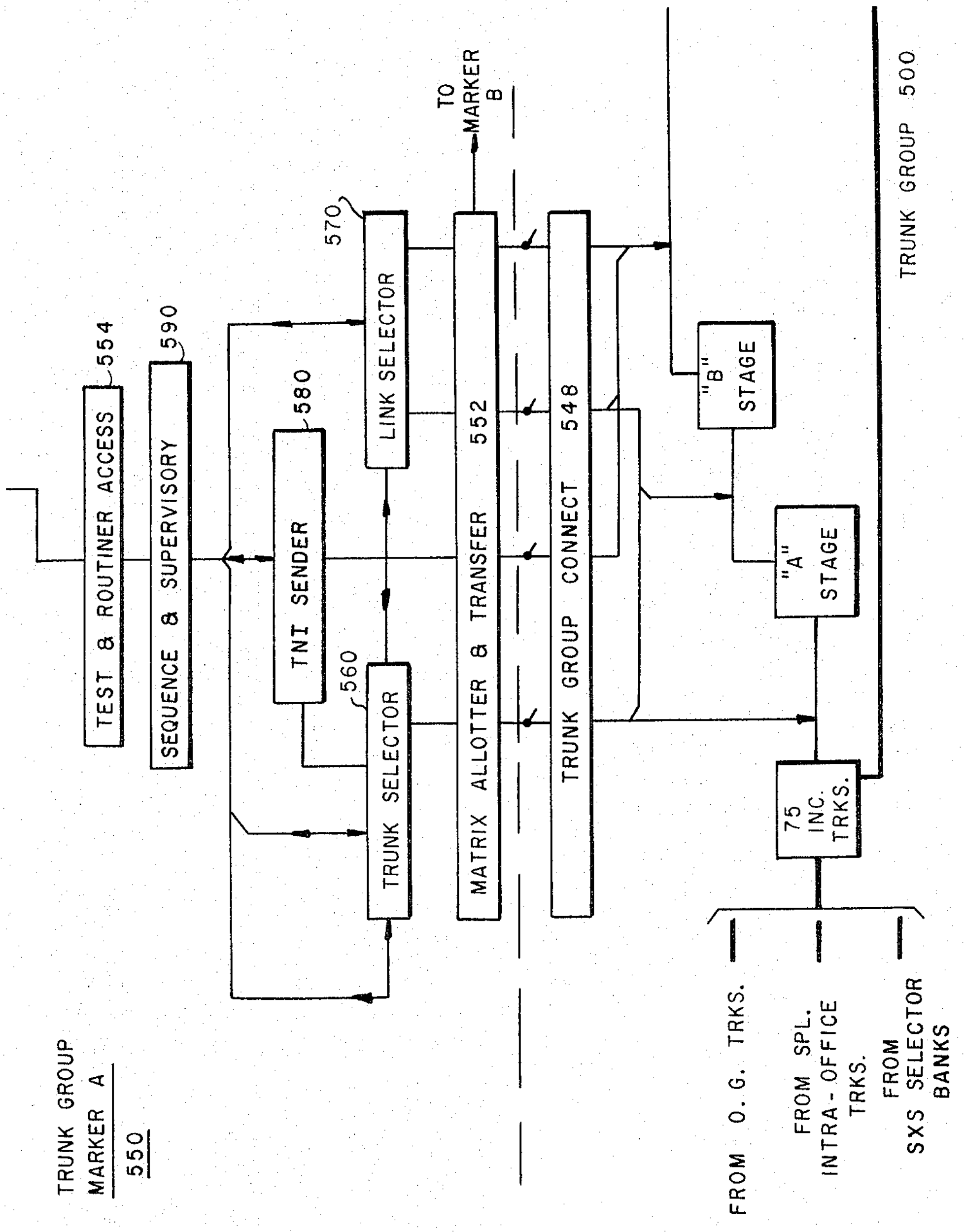

C(2)(*a*)(1) *Revertive call.*—The group selector outlets include a level to revertive call trunks, such as REV TRK shown in FIG. 1. The system is provided with two arrangements to reach this level, (1) special code dialed, and (2) directory number dialed. The trunk REV TRK provides for supervision of the call including battery feed, ringing, answer supervision, etc. back through the selector and the originating path of the line group to the line to which the stations of both parties are connected.

For special code dialing, the translator returns the switching digits and process digits to reach a selector outlet to a trunk circuit REV TRK.

For directory number dialing, the translator returns switching and process digits as for an ordinary local call, along with delete digit 5 to designate that the call is possibly a revertive call. This digit is decoded in the register transceiver as DNL5 and along with CP1 at gate 4610 generates signal REV, which is supplied to gate 4059.

On all calls the parity circuit 3910 compares the digits NC1–4 to NG1–4 inclusive as received in the shift register of the register transceiver with digits PE1–4 to PI1–4 inclusive from row 5 of the memory. The digits in the register transceiver shift register are the equipment location number of the called line, and the digits from memory row 5 are the equipment location number of the calling line. If they are the same, parity circuit 3910 generates signal REV CALL. The output of gate 4059 becomes true and along with A.C. command B75 sets flip-flop RC. Signal RC at gates 2311 and 2321 causes generation of write signals in row 1 (TY7) bits J1 and J2, which in the next multiplex cycle via gates 4057 and 4058 sets flip-flops LX1 and LX2, which is decoded as DLX3. This along with the condition $\overline{DLX0}$ causes the special switching digits to be inserted (FIGS. 32 and 33) into positions H and I of row 6 of the memory.

When a sender is seized it supplies these digits $A_T$ and $B_T$ from rows 6, positions I and H to the selector to cause completion of the connection to trunk REV TRK.

C(2)(*b*) *Outgoing call.*—The operation for an outgoing call is similar to that for a local call except for the process and switching digits from the translator down to the point at which the sender transmits two switching digits to the group selector send-receive circuit 480. The selector marker may establish a connection via a primary route, or if it finds that it is unable to do this it may itself select an alternate route and establish the connection accordingly. Also the outgoing trunk selected may or may not require ticketing. Assuming that the outlet selected is via crosspoint 1017 the selector marker operates crosspoints 1013, 1015 and 1017 in series over their lower windings. The outgoing trunk circuit applies ground to lead C to hold these three crosspoints over their upper windings in series with the cutoff relay 10CO.

If this outlet is via the primary route and there is no ticketing information the selector send-recive circuit 480 will merely return the "clear" signal which will be recognized at gate 7334 by the signals SAZ and SBZ being true at the end of receive, and a signal will be supplied via gate 7338 and gate 7223 to the gated pulse amplifier 7003 to reset the shift register and other of the flip-flops.

If the selector was unable to complete the connection via the primary route and has selected an outlet via an alternate route, the send-receive circuit 480 returns an alternate route digit in the first position of the shift register. Flip-flop SZ remains set so that signal SZ–1 is true. Also end of receive has occurred so that signal EOR–1 is true, and signal LD–0 is true so that in the time slot of the register when signal DSD1 becomes true gate 7346 is enabled. This in turn enables the gates to the sender controller so that the alternate route digit is transmitted via gates 7250–7253 to the sender controller via gates of FIG. 61 to leads MAR1, 2, 4, 8 and via gates in FIGS. 21 and 29 for storage in the memory. The sender controller to acknowledge recognition of the digits sends the signal on lead DB–1 which via gate 7222 sets flip-flop DR. Since there is no ticketing digit, signal SBZ is true. The signal DSD1 inhibits gate 7333 until after the end of the register time slot. Then in response to the signals SBZ and DR–1 gate 7333 is enabled to reset flip-flops SZ, DR and LD, and also to supply a signal via gate 7023 to enable gated pulse amplifier 7003, which resets the shift register and other flip-flops of the di-phase controller.

The alternate route digit causes change of the processing of the call such as modification of the skip digit (FIG. 62) to use alternate digits already provided by the translator.

If the connection is via a trunk which requires ticketing, the group selector identity will appear in the second position of the shift register (SB1–SB8). In this case also at the end of receive when the time slot of the register occurs we have the signal condition (SZ–1 LD–0 EOR–1 DSD1) to enable gate 7246 and this signal is supplied to gates 7249–7257. The ticketing digit identifying the selector group is supplied to the sender controller from gates 7254–7257 and via gates in FIG. 21 to leads MGR1, 2, 4, 8 to FIG. 26. Signal SGR from gate 6039 enables gates 2626, 32, 38, 44 to store the digit in row 3, position B of the memory. There may or may not also be an alternate route instruction digit, and if there is it is also supplied to the sender controller from the output of gates 7250–7253. The sender controller upon recognition of the digits returns the signal DB–1 which via gate 7222 sets flip-flop DR. At gate 7020 the signal SBZ is not true so it does not inhibit the gate and the other inputs thereto are all true. The output from gate 7020 sets flip-flop LZ, and also via gate 7024 and 7025 is supplied along with signal RC–1 to enable gated pulse amplifier 7003 to reset the shift register and other flip-flops. The signal LZ–1 via gate 7039 is supplied to gate 7040. All of its other inputs being true, gate 7040 is enabled to set flip-flops TR, SF and PF. There is no A.C. set signal to the other flip-flops of the shift register, and therefore we have a load zero condition. This signal is transmitted to the selector send-receive circuit 480 which returns two additional ticketing digits identifying the particular outlet from the selector, which stored in position J, rows 3 and 4. At the end of receive and in the time slot of the register gate 7246 becomes enabled to supply the input control to the gates 7249–7257 and the two digits are sent to the sender controller from the outputs of gates 7250–7257. The sender controller upon recognizing the digits returns the signal DB–1 which via gate 7222 sets flip-flop DR. After signal DSD1 becomes false the signals LZ–1 and DR–1 enable gate 7335 which via gate 7338 resets flip-flops SZ and LZ, and also via gate 3023 enables gated pulse amplifier 7003 to reset the shift register and other flip-flops. The di-phase controller is now cleared.

Note that on a ticketing call the selector transceiver transmits to the sender di-phase transceiver three times, and that the flip-flops SZ and LZ together count these receptions. During the first reception, which is the connect signal, flip-flops SZ and LZ are both in the reset condition; during the next reception which is the first set constituting the alternate route and first ticketing digit flip-flop SZ is in the set and flip-flop LZ is in the reset condition; during the next reception which is the second set of ticketing information both flip-flops SZ and LZ are in the set condition.

On a ticketing call, if there is a failure of ANI (automatic number identification of calling party), the signal DLX2 becomes true and causes digits to be placed in row 6, positions H and I to cause the connection to be routed to a CKO (checking) operator.

*Dial pulse and multi-frequency sending controller*

On outgoing calls, after the last two digits required to establish the connection to the outgoing trunk have been sent by the transceiver and the sender requests additional digits, the sender controller signals the sender to switch to dial pulse mode by a signal on lead LDP to operate the flip-flop DPF, or multi-frequency mode by a signal on lead LMF to operate the flip-flop MFF, as may be the case. At the same time digits from the sender controller are loaded into the A and B flip-flops. Relay driver 7406 restores to remove ground from lead CP, which permits relay TR to operate in series with relay CP before relay CP restores. Relay TR locks at its own contacts, and at other contacts transfers the line leads TH and RH from the di-phase transceiver to the repeat coil and the loop supervisory relay SU, so that the dial pulse or multi-frequency pulse train may be transmitted to the outgoing loop.

The sending operation centers around the counter C, which has a normal position in count 12.

*Dial pulse call*

Assuming the call is to be dial pulsed, when the trunk connect signal is recognized by operation of the loop supervisory relay SU and no stop dial indication exists, the counter starts advancing one count on each on-hook period of the dial pulse train at lead DP, using gates 7708, 7710, 7711, 7713, and 7738 to control flip-flop CC and counter C by the pulse train on lead DP. At gate 7491 the signal on lead PB–0 is continuously true at this time, so that the relay driver 7893 remains operated and keeps the loop closed. Therefore the outpulsing does not commence until the counter passes through count 15 into count 0, at which time the signal CZ at the output of gate 7628 becomes true. When the flip-flop CC is in the reset state the D.C. set input to flip-flop PB is enabled to set this flip-flop upon the occurence of signal B70, thereby removing the pulse blocking condition at gate 7491. The count from 12 to 0 provides time delay (between 300–400 milliseconds) to allow the distant office to prepare to receive pulses and to return the stop dial indication, when required. If this indication is returned, relay SD operates and through contacts of relay SU supplies ground on lead SD, which inhibits gate 7713 so that the counter remains in the count at which the stop dial has occurred until it is removed.

There is storage for two digits in stores A and B. The two digits are outpulsed alternately (starting with the A position), if both positions have a digit stored in them. If only the B store has a digit, and the A store is blank, the signal AZ at the output of gate 7614 is true and causes flip-flop DB to be set via gates 7615 and 7617 upon the occurrence of signal B70 which immediately enables the circuit to transmit the B digit. At all times, when leaving the even position, the stored digits are erased and the sender controller is requested to supply additional digits.

Assuming that digits are present in both storage positions, when the flip-flop PB operates upon reaching the off-hook period of the count 0, the loop control gate 7491 is enabled and the output from the coincidence circuit is enabled at gate 7688. The signal on lead DB–0 is true and enables the gates 7463 to 7466 via gates 7455 and 7457 from the A store to the coincidence circuit. From this point the line loop is controlled by the output from flip-flop CC at the gate 7491 with the line loop being open during each on-hook period of the pulse train. When the coincidence between the digits stored in the A position and the digit in the counter is recognized, the signal from the coincidence circuit through gate 7688 and through gates 7629 and 7643 causes the counter C to be advanced to count 10 upon the next occurrence of pulse B70, and this same signal resets flip-flop PB. The coincidence signal from gates 7629 and 7643 through gate 7615 and 7617 also sets the flip-flop DB, to thereby disable the gate 7455 and enable the gate 7459 so that the coincidence circuit views the B digit. With flip-flop PB reset the output from the coincidence circuit is inhibited and gate 7491 remains true to lock the pulse repeating relay driver 7893 in the closed position, thereby preventing further pulsing. The counter C now continues stepping from count 10 up to count 0 (unless the stop dial occurs to inhibit gate 7713 in which case it will wait until it is removed). Counts 10 through 0 provide approximately 640 milliseconds interdigital pause. When count 0 is reached the operation is essentially repeated to transmit the digit from the B position.

At the end of the transmission of the B digit the coincidence signal at the output of gate 3643 through gate 7619 in conjunction with the signal on lead DB–1 being true enables gate 7620 to reset flip-flop DB and to set flip-flop CL. The signal CL–1 causes the flip-flops of stores A and B to be reset, which causes the signals AZ and BZ at the outputs of gates 7614 and 7618 respectively to become true, together with the output from gate 7623. Flip-flop CL also resets. (It may be noted here that as long as there is no digit in either A or B position (AZ BZ) the gated pulse amplifier 7738 is not enabled so that the counter cannot advance. This will not normally effect the counter, since the maximum time from the request for the digit until the digits are delivered is only 20 milliseconds, except in the cases of early outpulsing when digits to be sent out may not as yet have been dialed by the subscriber. In the latter case the counter will not be advanced until the digit becomes available.) The signal SM is generated to transmit a request for additional digits to the sender controller. The succeeding digits will be outpulsed in a similar manner. After the last digit has been outpulsed and this circut requests additional digits, the sender controller indicates by signal LES, which sets flip-flop ES, that no digits remain to be outpulsed. These conditions cause the sender to release. The counter C advances until it reaches count 12, and the output from gate 7702 inhibits gate 7701 which removes the enabling signal from the lower input of gate pulse amplifier 7738.

*Multi-frequency sending*

The initial operation for multi-frequency sending is similar to that of dial pulse sending. The counter starts from count 12, but follows the MF pulse train at gate 7709 (nominally 7 pulses per second, 50% duty cycle). The sending does not begin until count 1 is reached. The period of count 12–16 provides some 500–640 millisecond delay to allow the distant office to prepare for the receipt of digits and to return the stop dial condition. Stop dial is always expected from offices equipped to receive MF tones. If count 16 is reached and no stop dial condition has occurred, this circuit signals "reorder" to the register junctor and the sender is released.

If the stop dial occurs prior to count 15, at the end of the stop dial, ground on lead ESD enables gate 3703 and 3704 to advance counter C by means of gated pulse amplifier 3738 by following A.C. pulse train (18 kc.) to count 15. This feature is provided to avoid unnecessary delays in the resulting holding of the MF equipment at the distant office. At count 15 flip-flop C15 is set which inhibits gate 7703.

Either both positions or only one of the two stores may contain digits, which is the same as the case for dial-pulse sending. If digits are always available in both positions, a digit is sent on each count of counter C; the digit in store A is sent on the odd count which corresponds to C1 being true, the digit in store B on the even count. In each count the 70 millisecond tone-on period is followed by a 70 millisecond tone-off period (assuming 7 pulses per second, 50% duty cycle). Sending from store A is controlled by gate 7456 and sending from store B is controlled by gate 3458. The exception to the above is the KP digit, which is always the first digit to be sent, is always stored in position B, and the tones for this digit are connected to the line during the tone-off period of count 1 the tone-on period of count 2 (140 milliseconds).

After the counter has advanced to 15 setting flip-flop C15 and thereby inhibiting gate 7703, the advance control for counter C is resumed by the MF pulse train in gate 7709. In counter state zero flip-flop PB is set, thereby supplying input signals to gate 7456, 7458, and 7460 so that sending can commence. Sending is accomplished by relay drivers 7409 to 7413 which are connected through various gates to the A and B stores. The KP digit has the value 11 and is gated through gates 7467 to 7470 under the control of gate 7460 which is enabled by the KP digit itself and continues through count 2 by means of gate 7458 during the tone-on period of count 2.

At the beginning of the tone-off period in each even count, flip-flop CL is set in response to gates 7725, 7726, and 7727, thereby causing the storage positions to be cleared and the sender controller is requested for additional digits by the generation of signal SM. The digits are received during the same tone-off period from the sender controller. The next digits are sent from stores A and B alternately under the control of gate 7456 during the odd count and gate 7458 during the even count.

If only one position contains a digit, the counter remains in the count associated with the blank position only momentarily and then advances to the next position. If the digits are placed in both positions, the counter will continue following the MF pulse train during the tone-on period of count 3, the digit in the on position is gated and during the tone-on period of count 4 the even position is gated. Upon the tone-off period of count 4 the digit is cleared from the storage and the new digits are requested.

When a blank position is encountered gate 7706 allows the counter C to advance to the next count and gate 7707 allows the counter to advance for the even position being blank.

While the arrangement shown herein provides that each sender transmitter of the group is universal by providing the three modes, code pulse, dial pulse, and multi-frequency; it is apparent that the individual senders can be specialized as to mode, in which case the group of senders would still provide the universal requirement.

C(2)(c) *Incoming Call.*—Access is provided for an incoming call via incoming register junctor 624, or any other incoming register junctor that may be provided, to receive dial pulse, multifrequency, or push-button dialing information. This information is then transferred to the register's memory.

The multi-frequency digit entry appears in both row 3 and row 4 of position C in the memory. The multi-frequency entry is provided at OR gates 4421–25 which are enabled by leads MFD1, 2, 4, and 8 from an incoming register junctor.

An incoming call can either be a local terminating or a tandem call. When, for example, an intertoll (1A1) operator code call originates on a toll trunk, a conflict in dialing patterns arises. A local 1A1xxx type of DDD station-to-station call has a conflicting code. This problem is solved by analyzing the class of service information.

D. CONCLUSION

The register-sender group described above enables the switching system to provide many capabilities, such as handling both local and incoming calls.

The E–A–X register is "universal," in that it will accommodate local, incoming, and tandem traffic; different registers for incoming trunks and for local lines are not required. Besides the codes that subscribers are authorized to use, all special codes such as TTC (Toll Terminating Center), toll test, and operator codes will be handled.

Analysis is made to differentiate between conflicting dialing patterns such as inter toll (1A1) operator codes originating on toll trunks, and local 1A1xxxx DDD station-to-station codes.

*Storing dialed digits*

In the common control, temporary storage is provided, on a per-register basis, for up to 13 dialed digits.

*Inserting digits.*

Prefix routing digits, special handling codes, area and office codes, etc., may be added to or may replace the dialed pattern. An eight-digit insertion capability is provided for this purpose.

*Receiving touch-calling, multi-frequency, and dial pulses*

Any combination of receiving modes may be used in the accumulation of digits.

*Transmitting MF dial and code pulses*

The senders also are universal, in that they provide all modes of sending required by the system. For intra-office signalling a high-speed code-sending technique is used, while for sending to an outlying office the senders provide for either dial-pulse or multi-frequency signalling, as required by that office. Sending modes may be changed while in the process of routing an individual call.

*Accumulating information for ticketing*

Storage is provided, on a per-register basis, for the called and calling directory numbers, for use when ticketing is required.

*Converting codes*

As a result of the two-way communication that exists between the markers and the register sender group, the register is prepared to change its outpulsing pattern if requested to do so by a marker. Thus the markers' choice of alternate routes is not restricted by the mode of outpulsing required.

*Making a second attempt at call-completion*

A "resend" feature is provided to improve the grade of service by allowing a second attempt to complete a call over a different route, if, for example, the route first chosen runs into link blockage.

*Identifying stations on two-party lines*

Two-party identification will be provided for billing purposes or class-of-service identification, in those switching systems in which the second party's phone on a party line is arranged to connect ground to the tip side of the line.

*Working with present, intermediate, and future numbering plans*

The present DDD numbering plan, and the intermediate plan involving All-Number Calling, require timing after only the first digit, to properly recognize all normal code patterns. In the E–A–X registers, this is done in the normal mode of operation. The numbering plan anticipated for the distant future will, however, require timing after the first, third, and seventh digits, in order to differentiate between special-service, local-area, and foreign-area calls. To accommodate this pattern, the register sender group is designed for a "future" mode of operation also, which provides this additional timing.

*Early outpulsing*

The register sender group is capable of outpulsing to the translator as soon as sufficient digits have been dialed to perform a translation, and will thereafter stay within one digit of the incoming dialed pattern.

*Prepay coin control*

Facilities are provided within the register sender for detection of coin deposit, and for refunding initial coin deposits. This obviates the requirement of providing paystation repeaters on a per-line basis; when necessary, a call will be routed through one of a common pool of coin-control insertion junctors, which are circuits inserted into a transmission path by the group selector, to provide supervision of coins deposited.

*Handling reverting calls*

Simply by comparing the called and calling line equipment numbers, the register will detect when a reverting call is in process; the subscriber need not dial any special reverting-call codes (although the register will also process such codes).

*Abbreviated dialing*

Facilities are provided that allow each authorized subscriber to dial abbreviated (two-digit) codes, when dialing certain stations which he calls frequently.

*Controlling "automatic time-out" speed*

Whenever the occupancy of the register sender is above a pre-determined level, the time-out interval between registration of successive digits is reduced, in all registers, to increase their traffic-handling capacity.

*Transmitting the calling number*

When required, the calling as well as the called number can be transmitted. The calling number may be sent in any of the three pulsing modes (dial pulse, multi-frequency, code pulse).

Patent No. 3,170,041, by K. K. Spellnes, for Communication Switching System, issued February 16, 1965, covers features of the switching system described herein, and in columns 33–35 thereof lists other related patent applications, some of which cover features disclosed herein. This list is made a part hereof as though fully set forth.

With respect to the subject matter claimed herein, note that the Spellnes Patent 3,170,041 claims the system arrangement in which the calling line equipment number is stored in the register on every call, which is essential to the arrangement for recognizing a revertive call as claimed herein. The basic arrangement for two-way communication between the senders and the markers is claimed in an application Serial No. 304,827, filed August 27, 1963, by B. Sherstiuk, now Patent No. 3,278,693, this two-way communication being required for some of the features claimed herein. One of these features is the receipt of a signal from the group selector marker when an alternate route has been chosen to modify the sender instructions, such as mode of outpulsing, skip digit, and end-of-send digit. The arrangement in the group selector marker for choosing an alternate route when there is no outlet available for the primary route is claimed in a copending application Serial No. 414,174, filed November 27, 1964, by W. B. Klees et al., for Arrangements in a Communication Switching System. All of these patents and applications are owned by the same assignee as the present application.

What is claimed is:

1. In a communication switching system comprising a plurality of switching groups, with marker apparatus for controlling the establishment of connections through said switching groups; having register-sender apparatus comprising register means and a plurality of senders; having translating means common to said plurality of switching groups, and means for transferring information directly between the register means and the translator means; having means including the marker apparatus, responsive to a calling line service request signal for identifying the calling line and connecting it to the register means; having means for transmitting the information identifying the equipment location number of the calling line from the marker apparatus to the register means for registration therein; and having means for registering in said register means the called line directory number as transmitted over the calling line and for translating, under the control of said translating means, at least a part of said directory information into corresponding equipment location information; there being included in the information returned from the translator a revertive call item designating whether or not the called line is possibly on the same line as the calling line:

a parity checking arrangement included in the register means to compare the calling line equipment location number as stored in the register with the called line equipment location number as received from the translator to generate a revertive call signal responsive to these numbers being identical, internal translation means responsive to coincidence of the revertive call item from the translator and the revertive call signal from the parity checking arrangement to supply switching information which is transmitted via one of said senders to marker apparatus to cause a connection from the line on which said calling and called parties appear to be completed to a revertive call trunk circuit.

2. In a communication switching system, the combination as claimed in claim 1, wherein said register means includes a memory, logic apparatus, and a transceiver; there being a plurality of registers each of which has a plurality of storage elements in the memory, with the storage elements for each register including a dialed digit storage area, a calling line number storage area, a switching digit storage area, and control information storage areas; a time division multiplex arrangement including the memory and the logic apparatus in a recirculating arrangement controlled by pulses in cyclically recurring time slots so that the logic apparatus is shared by the registers; the equipment location number of the calling line as received from the marker apparatus being stored in the calling line storage area of the register being used in that call, and the called line directory number being received by said logic apparatus and stored in the dialed digit storage area; a signalling path interconnecting the transceiver and the translating means, means for initiating a request for translation condition by a given register, and means effective during the time slot of said register responsive to said request condition and the transceiver being idle for loading information into the transceiver and supplying a request-for-service indication to the translator, means responsive to an acknowledgment of the request by the translating means for sending the information from the transceiver thereto over said signalling path, translated information being subsequently returned by the translating means over the signalling path to the transceiver and placed into the switching digit storage area during the time slot of the register being used:

wherein said internal translation means is effective in response to completion of receipt of information from the translator means and a signal indicating being in the time slot of the register using the transceiver, and said internal translation means includes an arrangement to produce switching digits and to place them in the switching digit storage area of the register, these switching digits being for routing to a revertive call trunk circuit.

3. In a communication switching system, the combination as claimed in claim 2, wherein there may be included in the information returned from the translator a ticketing-required item, and wherein said internal translation means further includes an arrangement responsive to the ticketing-required item and a failure of calling number identification to supply switching information into the switching digit storage area of the register which is then transmitted via the sender to the marker apparatus to cause a connection from the calling line to be completed to a checking operator circuit.

4. In a communication switching system, the combination as claimed in claim 3, wherein said register means further includes timing means started in response to the completion of dialed information and without accumulating seven dialed digits to time the receipt of the calling number identification received from an incoming trunk circuit.

5. In a communications switching system comprising a plurality of local line switching groups and a plurality of incoming trunk line switching groups, with marker apparatus for controlling the establishment of connections through the switching groups;

register-sender apparatus comprising a time division multiplex arrangement including a memory and logic apparatus in a recirculating arrangement controlled by pulses in cyclically recurring time slots so that the logic apparatus is shared by the registers, there being a plurality of registers each of which has a plurality of storage elements in the memory, with the storage elements for each register including a dialed digit storage area, a calling line number storage area, a switching digit storage area, and control information storage areas;

a plurality of register junctors individual to the registers with multiplex means effectively connecting them to the logic apparatus during the time slots of the associated registers;

means including the marker apparatus, responsive to a calling line service request signal at one of said local lines for identifying the calling line, selecting an idle register junctor, and causing a connection to be established between the calling line and the selected register junctor through the coresponding line switching group, means for identifying class of service of the calling line including an indication that this is a local line, means for transmitting information identifying the calling line and its class of service from the marker apparatus to the register means for registration in the calling line number storage area of the register associated with the selected register junctor;

means including the marker apparatus, responsive to a calling line service request at an incoming trunk line for identifying the calling trunk line, selecting an idle register, and causing a connection to be established between the calling trunk line and the selected register junctor, means for identifying the class of service of the calling trunk line including an indication that this is an incoming trunk, means for transmitting the information identifying the calling trunk line and its class of service from the marker apparatus to the register means for registration therein in the calling line storage area of the register associated with the selected register junctor;

translating means common to said plurality of switching groups, and means for transferring information directly between the register means and the translator means;

means including an accumulating counter and timing storage areas in the memory and associated circuits in the logic apparatus for receiving call signals from a calling line in a dial pulse mode to count the pulses in the accumulating storage area and to recognize an interdigital pause and in response thereto to cause each dialed digit to be shifted from the accumulating storage area into the dialed digit storage area; and means including multi-frequency receiving circuits in at least some of said register junctors and including circuits in said logic apparatus to receive signals from a calling line in a multi-frequency mode and to enter the digits in the dialed digit storage area of the register.

6. In a communication switching system, the combination as claimed in claim 5, wherein said logic apparatus includes a bi-stable device (TN), said device being set in response to the receipt of a given code pattern;

means responsive to the coincidence of said device being set and a local class of service to write a totals digit equal to four into the memory and alternatively to the coincidence of said device being set and a total class of service to write a totals digit equal to three into the memory, whereby said code pattern may be interpreted to have one meaning if received from a local line and another meaning if received from an incoming trunk line.

7. In a communication switching system, the combination as claimed in claim 6, wherein said given code pattern comprises three digits, wherein in response to the totals digit equal to three, these three digits are sent to the translator means, and wherein alternatively in response to the totals digit equals to four, after another digit is received, the four digits are sent to the translator means.

8. In a communication switching system, the combination as claimed in claim 7, wherein said given code pattern is a digit "one," a digit other than "one" or "zero," and a digit "one," which received from an incoming trunk line designates an intertoll operator code, and which received from a local line designates a station-to-station ticketing call and the beginning of an area code.

9. In a communication switching system, the combination as claimed in claim 5, further including means which comprise receivers in at least some of said register junctors and incoming circuits in said logic apparatus to receive signals from a local calling line in a push-button call mode and to enter the digits into the digit storage area of the register.

10. In a communication switching system, the combination as claimed in claim 9, wherein said push-button call mode is a multi-frequency mode.

11. In a communication switching system comprising a plurality of switching groups, with marker apparatus for controlling the establishment of connections through said switching groups; having register-sender apparatus comprising register means and a plurality of senders; having translating means common to said plurality of switching groups, and means for transferring information directly between the register means and the translator means; having means including the marker apparatus, responsive to a calling line service request signal for identifying the calling line and connecting it to the register means; having means for transmitting the information identifying the equipment location number of the calling line from the marker apparatus to the register means for registration therein; and having means for registering in said register means the called line directory number as transmitted over the calling line and for translating, under the control of said translating means, at least a part of said directory information into correspoding equipment location information:

said register means including a bi-stable device designating a time-out interval, said device being set in response to a counter reaching a given time-out interval after the receipt of a given number of digits of dialed information from a calling line;

an arrangement to generate a signal in response to the output of said device to generate an instruction digit designating a dialing time out and to request a translation of said given number of digits; and means to transmit the calling line number together with said dialed digits, and instruction digit to the translating means for a translation from a repertory associated with the calling line.

12. In a communication switching system, the combination as claimed in claim 11, wherein said given number of digits is either one or two, and said arrangement includes a one-digit-call bistable device (HE) and a two-digit-call bistable device (RP), the one-digit-call device being set in response to the setting of said time-out bistable device with one digit received to cause one digit to be sent for translation, and alternatively the two-digit-call device being set in response to the setting of the timeout device with two digits received to cause two digits to be sent for translation.

13. In a communication switching system, the combination as claimed in claim 11, wherein said repertory for some calling lines comprises switching information of called line destinations designated by the abbreviated dialing code, and for some calling lines comprises switching information to make a connection to a home extension intercommunication trunk.

14. In a communication switching system, the combination as claimed in claim 11, wherein said register means includes a memory, logic apparatus, and a transceiver; there being a plurality of registers each of which has a plurality of storage elements in the memory, with the storage elements for each register including a dialed digit storage area, a calling line number storage area, a switching digit storage area, and control information storage areas; a time division multiplex arrangement including the memory and the logic apparatus in a recirculating arrangement controlled by pulses in cyclically recurring time slots so that the logic apparatus is shared by the registers; the equipment location number of the calling line as received from the marker apparatus being stored in the calling line storage area of the register being used in that call, and the called line directory number being received by said logic apparatus and stored in the dialed digit storage area; a signalling path interconnecting the transceiver and the translating means, means for initiating a request for translation condition by a given register, and means effective during the time slot of said register responsive to said request condtion and the transceiver being idle for loading information into the transceiver and supplying a request-for-service indication to the translator, means responsive to an acknowledgment of the request by the translating means for sending the information from the transceiver thereto over said signalling path, translated information being subsequently returned by the translating means over the signalling path to the transceiver and placed into the switching digit storage area during the time slot of the register being used.

15. In a register-translator communication switching system comprising a plurality of line terminals designated by individual equipment numbers, a plurality of lines individually connected to said line terminals, a plurality of subscriber stations designated by individual directory numbers connected to said lines, at least some of said lines being party lines having a plurality of such stations with different directory numbers connected thereto, a switching network for selectively interconnecting said line terminals, revertive call apparatus to supply signals and permit communication between two stations on the same line, register means, means to receive and store in said register means the equipment number of a line terminal on whose line there is a calling station, means in said register means to receive call signals designating a called line directory number from the calling station via its line and line terminal and means to record that number, a common translator, means to interconnect the register means and the common translator, means to supply said called line directory number to the translator and to receive therefrom the called line equipment number, means to store that number in the register means, switching network control means, means to supply the called line equipment number to said control means, which then controls the switching network to complete a connection from the calling line terminal to the called line terminal:

the improvement comprising a parity checking arrangement included in said register means to compare the calling line equipment location number as stored in the register means with the called line equipment location number as received from the translator, said parity checking arrangement being effective to generate a revertive-call signal responsive to these numbers being identical, means responsive to said revertive-call signal to supply switching instructions to said network control means to connect the line terminal designated by said equipment number to said revertive call apparatus.

16. Register-sender apparatus for use in a communication switching system having switching stages controlled by marker apparatus for extending connections between calling and called lines, some of said lines being outgoing trunk lines to other switching offices, and a common translator; wherein said register-sender apparatus includes a plurality of registers and a plurality of senders, with each of said registers having a plurality of storage elements, the storage elements for each register including a dialled-digit storage area, a switching-digit storage area, and a sender-instruction storage area, means under the control of said marker apparatus to connect a calling line to a register for the transmission of call signals designating the directory number of a called line for registration in said dialled-digit storage area of that register, an arrangement to transfer at least a portion of the called line directory number from said dialled digit storage area to the translator, and to receive from the translator information for storage in said switching-digit storage area and sender-instruction storage area, a data transfer arrangement to transmit switching digit information from the senders to said marker apparatus in a local mode and to receive information from the marker apparatus to the senders, said senders further having an arrangement to transmit information via trunk lines in any one of a plurality of outpulsing modes, and wherein said sender-instruction information includes a designation of the modes of transmission by the sender and the designation of which digits are to be sent, wherein there is an arrangement to supply digit and instruction information from the register storage areas to the sender to first cause the sender to transmit in the local mode at least a portion of said switching digits for use by the marker apparatus to establish a connection to a called line, and further when the called line is an outgoing trunk line to supply digits selected from the dialled-digit and switching-digit storage areas along with an instruction from the sender-instruction area to the sender to outpulse these digits in a designated mode;

the improvement in said register apparatus wherein said information received from the translator and stored in said sender-instruction storage area and switching-digit storage area for an outgoing call includes the instructions and switching digits required both for a primary route and any alternate routes to the call destination, wherein each register further includes an alternate-route storage area, means including said data transfer arrangement to receive from the marker apparatus and to store it in said alternate-route storage area information which may include a designation that the marker apparatus has selected an alternate route, and means under the control of the information in the alternate-route storage area to supply digits and instructions to the sender to outpulse the required digits in the required mode for the route selected by the marker apparatus.

(References on following page)

(References on following page)

References Cited by the Examiner

UNITED STATES PATENTS

| | | | |
|---|---|---|---|
| 3,113,183 | 12/1963 | Townsend | 179—18.3 |
| 3,188,395 | 6/1965 | Blashfield | 179—18.61 X |
| 3,206,554 | 9/1965 | Kandel et al. | 179—18 |
| 3,223,784 | 12/1965 | Inose et al. | 179—18.9 X |

KATHLEEN H. CLAFFY, *Primary Examiner.*

L. A. WRIGHT, *Assistant Examiner.*